US012703891B2

(12) United States Patent
Tour et al.

(10) Patent No.: US 12,703,891 B2
(45) Date of Patent: Aug. 11, 2026

(54) ULTRAFAST FLASH JOULE HEATING SYNTHESIS METHODS AND SYSTEMS FOR PERFORMING SAME

(71) Applicant: William Marsh Rice University, Houston, TX (US)

(72) Inventors: James M. Tour, Houston, TX (US); Bing Deng, Houston, TX (US)

(73) Assignee: William Marsh Rice University, Houston, TX (US)

( * ) Notice: Subject to any disclaimer, the term of this patent is extended or adjusted under 35 U.S.C. 154(b) by 555 days.

(21) Appl. No.: 18/246,460

(22) PCT Filed: Sep. 24, 2021

(86) PCT No.: PCT/US2021/052070
§ 371 (c)(1),
(2) Date: Mar. 23, 2023

(87) PCT Pub. No.: WO2022/067111
PCT Pub. Date: Mar. 31, 2022

(65) Prior Publication Data
US 2023/0374623 A1 Nov. 23, 2023

Related U.S. Application Data

(60) Provisional application No. 63/144,862, filed on Feb. 2, 2021, provisional application No. 63/082,592, filed on Sep. 24, 2020.

(51) Int. Cl.

| | |
|---|---|
| ***C22B 4/00*** | (2006.01) |
| ***C01B 32/196*** | (2017.01) |
| ***C22B 3/04*** | (2006.01) |
| ***C22B 4/04*** | (2006.01) |
| ***C22B 4/08*** | (2006.01) |
| ***C22B 11/02*** | (2006.01) |
| ***C22B 59/00*** | (2006.01) |

(52) U.S. Cl.
CPC .............. *C22B 4/00* (2013.01); *C01B 32/196* (2017.08); *C22B 3/04* (2013.01); *C22B 4/08* (2013.01); *C22B 11/025* (2013.01); *C22B 4/04* (2013.01); *C22B 59/00* (2013.01)

(58) Field of Classification Search
CPC .... C22B 4/08; C22B 4/00; C25C 5/00; B03C 11/00
See application file for complete search history.

(56) References Cited

U.S. PATENT DOCUMENTS

2017/0159192 A1* 6/2017 Helton ...................... C25C 3/06

FOREIGN PATENT DOCUMENTS

WO WO-2014037433 A1 * 3/2014 ............... C22B 3/06

OTHER PUBLICATIONS

Shi, Fengnian; Weiran Zuo, Emmy Manlapig. Pre-concentration of copper ores by high voltage pulses. Part 2: Opportunities and challenges. Minerals Engineering 79 pp. 315-323 (Year: 2015).*

* cited by examiner

*Primary Examiner* — Tima M. Mcguthry-Banks
(74) *Attorney, Agent, or Firm* — Dickinson Wright PLLC; Ross Spencer Garsson

(57) ABSTRACT

Ultrafast flash Joule heating synthesis methods and systems, and more particularly, ultrafast synthesis methods to recover metal from ores, fly ash, and bauxite residue (red mud).

24 Claims, 103 Drawing Sheets

Vapor Pressure (Pa)
Temperature (K)
MoCl3
WO3
V2O5
Cr
Ti
V2O5
C
10^5
10^4
10^3
10^2
10^1
10^0
10^-1
10^-2
500
1000
1500
2000
2500
3000
3500

Rapid Heating
1901

Stable Sintering
1902

Rapid Cooling
1903

| | Hg | As | Cd | Zn | Pd | Ag | Al | Cu | Sn | Cr | Au | Fe | Pd | C | Rh | Pt |
|---|---|---|---|---|---|---|---|---|---|---|---|---|---|---|---|---|
| Hg | 1 | 2309 | 2309 | 50000 | 100000 | 100000 | 100000 | 100000 | 100000 | 100000 | 100000 | 100000 | 100000 | 100000 | 100000 | 100000 |
| As | 2309 | 1 | 9.13 | 69.9 | 100000 | 100000 | 100000 | 100000 | 100000 | 100000 | 100000 | 100000 | 100000 | 100000 | 100000 | 100000 |
| Cd | 2309 | 9.13 | 1 | 5.71 | 28089 | 100000 | 100000 | 100000 | 100000 | 100000 | 100000 | 100000 | 100000 | 100000 | 100000 | 100000 |
| Zn | 50000 | 69.9 | 5.71 | 1 | 2066 | 100000 | 100000 | 100000 | 100000 | 100000 | 100000 | 100000 | 100000 | 100000 | 100000 | 100000 |
| Pd | 100000 | 100000 | 28089 | 2066 | 1 | 12.1 | 129 | 175 | 206 | 680 | 913 | 1961 | 2439 | 100000 | 100000 | 100000 |
| Ag | 100000 | 100000 | 100000 | 100000 | 12.1 | 129 | 6.69 | 8.64 | 10 | 19.8 | 35 | 56.1 | 78.7 | 100000 | 19083 | 34130 |
| Al | 100000 | 100000 | 100000 | 100000 | 129 | 6.69 | 1 | 1.25 | 1.65 | 2.31 | 4.21 | 5.5 | 8.32 | 100000 | 735 | 1235 |
| Cu | 100000 | 100000 | 100000 | 100000 | 175 | 8.64 | 1.25 | 1 | 1.3 | 1.8 | 3.35 | 4.43 | 6.5 | 513 | 870 | 100000 |
| Sn | 100000 | 100000 | 100000 | 100000 | 206 | 10 | 1.65 | 1.3 | 1 | 1.3 | 2.45 | 3.39 | 5.19 | 349 | 584 | 5618 |
| Cr | 100000 | 100000 | 100000 | 100000 | 680 | 19.8 | 2.31 | 1.8 | 1.3 | 1 | 1.96 | 2.57 | 3.89 | 247 | 401 | 3141 |
| Au | 100000 | 100000 | 100000 | 100000 | 913 | 35 | 4.21 | 3.35 | 2.45 | 1.96 | 1 | 1.28 | 2.16 | 90.6 | 160 | 745 |
| Fe | 100000 | 100000 | 100000 | 100000 | 1961 | 56.1 | 5.5 | 4.43 | 3.39 | 2.57 | 1.28 | 1 | 1.59 | 61.1 | 105 | 443 |
| Pd | 100000 | 100000 | 100000 | 100000 | 2439 | 78.7 | 8.32 | 6.5 | 5.19 | 3.89 | 2.16 | 1.59 | 1 | 31.7 | 60.2 | 172 |
| C | 100000 | 100000 | 100000 | 100000 | 100000 | 100000 | 100000 | 513 | 349 | 247 | 90.6 | 61.1 | 31.7 | 1 | 1.4 | 2.18 |
| Rh | 100000 | 100000 | 100000 | 100000 | 100000 | 19083 | 19083 | 870 | 584 | 401 | 160 | 105 | 60.2 | 1.4 | 1 | 1.48 |
| Pt | 100000 | 100000 | 100000 | 100000 | 100000 | 34130 | 1235 | 100000 | 5618 | 3141 | 754 | 443 | 172 | 2.18 | 1.48 | 1 |

FIG. 36

CFA-C

Concentration (ppm)

200 150 100 50 0

$Y_0$ (%)

100 80 60 40 20 0

Sc Y La Ce Pr Nd Sm Eu Gd Tb Dy Ho Er Tm Yb Lu

REE

HCl Extractable

Total Digestion

CFA-F
Concentration (ppm)
400
300
200
100
0
50
80
100
120
150
Voltage (V)
γ/γ0 (%)
200
150
100
50
0

CFA-F Raw
activated CFA-F
4402
4401
γ (%)
100
80
60
40
20
0
4
3
2
1
0
pH

CFA-C Raw
activated CFA-C
4404
4403
γ (%)
120
100
80
60
40
20
0
4
3
2
1
0
pH $c_{total}$(CFA-Raw): REE content by total quantification from CFA raw materials $c_0$(CFA-Raw): acid leachable REE content from CFA raw materials c(activated CFA): acid leachable REE content from CFA after FJH

CFA

Ball Milling

CFA + CB

FJH

Activated CFA 2 cm

4501

2 cm

4502

2 cm

4503

ULTRAFAST FLASH JOULE HEATING SYNTHESIS METHODS AND SYSTEMS FOR PERFORMING SAME

CROSS-REFERENCE TO RELATED PATENT APPLICATIONS

This application is a 35 U.S.C. § 371 national application of PCT Application No. PCT/US21/52070, filed on Sep. 24, 2021, entitled "Ultrafast Flash Joule Heating Synthesis Methods And Systems For Performing Same," which claims priority to U.S. Patent Appl. Ser. No. 63/082,592, filed Sep. 24, 2020, entitled "Ultrafast Flash Joule Heating Synthesis Methods And Systems For Performing Same." This application also claims priority to U.S. Patent Appl. Ser. No. 63/144,862, filed Feb. 2, 2021, entitled "Ultrafast Flash Joule Heating Synthesis Methods And Systems For Performing Same." These patent applications are commonly owned by the owner of the present invention. These patent applications are incorporated herein in their entirety.

GOVERNMENT INTEREST

This invention was made with government support under Grant No DE-FE0031794, awarded by the United States Department of Energy and under Grant No. FA9550-19-1-0296, awarded by the United States Department of Defense/Air Force Office of Scientific Research. The United States government has certain rights in the invention.

TECHNICAL FIELD

The present invention relates to ultrafast flash Joule heating synthesis methods and systems, and more particularly, ultrafast synthesis methods to recover metal from ores, fly ash, and bauxite residue (red mud).

BACKGROUND

Highly efficient and low-cost synthesis of nanomaterials is the prerequisite for their commercial applications.

Carbides

Nanosized transition metal carbides (TMCs) have been widely used as the precursors for ultra-hard and ultra-strong ceramics [Zou 2013; Zhang 2019; Reddy 2012], high-performance electrochemical catalysts because of their platinum-like electronic structures [Li 2018; Zhong 2016; Gao 2019; Gong 2016; Han 2018], and catalyst supports due to the strong metal-substrate interactions [Lin 2017; Yao 2017]. Traditional methods for bulk carbide syntheses include carburization of metal precursors with gaseous carbon precursors or sintering of metal precursors with graphitic carbon at high temperature. [Rosa 1983] These procedures can be problematic since they result in coked carbide surfaces due to the excessive supply of carbon sources, and large particle sizes with low surface areas that are detrimental to catalytic performance. [Chen 2013; Zeng 2015].

Much effort has been devoted to synthesizing carbides with fine particle sizes, including temperature-programmed reduction [Oyama 2992], carbothermic reduction of metal precursors [Wu 2020; Wang K 2019], laser spray pyrolysis of metal complexes [Kolel-Veetil 2005], and solution-based precipitation and carburization [Wan 2014]. The TPR method is versatile for high surface-area metal carbide synthesis but requires well-optimized reaction windows. [Claridge 2000]. The carbothermic reduction of metal precursors in a furnace is universal in synthesis of TMCs [Wu 2020]; however, extended high-temperature conditions are essential to compensate the slow solid-solid reaction kinetics, which inevitably result in sintering or agglomeration [Wang K 2019].

To avoid severe agglomeration, a microwave combustion method was developed for rapid synthesis of $Mo_2C$ and WC nanodots within 2 min. [Wan 2019]. The pyrolysis of metal complexes involves the use of costly and toxic metal-organic compounds such as $Cp_2Mo_2(CO)_6$ for the synthesis of $Mo_2C$ [Kolel-Veetil 2005; Wolden 2011] and $W(CO)_6$ for the synthesis of WC [Pol 2009].

The type of carbide is also limited by the availability of volatile metal compounds. The solution-based precipitation and carburization requires long annealing times for full conversion. For example, annealing at 850° C. for 12 to 24 h is needed for the synthesis of MoC using ammonium heptamolybdate ($(NH_4)_6Mo_7O_{24}\cdot 4H_2O$) as the precursor [Wan 2014].

Recently, several non-conventional electrical thermal processes have been developed towards energy-efficient high temperature synthesis. [Wang 2020; Giorgi 2018; Yan 2018]. The thermal shock (CTS) process used short current pulses for synthesis of high-entropy alloy nanoparticles on carbon supports at ~2000 K. [Yan 2018]. The ultrahigh temperature sintering (UHS) based on current-induced heating was proposed for sintering and screening of ceramics within 10 s. [Wang 2020]. The spark flash sintering (SPS) applied an electric current for the reactive carbothermic synthesis of zirconium carbide (ZrC) in 10 min. [Giorgi 2018]. However, these approaches are targeting the sintering of bulk ceramics and lack the ability in synthesis of fine nanocrystals.

Furthermore, phases and crystal surface structure play significant roles in the behavior of carbides, such as in their hydrogen adsorption/desorption energy. [Gong 2016; Politi 2013] However, there are very few procedures to selectively engineer the phases and crystal surfaces of carbides for maximal performance. [Gong 2016; Wan 2014].

Electrocatalytic hydrogen evolution (HER) reactions depend on the availability of low-cost electrocatalysts. TMC are highly promising in HER due to their platinum-like electronic structures. [Gao 2019]. However, state-of-art methods to synthesize metal carbides nanoparticles have the limitation of high cost and low productivity. [Gong 2016]. Critically, most methods are too specific and lack generality, and are also hard for the phase control. [Wan 2014].

Corundum

High-surface-area corundum nanoparticles ($\alpha$-$Al_2O_3$NPs) have widespread applications. For examples, corundum is widely used in ceramics for prosthetic implants [De Aza 2002] and high-speed cutting tools [Kumar 2003]. $\alpha$-$Al_2O_3$NPs precursors provide access to nanometer-grained alumina ceramics with significantly improved fracture toughness [Ighodaro 2008], wear resistance [Krell 1996], and high density under reduced sintering temperature [Guo 2016]. Even though $\gamma$-$Al_2O_3$NPs are primarily used as catalyst supports due to their high surface area [Peterson 2014], the $\alpha$-$Al_2O_3$NPs are also used as catalyst supports and they have higher mechanical stability in auto-exhaust Pt—Mo—Co catalytic converters [Frank 1998], and enhanced Ru catalyst activity for ammonia synthesis. [Lin 2019].

Much effort has been made toward improving the synthesis of $\alpha$-$Al_2O_3$, yet few of the processes afford high-surface-area NPs due to the intrinsic thermodynamic limits. [Guo 2016; McHale 1997; Amrute 2019]. Even though corundum is the thermodynamically stable phase of coarsely crystalized aluminum oxide ($Al_2O_3$), the synthesis of nanocrystalline $Al_2O_3$ usually leads to $\gamma$-$Al_2O_3$ because of its lower surface energy when surface areas are greater than 125 $m^2$ $g^{-1}$. [McHale 1997].

Another reason is the high activation energy barrier of ~485 kJ $mol^{-1}$ for the phase transformation from the cubic close-packed structure of the $\gamma$-phase to the hexagonal close-packed structure of the $\alpha$-phase. [Steiner 1971]. As a result, the thermal processes usually require temperatures >1470 K with prolonged annealing times of 10 to 20 h to facilitate the transformation. [Steiner 1971; Levin 1998]. The high-energy input and extended high-temperature annealing leads to surface area <10 $m^2$ $g^{-1}$ because of the substantial mass transfer. [Amrute 2019]. Moreover, the polymorphism of $Al_2O_3$ during the phase transformation further increases the complexity and could lead to the mixed transition (t)-alumina with undesired $\delta$- and $\theta$-$Al_2O_3$. [Steiner 1971; Chang 2001; Laine 2006]. Representative methods for corundum nanoparticles are rather time- and energy-consuming, such as, for example, annealing of $\gamma$-$Al_2O_3$ at 1473-1673K for 10-20 h [Lodziana 2004], and hydrothermal reaction of $\gamma$-AlOOH at 723K and 1200 bar for 35 days [McHale 1997; Loffler 2003].

Accordingly, the production of $\alpha$-$Al_2O_3$ by phase transformation from the cubic close-packed gamma phase ($\gamma$-$Al_2O_3$) is usually hampered by the high activation energy barrier (~485 kJ $mol^{-1}$), which requires extended high-temperature thermal annealing (~1500 K, 10 to 20 h) and suffers from severe agglomeration. Hence, developing a method that is ultrafast and energy-saving is critical for the broad applications of $\alpha$-$Al_2O_3$ nanoparticles.

E-Waste

Recovery of valuable metals from waste is significant for the circular economy and is also critical for solving environmental issues. Specifically, electronic wastes (e-waste) that contain rich valuable elements.

The e-wastes comes from discarded electrical or electronic devices. Precious metal recovery from electronic waste, termed "urban mining," is important for a circular economy. Present methods for urban mining, mainly smelting and leaching, suffer from lengthy purification processes and negative environmental impacts.

More than 40 million tons of electronic waste (e-waste) are produced globally each year [Zhang 2012; Zeng 2018], which is the fastest-growing component of solid wastes due to the rapid upgrade of personal electrical and electronic equipment [Ogunseitan 2009; Wang 2016]. Most e-waste is landfilled with only ~20% being recycled [Ghosh 2015], which could lead to negative environmental impact due to the broad use of heavy metals in electronics [Leung 2008; Julander 2014; Awasthi 2019].

E-waste could become a sustainable resource because it contains abundant valuable metals. [Kaya 2016]. The concentrations of some precious metals in e-waste are higher than those in ores. [Zhang 2012]. Precious metals recovery from e-waste, i.e., urban mining, is becoming more cost-effective than virgin mining [Zeng 2018] and important for a circular economy [Awasthi 2019].

Similarly, due to the broad use of heavy metals in electronics, including Cd, Co, Cu, Ni, Pb, and Zn, e-waste could lead to significant health risks and negative environmental impacts. [Leung 2008; Julander 2014; Awasthi 2019]. The heavy metal leakage due to improper landfill disposal leads to environmental disruption. [Zhang 2012; Awashthi 2019]. The release of hazardous components during the recycling processes in the form of dust or smoke [Leung 2008] deteriorates the health of recycling workers and local residents. For example, a significantly higher concentration of Pb has been found in the blood of e-waste workers. [Julander 2014; Popoola 2019].

The lack of high-yielding and environmentally friendly recovery processes are main obstacles to urban mining. [Kaya 2016]. The traditional method for e-waste recycling is based on a pyrometallurgy process [Hall 2007], where metals are melted by heating at high temperature. Pyrometallurgy is energy-intensive, lacks selectivity, and requires high-grade precursors. [Cui 2008]. Pyrometallurgical processes also produce hazardous fumes containing heavy metals, especially for those with low melting points such as Hg, Cd, and Pb. [Kaya 2016]. The hydrometallurgical process is more selective and done by leaching the metals using acid, base, or cyanide. [Sun Z 2017]. The leaching kinetics are usually slow. The use of highly concentrated leaching agents renders the hydrometallurgical process difficult for large-scale applications, and large amounts of liquid waste and sludge are produced that could result in secondary pollution. [Jafhav 2015]. Biometallurgy could be highly selective and environmentally sustainable, yet it is still in its infancy. [Zhuang 2015]. The separation of valuable metals from various materials matrices, including plastics, glass, and ceramics, are based upon their difference in physical or chemical properties. For example, the gravity separation technique relies on differing specific densities. [Sarvar 2015]. Magnetic separation is used to separate magnetic metals from nonferrous waste. [Yamane 2011]. Hydrometallurgical separation is based upon the chemical reactivity of metals with leaching agents. [Sethurajan 2019].

Electronic components contain potentially very harmful materials, including lead (Pb), cadmium (Cd), beryllium (Be) and chromium (Cr). If released into the environment, these harmful materials can result in a number of waterborne or even airborne diseases. At the same time, the circuit boards contains many precious metals, like gold (Au), silver (Ag), and platinum (Pt), as well as rare earth elemental metals that are hard to mine and considered critical elements for electronics manufacture and electric motors, including neodymium (Nd) and dysprosium (Dy). Mining or processing of these latter rare earth elements are controlled by foreign governments, raising concerns for the US essential element security for its manufacturing needs. However, less than 20% of e-waste is recycled, with 80% being landfill. One way for e-waste recycling is by melting circuit boards and leaching the valuable metals. [Sthiannopkao 2013]. The traditional recycling method that is usually handled in developing countries exposes workers to hazardous and carcinogenic substances. Hence, an ultraclean and highly efficient way to recycle the valuable metals from e-waste is highly needed.

Ores, Fly Ash, And Bauxite Residue (Red Mud)

Similar situations pertains to ores, fly ash, and red mud (red mud is more recently referred to as bauxite residue), again because rare earth elements (REE) are strategic resources in modern electronics, clean energy, and automotive industries. [Cheisson 2019]. Concentrated aqueous acid leaching of the REE minerals followed by biphasic solvent extraction has been the dominant scheme for REE mass production. [Cheisson 2019]. However, the resource- and pollution-intensive production has a large environmental footprint, where the degrative environmental cost reached $14.8 billion in 2015, warranting a search for a sustainable solution. [Lee 2018]. As the easily accessible REE minerals diminish, the extraction of REE from industrial wastes has gained much attention. [Jyothi 2020]. The applicable secondary wastes include coal fly ash (CFA) [Taggart 2016;

Smith 2019; Zhang 2020; Liu 2019; Sahoo 2016; Middleton 2020], bauxite residue (BR, which is also called red mud) [Deady 2016; Rivera 2018; Reid 2017], which results from bauxite processing for aluminum production, and, electronic waste (e-waste) [Maroufi 2018; Deshmane 2020; Peelman 2018] from consumer electronics and electric vehicles. Annual production of alumina in 2018 was approximately 160 million tons. Red mud is a highly alkaline waste composed of mainly oxides including $Fe_2O_3$, $Al_2O_3$, $TiO_2$, CaO, $SiO_2$, and $Na_2O$. Moreover, red mud also contains valuable rare earth elements, including La, Ce, Pr, Nd, Sm, Eu, Gd, Tb, Dy, Ho, Er, Tm, Yb, Lu, Y. [Deady 2016]. Accordingly, similar situations as discussed above with respect to needs to recovery metals from e-waste likewise pertain to ores, fly ash, and bauxite residue (red mud).

The reuse of these wastes in turn reduces the environmental burden of their disposal. [Sahoo 2016]. However, the REE contents in these secondary wastes are usually less than that in REE minerals, and the recycling yields are still extremely low, which exacerbate the quest to establish a circular economic program. [Taggart 2016].

Taking CFA as an example, it is the by-product of coal combustion with an annual production rate of ~750 million tons worldwide. [Sahoo 2016]. CFA has an average total REE content of ~500 ppm, which is variable based upon the geological origin of the feed coals. [Taggart 2016; Middleton 2020]. The acid extractable REE content, however, is usually much smaller and highly dependent on the CFA feeds. For example, Taggart 2016 reported the $HNO_3$ extractability of REE ranging from 1.6% to 93.2% with a median value of ~30% from major U.S. power plants, or 7.4 ppm to 372 ppm with a median value of ~127 ppm. REE extractability in CFA depends on the REE species, such as oxides, phosphates (churchite, xenotime, monazite, etc.), apatite, zircon, and glass phases. [Liu 2019]. The low REE extractabilities in most CFA resources are attributed to the large ratios of hard-to-dissolve REE species such as REE phosphates, zircon, and glass phases. [Liu 2019].

Optimizing acid leaching processes could, to some extent, improve the extractability by using highly concentrated mineral acids, such as 15 M $HNO_3$ at 85-90° C. for an extractability of 70% [Taggart 2016], and 12 M HCl at 85° C. for an extractability of 35-100%, depending on the feeds [King 2018]. The use of concentrated acid, however, inevitably increases the cost of extraction and the disposal burden. Chemical or thermal pretreatments of the CFA prior to acid leaching contribute to achieving high REE recovery. [Wang Z 2019; Taggart 2018]. For examples, a total REE recovery of 88% is achieved by the NaOH hydrothermal treatment followed by acid leaching. [Wang Z 2019]. Alkali roasting using NaOH leads to a recovery yield >90%. [Taggart 2018]. However, those pretreatment processes are usually lengthy and energy-intensive, which greatly reduce the profit margin and incentive.

Moreover, there are environmental hazards in the discharge of these materials. Discharge of red mud is very environmentally hazardous because of its alkalinity. In October 2010, about one million cubic meters of red mud was accidently released into the countryside in Hungary, killing ten people and polluting the surrounding areas. Indeed, developed methods to separate and recover rare earth elements, such as, for instance, leaching and cation-exchange chromatography [Ochsenkuhn-Petropulu 1995] can result in secondary pollution in view of the large amounts of acid used.

Thus, present methods for REE recovery suffer from lengthy purifications, low extractability, and high wastewater streams. Hence, there remains a need for a rapid and energy-efficient pretreatment for the REE recovery from ores, fly ash, and bauxite residue (red mud). There further remains a need to develop a "dry" method to directly recovery the rare earth elements in ores, fly ash, and bauxite residue (red mud).

SUMMARY OF THE INVENTION

The present invention relates to ultrafast flash Joule heating synthesis methods, and more particularly, embodiments of the present invention include ultrafast synthesis methods to recover metal from ores, fly ash, and bauxite residue (red mud).

Such solvent-free processes based on flash Joule heating can provide for the ultrafast synthesis for activating ores, fly ash, and bauxite residue (red mud) to improve the REE extractability. The FJH process thermally degrades or reduces the hard-to-dissolve REE species to components with high thermodynamic solubility, leading to ~2 times increase of leachability content and a high recovery yield using diluted acid (e.g., 0.1 M HCl). The activation can be utilized for for various wastes including coal fly ash and bauxite residue (red mud). The rapid FJH process is energy-efficient with a low electrical energy consumption of 600 kWh $ton^{-1}$, enabling a profit increase of greater than 10 times.

In general, in another embodiment, the invention features a method of recovering metal. The method includes mixing a material with a conductive additive to form a mixture. The material is prepared from ores, fly ash, and/or bauxite residue. The method further includes applying a voltage across the mixture to recover metal from the material. The voltage is applied in one or more voltage pulses. Duration of each of the one or more voltage pulses is for a duration period. The method further includes collecting the recovered metal. The recovering and collecting of the metal comprises performing a leaching process after applying the voltage across the mixture.

Implementations of the invention can include one or more of the following features:

The conductive additive can be a carbon source.

The material can be prepared from ore.

The material can be prepared from fly ash.

The material can be prepare from bauxite residue.

The material can be prepared by performing a mechanical process to transform the material into a fine powder.

The mechanical process can be selected from a group consisting of cutting the material into small pieces, crushing the material, grinding the material, milling the material, and combinations thereof.

The fine powder can be a microscale fine powder.

The conductive additive can be selected from a group consisting of elemental carbon, carbon black, graphene, flash graphene, coal, anthracite, coke, metallurgical coke, calcined coke, activated charcoal, biochar, natural gas carbon that had been stripped of its hydrogen atoms, activated charcoal, shungite, plastic waste, plastic waste-derived carbon char, food waste, food waste-derived carbon char, biomass, biomass-derived carbon char, hydrocarbon gas, and mixtures therefrom.

The conductive additive can be carbon black.

The conductive additive can be predominately elemental carbon.

The material and the conductive additive can be mixed at a weight ratio in a range of 1:2 and 25:1.

The voltage applied can be in a range of 15 V and 300 V.

The mass of the mixture to which the voltage is applied can be more than 1 kg. The voltage applied can be between 100 V and 100,000 V.

The mass of the mixture to which the voltage is applied can be more than 100 kg.

The mass of the mixture to which the voltage is applied can be more than 1 kg. The current applied can be between 1,000 amps and 30,000 amps.

The mass of the mixture to which the voltage is applied can be more than 100 kg.

The mixture can have a resistance in the range of 0.1 ohms and 25 ohms when the voltage is applied.

The duration period for the duration of each of the one or more voltage pulses can be between 1 microsecond and 25 seconds.

The duration period for the duration of each of the one or more voltage pulses can be between 1 microsecond and 10 seconds.

The duration period for the duration of each of the one or more voltage pulses can be between 1 microsecond and 1 second.

The duration period for the duration of each of the one or voltage pulses can be between 100 microseconds and 500 microseconds.

The one or more voltage pulses can be between 2 voltage pulses and 100 voltage pulses.

The voltage pulse can be performed using direct current (DC).

The method can be performed utilizing a pulsed direct current (PDC) Joule heating process.

The voltage pulse can be performed using alternating current (AC).

The voltage pulse can be performed by using both direct current (DC) and alternating current (AC).

The method can switch back and forth between the use of direct current (DC) and alternating current (AC).

The method can concurrently use direct current (DC) and alternating current (AC).

The one or more voltage pulses can increase the temperature of the mixture to at least 3000 K.

The metal can include a rare earth element.

The metal can include precious metal.

The materials can include a metal oxide. The step of applying a voltage across the mixture can result in a carbothermic reaction of the metal oxide to recover the metal.

The applying of the voltage across the mixture to recover the metal from the material can be performed at a pressure between 0.001 and 25 atmospheres.

The pressure can be around 1 atmosphere.

The pressure can be at least 2 atmospheres.

The pressure can be at least 10 atmospheres.

The pressure can be at least 20 atmospheres.

The method can be performed using a pressurized cell.

The applying of the voltage across the mixture to recover the metal from the material can result in a majority of the metal remaining with graphene created by the method.

The step of collecting can include collecting a gas stream comprising volatized products produced by the application of the voltage across the mixture.

The the step of collecting can further include cooling the gas stream.

The leachability of metals in the mixture after applying a voltage across the mixture can be more than two times the leachability content of the metals in the mixture before applying the voltage across the mixture, when conducted using the same pH and same volume of aqueous treatment.

The leaching process can be performed using a diluted acid.

The diluted acid can be at most 1 M of the acid.

The diluted acid can be at most 0.1 M of the acid.

The diluted acid can be at least 1 M of the acid.

The method can be performed in a continuous process or automated process.

In general, in another embodiment, the invention features a system for performing the method of recovering metal utilizing at least one of the above described methods. The system includes a source of the mixture comprising the material and conductive additive. The system further includes a cell operably connected to the source such that the mixture can be flowed into the cell and held under compression. The system further includes electrodes operatively connected to the pressure cell. The system further includes a flash power supply for applying a voltage across the mixture to recover the metal from the material.

Implementations of the invention can include one or more of the following features:

The cell can be a pressure cell. The system can further include a gas supply for pressurizing the pressure cell.

The system can further include an adjustable relief value.

The system can further include a particle collector.

The system can further include a gas collector.

The system can be operable to perform a continuous process or automated process.

BRIEF DESCRIPTION OF THE DRAWINGS

FIG. 1A is a schematic of FJH synthesis of carbides with Route (i) showing the high temperature FJH process of an embodiment of the present invention, and Route (ii) showing a traditional carburization process. FIG. 1B shows current measurement during the FJH process. FIG. 1C shows real-time spectral radiance at wavelength of 640-1000 nm. The inset are, photos of the sample before FJH, during FJH, and in rapid cooling. FIG. 1D shows real-time temperature measurement by fitting the blackbody radiation from the sample during the FJH process. FIG. 1E shows the temperature-vapor pressure relationships for various metal precursors and carbon.

FIG. 2A is X-ray diffraction (XRD) patterns of $\beta$-$Mo_2C$, $\alpha$-$MoC_{1-x}$, and $\eta$-$MoC_{1-x}$ synthesized at voltage (V) of 30 V, 60 V, and 120 V, respectively. The PDF reference cards for each are $\beta$-$Mo_2C$, 35-0787; $\alpha$-$MoC_{1-x}$, 65-8092; and $\eta$-$MoC_{1-x}$, 08-0384. FIG. 2B is the crystal structures of three phases of molybdenum carbides. $\beta$-$Mo_2C$ is hexagonal with ABAB stacking, $\alpha$-$MoC_{1-x}$ is cubic, and $\eta$-$MoC_{1-x}$ is hexagonal with ABCABC stacking. FIG. 2C is X-ray photoemission spectroscopy (XPS) spectra of three phases of molybdenum carbides. FIG. 2D is bright-field transmission electron microscopy (BF-TEM) image of a $\beta$-$Mo_2C$ nanocrystal supported on graphene. The 0.339 nm corresponds to interplanar distance (d) of graphene. FIG. 2E is high-resolution transmission electron microscopy (HRTEM) image of $\beta$-$Mo_2C$ and corresponding fast Fourier transform (FFT) pattern. FIG. 2F is high-angle annular dark-field scanning transmission electron microscopy (HAADF-STEM) image and energy dispersive X-ray spectroscopy (EDS) element maps of $\beta$-$Mo_2C$. FIG. 2G is an HRTEM image of $\alpha$-$MoC_{1-x}$ and corresponding FFT pattern. FIG. 2H is an HRTEM image of $\eta$-$MoC_{1-x}$ and corresponding FFT pattern.

FIG. 3A shows formation energy of β-$Mo_2C$, and α-$MoC_{1-x}$ and η-$MoC_{1-x}$ with different carbon contents. FIG. 3B is the calculated crystal structure of β-$Mo_2C$, α-$MoC_{1-x}$ (x=½), α-$MoC_{1-x}$ (x=⅜), and η-$MoC_{1-x}$ (x=⅜) (with dashed circles denoting the carbon vacancies).

FIG. 4A shows polarization curves of three phases of molybdenum carbide. Pt/C and pure flash graphene (FG) were used as control. The performances were normalized to the same mass loading of molybdenum carbides. FIG. 4B shows Tafel curves of three phases of molybdenum carbide. FIG. 4C shows alternating current (AC) impedance of three phases of molybdenum carbide. FIG. 4D shows the durability of molybdenum carbides. The polarization curve of α-$MoC_{1-x}$ for the $1^{st}$ cycle and the $1000^{th}$ cycle. The inset of FIG. 4D is the change of overpotential for three phases of molybdenum carbides. FIG. 4E shows free-energy diagrams for HER on the β-$Mo_2C$(001), α-$MoC_{1-x}$(110), and η-$MoC_{1-x}$(001) at one monolayer hydrogen adsorption coverage. FIG. 4F shows calculated partial density of states of Mo and C in β-$Mo_2C$(001), α-$MoC_{1-x}$(110), and η-$MoC_{1-x}$(001) with the dashed line denoting the position of the Fermi level.

FIG. 5A is the carbothermic reduction temperature of oxides derived from the Ellingham diagram. FIG. 5B is X-ray diffraction (XRD) patterns and high-resolution transmission electron microscopy (HRTEM) images of group IVB metal carbides. The PDF reference cards are TiC, 65-7994; ZrC, 65-8834; and HfC, 65-7326. FIG. 5C is XRD patterns and HRTEM images of group VB metal carbides. The PDF reference cards for each are VC, 65-8825; NbC, 65-8780; and TaC, 65-0282. FIG. 5D is XRD patterns and HRTEM images of group VIB metal carbides. The PDF reference cards for each are $Cr_3C_2$, 65-0897; $Mo_2C$, 35-0787; and $W_2C$, 20-1315. (Scale bars are 5 nm in FIGS. 5B-5D).

FIG. 6A is an electrical schematic of the FJH system. 10 aluminum electrolytic capacitors (450V, 6 mF, Mouser #80-PEH200YX460BQU2) with a total capacitance of 60 mF were used for charging. Additional details of the electrical components could be found in the publication. [Luong, 2020]. FIG. 6B is a photograph of the FJH setup. FIG. 6C is a photograph of the reaction stage. FIG. 6D is a photograph of the reaction chamber.

FIG. 7 shows the scheme of the pulsed direct current Joule heating and the resistive hotspot effect. FIG. 8 shows representative methods for the phase transformation from γ- to α-$Al_2O_3$. FIG. 9 is XRD patterns of γ-$Al_2O_3$ after different PDC durations and the α-$Al_2O_3$ product after calcination. FIG. 10 shows crystal structures of alumina phases: γ-$Al_2O_3$ (crystal system: cubic; space group: Fd-3m), δ'-$Al_2O_3$ (crystal system: orthorhombic; space group: P222), and α-$Al_2O_3$ (crystal system: trigonal; space group: R-3c). For γ-$Al_2O_3$, all of the Al sites are depicted to show the crystal structure, while in the actual structure not all the sites are occupied. FIG. 11 shows phase mass ratio of alumina polymorphs varied with PDC duration. FIG. 12 shows Raman spectra of as-synthesized α-$Al_2O_3$/CB mixture and the purified α-$Al_2O_3$NPs by calcination in air.

FIG. 13A is an electrical diagram of the system. FIG. 13B shows a pulsed voltage generation that can be used in the system to generate the PDC.

FIG. 14A is a BF-TEM image of the α-$Al_2O_3$NPs. FIG. 14B is a HRTEM image of the α-$Al_2O_3$NPs. FIG. 14C is a histogram and distribution of the α-$Al_2O_3$NPs particle size determined by TEM. FIG. 14D shows pore width distribution determined by the application of DFT model. FIG. 14E is Fourier-transform infrared spectra of the γ-$Al_2O_3$NPs precursors and the α-$Al_2O_3$NPs products. FIG. 14F is a XPS fine spectra of Al and O of the α-$Al_2O_3$NPs.

FIG. 15A is XRD patterns of γ-$Al_2O_3$/CB with different mass ratio after PDC process. FIG. 15B is phase mass ratio of the product after PDC process varied with volume fraction of γ-$Al_2O_3$, f(γ-$Al_2O_3$). FIG. 15C is conductivity and temperature varied with f(γ-$Al_2O_3$). FIGS. 15D-15F are current density maps of the sample during PDC with different γ-$Al_2O_3$ volume fractions of f=0.41, f=0.73, and f=0.78, respectively.

FIG. 17A shows cohesive energy (μ, eV/$Al_2O_3$) of the bulk and the formation energies (ε, eV/Å$^2$) of the surfaces for three $Al_2O_3$ phases. FIG. 17B shows the free energy of the $Al_2O_3$ nanocrystals of three phases as plotted against the specific surface area. FIGS. 17C-17D are the contour plots of partial charge density at the highest bands (0.3 eV below the Fermi levels) of the surface states of γ-$Al_2O_3$(100), δ'-$Al_2O_3$(100), and α-$Al_2O_3$(001) from top view (FIG. 17C) and lateral view (FIG. 17D).

FIG. 18A is an electric diagram of the ACS system. FIGS. 18B-18C are, respectively, top and side view photographs a carbon paper holder for sintering.

FIG. 19A shows photographs of the carbon paper during heating, sintering, and cooling. FIG. 19B shows real-time temperature measurement during the ACS process. FIG. 19C show the images of the sintered ceramic pellets supported on carbon papers. FIG. 19D shows XRD patterns of the alumina ceramics using the α-$Al_2O_3$NPs or the commercial α-$Al_2O_3$ nanopowder as precursors. FIG. 19E is an SEM image of the ceramic by using α-$Al_2O_3$NPs as precursors.

FIG. 19F shows grain size distribution of the alumina ceramic. FIG. 19G shows statistic of the Young's module of the alumina ceramics using the α-$Al_2O_3$NPs precursor. FIG. 19H shows statistic of the Young's module of the alumina ceramics using the commercial α-$Al_2O_3$ precursor.

FIG. 20A is a photograph of a sample with mass of 700 mg synthesized using a tube (D=15 mm) and PDC voltage of 60 V. FIG. 20B is XRD pattern of the product shown in FIG. 20A. FIG. 21A is a photograph of a sample with mass of 1.4 g synthesized using a tube (D=15 mm) and PDC voltage of 120 V. FIG. 21B is XRD pattern of the product shown in FIG. 21A.

FIG. 22 is a schematic of a FJH and evaporative separation system. FIG. 23 is a photo of a printed circuit board (PCB) (scale bar, 5 cm) with the inset showing the mixture of carbon black (CB) with PCB powder (scale bar, 2 cm). FIG. 24 shows concentrations of precious metals in PCB as determined by inductively coupled plasma mass spectrometry (ICP-MS). FIG. 25 shows currents vs time recorded under different FJH voltages. FIG. 26 shows real-time temperature measurements at different FJH voltages by fitting blackbody radiation emitted from the sample. FIG. 27 shows vapor pressure-temperature relationship of precious metals and carbon. FIG. 28 shows recovery yield of precious metals by condensing the evaporated gas components.

FIG. 29A is a photograph of the evaporative collection system. FIGS. 29B-29C are, respectively, photographs of the vacuum gauge before and after flash Joule heating (FJH). FIGS. 29D-29E are, respectively, photographs of the condensate vessel before and after the FJH reaction.

FIGS. 31A-31F show, respectively, recovery yield of precious metals by using (FIG. 31A) NaF, (FIG. 31B) PTFE, (FIG. 31C) NaCl, (FIG. 31D) CPVC, (FIG. 31E) NaI, and (FIG. 31F) mixture of NaF, NaCl and NaI, as additives. $Y_0$ and Y mean the recovery yield of precious metals without and with additives, respectively. The dashed line denotes $Y/Y_0=1$, meaning that there is no advantage of the additive if $Y/Y_0 \leq 1$. FIG. 31G is a scanning transmission electron microscopy (STEM) image of the collected solids, and energy dispersive X-ray spectroscopy (EDS) maps of Rh, Pd, Ag, and Au at the rectangular region. (Scale bar in STEM image, 0.5 μm; scale bars in EDS maps, 100 nm).

FIG. 32A shows different processes for the recovery of precious metals from printed circuit board (PCB). FIG. 32B shows thermogravimetric analysis (TGA) curve of PCB after FJH (PCB-Flash) in air. The inset are photographs of PCB-Flash and PCB after FJH and calcination (PCB-Flash-Calcination). FIG. 32C is a TGA curve of PCB. FIG. 32D shows X-ray photoemission spectroscopy (XPS) of PCB, PCB-Flash, and PCB-Flash-Calcination. FIG. 32E shows concentration of precious metals in PCB after calcination (PCB-Calcination). FIG. 32F shows improvement of leaching yield by calcination. $Y_0$ and Y mean the recovery yield by leaching PCB and PCB-Calcination, respectively.

FIG. 33A shows a schematic of the pressurized setup for FJH. FIG. 33B shows gas flow simulation under different pressure. The inner pressure ($P_0$) during the FJH was calculated to be ~5 atm. $P_{out}$ of 0 atm, 1 atm, and 4 atm correspond to the FJH under vacuum, atmospheric pressure, and 3 atm of positive pressure. FIG. 33C shows concentration of precious metals and improvement of recovery yield by FJH. FIG. 33D shows concentration of precious metals and improvement of recovery yield by FJH and calcination. FIG. 33E shows improvement of recovery yield varied with FJH voltages under atmospheric pressure. FIG. 33F shows improvement of recovery yield varied with pressure. For FIGS. 33E-33F, the recovery yields of Rh, Pd, and Ag are calculated from PCB-Flash, and the recovery yield of Au is calculated from PCB-Flash-Calcination.

FIG. 34A shows a scheme of the laminated configuration of several types of electronics. FIG. 34B is a scanning electron microscopy (SEM) image of printed circuit board (PCB) powders. FIG. 34C is a SEM image of PCB-Flash. FIG. 34D is a SEM image of PCB-Flash-Calcination. FIG. 34E shows the scheme of morphological and structure changes of PCB during the FJH and calcination process.

FIG. 35A shows vapor pressure-temperature relationships of toxic heavy metals and carbon. FIG. 35B shows concentrations of toxic heavy metals in printed circuit board (PCB). FIG. 35C shows concentrations of toxic heavy metals in PCB after FJH. FIG. 35D shows removal efficiency and collection yield of heavy metals. FIG. 35E shows concentration of Hg in the residues after multiple FJH reactions. FIG. 35F shows concentration of Cd in the residues after multiple FJH reactions. The dashed lines in FIGS. 35E-35F represent the starting contents and the approved World Health Organization (WHO) level for safe limits of agricultural soils.

FIG. 36 is a chart showing the theoretical separation factors of the evaporative separation process.

FIG. 37A is XRD pattern of Al recovered from $Al_2O_3$. FIG. 37B is XRD pattern of Fe recovered from $Fe_2O_3$. FIG. 37C is XRD of Cu recovered from $CuSO_4$. FIG. 37D is XRD of Ni recovered from $NiSO_4$. FIG. 37E is XRD of Mn recovered from $MnO_2$. FIG. 37F is XRD of Pb recovered from $PbNO_3$. This is as would occur in bauxite residue (red mud).

FIG. 39A is a photograph of treated samples. the samples treated with the condition of $m_0$=0.2 g, $V_0$=150 V, and $C_0$=0.06 F (left), $m_1$=2 g, $V_1$=150 V, and $C_1$=0.6 F (middle), $m_2$=4 g, $V_2$=300 V, and $C_2$=0.6 F (right). FIGS. 39B-39D are realtime temperature curves for the samples.

FIG. 41A shows a electrical diagram of the FJH system. FIGS. 41B-41C are photographs of FJH jigs to connect the sample and the FJH system for, respectively, 200-mg and 2-g synthesis.

FIG. 43A is XRD patterns of CFA-F and CFA-C. FIG. 43B is XPS full spectra of CFA-F and CFA-C. FIG. 43C is concentration of total REEs in CFA-F and CFA-C by $HNO_3$ leaching (15 M, 85° C.), HCl leaching (1 M, 85° C.), and total quantification. FIG. 43D is an SEM image of CFA-F (scale bar, 2 μm). FIG. 43E shows HCl-extractable REE contents (1 M, 85° C.) and total quantification of REE in CFA-F, and the recovery yield of REE. FIG. 43F is an SEM image of CFA-C(scale bar, 5 μm). FIG. 43G shows HCl-extractable REE contents (1 M, 85° C.) and total quantification of REE in CFA-C, and the recovery yield of REE. (All error bars represent the standard deviation where N=3).

FIG. 44A is a scheme of the FJH of CFA. FIG. 44B is a current curve with the condition of 120 V and 1 s. FIG. 44C shows realtime temperature measurement.

FIG. 44D shows the relationship between HCl-leachable REE contents (1 M, 85° C.) from CFA-F, increase of recovery yield, and the FJH voltages. FIG. 44E shows pH-dependent REE leachability from the CFA-F raw materials and activated CFA-F. FIG. 44F shows pH-dependent leachability of REE from the CFA-C raw materials and activated CFA-C. FIG. 44G shows HCl-leachable REE contents (1 M, 85° C.) from activated CFA-F, and the increase of recovery yield. FIG. 44H shows HCl-leachable REE contents (1 M, 85° C.) from activated CFA-C, and the increase of recovery yield. ($Y_0$ represents the REE recovery yield by HCl leaching the CFA raw materials, and Y represents the REE recovery yield by HCl leaching the activated CFA. All error bars represent the standard deviation where N=3).

FIG. 46A is XRD patterns of $YPO_4$ (bottom) with reference PDF ($YPO_4$, #11-0254), and $YPO_4$ after FJH (top) with reference PDF ($Y_2O_3$, #43-0661). FIG. 46B is XRD patterns of $LaPO_4$ (bottom) with reference PDF ($LaPO_4$, #35-0731), and $LaPO_4$ after FJH (top) with reference PDF ($La_2O_3$, #05-0602). FIG. 46C is calculated dissolution curves of $Y_2O_3$, $YPO_4$, $La_2O_3$, and $LaPO_4$ with a mass of 1 g in 100 mL solution. is used to balance the charge. FIG. 46D is Ellingham diagram of carbon monoxide and REE oxides. The vertical dash line denotes the temperature to reduce $Sc_2O_3$. FIG. 46E is XPS fine spectrum of $Y_2O_3$ after FJH. FIG. 46F is XPS fine spectrum of $La_2O_3$ after FJH. FIG. 46G is Gibbs free energy change of the REE oxides and REE metals dissolution reactions.

FIG. 47A is a photograph of BR, (scale bar 5 cm). FIG. 47B is XRD pattern of BR. FIG. 47C is acid-leachable REE contents (0.5 M $HNO_3$) from BR raw materials and the 120 V FJH activated BR, and the increase of recovery yield. ($Y_0$ represents the REE recovery yield by acid leaching the raw materials, and Y represents the REE recovery yield by acid leaching the activated materials. All error bars represent the standard deviation where N=3).

FIG. 48A is acid-leachable content of total REE (0.5 M $HNO_3$) from BR, and the increase of REE yield varied with FJH voltages. FIG. 48B is acid leachable REE content (0.5 M $HNO_3$), and the increase of recovery yield at 120 V FJH. ($Y_0$ represents the REE recovery yield by directly leaching the BR raw materials. Y represents the REE recovery yield by leaching the activated BR. The error bar denotes the standard deviation where N=3).

FIG. 49A is a photograph of e-waste ground to powders, scale barm 5 cm. FIG. 49B is XRD pattern of e-waste. FIG. 49C is acid-leachable REE contents (1 M HCl) from e-waste raw materials and the 50 V FJH activated e-waste, and the increase of recovery yield. ($Y_0$ represents the REE recovery yield by acid leaching the raw materials, and Y represents the REE recovery yield by acid leaching the activated materials. All error bars represent the standard deviation where N=3).

FIG. 50A is acid-leachable content of total REE (1 M HCl) from e-waste, and the increase of REE recovery yield varied with the FJH voltages. FIG. 50B is acid-leachable content of total REE (1 M HCl), and the increase of REE recovery yield at 50 V FJH. ($Y_0$ represents the REE recovery yield by directly leaching the e-waste raw materials. Y represents the REE recovery yield by leaching the activated e-waste. The error bars denote the standard deviation where N=3).

DETAILED DESCRIPTION

The present invention relates to ultrafast flash Joule heating synthesis methods, and more particularly, embodiments of the present invention include ultrafast synthesis methods to form carbides, ultrafast synthesis methods to form corundum nanoparticles, ultrafast synthesis methods to recover precious metals recovery from electronic waste (e-waste), and ultrafast synthesis methods to recover metal from ores, fly ash, and bauxite residue (red mud).

Ultrafast Synthesis of Carbides

Synthesis Process

The present invention includes flashing Joule heating [see Luong 2020; Stanford 2020; Tour PCT '000 Application] for ultrafast processes to synthesize metal carbide nanoparticles. Metal carbides were synthesized within seconds, which is hundreds of time faster than previous methods [Gong 2016; Wan 2014; Ma 2015]. Accordingly, in some embodiments, the present invention provides for phase controlled synthesis of transition metal carbide nanocrystals by ultra flash Joule heating.

Such solvent-free process based on flash Joule heating, can provide for the ultrafast synthesis of coke-free carbide nanocrystals within 1 s. A milliseconds current pulse can pass through the precursors, which brings the sample to ultrahigh temperature (>3000 K) and then it is rapidly cooled to room temperature ($>10^4$ K $s^{-1}$). Thirteen element carbides can be synthesized, including interstitial TMCs of TiC, ZrC, HfC, VC, NbC, TaC, $Cr_2C_3$, MoC, and $W_2C$, and covalent carbides of $B_4C$ and SiC, which provides for excellent generality. Moreover, by controlling the FJH pulse voltage, phase-pure molybdenum carbides including $\beta$-$Mo_2C$, and metastable $\alpha$-$MoC_{1-x}$ and $\eta$-$MoC_{1-x}$ can be selectively synthesized, showing the phase engineering ability of the synergistic electrical-thermal process. The phase-dependent HER performance of molybdenum carbides was also discovered; the $\beta$-$Mo_2C$ exhibited the best HER performance (with an overpotential of −220 mV, Tafel slope of 68 mV $dec^{-1}$, and good durability).

Figure 1A:
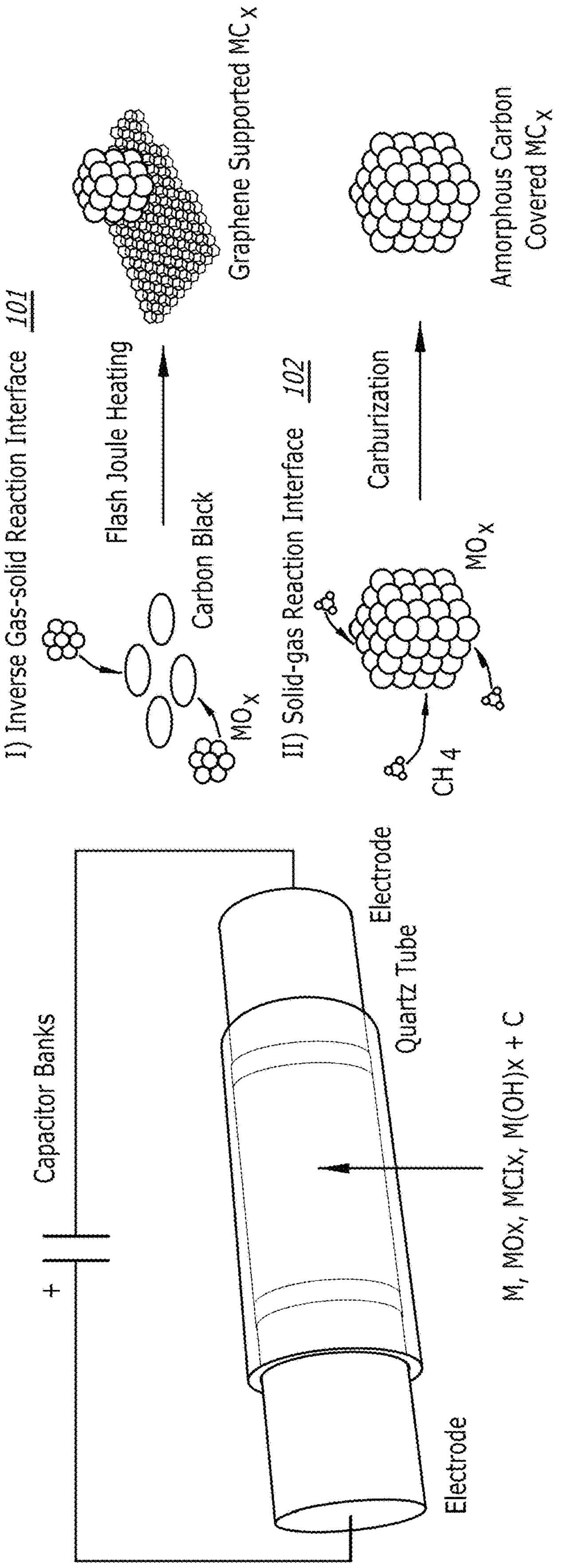
FIGS. 1A-1E show ultrafast synthesis of carbides by flash Joule heating (FJH).

FIG. 1A is a schematic of FJH synthesis of carbides with various precursors. Route (i) 101 demonstrates the ultrahigh temperature FJH process described herein in which carbon black and metal oxides form metal carbides and graphene. The graphene could be subsequently removed by post-synthesis purification process (not shown). This can be referred to as an inverse gas-solid reaction interface. Route (ii) 102 demonstrates the traditional carburization process which is called a solid-gas reaction interface.

Methods for ultrafast synthesizing of carbides can include the following.

Select a reaction precursor (or precursors) and mix with a conducting carbon additive, such as carbon black. Alternatively, the conducting additive can be other carbon sources (in addition or in the alternative of carbon black, since these temperatures will convert any carbon source to almost all carbon at these temperatures. The carbon black could be substituted by graphene, flash graphene, coal, anthracite, coke, metallurgical coke, calcined coke, activated charcoal, biochar, natural gas carbon that had been stripped of its hydrogen atoms, activated charcoal, shungite, plastic waste, plastic waste-derived carbon char, food waste, food waste-derived carbon char, biomass, biomass-derived carbon char, hydrocarbon gas, and mixtures therefrom. The use of carbon black as described herein is representative of the conducting additives that can be utilized in the present invention. In certain embodiments of the present invention, the ratio of precursor to conductive additive is in the range between 1:2 to 15:1 by weight, and in further certain embodiments, the ratio of precursor to conductive additive is in the range between 1:2 to 2:1 by weight.

As shown in FIG. 1A, versatile precursors, including elementary metals and metal components, such as metal oxides, metal chlorides, and metal hydroxides can all be used as the precursor. Carbon black (or other conductive additive) and metal precursor were mixed well by using hand grind or ball milling.

Flash Joule heating the mixture of carbon black (or other conductive additive) and metal precursors. As shown in FIG. 1A, the mixture can be loaded into a quartz tube and compressed to have a resistance of 0.5 to 20 ohm. Two copper or graphite rods were put on both side as the electrodes. High voltage ranging from 30 V to 150 V was loaded by capacitor banks (this can also be done using AC, which sometimes even has advantages). But the voltage will be much higher, up to thousands of volts (and could exceed 10,000 amps), if the reaction scale is larger since as the scale gets larger, the voltage (and current) must increase to induce the same reaction temperature. For example if the reaction scale is for kilograms or hundreds of kilograms of materials, the voltage could be 10,000 volts, and even as high as 100,000 volts (and the current could be 10,000 amps, and even as high as 30,000 amps).

Figure 1B:
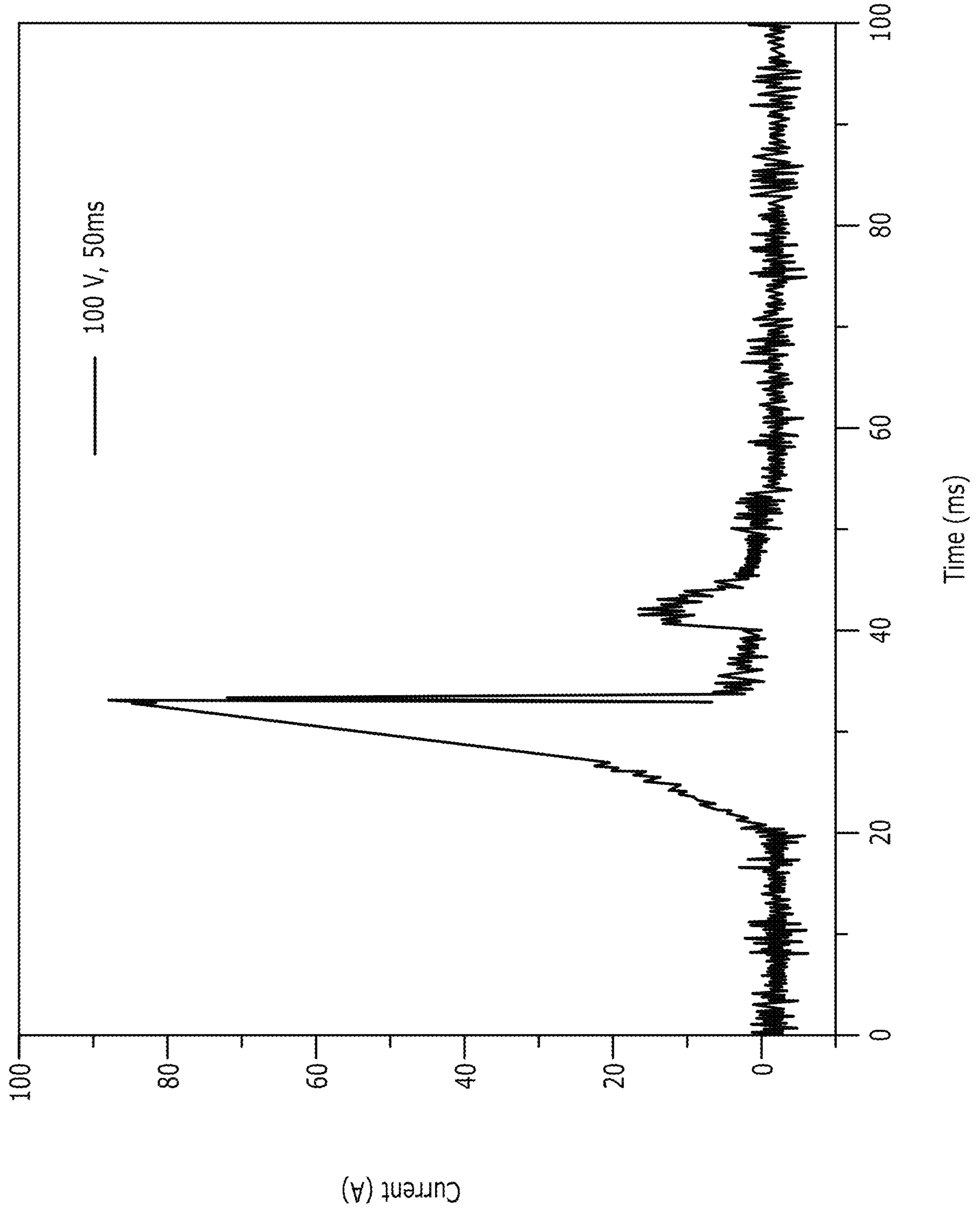

In an embodiment, a mixture of metal precursors and commercial carbon black was slightly compressed inside a quartz tube between two graphite electrodes (FIG. 1A). The widely applicable metal precursors could be elemental metal (M), metal oxides ($MO_x$), chlorides ($MCl_x$), and hydroxides ($M(OH)_x$), etc. The carbon black simultaneously worked as the carbon source for carbothermic reduction and the conductive additive. The two electrodes were connected to capacitor banks, which were firstly charged by a power supply and then bring the precursors to a high temperature by high voltage discharging. In a typical FJH process with a voltage of 100 V and sample resistance of 1Ω, the current passing through the sample was recorded to be ~100 A in ~50 ms discharge time (FIG. 1B).

Figure 1C:
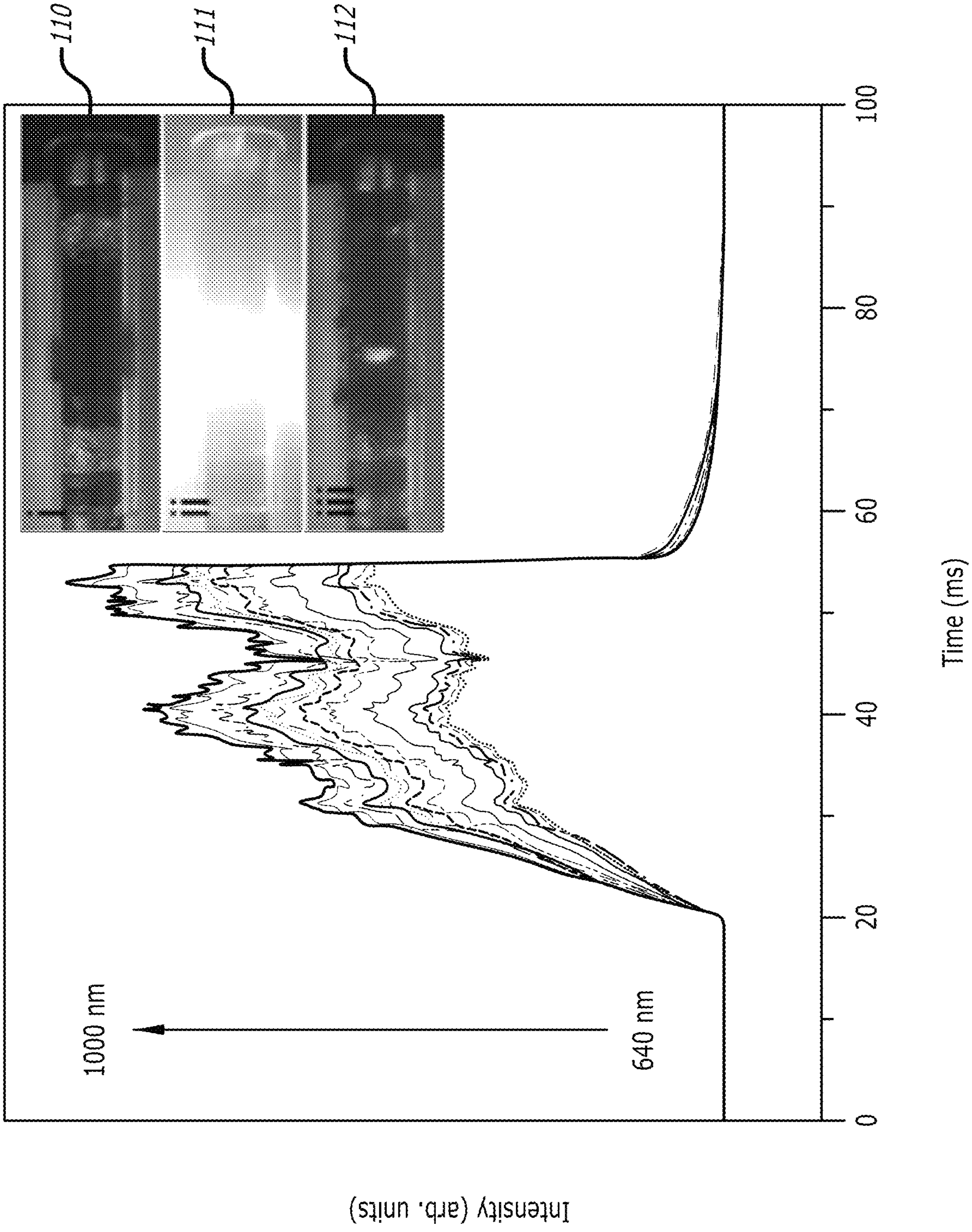
Figure 1D:
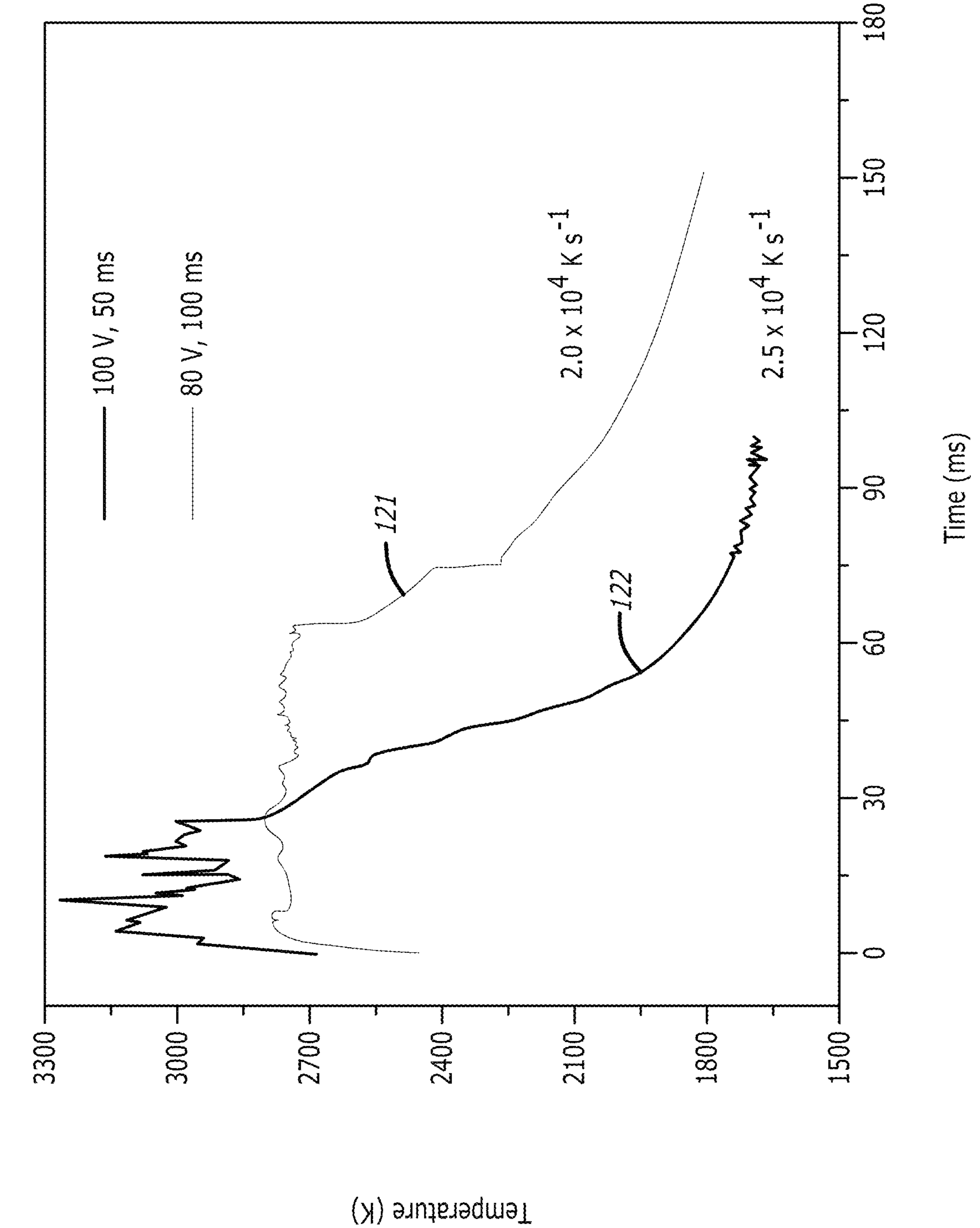

A rapid light emission was observed during the FJH process (see photos 110-112 in FIG. 1C). The temperature was measured by fitting the blackbody radiation spectra of the sample (FIG. 1C). The highest temperatures obtained at 80 V and 100 V FJH were estimated to be ~2700 K and ~3000 K, respectively (shown in curves 121-122 in FIG. 1D).

The cooling rate is ultrafast and on the order of $10^4$ K $s^{-1}$. The temperature distribution of the sample is simulated by using a finite element method (FEM), which further provides insight into the effects of FJH parameters on the reachable temperature. It was found that higher temperature values could be obtained by applying a larger FJH voltage and suitable sample electrical conductivity. In contrast, the higher thermal conductivity of the sample results in lower temperature due to faster thermal dissipation. A temperature map showed that the temperature distribution is uniform throughout the whole sample, showing the homogeneous heating feature of the FJH process.

FJH of the sample to such a high temperature (~3000 K) volatilized most of the non-carbon components. According to the temperature-vapor pressure relationships (FIG. 1E), all of the representative metal precursors, including elemental metal and metal oxides and chlorides, have higher vapor pressure than carbon which sublimes at ~3900 K [Abrahamson 1974]. As a result, the metal precursors were the volatile components, and the carbon source remains solid during the reaction. In this case, metal precursor vapors reacted with the carbon to form the metal carbides, which is referred to herein as the inverse gas-solid reaction interface (FIG. 1A, route (i) 101). In contrast, in the traditional carburization process [Rosa 1983], a gaseous hydrocarbon such as methane ($CH_4$) is introduced to the solid metal precursors. The carbon diffusion through the solid-gas interface is usually fast and results in a coked carbide surface due to the excessive supply of carbon sources (FIG. 1A, route (ii) 102), which can passivate the catalytic activity of the final products [Gong 2016].

Phase Controlled Synthesis of Molybdenum Carbide Nanocrystals

Molybdenum carbides attractive for catalysts [Yao 2017; Wan 2014; Li 2016; Ma 2015] were synthesized using embodiments of the present invention. The phases of molybdenum carbides are complex due to their temperature-, composition-, and vacancy-dependent stability [Hugosson 1999]. Different phases have distinct geometric and electronic structures [Politi 2103; Baek 2019], and the catalytically relevant phases are hexagonal β-$Mo_2C$ [Wan 2014; Ma 2015; Fan 2017], cubic α-$MoC_{1-x}$ [Yao 2017; Baek 2019; Song 2019], and hexagonal η-$MoC_{1-x}$[34] [Song 2019].

Figure 1E:
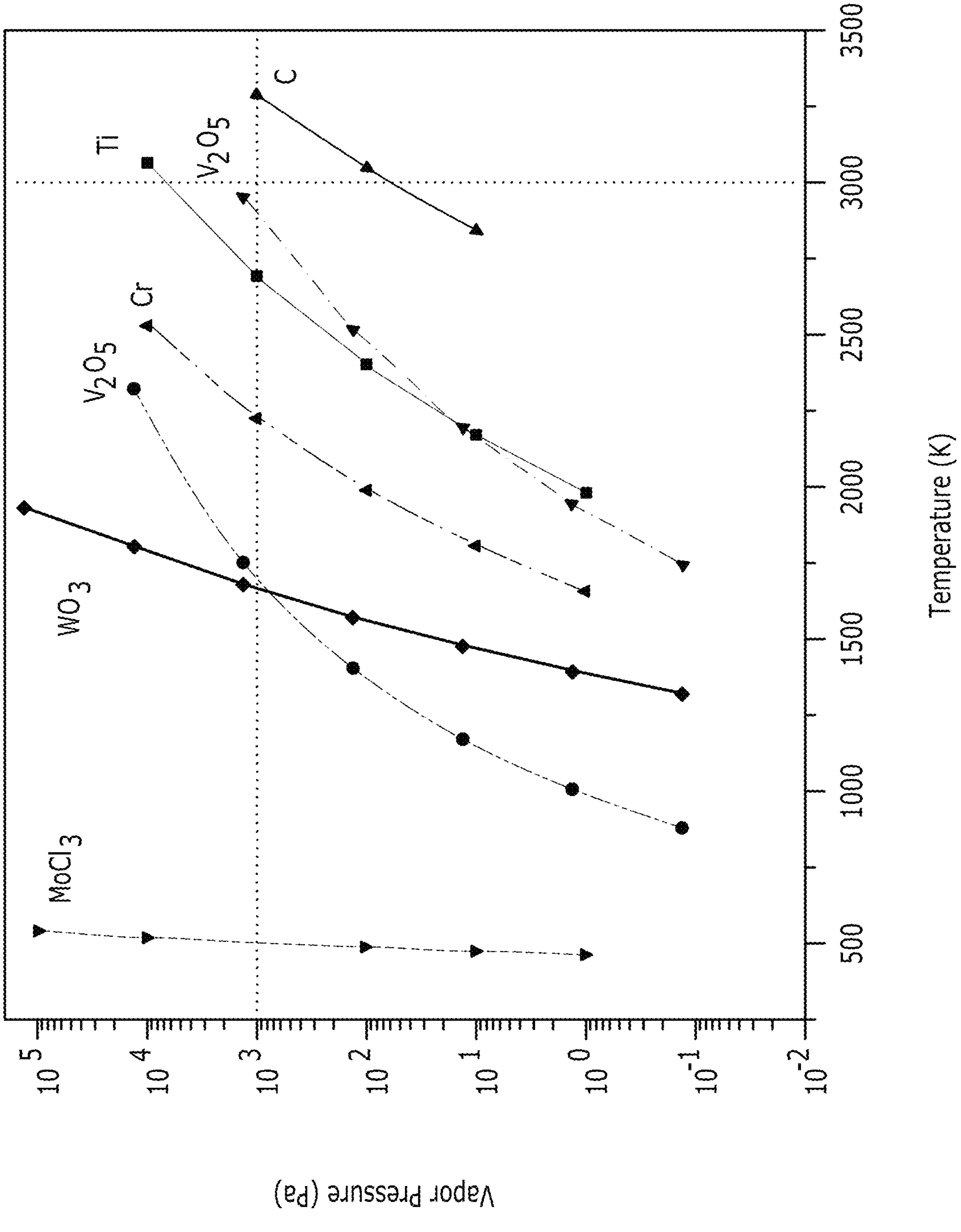
Figures 2A, 2B, 2C:
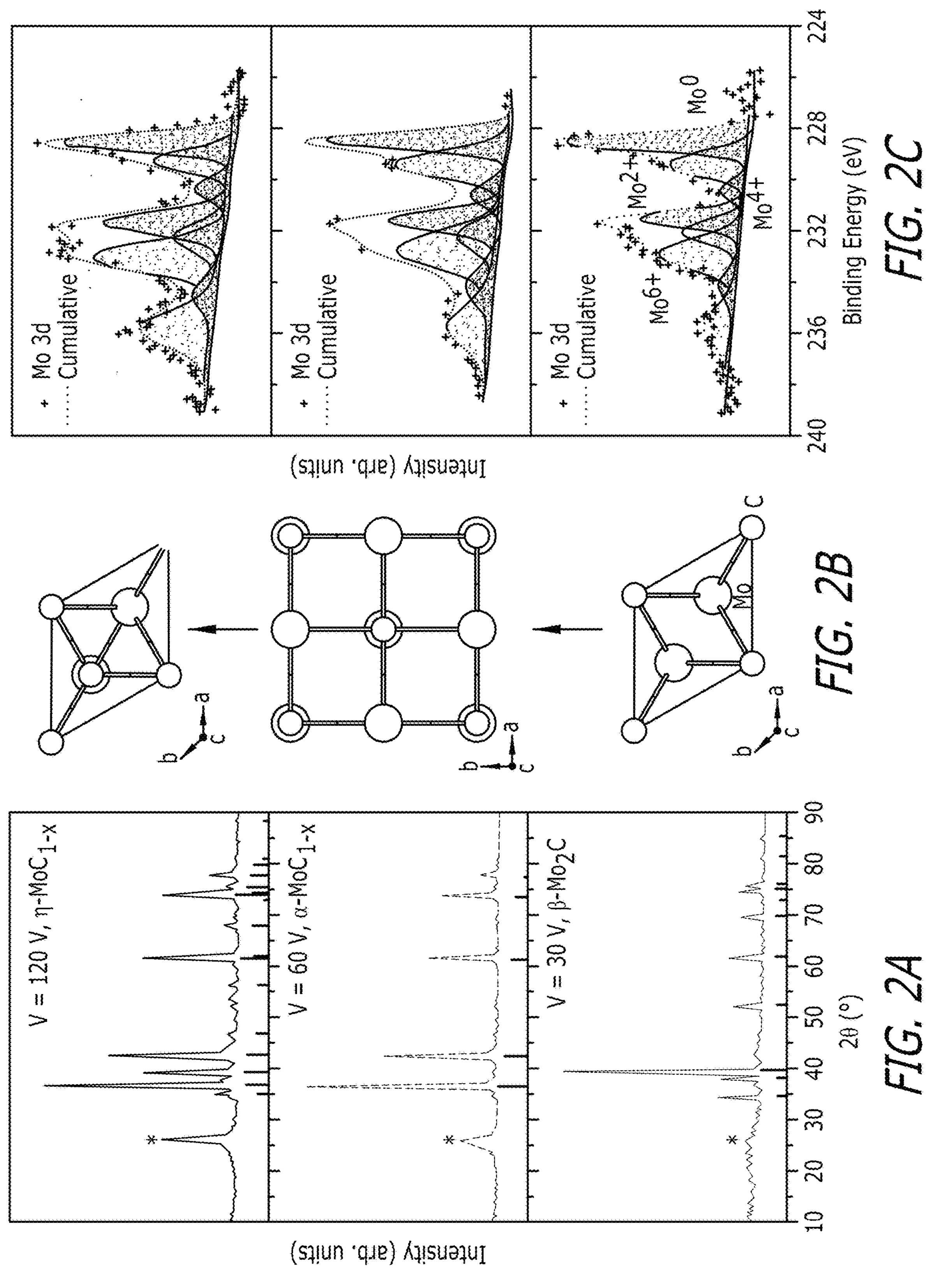
FIGS. 2A-2H show phase-controlled synthesis of molybdenum carbides.

$MoCl_3$ was chosen as the precursor because of its high vapor pressure (FIG. 1E). It was found that three pure phases of molybdenum carbides could be selectively synthesized by adjusting FJH voltages (FIGS. 2A-2B). β-$Mo_2C$ phase was produced under the voltage of 30 V according to X-ray diffraction (XRD) (FIG. 2A, bottom); when the voltage was increased to 60 V, pure α-$MoC_{1-x}$ phase was obtained (FIG. 2A, middle); further increasing the voltage to 120 V led to η-$MoC_{1-x}$ (FIG. 2A, top). Note that the diffraction peak at ~26° (show by the star) was attributed to the graphene support.

The phase transformation from hexagonal β-$Mo_2C$ to cubic α-$MoC_{1-x}$ and then to hexagonal η-$MoC_{1-x}$ is a newly found topotactic transition pathway, which is distinct from the previous report [Wan 2019], where the α-$MoC_{1-x}$ was transformed to β-$Mo_2C$ after a ~24 h annealing at 850° C., and η-$MoC_{1-x}$ was only stabilized by using a $NiI_2$ additive at an higher temperature.

To investigate the electronic structures, X-ray photoelectron spectroscopy (XPS) spectra of the Mo 3d core level was collected (FIG. 2C). Mo 3d spectra were split into $3d_{3/2}$ and $3d_{5/2}$ peaks. The peak fitting shows four chemical states of Mo in molybdenum carbides, including $Mo^0$, $Mo^{2+}$, $Mo^{4+}$, and $Mo^{6+}$. The dominant $Mo^0$ peak and the smaller peak of $Mo^{2+}$ are attributed to the molybdenum carbide due to the coexistence of Mo—Mo and Mo—C bonds in molybdenum carbides [Wan 2014]. $Mo^{4+}$ and $Mo^{6+}$ were assigned to $MoO_2$ and $MoO_3$, respectively, due to the surface oxidation of molybdenum carbides when exposed to air [Wan 2014; Ma 2015]. Quantitative analysis of the ratios of Mo chemical states showed the high oxidation states ($Mo^{4+}$ and $Mo^{6+}$) in η-$MoC_{1-x}$ are larger than those in β-$Mo_2C$ and α-$MoC_{1-x}$, indicating that β-$Mo_2C$ is the most oxidation resistant phase followed by α-$MoC_{1-x}$.

Morphology characterization by scanning electron microscopy (SEM) shows the fine powder feature of all three carbide phases. The energy dispersive spectroscopy (EDS) mapping images showed a uniform distribution of Mo and C.

Transmission electron microscopy (TEM) and XRD were used to characterize the size and crystallinity of the molybdenum carbides. The particle sizes of the molybdenum carbide phases were determined by the FRI voltages. The β-$Mo_2C$ synthesized at the lowest voltage has the largest average size of ~26.4 nm, followed by α-$MoC_{1-x}$ (~21.2 nm) and η-$MoC_{1-x}$ (size of ~20.1 nm). The smaller particle size obtained under higher voltage could be attributed to the faster nucleation kinetics at higher temperature [Jang 1995].

The particle size values measured by TEM match well with the crystal size determined by XRD using the Halder-Wagner method (see TABLE I), indicating that the single-crystal feature of the synthesized carbide particles.

TABLE I

Parameters For Carbide Synthesis

| Precursors | Mass Ratios | Molar ratios | Mass (mg) | Resistance (Ω) | Voltage (V) | Time (ms) | Product | Crystal size (nm) |
|---|---|---|---|---|---|---|---|---|
| Ti:CB | 1:1 | 1:4 | 50.0 | 2 | 120 | 500 | TiC | 30.7 |
| $Zr(OH)_4$:CB | 1:1 | 1:13 | 51.2 | 4 | 120 | 500 | ZrC | 40.6 |
| $HfO_2$:CB | 1:1 | 1:18 | 48.3 | 2 | 100 | 500 | HfC | 30.8 |
| $VO_2$:CB | 1:1 | 1:4 | 49.0 | 3 | 120 | 500 | VC | 26.6 |
| $NbCl_5$:CB | 1:1 | 1:23 | 50.3 | 2 | 120 | 500 | NbC | 24.1 |
| $TaCl_5$:CB | 1:1 | 1:30 | 50.2 | 2 | 120 | 500 | TaC | 28.7 |
| Cr:CB | 4:1 | 1:1 | 51.2 | 4 | 120 | 500 | $Cr_3C_2$ | 14.6 |
| $MoCl_3$:CB | 1:1 | 1:17 | 50.3 | 2 | 30 | 1000 | β-$Mo_2C$ | 22.3 |
| $MoCl_3$:CB | 1:1 | 1:17 | 48.6 | 1 | 60 | 1000 | α-$MoC1_{1-x}$ | 17.6 |
| $MoCl_3$:CB | 1:1 | 1:17 | 49.7 | 1 | 120 | 500 | η-$MoC_{1-x}$ | 17.4 |
| $WO_3$:CB | 1:1 | 1:19 | 48.7 | 2 | 100 | 1000 | $W_2C$ | 25.1 |
| B:CB | 1:2 | 1:1 | 27.6 | 3 | 120 | 500 | $B_4C$ | — |
| $SiO_2$:CB | 4:1 | 1:1.25 | 53.2 | 10 | 150 | 500 | SiC | — |

Figure 2E:
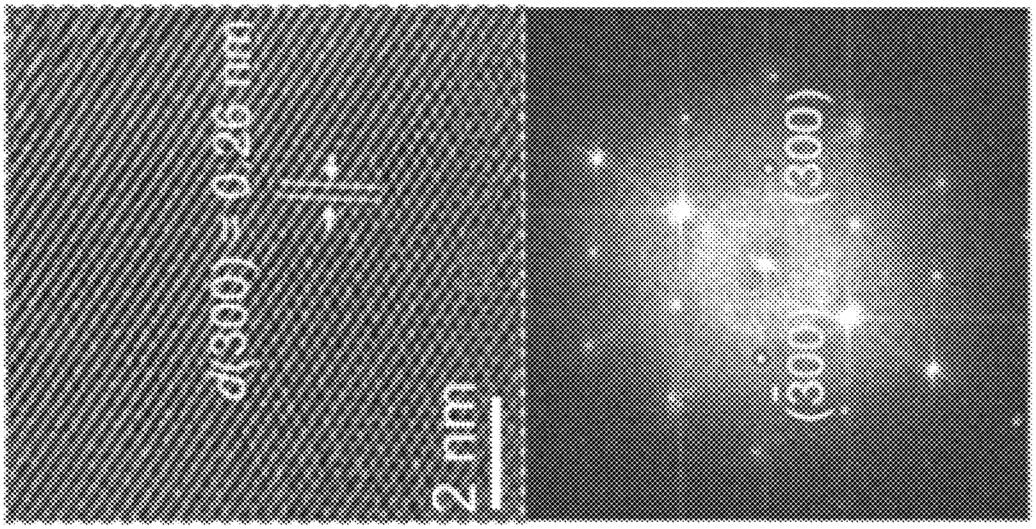
Figure 2D:
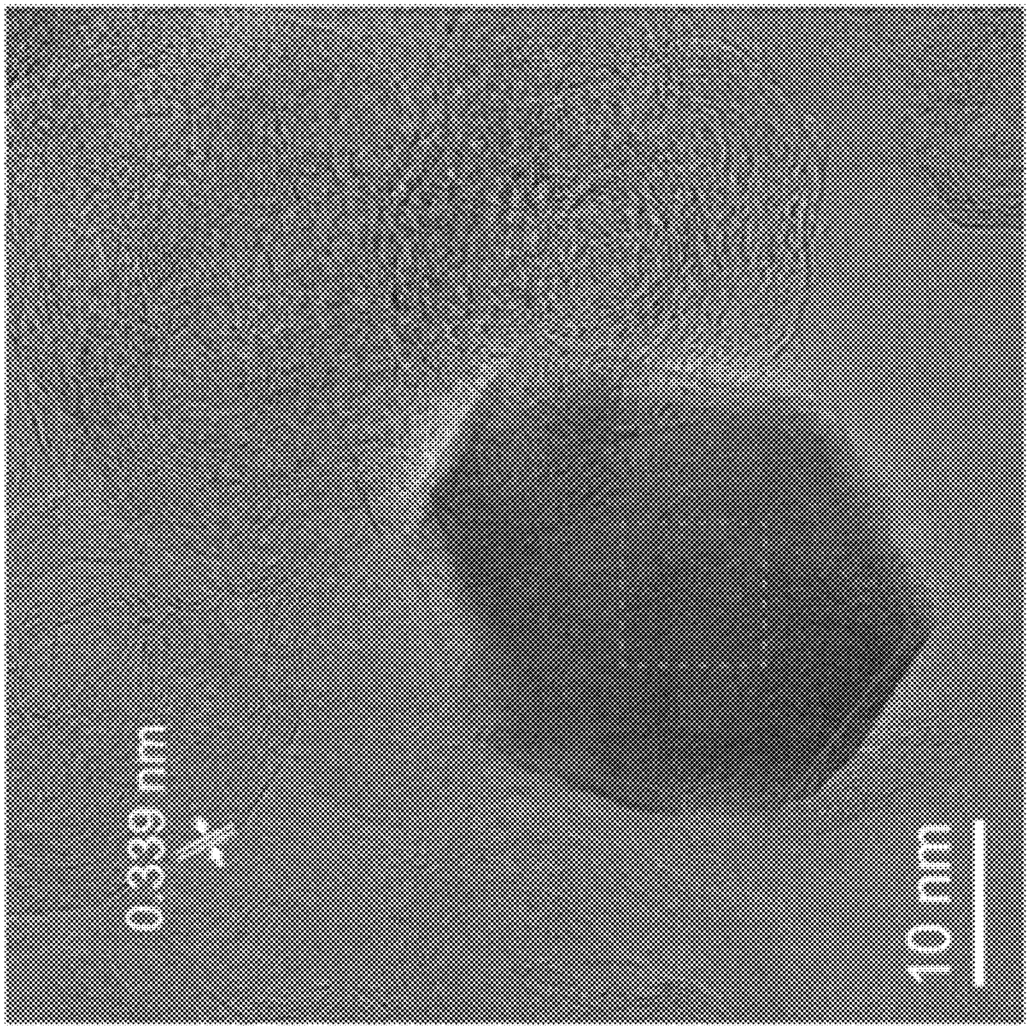
Figure 2F:
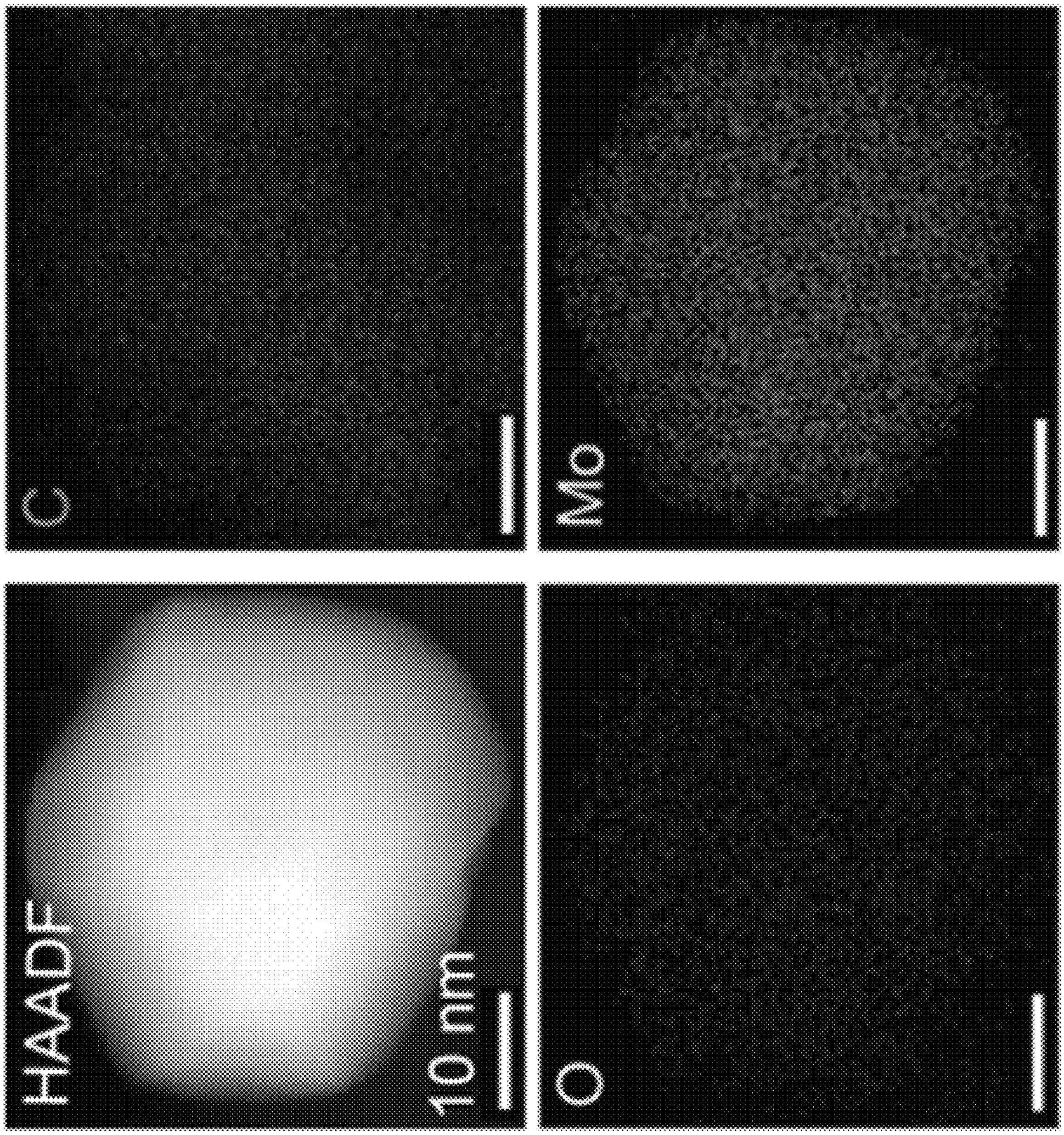
Figure 2G:
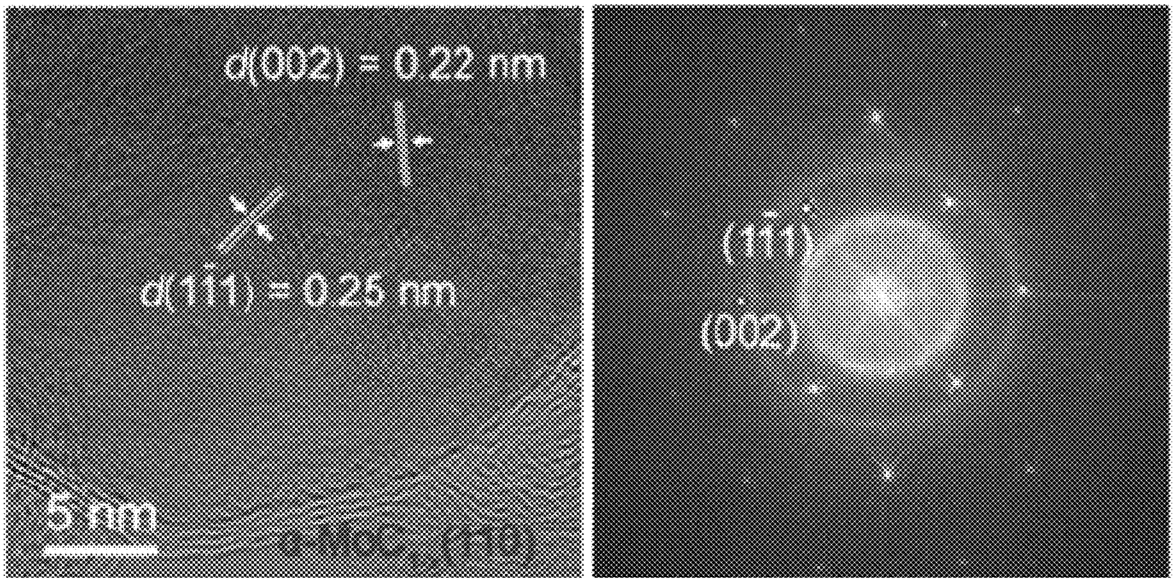
Figure 2H:
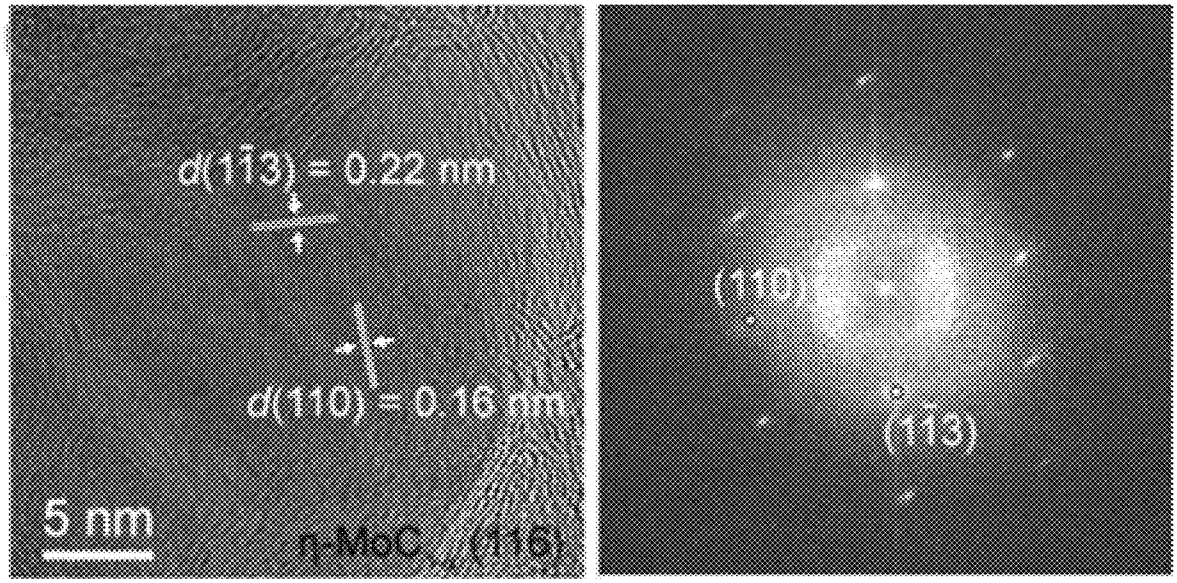

The typical bright-field TEM (BF-TEM) image of a β-$Mo_2C$ nanocrystal showed the regular hexagonal nanoplate (depicted by hexagon 201) with a lateral size of ~20 nm supported on carbon (FIG. 2D). The high-resolution TEM (HRTEM) image shows the lattice fringes (FIG. 2E, top), where the 0.26 nm interplanar spacing (d) corresponds to the (300) plane of (β-$Mo_2C$. According to the atomic-resolution image and corresponding fast Fourier transform (FFT) pattern (FIG. 2E, bottom), the nanoplate orientation was assigned to be β-$Mo_2C$(001). The high-angle annular dark-field (HAADF) scanning transmission electron microscopy (STEM) image and EDS elemental maps under STEM mode reveal the uniform spatial distribution of Mo, C, and O (FIG. 2F). Note that the O is attributed to the surface contamination, consistent with the XPS results (FIG. 2C). The HRTEM image and corresponding FFT pattern of α-$MoC_{1-x}$ (FIG. 2G) and η-$MoC_{1-x}$ (FIG. 2H) were also obtained with the orientation of α-$MoC_{1-x}$(110) and η-$MoC_{1-x}$(116) for the specific samples. Nevertheless, no preferred orientation was observed for these carbide nanocrystals according to XRD results (FIG. 2A).

Phase Transformation Process of Molybdenum Carbides

To explain the voltage-dependent phase formation, the current passing through the samples and the temperature under different FJH voltages were firstly recorded. A higher voltage leads to higher temperatures and energy inputs. The maximum temperatures at FJH voltages of 30 V, 60 V, and 120 V were measured to be 839 K, 1468 K, and 3242 K, respectively.

Figure 3A:
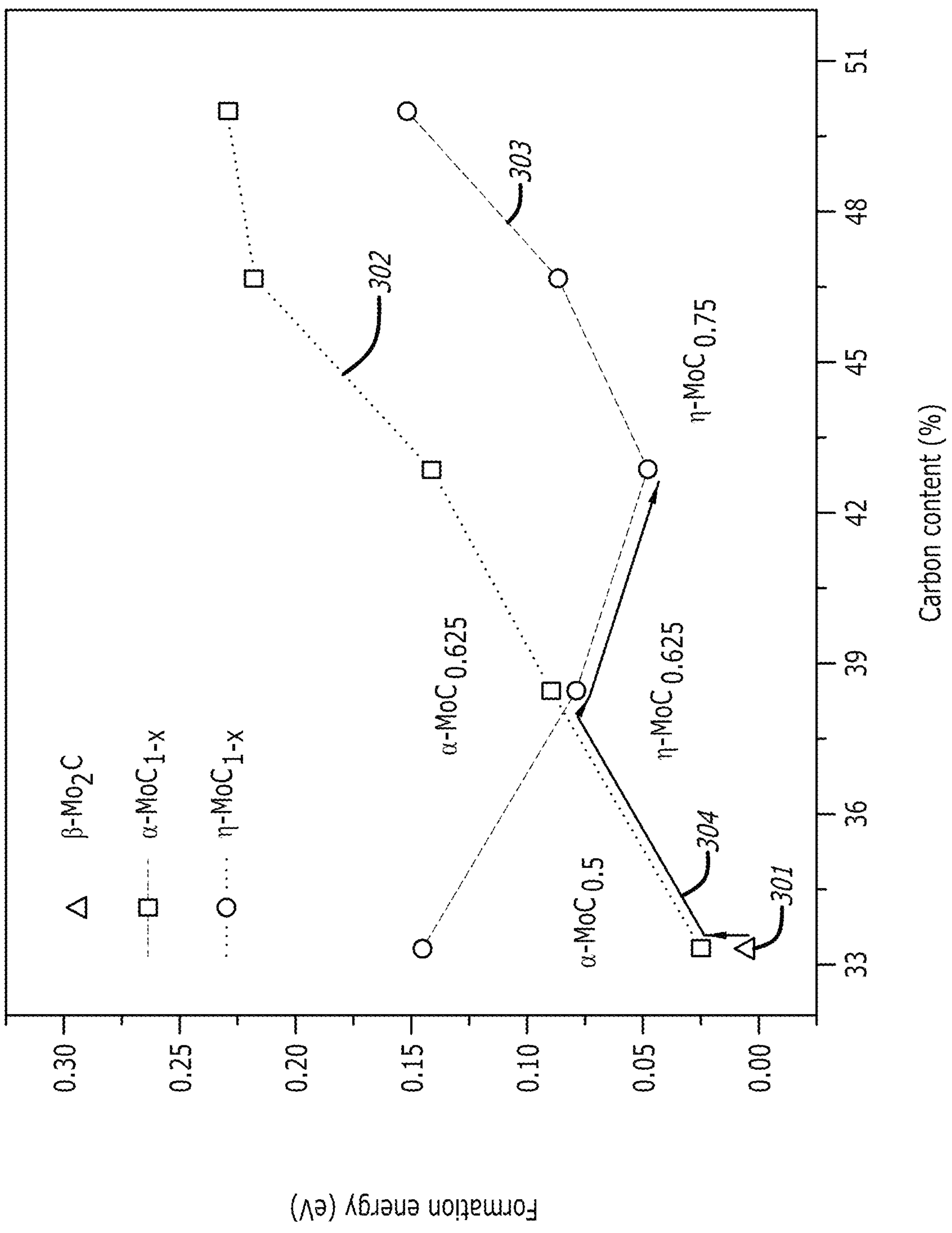
FIGS. 3A-3B show the phase transformation process of molybdenum carbides (which were revealed by density functional theory (DFT) calculations).

The formation energies of β-$Mo_2C$, α-$MoC_{1-x}$, and η-$MoC_{1-x}$ varied with carbon content were calculated by first principles density functional theory (DFT) (FIG. 3A, curves 301-303, respectively). It was found that the β-$Mo_2C$ phase is the most stable phase with the lowest formation energy; hence, β-$Mo_2C$ forms at a relatively low voltage and temperature (point 301).

Figure 3B:
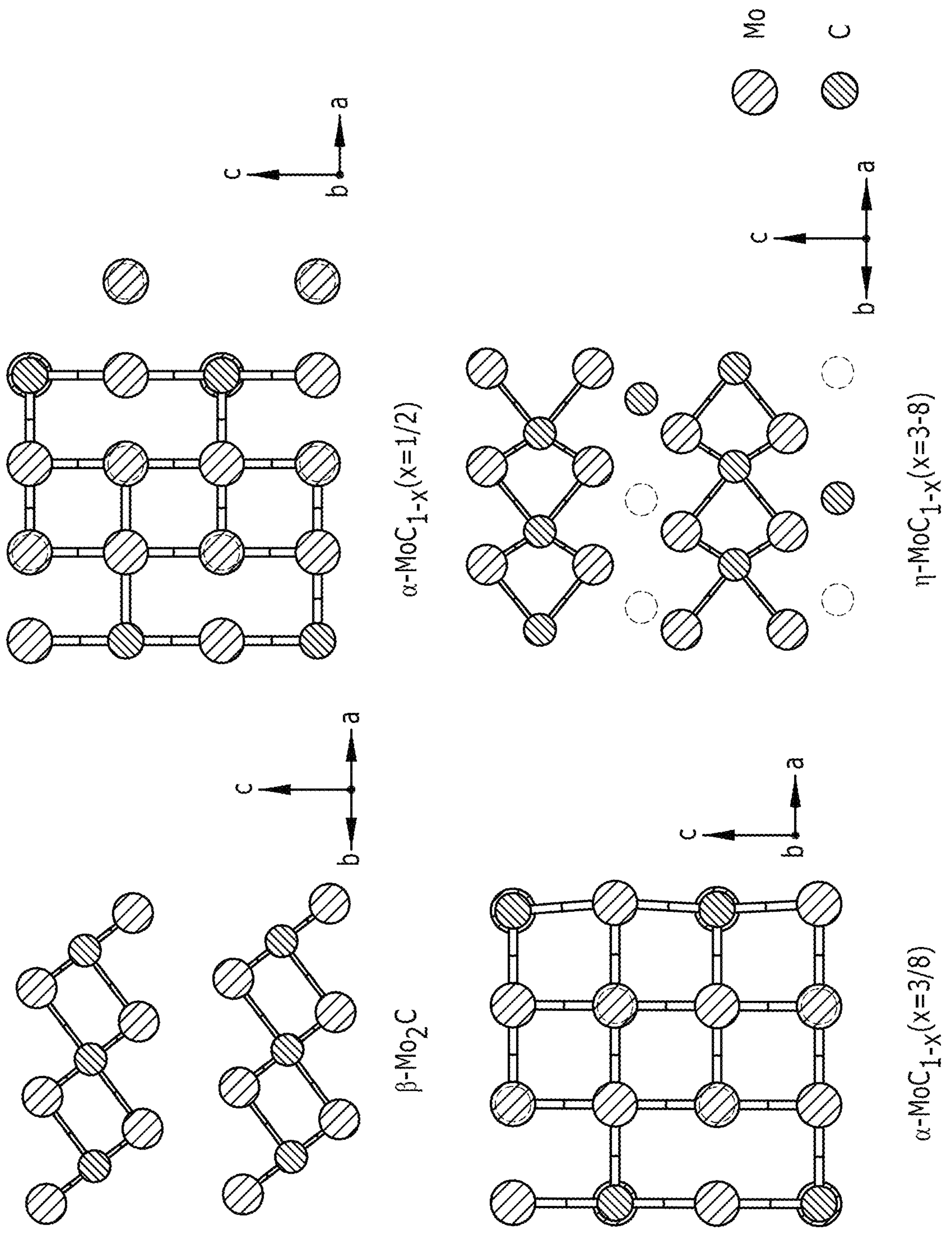

In contrast, the α-$MoC_{1-x}$ and η-$MoC_{1-x}$ were metastable phases [Hugosson 1999] and were formed and stabilized at a higher temperature according to the Mo—C phase diagram. The α-$MoC_{1-x}$ (x=½) structure has a slightly higher formation energy and the same stoichiometric composition with β-$Mo_2C$ (FIG. 3B). Hence, the topotactic transition from β-$Mo_2C$ to α-$MoC_{1-x}$ is expected when the carbon content is slightly increased (see line 304, which line denotes the projected phase transformation pathway). As more carbon is incorporated into the Mo—C system, the α-$MoC_{1-x}$ formation energy continuously increases (curve 302), and the energy curve intersects with that of η-$MoC_{1-x}$ (curve 303).

The η-$MoC_{1-x}$ phase becomes the relatively stable phase near x=⅜ (FIG. 3B), and continues to be the stable phase up to higher carbon contents. This result showed that the carbon vacancy dominated the energy landscape of the Mo—C system, and served as the driving factor for the topotactic transition pathway from β-$Mo_2C$ to α-$MoC_{1-x}$ and then to η-$MoC_{1-x}$ phase.

The FJH process with broadly tunable energy input permits the access of the metastable phases with higher formation energy than the thermodynamically stable phase; then, the ultrafast cooling rate of the FJH process (>$10^4$ K $s^{-1}$) helps to kinetically retain the metastable phases, including α-$MoC_{1-x}$ and η-$MoC_{1-x}$ phases, to room temperature. As a control, at the same temperature when metastable α-$MoC_{1-x}$ phase was produced by FJH, the synthesis using a conventional tube furnace with its slow cooling rate of ~10 K $min^{-1}$ only produced the thermodynamically stable β-$Mo_2C$ phase. This explicitly showed the role of the ultrafast cooling rate of the FJH process in kinetically accessing the metastable phases.

Phase Dependent HER Performance of Molybdenum Carbides

Figure 4A:
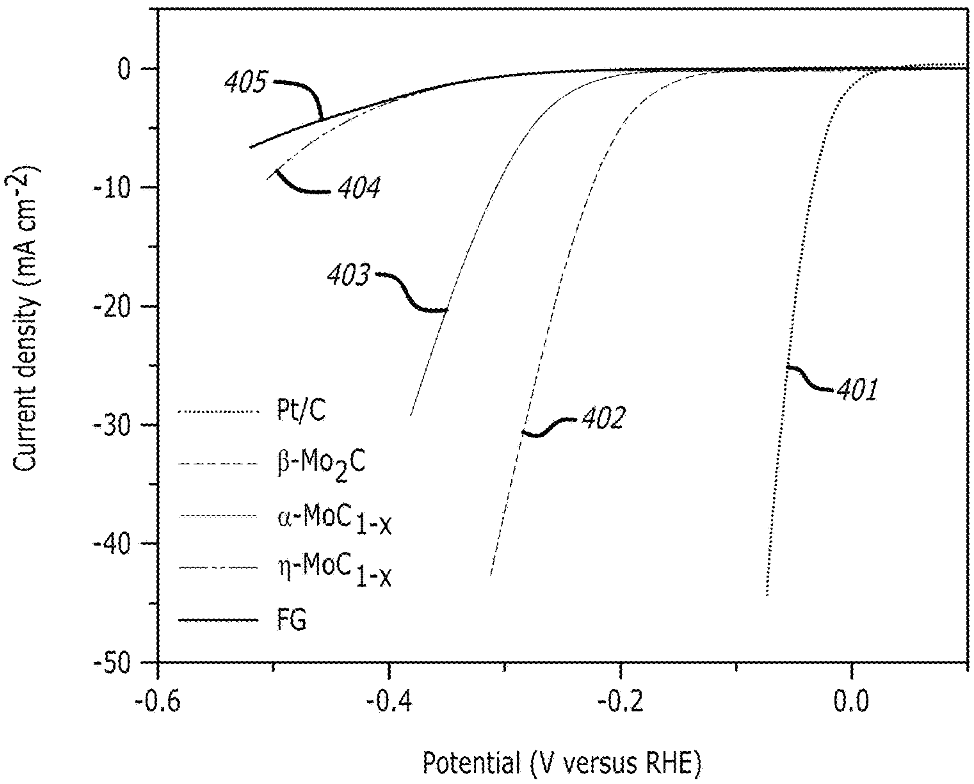
FIGS. 4A-4F shows phase dependent hydrogen evolution reaction (HER) performance of molybdenum carbides.

The side-by-side electrochemical comparison of the three phases of molybdenum carbide reveal the effect of the phase control on their individual intrinsic characteristics and catalytic behaviors. To demonstrate their catalytic properties, the HER performances of the three molybdenum carbide phases were measured in 0.5 M $H_2SO_4$ using a standard three-electrode configuration. Linear scan voltammogram (LSV) curves of the different electrocatalysts as well as the Pt/C benchmark are shown in FIG. 4A (with curves 401-405 for Pt/C, β-$Mo_2C$, α-$MoC_{1-x}$, η-$MoC_{1-x}$, and flash graphene (FG). The flash graphene (FG) obtained from FJH of carbon black was used as a control and showed negligible HER activity. [Luong 2020].

Figure 4B:
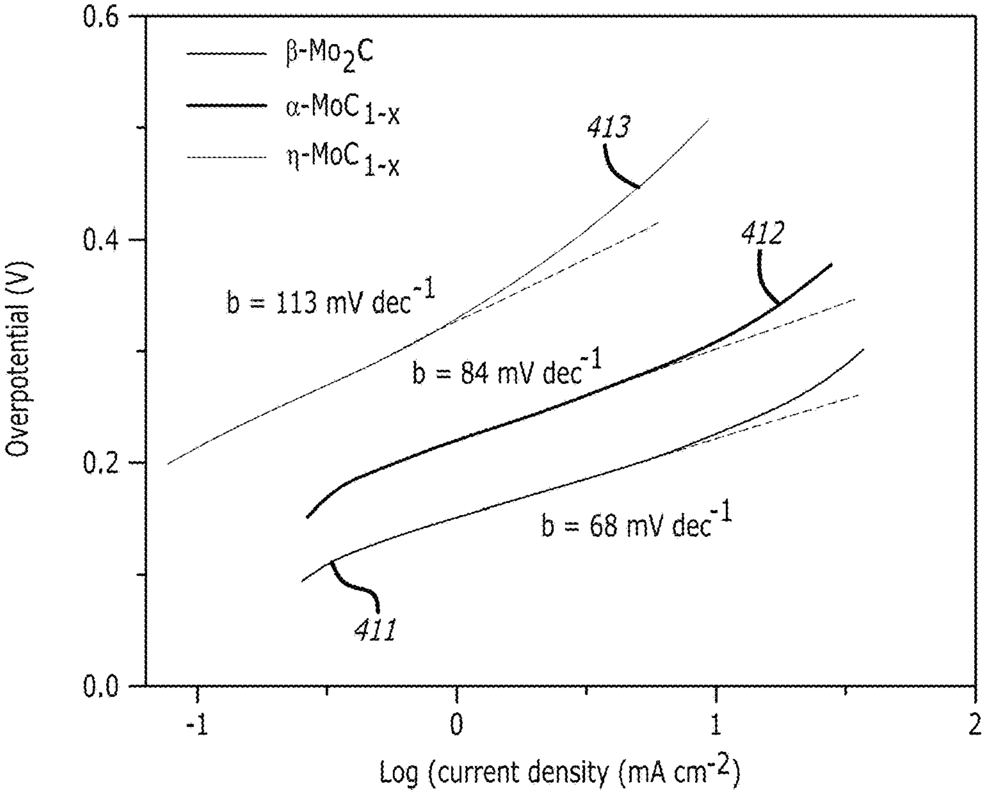

The phase-dependent HER activity of molybdenum carbides was observed. The overpotential (η) vs a reversible hydrogen electrode (RHE) at geometric current densities of 10 mA $cm^{-2}$ for β-$Mo_2C$, α-$MoC_{1-x}$, and η-$MoC_{1-x}$ were ~220 mV, ~310 mV, and ~510 mV, respectively (FIG. 4A). The Tafel slopes (b) for β-$Mo_2C$, α-$MoC_{1-x}$, and η-$MoC_{1-x}$ were calculated to be 68 mV $dec^{-1}$, 84 mV $dec^{-1}$, and 113 mV $dec^{-1}$, respectively (curves 411-413 of FIG. 4B), showing the phase-dependent HER reaction kinetics.

The fast electrode kinetics of β-$Mo_2C$ phase is reflected in the small charge transfer resistance of ~60Ω at the potential of −0.5 V vs RHE according to the electrochemical impedance measurement. (See FIG. 4C with curves 421-423 showing alternating current (AC) impedance of β-$Mo_2C$, α-$MoC_{1-x}$, and η-$MoC_{1-x}$, respectively.)

Figure 4C:
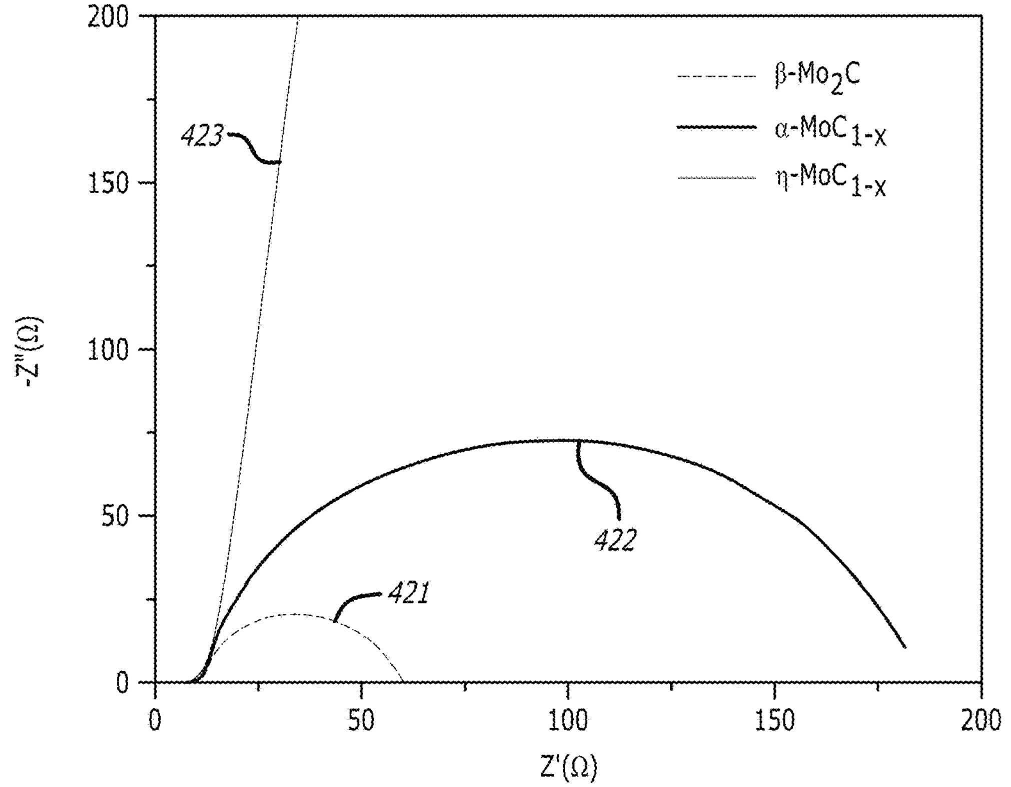
Figure 4D:
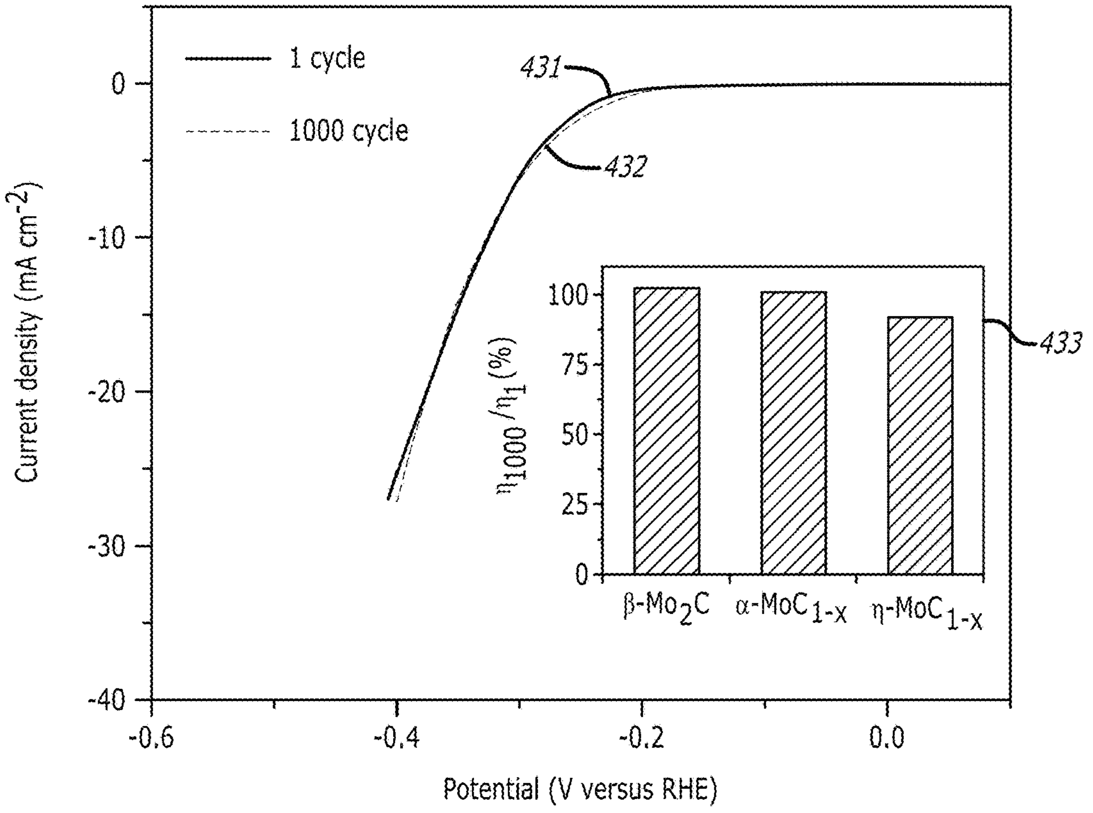

The durability of the three molybdenum carbides phases was evaluated by sweeping the electrocatalysts for 1000 cycles using the cyclic voltammetry method. The LSV curves of the $1^{st}$ and 1000th cycle (curves 431-432, respectively) for the three phases of molybdenum carbides are shown in FIG. 4D. No obvious current degradation was observed for all three phases, and the overpotential at 10 mA $cm^{-2}$ declined little (graph 433), demonstrating the excellent long-term stability.

Figure 4E:
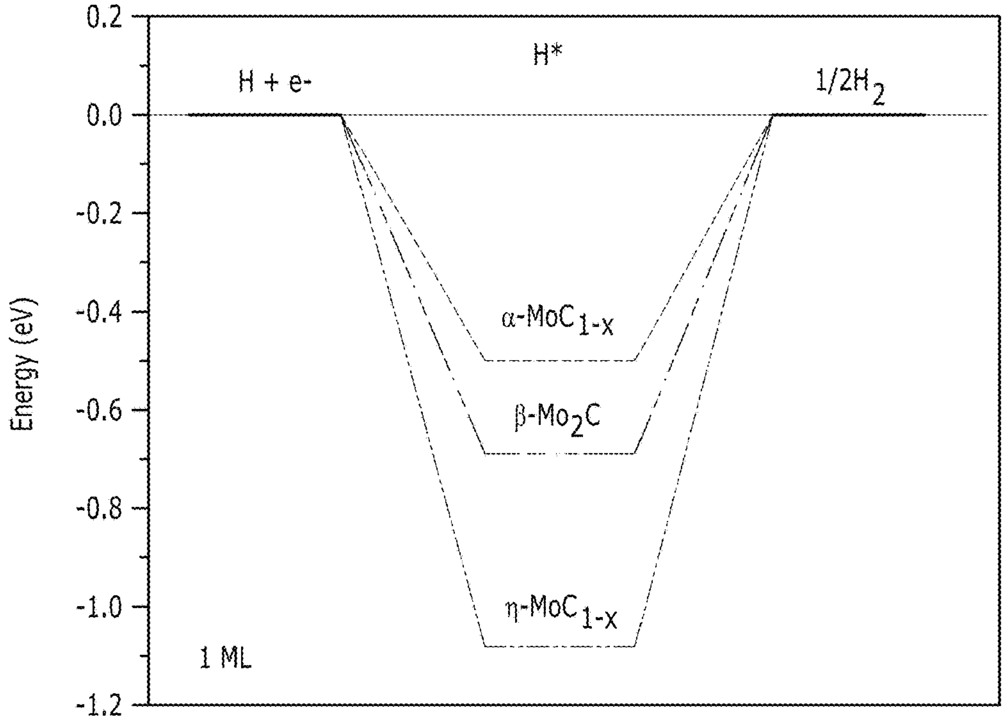

DFT calculations were conducted to elucidate the phase dependent HER performance. The Gibbs free energy of hydrogen adsorption ($\Delta G_H$) has been a descriptor in the selection of HER electrocatalysts [Mavrikakis 2006], and optimal catalysts have $\Delta G_H$ near 0 eV according to the Sabatier principle [Greenley 2006]. The $\Delta G_H$ of β-$Mo_2C$ (001), α-$MoC_{1-x}$(110), and η-$MoC_{1-x}$(001) were calculated to be 0.48 eV, 0.71 eV, and 1.09 eV, respectively (FIG. 4E). These results show that β-$Mo_2C$ and α-$MoC_{1-x}$ have smaller hydrogen adsorption energies than η-$MoC_{1-x}$, consistent with previous reports. [Fan 2017; Matanovic 2018]. Other than $\Delta G_H$, the electronic structures provide valuable insights into the metallic character of carbide phases. [Politi 2013].

Figure 4F:
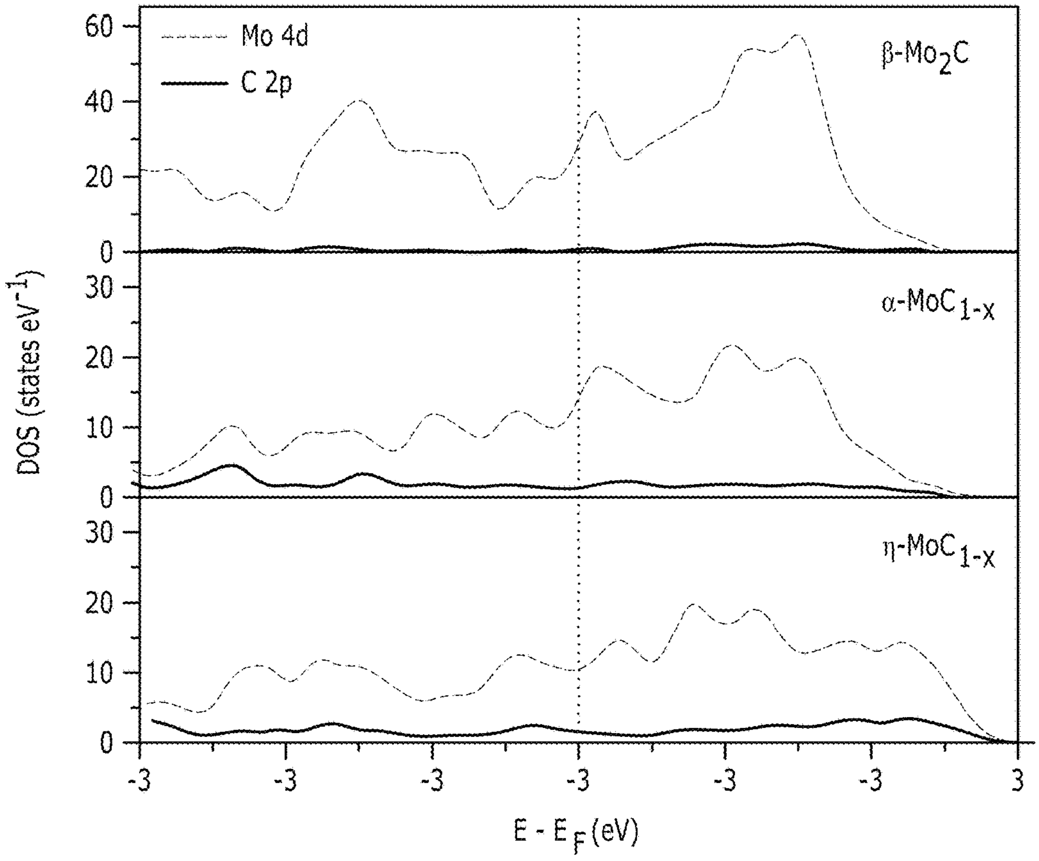

FIG. 4F illustrates the partial density of states (DOS) of Mo and C in molybdenum carbides. The DOS of β-$Mo_2C$ near the Fermi level is substantially larger than those of α-$MoC_{1-x}$ and η-$MoC_{1-x}$. The higher Mo content in β-$Mo_2C$ results in a higher carrier density and enhanced metallicity, which is beneficial for the charge transfer during electrochemical reactions (FIG. 4C). The larger surface area of β-$Mo_2C$ in comparison to the other two phases as measured by the Brunauer-Emmett-Teller (BET) method also contributes to the larger current density. The observed best HER performance of β-$Mo_2C$ was a collective effect of the relatively small hydrogen adsorption energy, enhanced metallic character, and high surface area. In addition, the flash graphene support provided a conductive pathway and prevented the carbide nanocrystals aggregating, which was beneficial for improving the HER performance [Li 2019].

Generalized Strategy For Carbide Nanocrystals Synthesis

Because of the ultrahigh available temperature by the FJH process, various TMCs are readily synthesized regardless of the availability of metal precursors with high vapor pressure. A series of carbide nanocrystals from transition groups IVB, VB, and VIB were successfully synthesized (FIGS. 5A-5D). The uniform temperature distribution permits the phase-pure synthesis throughout the whole sample. (The peak at ~26° (star) for all the samples is attributed to graphene support).

Figure 5A:
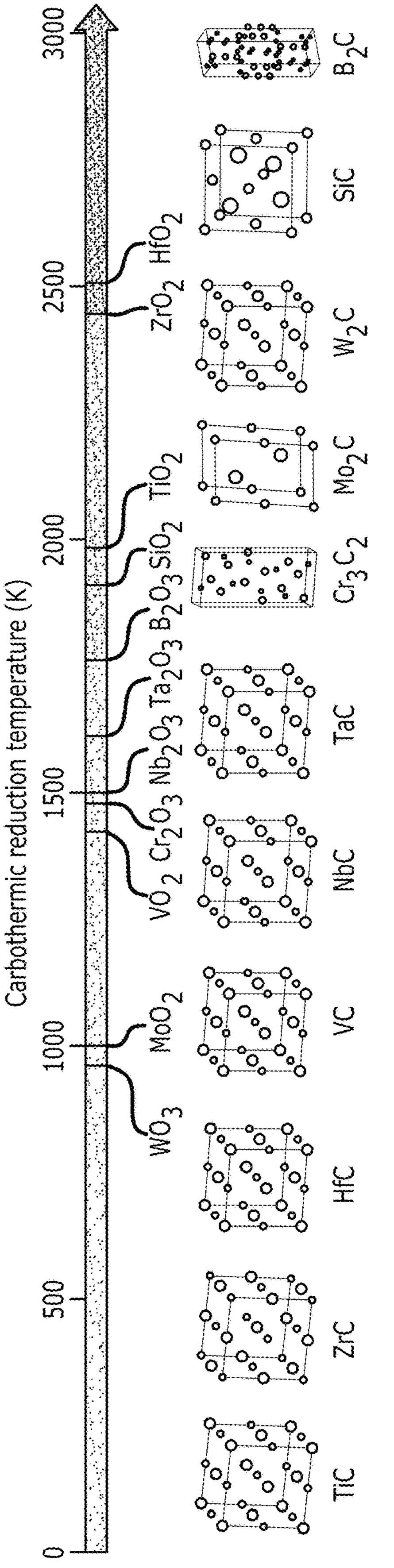
FIGS. 5A-5D shows generalized strategy for carbide synthesis.

According to the Ellingham diagram, the reduction temperatures of the metal oxides were calculated, which serve as reference values to evaluate carbide formation since the reaction of metal with carbon is exothermic (FIG. 5A). The ultrahigh temperature (~3000 K) of the FJH process makes it possible for the reduction of all the listed oxides to elemental metals, including the most challenging $HfO_2$ at temperature up to ~2510 K. Nearly all the low-cost metal or metal compounds, including oxides, hydroxides, and chlorides, could be used as precursors, making FJH a promising low-cost production method when compared to previous methods that rely on the availability of volatile compounds. [Kolel-Veetil 2005; Wolden 2011; Pol 2009].

Figure 5B:
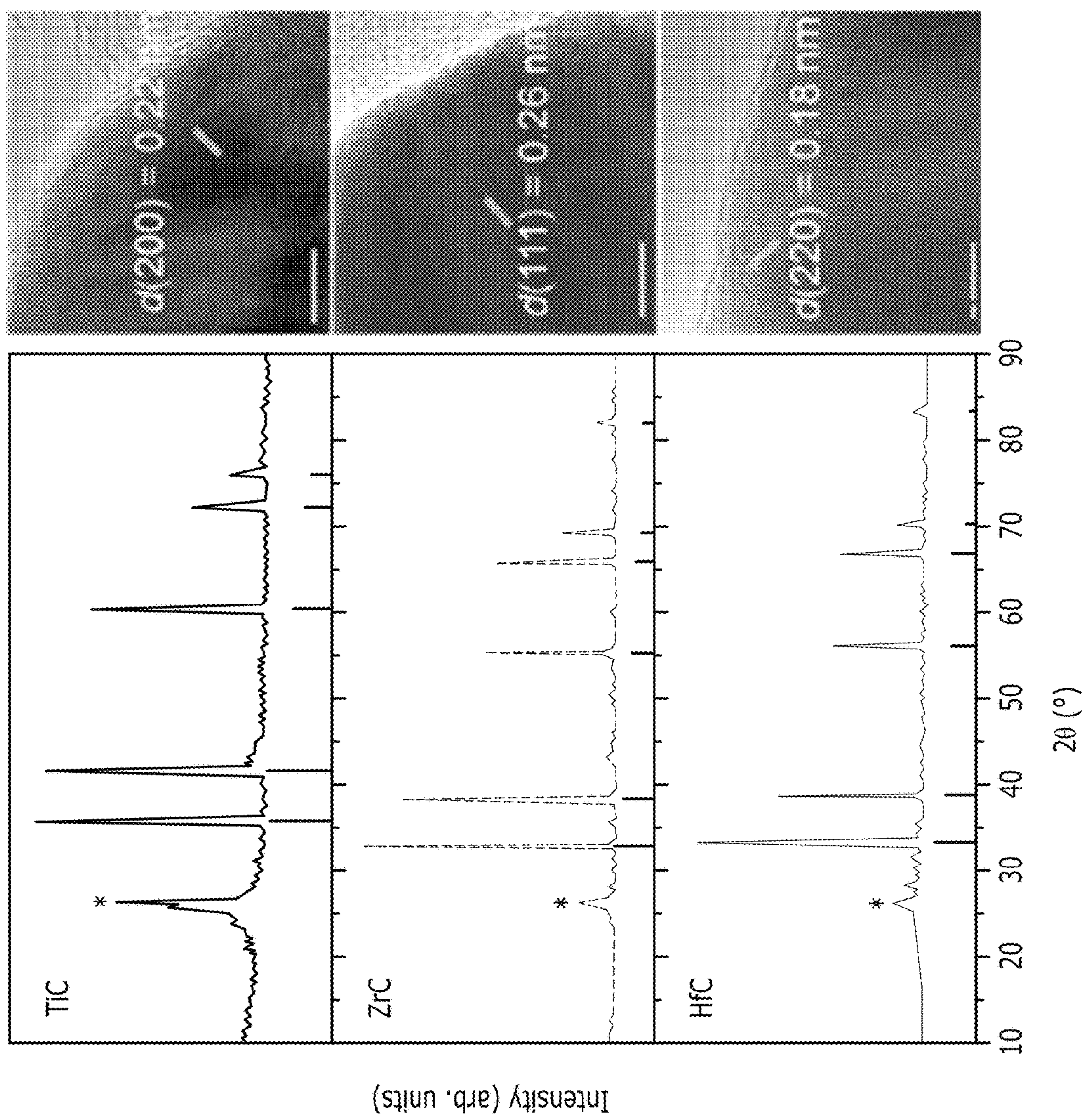
Figure 5C:
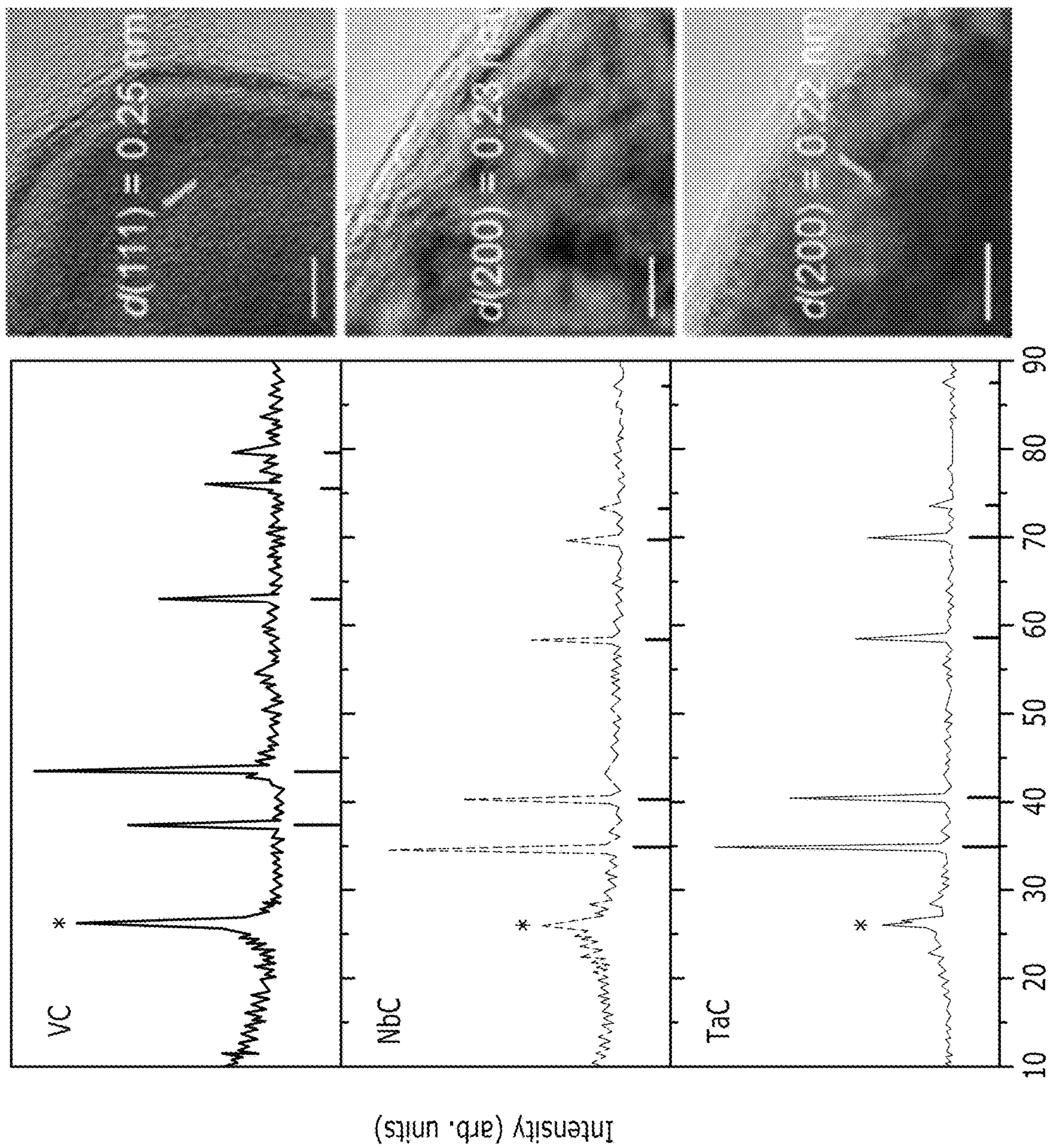
Figure 5D:
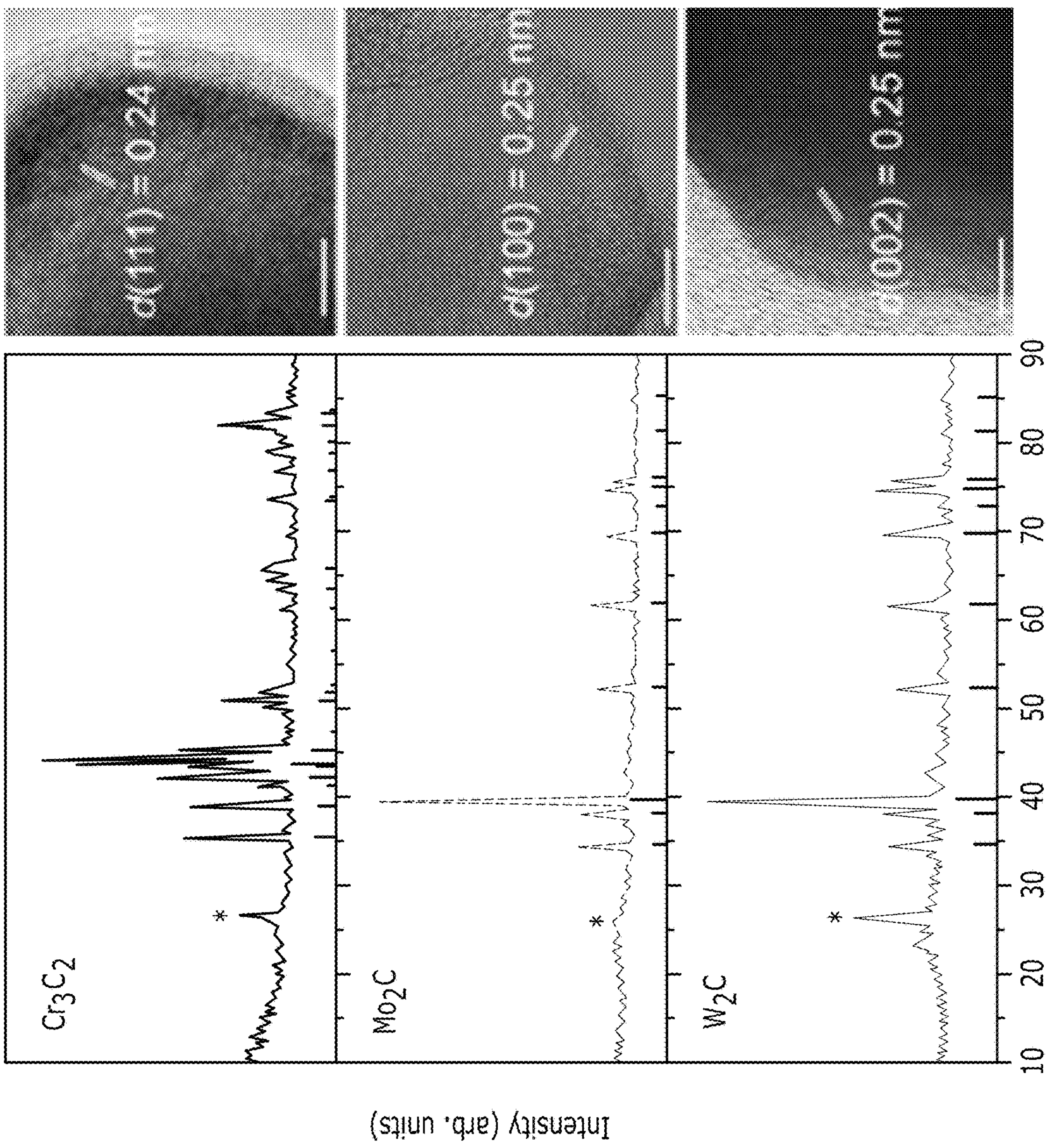

Group IVB carbides only have the stable rock salt crystal structure, including TiC, ZrC, and HfC, which were readily synthesized (FIG. 5B). The particle sizes of the TiC, ZrC, and HfC were measured to be ~30.4 nm, ~38.6 nm, and ~30.6 nm, respectively. These values matched well with the crystalline sizes determined by XRD (see TABLE I, above), demonstrating that the as-synthesized carbide nanoparticles are mostly single-crystal. For group VB carbides, the competing $M_2C$ (M=V, Nb, and Ta) phase could exist at a lower C content. [Hugosson 1999]. Nevertheless, by using a large molar ratio of C/M, synthesized the pure phases of VC, NbC, and TaC nanocrystals were successfully synthesized with the cubic structure and particle sizes ranging from ~20 to ~30 nm (FIG. 5C). In contrast, the phases of group VIB carbide (Cr, Mo, and W) are much more complex. [Hugosson 2001]. Here, the orthorhombic $Cr_3C_2$ phase and hexagonal $W_2C$ phase were synthesized with particle sizes of ~14.2 nm and ~18.7 nm, respectively (FIG. 5D). $W_2C$ is not thermodynamically favored over the WC phase below 1250° C. according to the W—C phase diagram. [Kurlov 2006]. The successful synthesis of the metastable $W_2C$ is attributed to the high energy input and ultrafast cooling rate of the ultrafast electrical thermal reaction, once again demonstrating the excellent phase engineering ability of the FJH process. Apart from the TMCs, the covalent carbides of $B_4C$ and SiC were synthesized, demonstrating the generality of the FJH process.

System and Synthesis Process

Accordingly, for the synthesis of metal carbides, the present invention provides, among other things, (i) an ultrafast synthesis that is thousands of times faster than previous reported methods; (ii) the phase control ability, which is hard to realize by other methods; (iii) the generality, as demonstrated by the synthesis of up to 13 carbides, which is impossible by any other methods.

The metal carbides resulting from the present invention, especially molybdenum carbides and tungsten carbides, can be utilized as electrocatalysts, such as for hydrogen evolution, which is critical for the application of fuel cells in clean energy. Moreover, the nanoscale carbides are important precursors for the fabrication of high-performance carbide ceramics.

Figure 6A:
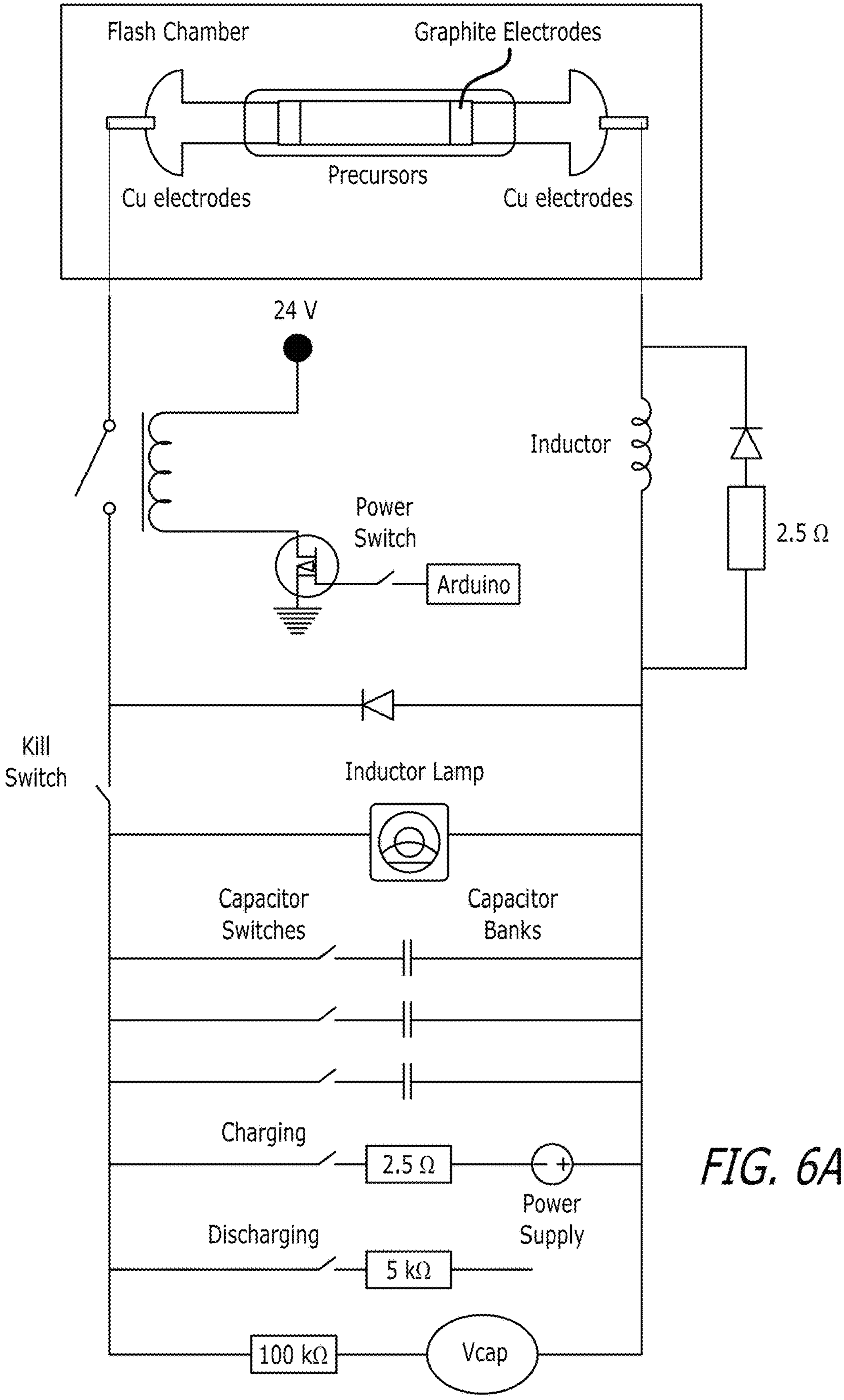
FIGS. 6A-6D shows a flash Joule heating (FJH) setup.
Figure 6B:
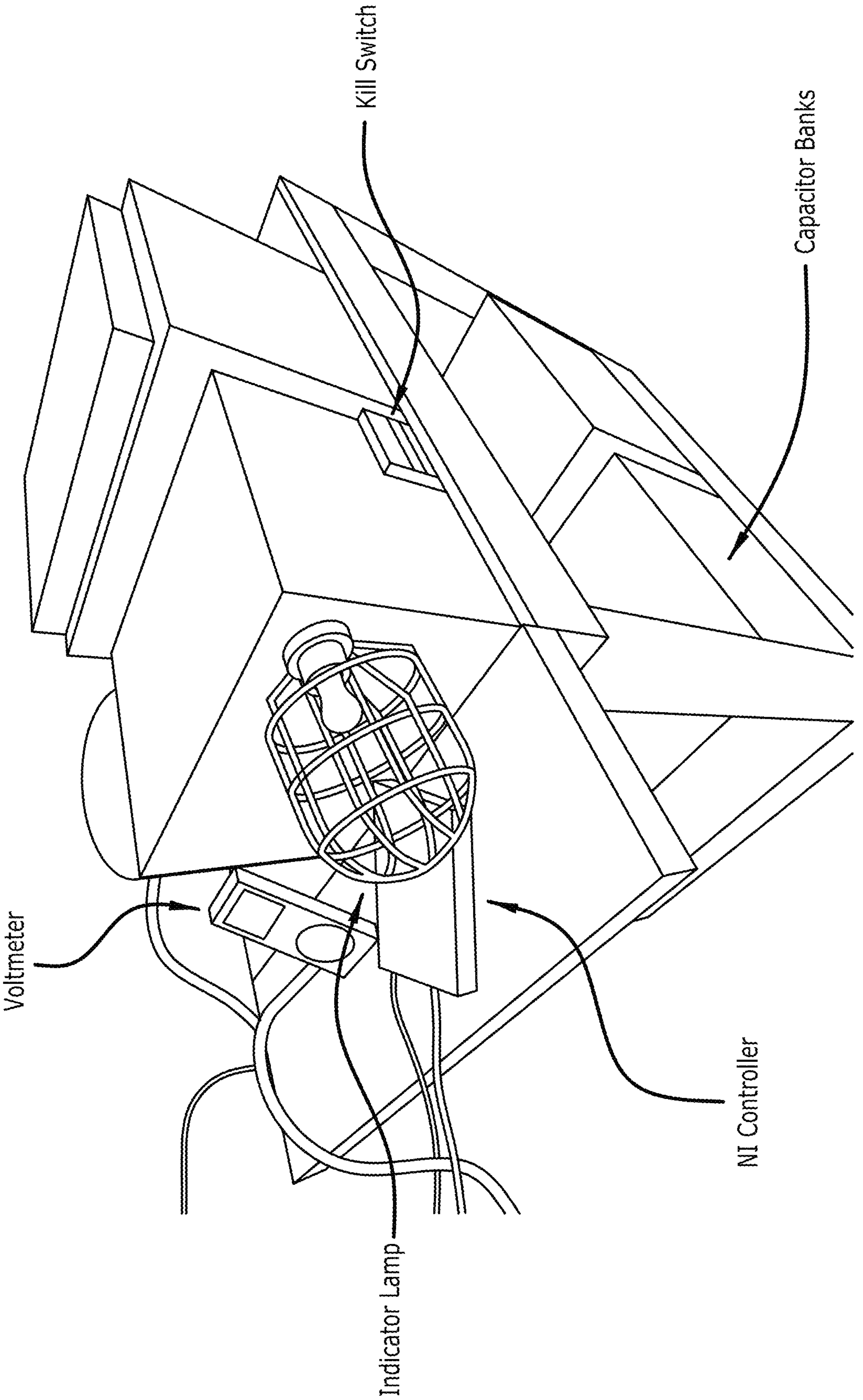
Figure 6C:
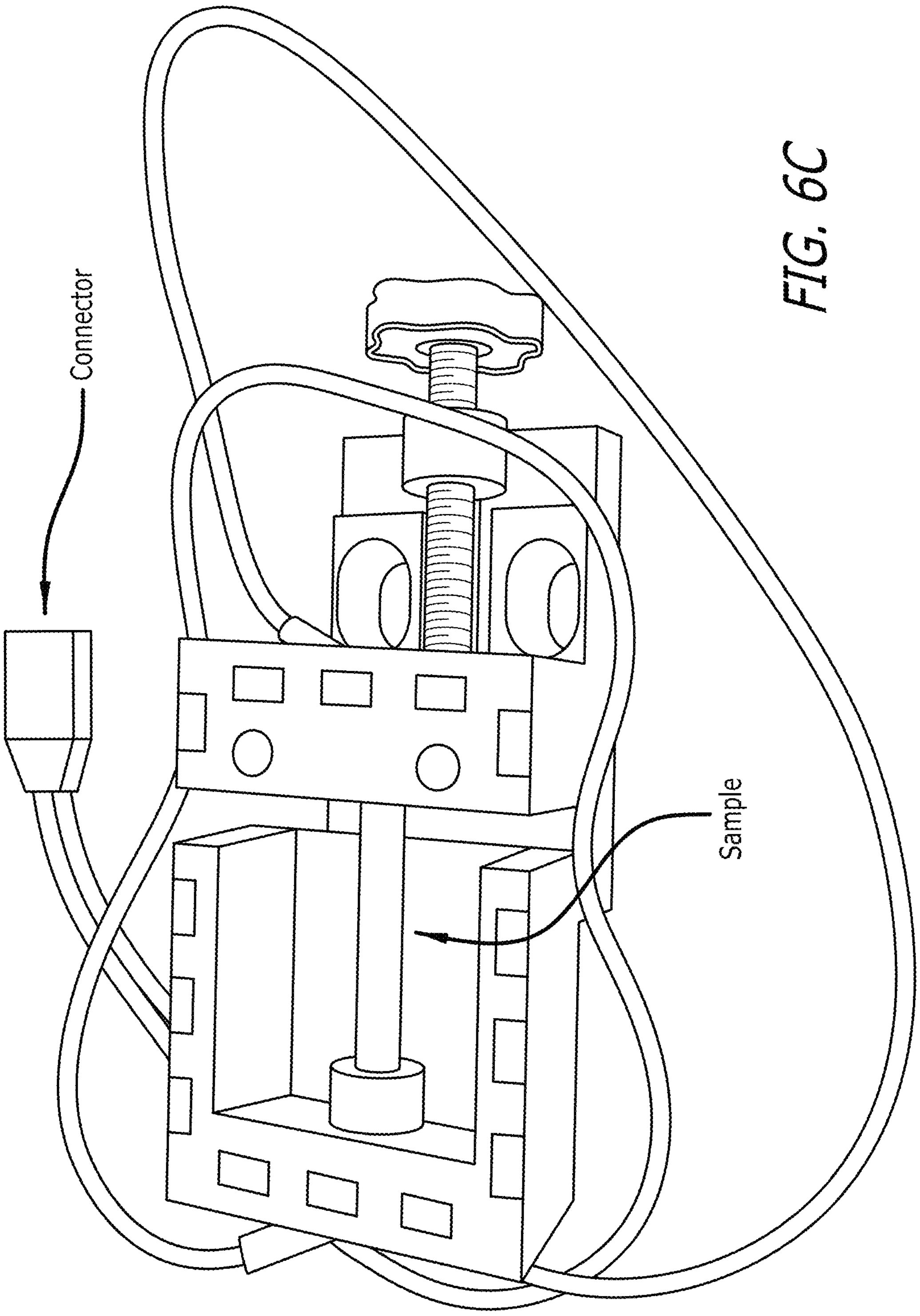
Figure 6D:
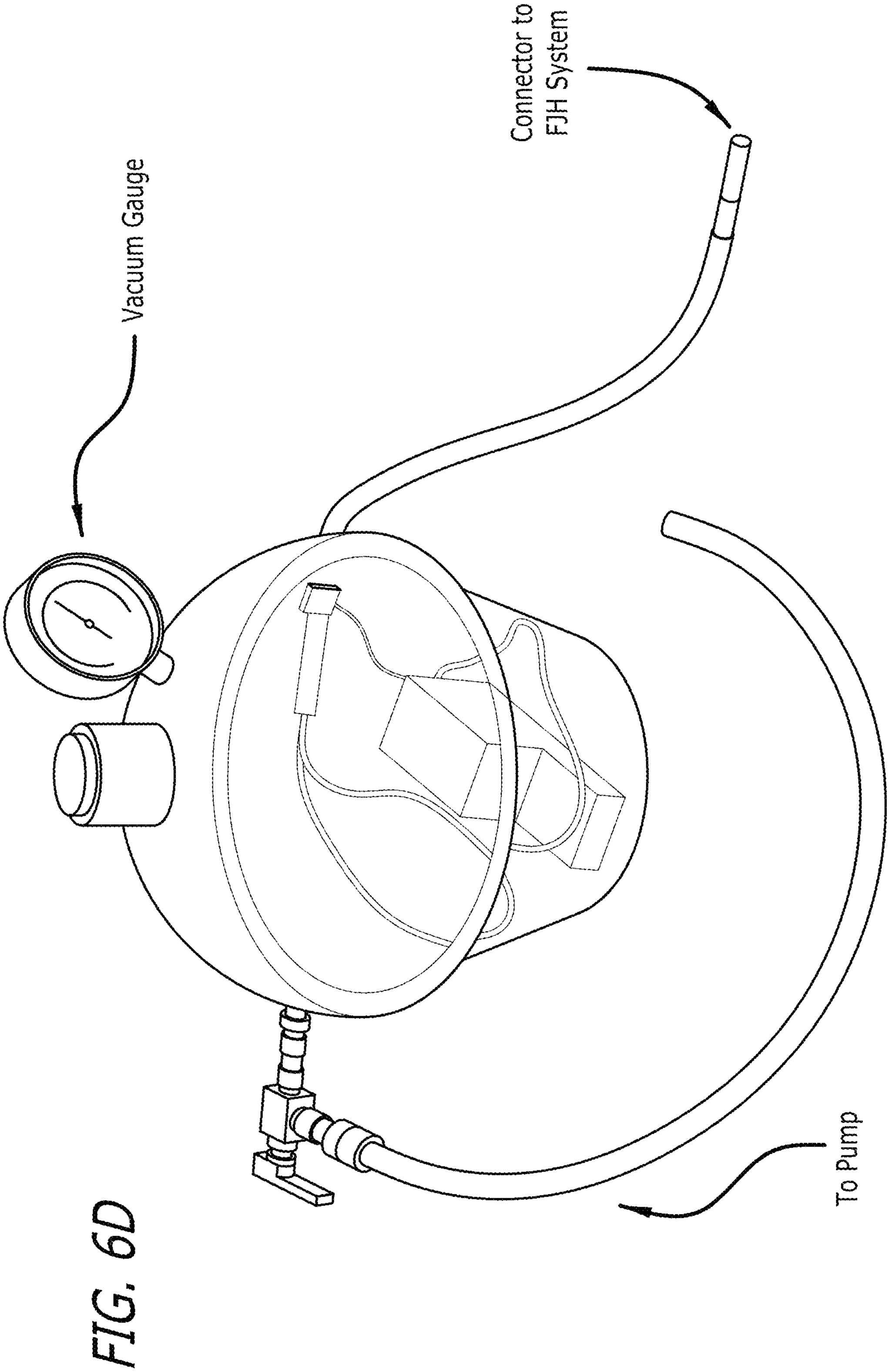

An exemplary system and process used included the electrical circuit diagram and setup of the FJH system are shown in FIGS. 6A-6B. (Additional details of the electrical components could be found in Luong 2020). A capacitor bank with a total capacitance of 60 mF was used as the power supply. The metal precursors and carbon black with specific weight ratios (TABLE I) were mixed by grinding using a mortar and pestle. The reactants (~50 mg) were loaded into a quartz tube with an inner diameter (ID) of 4 mm and outside diameter (OD) of 8 mm. When scaling up the process, a quartz tube with ID of 8 mm and OD of 12 mm was used for the ~200 mg sample, and a quartz tube with ID of 16 mm and OD of 20 mm was used for the ~1 g sample. Further scaling up the mass to kilogram scale will need containers that need no be quartz. Graphite rods were used as the electrodes in both ends of the quartz tube. The electrodes were loosely fitting in the quart tube to permit outgassing. The resistance was controlled by the compression force of the electrodes across the sample. The tube was then loaded on the reaction stage (FIG. 6C). The reaction stage was loaded into a sealed reaction chamber which was evacuated to a mild vacuum (~10 mm Hg) to accommodate degassing and avoid sample oxidation (FIG. 6D). The reaction stage was then connected to the FJH system.

The capacitor bank was charged by a direct current (DC) supply that can reach voltages up to 400 V. A relay with programmable ms-level delay time was used to control the discharge time. The charging, flash Joule heating, and discharging were automatically controlled by using the National Instruments Multifunction I/O (NI USB-6009) combined with a customized LabView program. After the FJH reaction, the apparatus rapidly cooled on its own to room temperature. Before removing the sample, make sure that the capacitor bank is fully discharged. The detailed conditions for the synthesis of various carbides are listed in TABLE I.

Features and Applications

In embodiments, the as-synthesized carbide nanocrystals were supported on flash graphene. The necessity of separation of graphene and carbides depends on the further application. For the application of nanocrystalline carbides in electrocatalysts, the graphene support is beneficial for improving the performance by providing conduction and preventing particle aggregation. For another major application of nanocrystalline carbides as precursors for ultra-strong ceramics, the removal of excess carbon is necessary.

It was realized that the efficient purification of the carbides by post-synthesis processes, including the simple calcination in air for SiC; the Ca metal etching [Dyjak 2013] for TiC, ZrC, HfC, VC, NbC, TaC, $Cr_3C_2$, β-$Mo_2C$, and $W_2C$; and the density-in-liquid purification procedure for metastable molybdenum carbides, α-$MoC_{1-x}$ and η-$MoC_{1-x}$. In addition, the greatly improved purity of $B_4C$ was shown by using controlled feeding during the synthesis.

Due to the ultrafast heating/cooling rate, the direct sampling heating feature, and the short reaction duration within 1 s, the FJH process for carbide synthesis is highly energy efficient compared to traditional furnace heating where large amounts of energy are used to maintain the temperature of the chamber. The carbide nanocrystals were synthesized at only 2.2 to 8.6 kJ $g^{-1}$ in electrical energy. The FJH synthesis possesses excellent scalability, that a constant temperature value and uniformity on different mass scales could be obtained by adjusting the discharging voltage and/or the capacitance.

The synthesis of carbide nanocrystals up to gram scale was demonstrated by increasing the FJH voltage. The FJH process can be extended to the synthesis of carbide alloys [Sacker 2018], heteroatom-decorated carbides, [Song 2019], and phase engineering of metastable carbides, [Demetriou 2002], which provides a powerful technique for carbide production.

The controlled synthesis of metastable phases is challenging in the synthesis of inorganic materials [Chen 2020]. The FJH process provides broadly tunable energy input that can exceed 3000 K coupled with kinetically controlled ultrafast cooling rate (>$10^4$ K $s^{-1}$). Hence, the FJH process provide access to many non-equilibrium phases and subsequently retain it at room temperature, thus serving as a potential tool for engineering the metastable phases of various materials, such as metal nanomaterials [Chen 2020], layered oxides [Bianchini 2020], metal nitrides [Sun W 2017], and two-dimensional materials.

Ultrafast Synthesis of Corundum Nanoparticles

The present invention further includes flashing Joule heating [see Luong 2020; Stanford 2020; Tour PCT '000 Application] for ultrafast processes to synthesize metal corundum nanoparticles, i.e., ultrafast phase transformation from γ-$Al_2O_3$ (as well as γ-AlOOH) to α-$Al_2O_3$ by a flash Joule heating method. Briefly, carbon black (or other carbon additive, such as discussed above) was mixed with γ-$Al_2O_3$ (or γ-AlOOH) nanoparticles, which then is subjected to flash Joule heating. The phase transformation is ultrafast within 1 s, thousands of times faster than other start-of-art methods.

Embodiments of the present invention thus include a Joule heating process based on pulsed direct current (PDC) to complete the phase transformation from γ- to α-$Al_2O_3$ at a significantly reduced average bulk temperature and reaction duration (~573 K, <1 s). The rapid transformation can be enabled by the resistive hotspot-induced local heating in the PDC process when an appropriate volume fraction ratio of γ-$Al_2O_3$ precursors and carbon black conductive additives are used. The pulsed and local heating mitigates the agglomeration, leading to the synthesis of α-$Al_2O_3$NPs with average particle size of ~23 nm and surface area ~65 $m^2$ $g^{-1}$. Ab initio calculations reveal that the topotactic phase transformation process (from γ- to δ'- to α-$Al_2O_3$) is determined by the surface energy difference of the three phases. A particle size of ~21 nm was achieved that is the thermodynamic limit for the synthesis of dehydrated α-$Al_2O_3$ NPs with the δ-$Al_2O_3$ as the intermediate phase by a thermal process.

Further, based on the Joule heating technique, an alternating current sintering (ACS) process has been developed that shows the ultrafast and pressureless sintering of these α-$Al_2O_3$NPs into alumina ceramics with nanoscale grain size and improved strength and hardness.

A calcination process was also developed to totally remove the carbon black or formed flash graphene, and pure phased α-$Al_2O_3$ was obtained. In embodiments, the synthesized α-$Al_2O_3$ was shown to have a surface area up to 65 $m^2$/g, that means that these materials are useful in the applications of catalyst support and high-strength ceramics.

Phase Transformation Synthesis

Methods for ultrafast synthesizing of corundum nanoparticles (i.e., the transformation from γ-$Al_2O_3$ (as well as γ-AlOOH) to α-$Al_2O_3$ can include the following.

Figure 7:
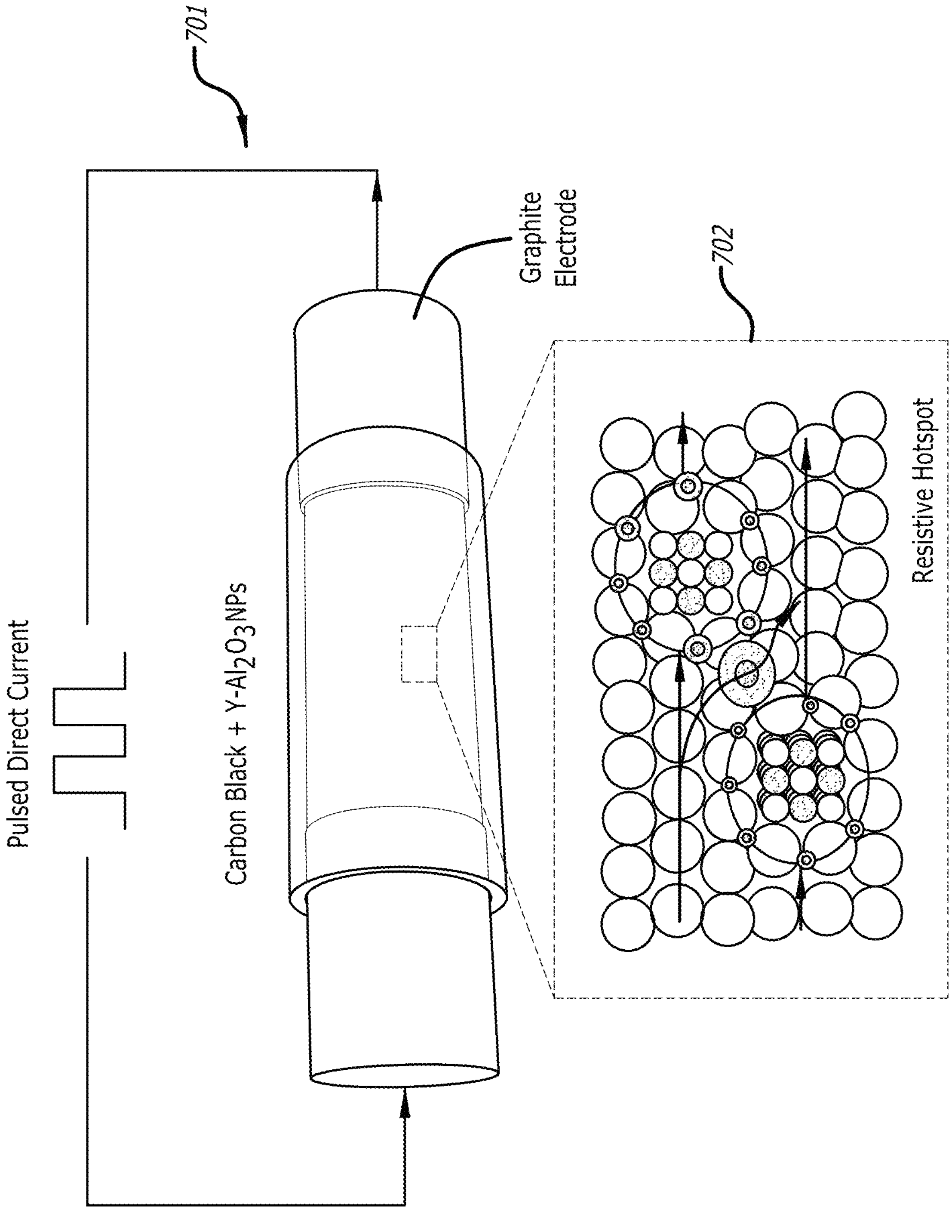
FIGS. 7-12 show ultrafast phase transformation of alumina by pulsed direct current Joule heating.

Since the γ-$Al_2O_3$NPs precursors are electrically insulative, commercial carbon black (CB) was used in embodiments as the conductive additive. For instance, the mixture of γ-$Al_2O_3$NPs and CB were compressed inside a quartz tube between two graphite electrodes. See FIG. 7 (showing the PDC apparatus 701 and the resistive hotspots 702 around and at the gap of the insulative γ-$Al_2O_3$NPs with the arrows depict the electric current lines) and FIG. 13A (with aluminum electrolytic capacitors (450 V, 13 mF) having total capacitance of 0.624 F used for charging), The CB also works as separators to avoid the agglomeration of $Al_2O_3$NPs during heating. The resistance was controlled by the compressive force on the two electrodes, which is shown in TABLE II.

TABLE II

Parameters for PDC Joule Heating

| Precursors | Mass Ratio | Initial Mass (mg) | Rs (Ω) | $V_0$ (V) | $V_1$ (V) | Duration (ms) | Final Mass (mg) |
|---|---|---|---|---|---|---|---|
| γ-$Al_2O_3$:CB | 1:1 | 150.0 | 1.5 | 60 | 9 | 800 | 132 mg |
| γ-$Al_2O_3$:CB | 2:1 | 150.0 | 2 | 60 | 35 | 800 | 128 mg |
| γ-$Al_2O_3$:CB | 3:1 | 150.0 | 4 | 60 | 38 | 800 | 140 mg |
| γ-$Al_2O_3$:CB | 4:1 | 150.0 | 8 | 60 | 42 | 800 | 135 mg |
| γ-$Al_2O_3$:CB | 5:1 | 150.0 | 20 | 60 | 50 | 800 | 146 mg |
| γ-$Al_2O_3$:CB | 4:1 | 150.0 | 8 | 60 | 55 | 300 | 132 mg |
| γ-$Al_2O_3$:CB | 4:1 | 150.0 | 8 | 60 | 52 | 400 | 135 mg |
| γ-$Al_2O_3$:CB | 4:1 | 150.0 | 8 | 60 | 40 | 500 | 130 mg |
| γ-$Al_2O_3$:CB | 4:1 | 150.0 | 8 | 60 | 42 | 800 | 135 mg |
| CB | — | 150.0 | 0.8 | 60 | 12 | 500 | 122 mg |

Note:
$V_0$: the start voltage, $V_1$: the voltage after Joule heating.

Figure 13A:
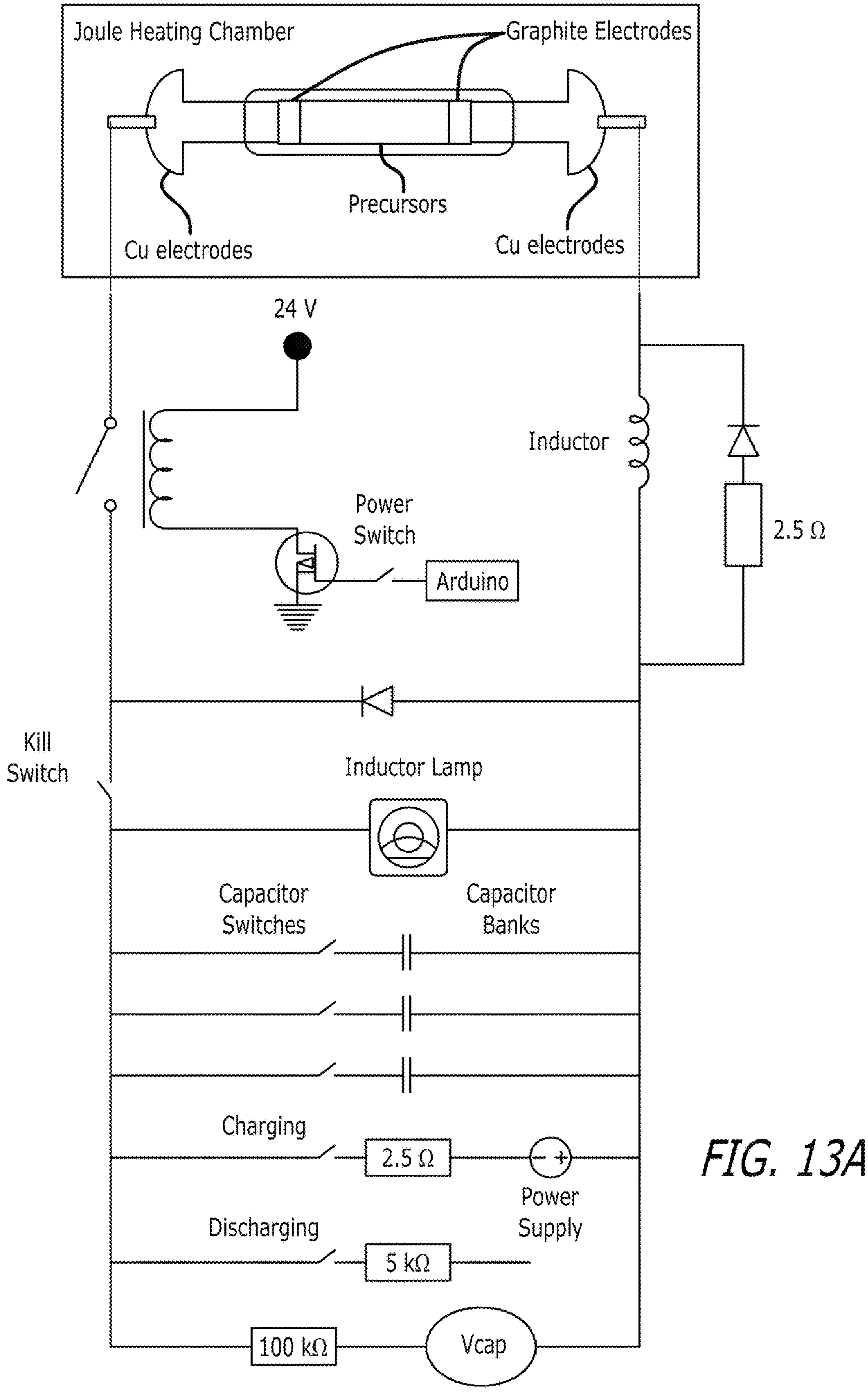
FIGS. 13A-13B show a PDC Joule heating system.
Figure 13B:
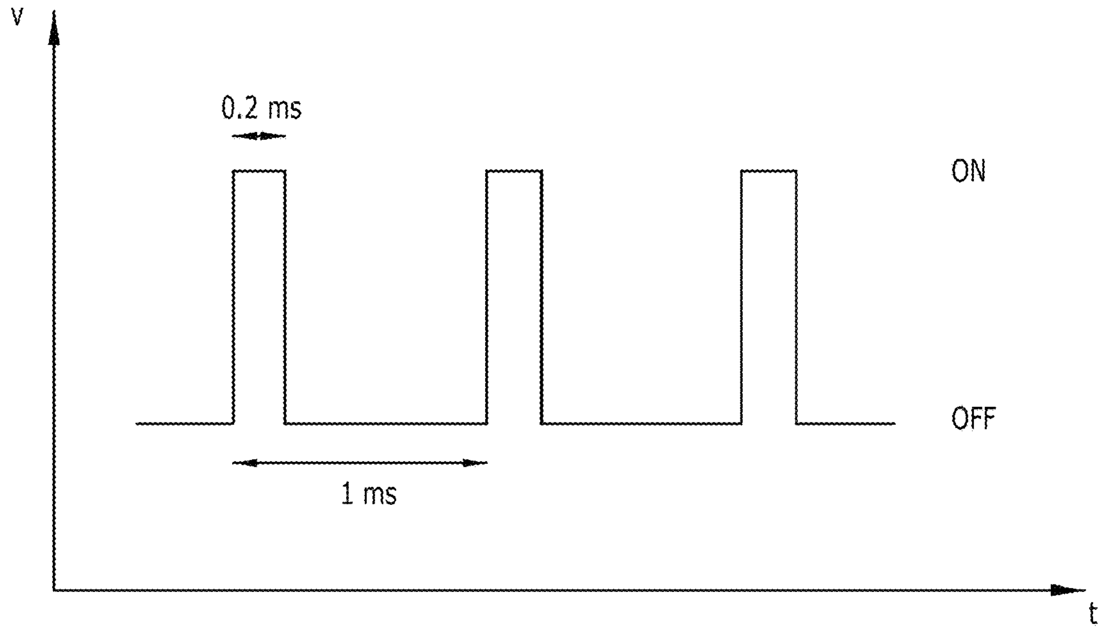

The electrodes were connected to a capacitor bank with capacitance of C=0.624 F and charging voltage up to $V_0$=500 V. The discharge circuit was a series resistor-inductor-capacitor circuit with the characteristic time of τ=0.1 ms, which permitted the PDC with frequency of f=1000 Hz. FIG. 13B shows a pulsed voltage generation that can be used in the system to generate the PDC, with the frequency 1000 Hz, and the ON state is set to be 20%, which gives a 0.2 ms voltage pulse.

Joule heating affects the entire electric conductor; for a homogeneous conductor, the current density is uniform so the Ohmic dissipation enables the homogeneous temperature distribution throughout the sample. [Johnson 2011]. However, when an electrical field is applied to an inhomogeneous medium, as in the composite of conductive CB and insulative $Al_2O_3$, the current and powder densities have strong spatial variation. [Soderberg 1987]. The power dissipation is substantially larger than the neighboring regions at some regions, which are termed resistive hotspots 702 (illustrated in FIG. 7A). Even though the average bulk temperature is low, the hotspots permit local heating and trigger the transformation that happens at a much higher temperature.

Figure 8:
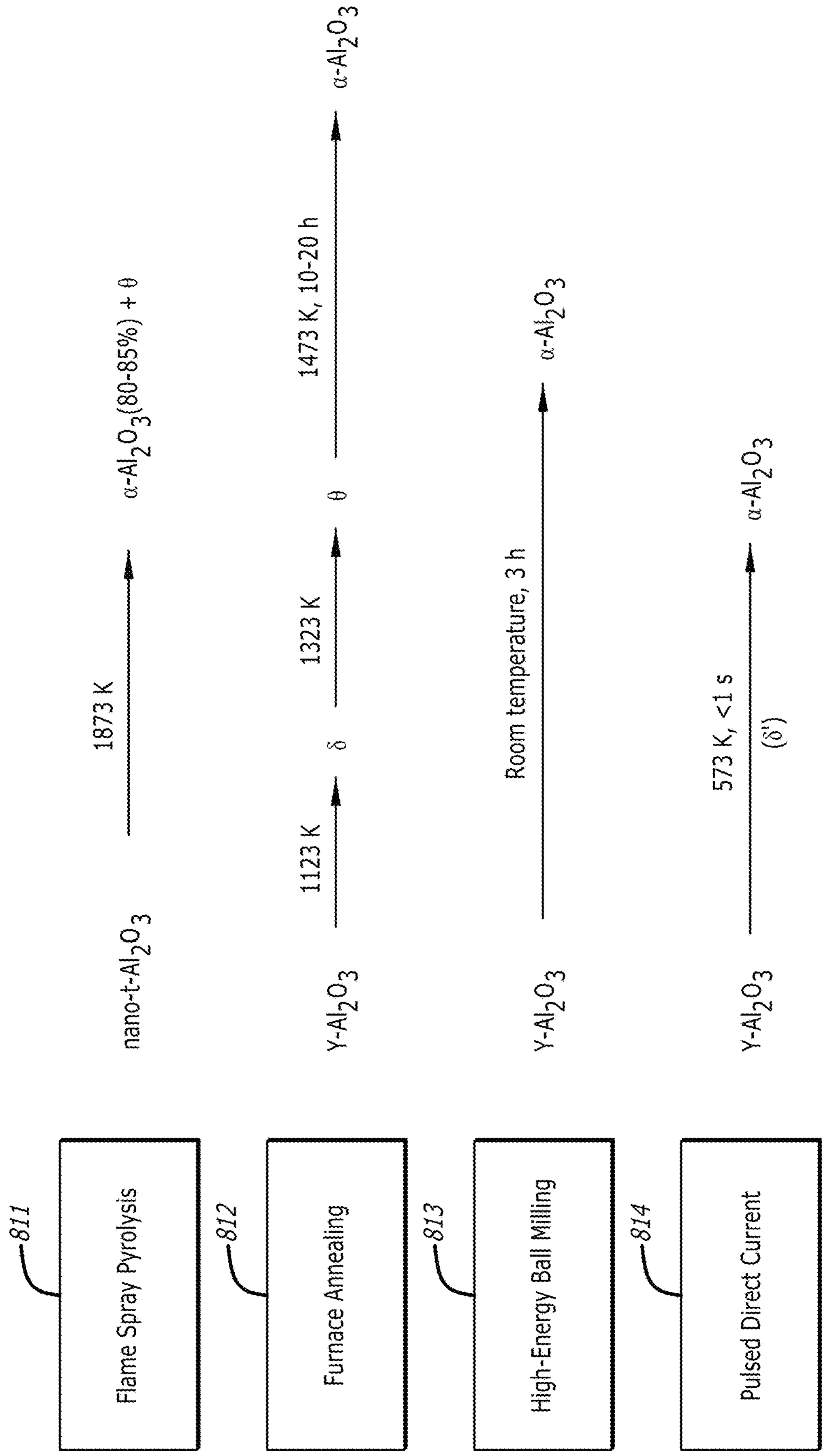

By using this effect, the phase transformation from γ-$Al_2O_3$ to α-$Al_2O_3$ accompanied by the intermediate t-phase of δ'-$Al_2O_3$ at an average bulk temperature of ~573 K in <1 s was realized. See pulsed direct current method 814 shown in FIG. 8. As shown in FIG. 8, this pulsed direct current method 814 is compared to the representative phase transformation methods reported in the literature, namely flame spray pyrolysis method 811 [Laine 2006], furnace annealing method 812 [Steiner 1971], and high energy ball milling method 813 [Amrute 2019].

The liquid-feed flame spray pyrolysis method 811 produced α-$Al_2O_3$ at temperatures near 1873 K; however, the kinetically controlled process may render it difficult to access the pure phase (80-85% purity of α-phase). [Laine 2006]. Traditional heating methods that supply heat through the sample boundary, such as furnace annealing method 812, require an extended period to permit uniform heating; hence 1473 K and 10 to 20 h was necessary to complete the phase conversion. [Steiner 1971]. Other room-temperature non-equilibrium processes, such as high-energy ball milling method 813, have been reported to form α-$Al_2O_3$. [Amrute 2019]. Nevertheless, the γ-$Al_2O_3$ could agglomerate, which leads to loss of surface area during the extended time and high-energy collisions. [Zielinski 1993; Chauruka 2015].

Figure 9:
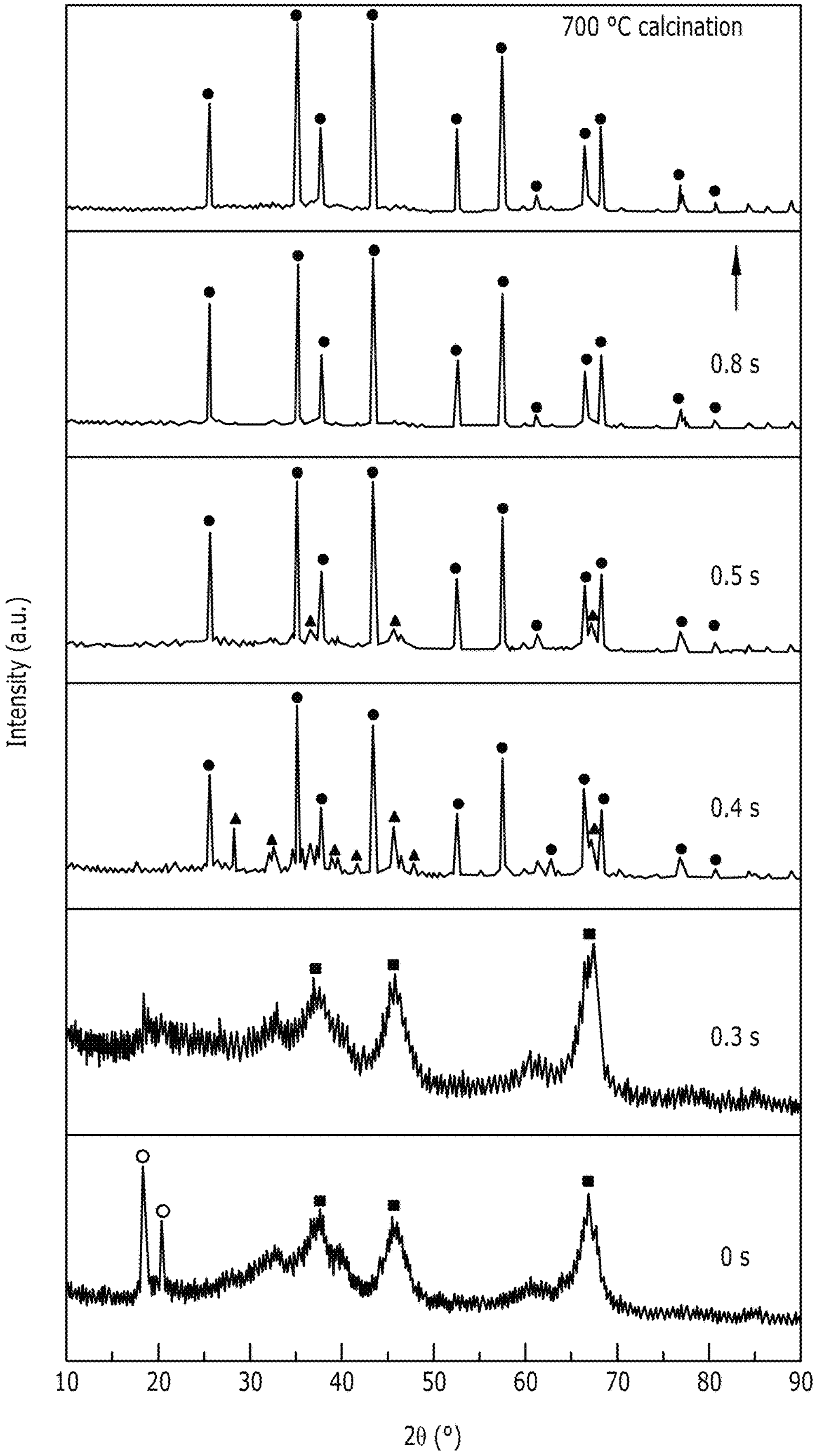
Figure 10:
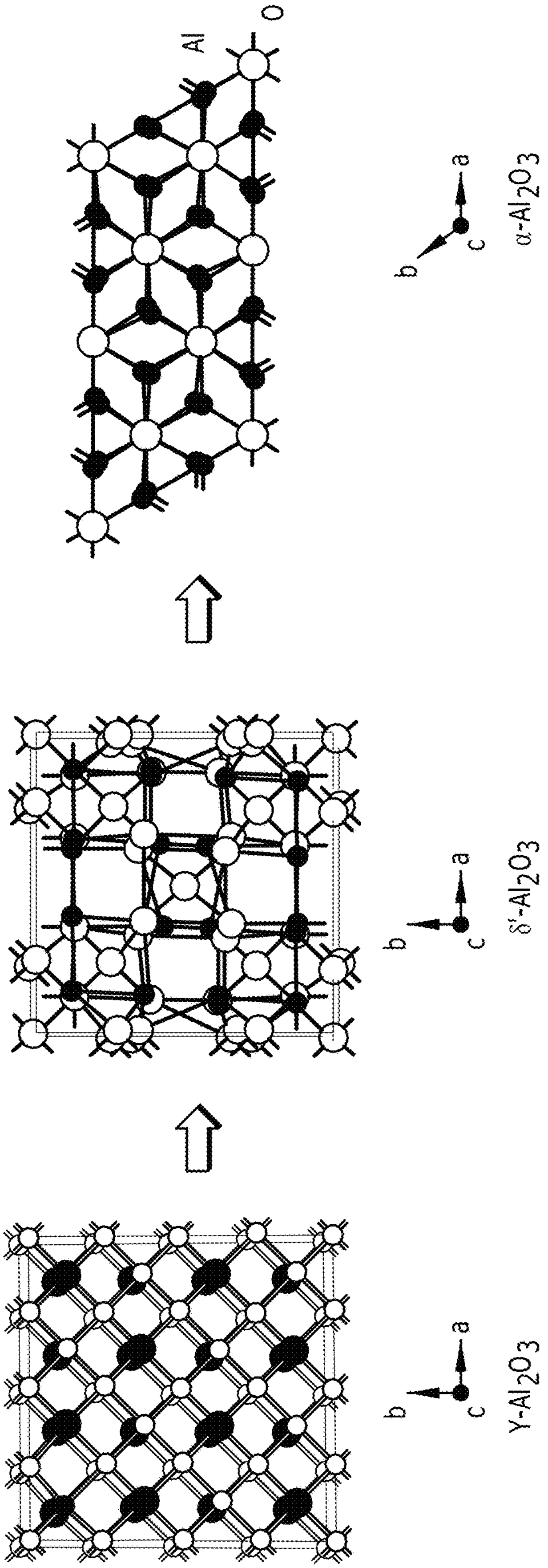
Figure 11:
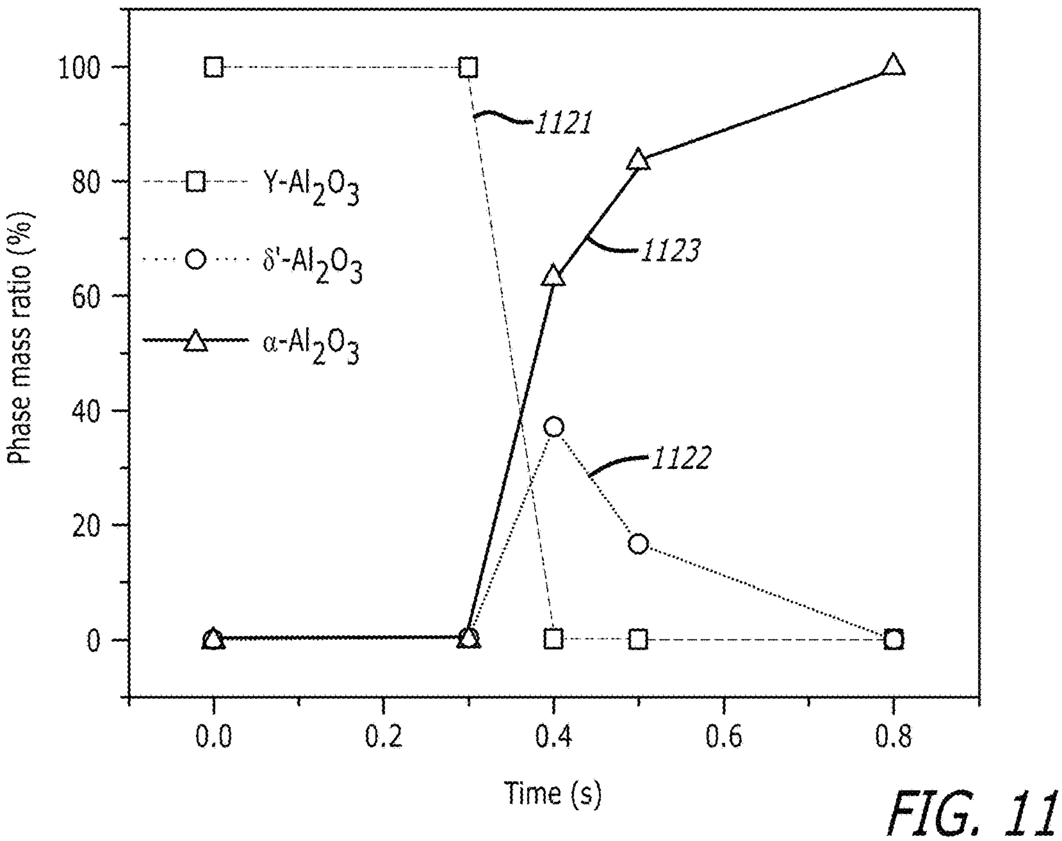

The detailed phase transformation process of γ-$Al_2O_3$ was investigated by the PDC approach. See FIGS. 9-11. (In FIG. 9, the marks represent γ-$Al_2O_3$ (■), δ'-$Al_2O_3$ (▲), α-$Al_2O_3$ (●), and γ-AlOOH (○); the precursor was γ-$Al_2O_3$ with slight γ-AlOOH phase (crystal system: monoclinic; space group: P21/n; PDF No. 07-0324); and the 0.8 s treated sample was calcined). Commercial γ-$Al_2O_3$NPs with particle size of ~10 nm and surface area of ~156 $m^2$ $g^{-1}$ were used as the precursors. A small ratio of γ-AlOOH phase appeared in the precursors (FIG. 9, 0 s). The mass ratio of γ-$Al_2O_3$NPs and CB was 4 to 1, which gave a sample resistance of ~8Ω (TABLE II). A discharging voltage of 60 V was applied with different discharging times controlled by a relay. The X-ray diffraction (XRD) patterns of the products with different PDC on-state time are shown in FIG. 9. As the discharging time increased, the γ-AlOOH first disappeared at 0.3 s; then, the γ-$Al_2O_3$ was transferred to δ'- and α-$Al_2O_3$ phase at 0.4 to 0.5 s; last, the intermediate δ'-$Al_2O_3$ phase was fully converted to α-$Al_2O_3$ phase after 0.8 s of discharge (FIG. 11 with curves 1121-1123 for γ-$Al_2O_3$, δ'-$Al_2O_3$, and α-$Al_2O_3$, respectively). The orthorhombic δ'-$Al_2O_3$ was observed as the single intermediate phase (FIG. 10), which is distinct from other thermal processes where δ- and θ-$Al_2O_3$ usually appear before the final α-$Al_2O_3$ phase (FIG. 8). [Steiner 1998; Levin 1998; Lamouri 2017].

Figure 13C:
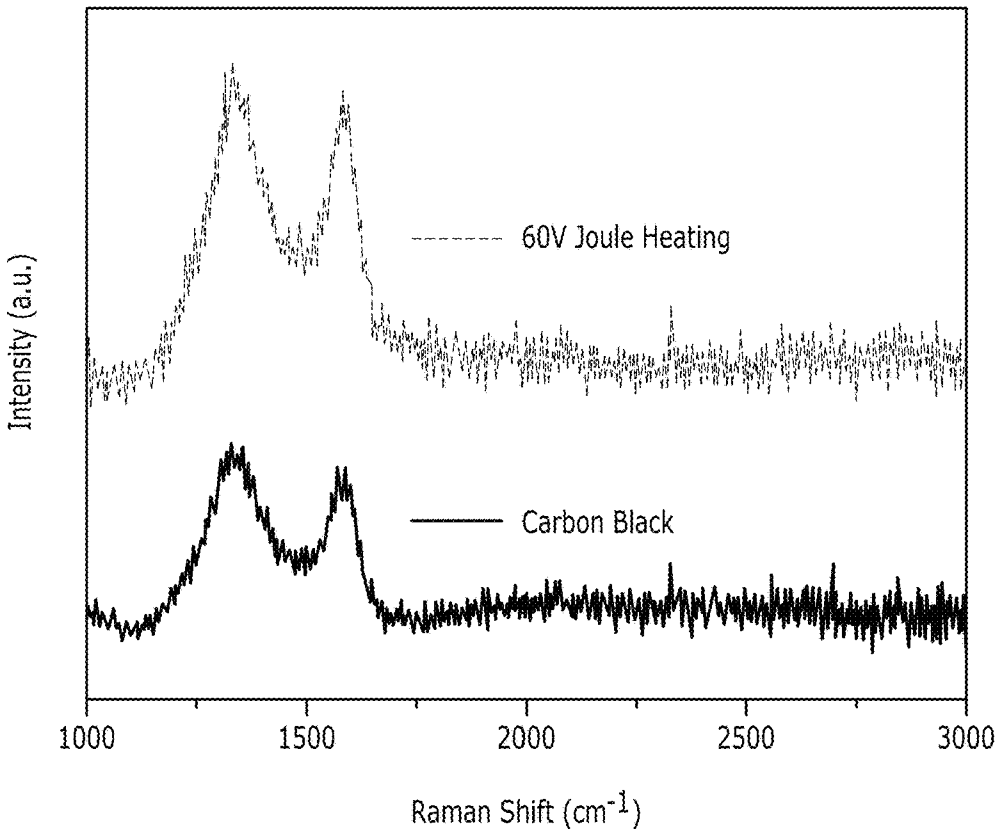
FIG. 13C shows Raman spectra of CB precursor and the product after PDC Joule heating at 60 V for 0.8 s.

Unlike previous report [Luong 2020] on the synthesis of graphene by the high-voltage flash Joule heating at a high temperature of ~3000 K, the 60 V PDC did not provide enough energy to graphitize the CB. FIG. 13C (with no observation of the 2D peaks for the product after Joule heating at 60 V). As a result, the CB could be easily removed by heating in air, according to thermal gravimetric analysis (TGA). Here, the as-synthesized mixture of α-$Al_2O_3$NPs and CB was calcined in air at 700° C. for 1 h to purify the product. The X-ray photoemission spectrum (XPS) of the α-$Al_2O_3$ product after calcination showed very minor carbon signal, which could be caused by the carbon adsorption in air.

Figure 12:
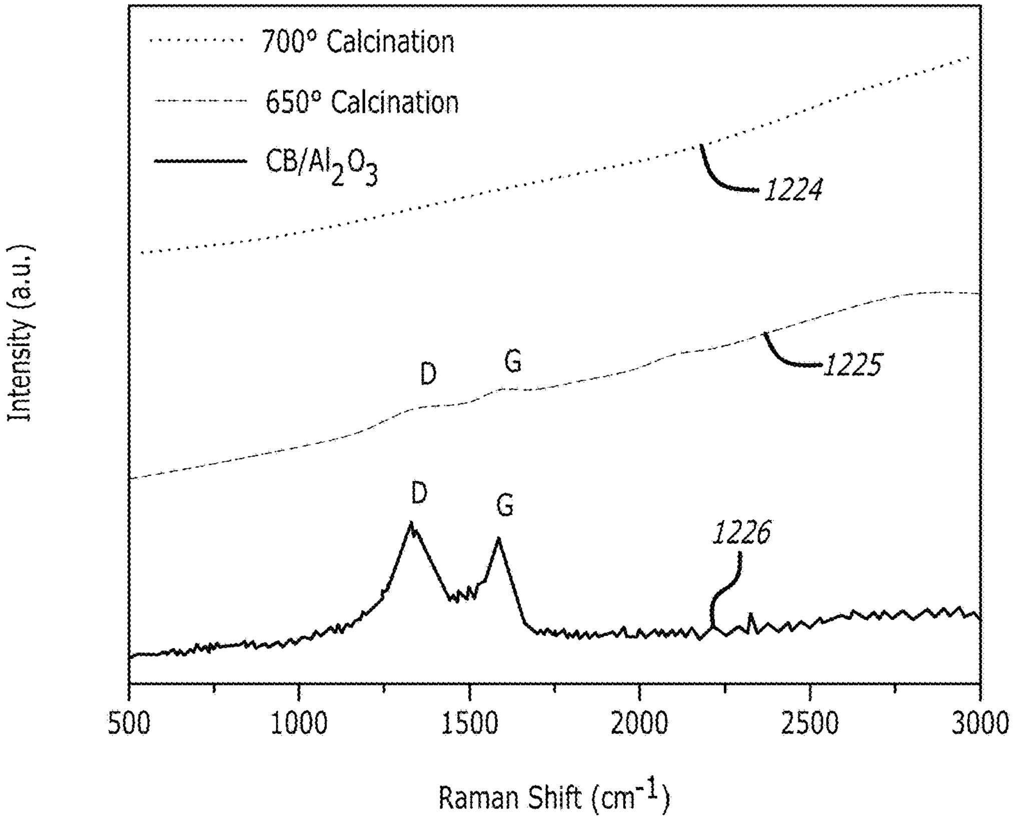

Raman spectra are sensitive to even a monolayer of carbon [Wang 2008]; intriguingly, no characteristic Raman bands of carbon were detected after calcination at 700° C. (FIG. 12 with curves 1224-1226 for 700° C. calcination, 650° C. calcination, and CB/$Al_2O_3$, respectively), demonstrating the efficient removal of carbon. As a control, it was determined that the calcination process itself does not trigger the phase transformation and has negligible effect on the coarsening or aggregation of the γ-$Al_2O_3$ phase.

Characterization of the Corundum Nanoparticles

Figure 14B:
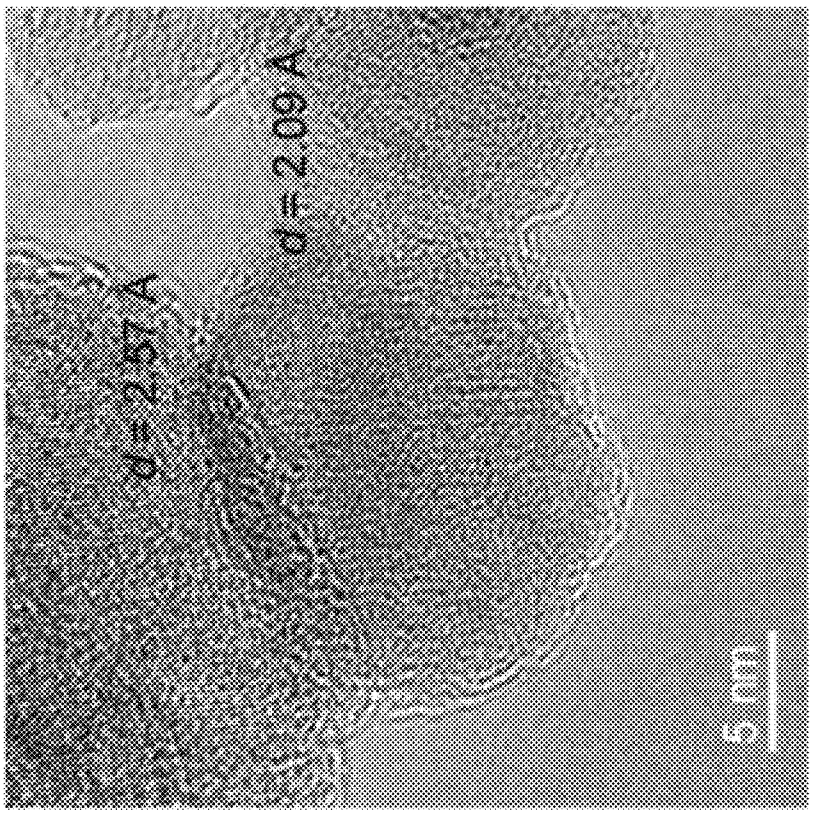
FIGS. 14A-14F show characterization of α-$Al_2O_3$NPs.
Figure 14A:
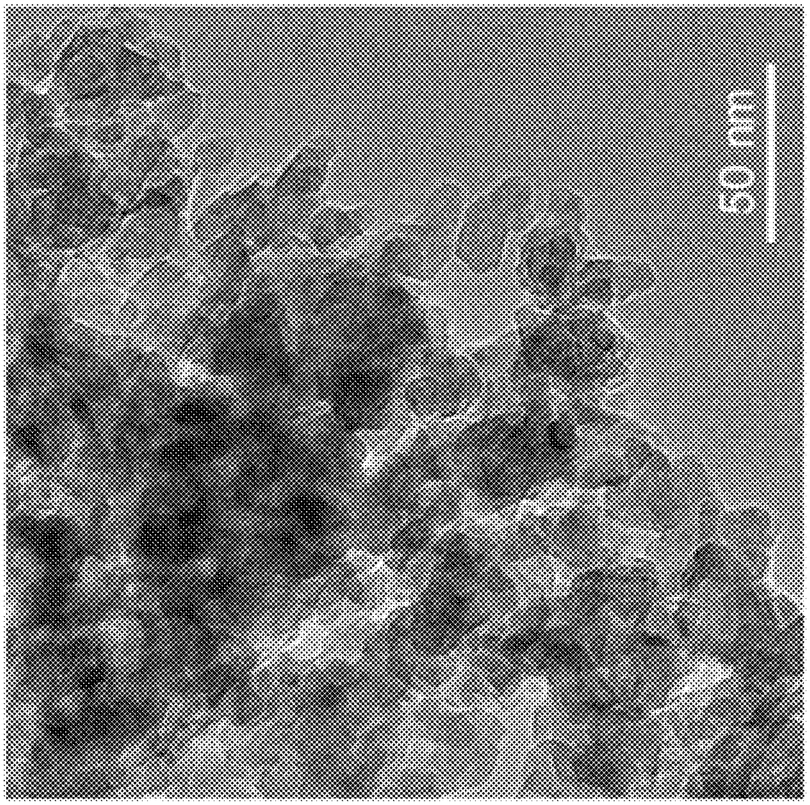
Figure 14C:
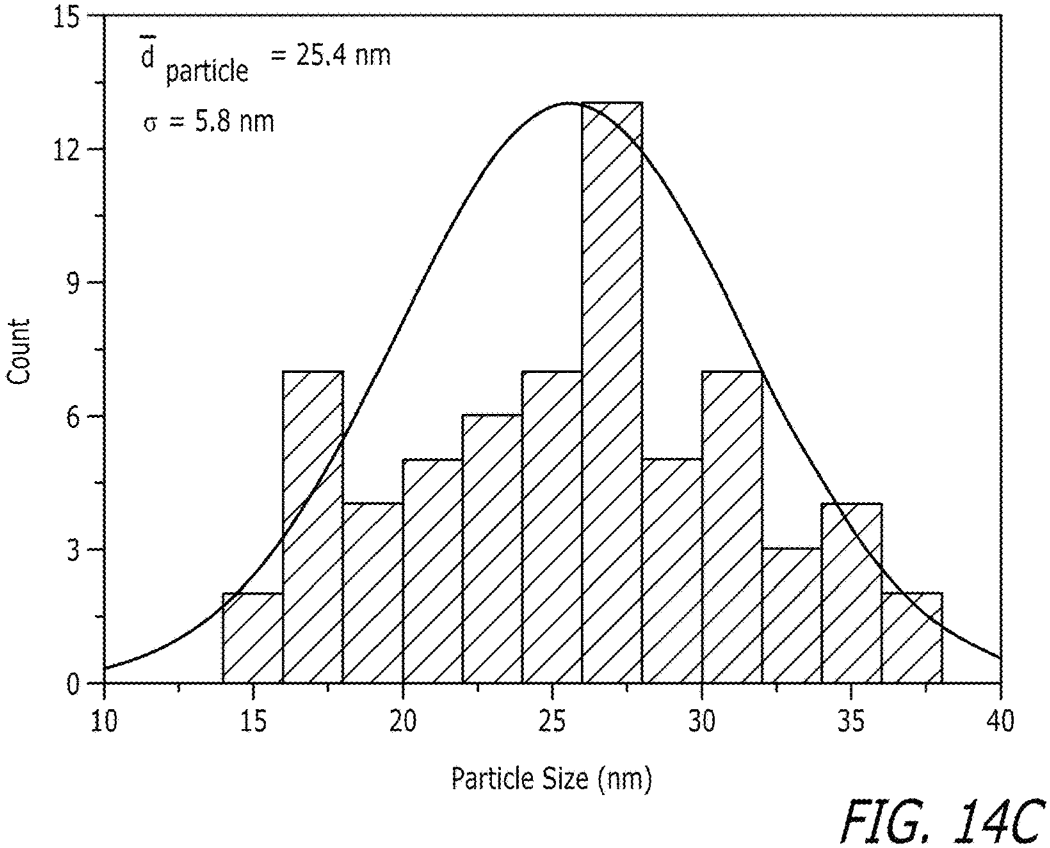

The α-$Al_2O_3$NPs derived by PDC followed by mild calcination were further characterized in detail. Bright field transmission electron microscopy (BF-TEM) images showed the well-dispersed particles. See FIG. 14A. High resolution TEM (HRTEM) showed the high degree of crystallinity of the α-$Al_2O_3$NPs. See FIG. 14B. The interplanar spacing values of ~2.57 Å and ~2.09 A correspond to the d(104) and d(113) of α-$Al_2O_3$, respectively. It was observed that some α-$Al_2O_3$NPs with surface roughness features at a few nm, which is similar to the particle size of the γ-$Al_2O_3$ precursors. This revealed that the rapid PDC process triggers the phase transformation while no significant agglomeration of the NPs occurs. The TEM images show that the particle size ranged from 14 to 36 nm, with an average particle size of 25.4 nm and standard derivation (σ) of 5.8 nm. See FIG. 14C.

Figure 14D:
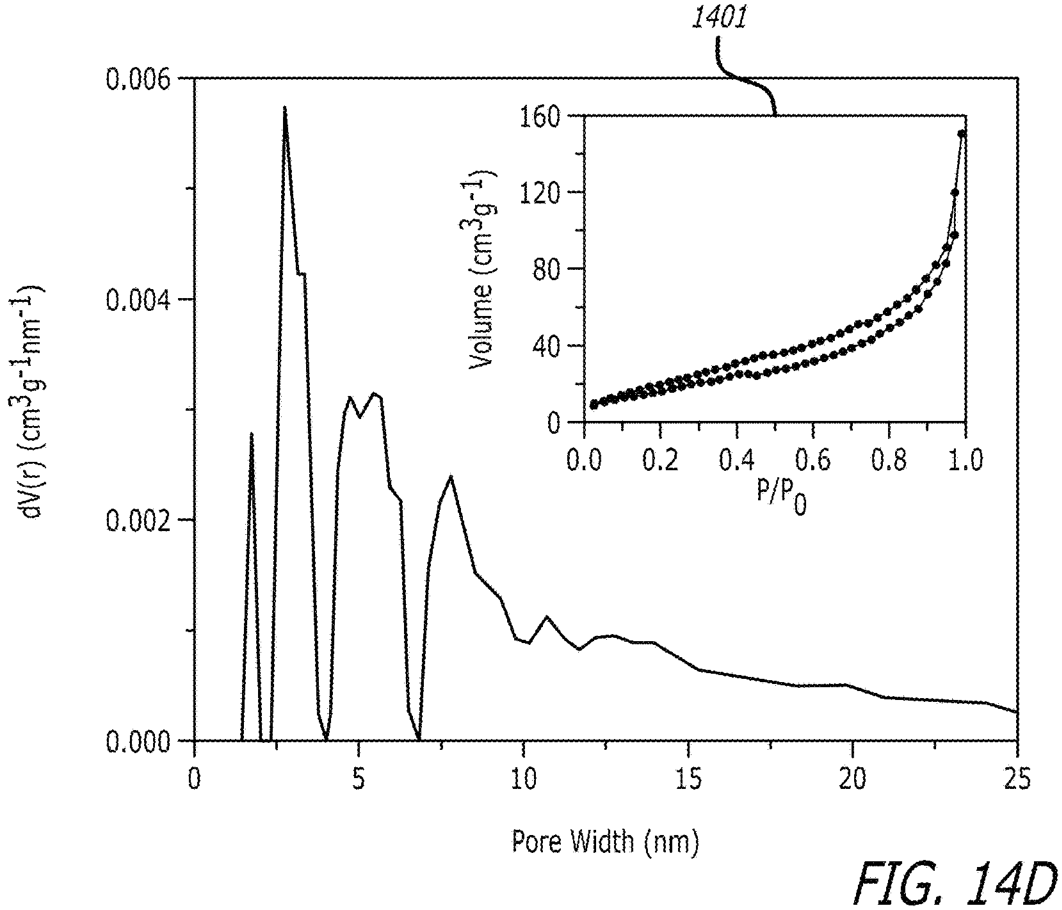

Brunauer-Emmett-Teller (BET) measurement showed that the surface area of the α-$Al_2O_3$NPs is ~65 $m^2$ $g^{-1}$. See inset 1401 of FIG. 14D (which inset shows $N_2$ adsorption-desorption isotherms of $\alpha$-$Al_2O_3$NPs at 77 K). The average particle size (D) is estimated to be ~23 nm by Eq (1):

$$D=6/(\rho S) \qquad \text{Eq. (1)}$$

where $\rho$ is the density of $\alpha$-$Al_2O_3$ (3.96 g $cm^{-3}$) and S is the specific surface area [Karagdov 1999].

The pore size determined from the $N_2$ adsorption-desorption isotherm using the density functional theory (DFT) model indicates the distribution with high probability at 3 to 10 nm. See FIG. 14D. The observed surface area was attributed to the nanoscale grain size, as well as to the pores and surface roughness features within the NPs. The crystalline size of the $\alpha$-$Al_2O_3$NPs was estimated to be ~22 nm based on the Halder-Wagner method. The crystalline size (~22 nm) agrees well with the particle size measured from TEM statistics (~25 nm) and BET estimation (~23 nm), demonstrating the single-crystal feature of the NPs.

Figure 14E:
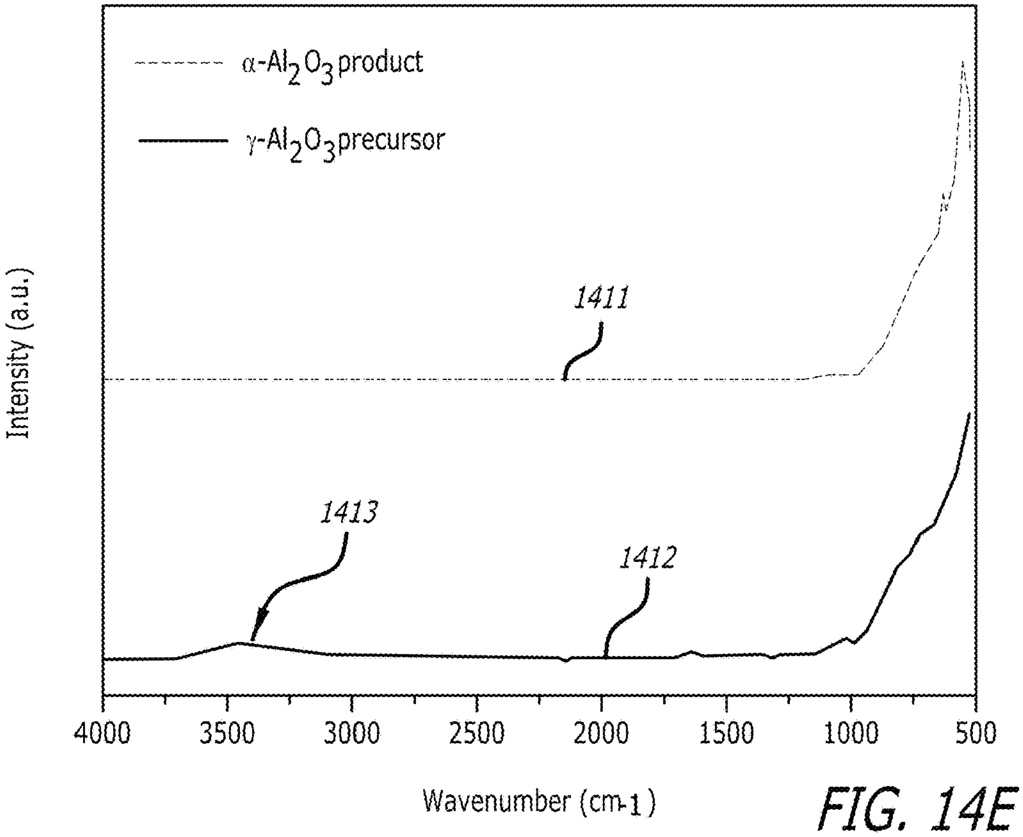

Unlike the starting $\gamma$-$Al_2O_3$NPs that had hydrated surfaces, the synthesized $\alpha$-$Al_2O_3$NPs surfaces were highly dehydrated because of the thermal process. FIG. 14E, with curves 1411-1412 showing $\alpha$-$Al_2O_3$ product and $\gamma$-$Al_2O_3$ precursor, respectively (and the black arrow 1413 pointing to the hydroxyl group absorbance).

Figure 14F:
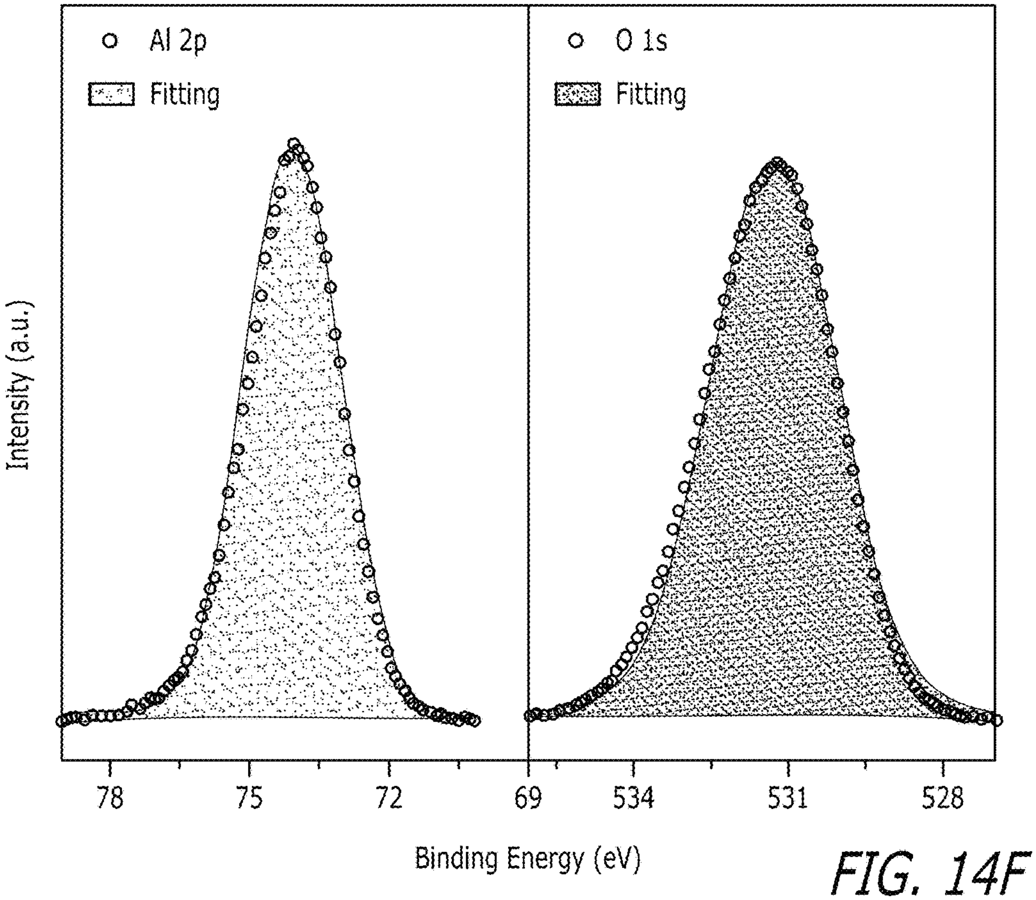

The XPS fine spectra showed the dominate $O^{2-}$ peak at a binding energy of ~531.2 eV and single $Al^{3+}$ peak at a binding energy of ~74.0 eV from the $\alpha$-$Al_2O_3$NPs. See FIG. 14F. This demonstrated that the ultrafast PDC process did not result in obvious oxygen deficiencies or the carbothermic reduction of $Al_2O_3$ even with the existence of CB, presumably due to the high reduction potential of $Al^{3+}$. No other peaks were detected in the XPS full spectrum, indicating the high-purity synthesis ability of the electric thermal process. This makes it superior to the solvent-based methods including ball milling [Amrute 2019] or co-precipitation [Guo 2016], which suffer from lengthy purification processes and chemical contaminants.

Resistive Hotspot Effect

Figure 15A:
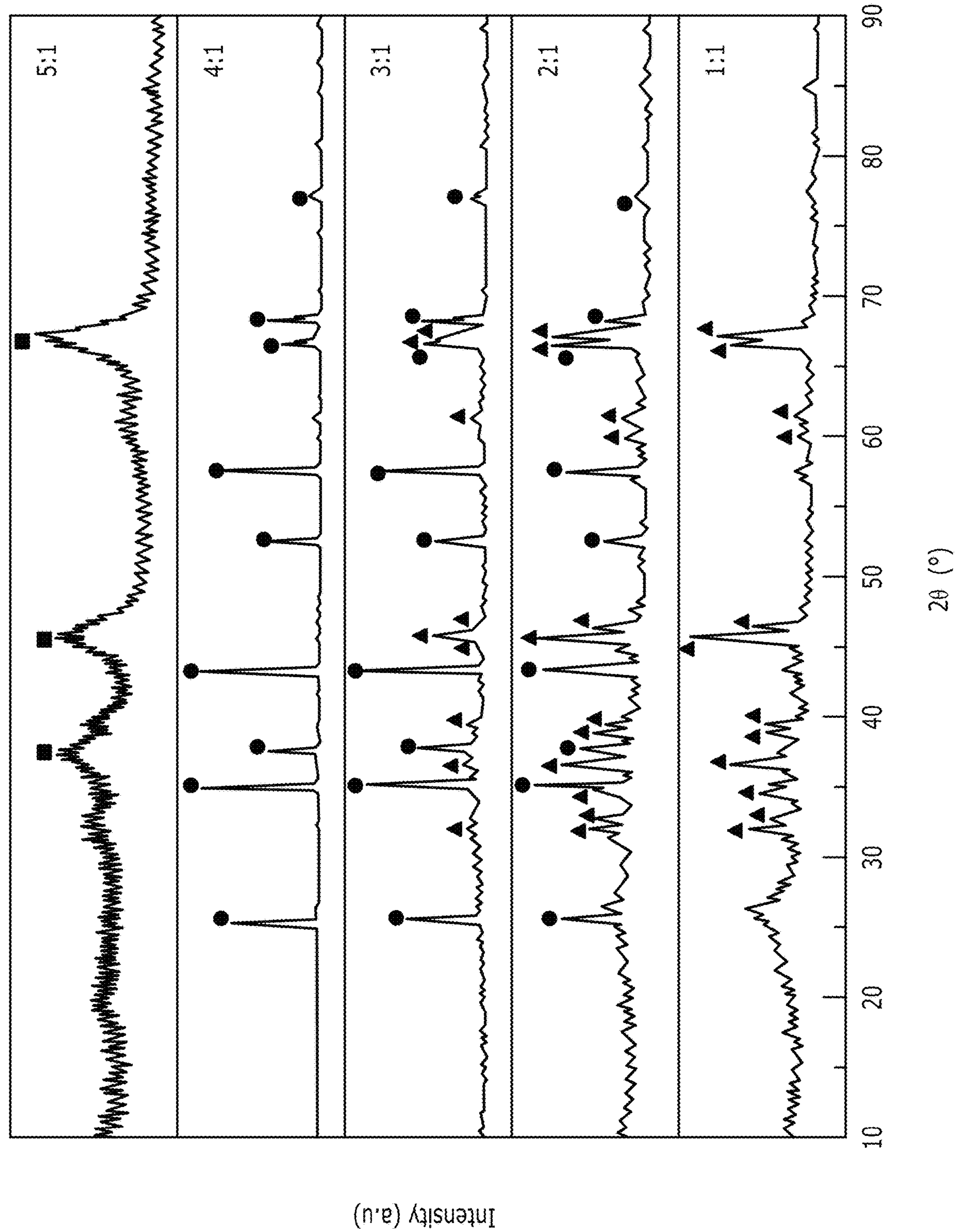
FIGS. 15A-15F show resistive hotspot effect in PDC process.
Figure 15B:
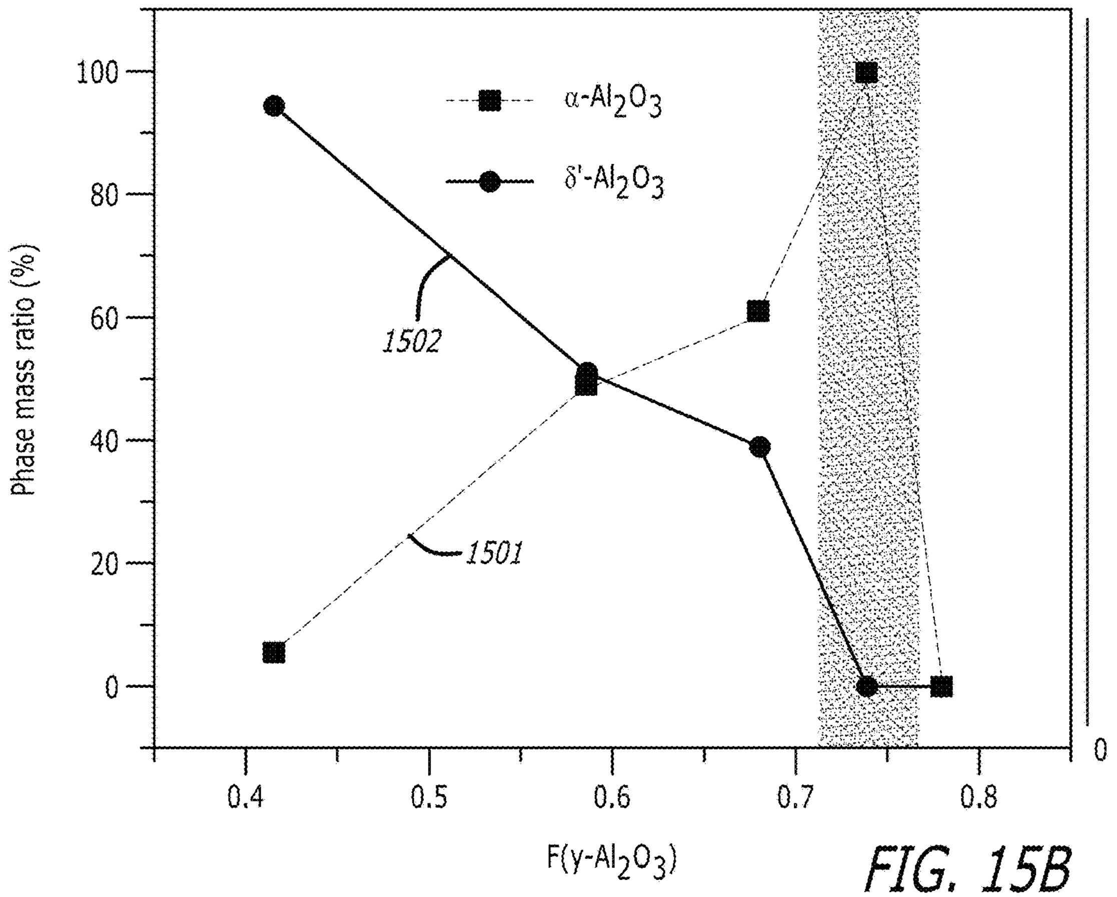

The composition of the inhomogeneous media can be important for local power dissipation during the PDC process. To quantitatively show the effect of the composition on the phase transformation, a series of precursors with different mass ratio of $\gamma$-$Al_2O_3$ and CB were treated by PDC under the same voltage and time. FIG. 15A (with marks: $\gamma$-$Al_2O_3$ (■), $\delta'$-$Al_2O_3$ (▲), and $\alpha$-$Al_2O_3$ (●), and numbers being the mass ratio of $\gamma$-$Al_2O_3$ to CB); TABLE II. According to the densities of $\gamma$-$Al_2O_3$ and CB, the volume fractions (f) of $\gamma$-$Al_2O_3$ were obtained (shown in TABLE III), and the phase mass ratios varied with f($\gamma$-$Al_2O_3$) after the PDC process were calculated. FIG. 15B (showing curves 1501-1502 for $\alpha$-$Al_2O_3$ and $\delta'$-$Al_2O_3$, respectively).

TABLE III

| Volume fraction of $\gamma$-$Al_2O_3$ | | |
|---|---|---|
| Mass ratio | Mass ratio of CB | f($\gamma$-$Al_2O_3$) |
| $\gamma$-$Al_2O_3$:CB = 1:1 | 0.50 | 0.42 |
| $\gamma$-$Al_2O_3$:CB = 2:1 | 0.33 | 0.59 |
| $\gamma$-$Al_2O_3$:CB = 3:1 | 0.25 | 0.67 |
| $\gamma$-$Al_2O_3$:CB = 4:1 | 0.20 | 0.73 |
| $\gamma$-$Al_2O_3$:CB = 5:1 | 0.17 | 0.78 |

The phase transformation degree was increased as the f($\gamma$-$Al_2O_3$) increased from 0.41 to 0.73; the phase-pure $\alpha$-$Al_2O_3$ was obtained at f($\gamma$-$Al_2O_3$) ~0.73. Further increase in the f($\gamma$-$Al_2O_3$) to >0.78 led to no phase transformation.

Figure 15C:
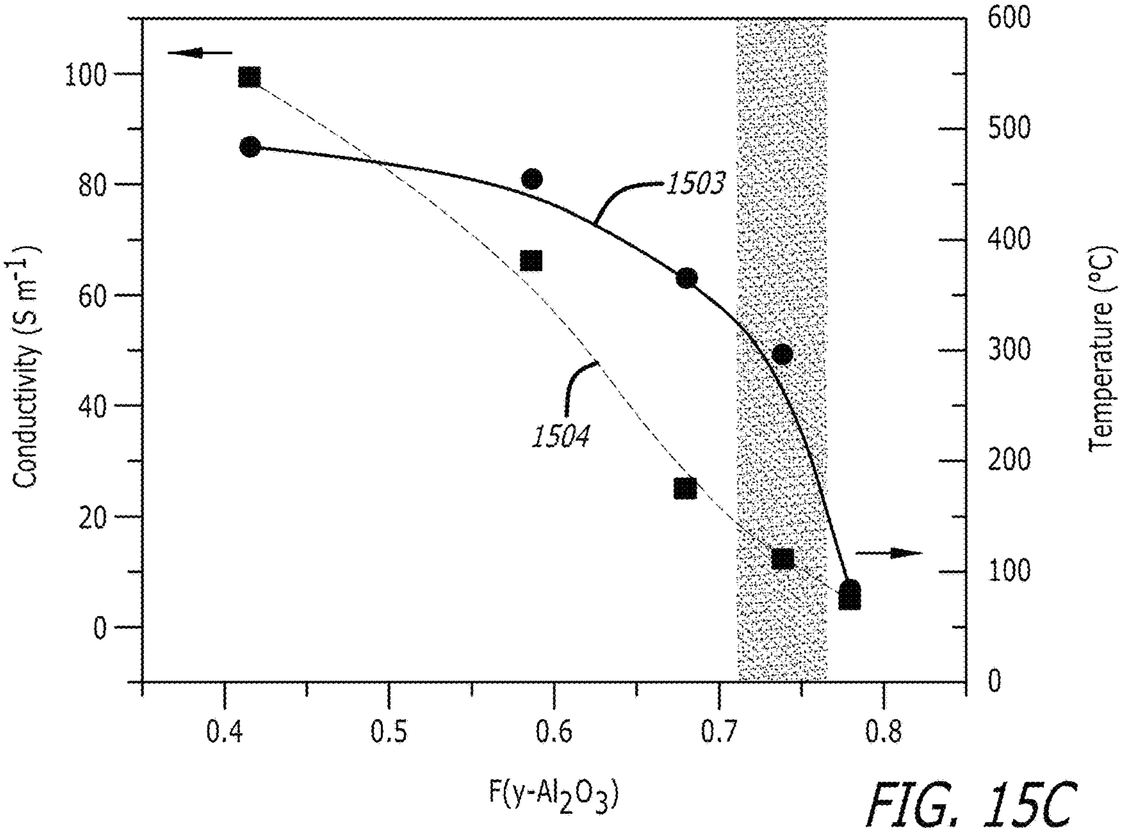

To explain the f($\gamma$-$Al_2O_3$)-dependent phase transformation, the electrical conductivity and temperature were measured. The conductivities were determined based on the measured resistance (R) and the feature size of the samples. TABLE II; FIG. 15C (with curves 1503-1504 for conductivity and temperature, respectively, versus f($\gamma$-$Al_2O_3$). The conductivity was inversely proportional to f($\gamma$-$Al_2O_3$) (curve 1504 in FIG. 15C), which was reasonable since $\gamma$-$Al_2O_3$ is electrically insulative. The real-time temperature was measured using an infrared (IR) thermometer. The average bulk temperature was decreased with the increase of f($\gamma$-$Al_2O_3$) (curve 1503 in FIG. 15C). This could be explained by the power (P) equation of Joule heating by Eq. (2):

$$P=\frac{V^2}{R}=V^2\sigma \qquad \text{Eq. (2)}$$

where V is the voltage, and $\sigma$ is the conductivity of the sample.

Since the start voltages were fixed to $V_0$=60 V, the power was proportional to the conductivity of the sample. Intriguingly, the phase pure $\alpha$-$Al_2O_3$NPs were obtained at a low average bulk temperature of ~573 K with f($\gamma$-$Al_2O_3$)~0.73. FIG. 15C.

Such a low temperature was not supposed to trigger the phase transformation from $\gamma$- to $\alpha$-$Al_2O_3$ with a high activation energy of ~485 kJ $mol^{-1}$. [Steinr 1971]. Moreover, the higher phase transformation degree at a lower temperature is counterintuitive. FIG. 15C.

Figure 15E:
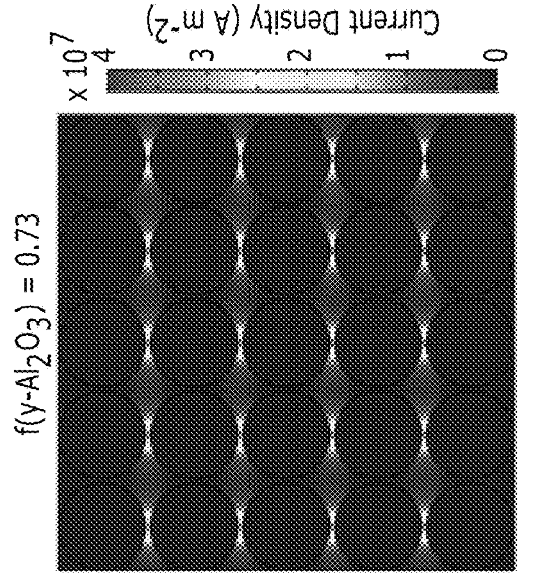
Figure 15D:
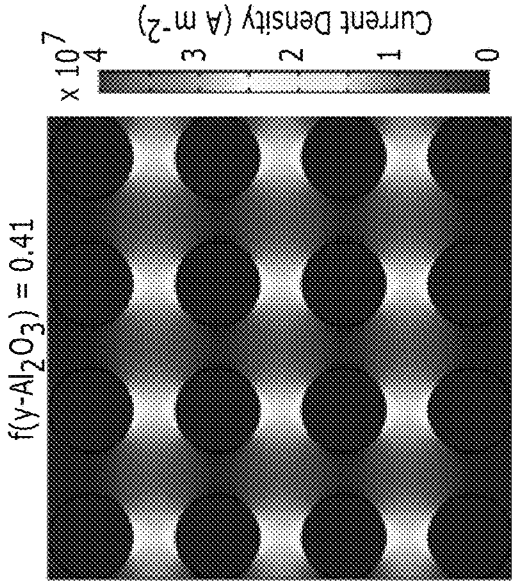
Figure 15F:
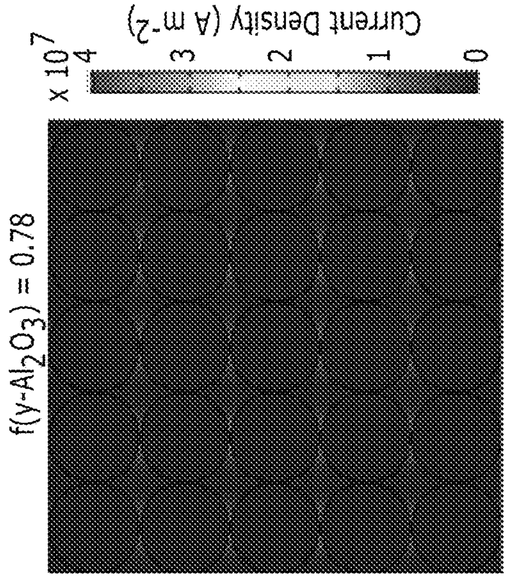

To explain the phenomenon, a numerical simulation was conducted based on the finite element method (FEM) on the current density distribution of the $\gamma$-$Al_2O_3$/CB composite during PDC process. As shown in FIGS. 15D-15F, the current density is inhomogeneous in the composite of $\gamma$-$Al_2O_3$ and CB; the current densities at the regions of vertical gaps between $\gamma$-$Al_2O_3$NPs are larger than the bulk regions. (In FIGS. 15D-15F, the balls are $\gamma$-$Al_2O_3$ and the continuous phase is CB, with the vertical side bars showing the current density values). The gaps become narrower as the f($\gamma$-$Al_2O_3$) increased, leading to significantly large current densities in those regions. Considering that the resistivity (R) of the conductive CB phase is constant, the heat (Q) per volume produced by PDC is proportional to the square of the current density (j) by Eq. (3):

$$Q\propto j^2R \qquad \text{Eq. (3)}$$

Figure 16:
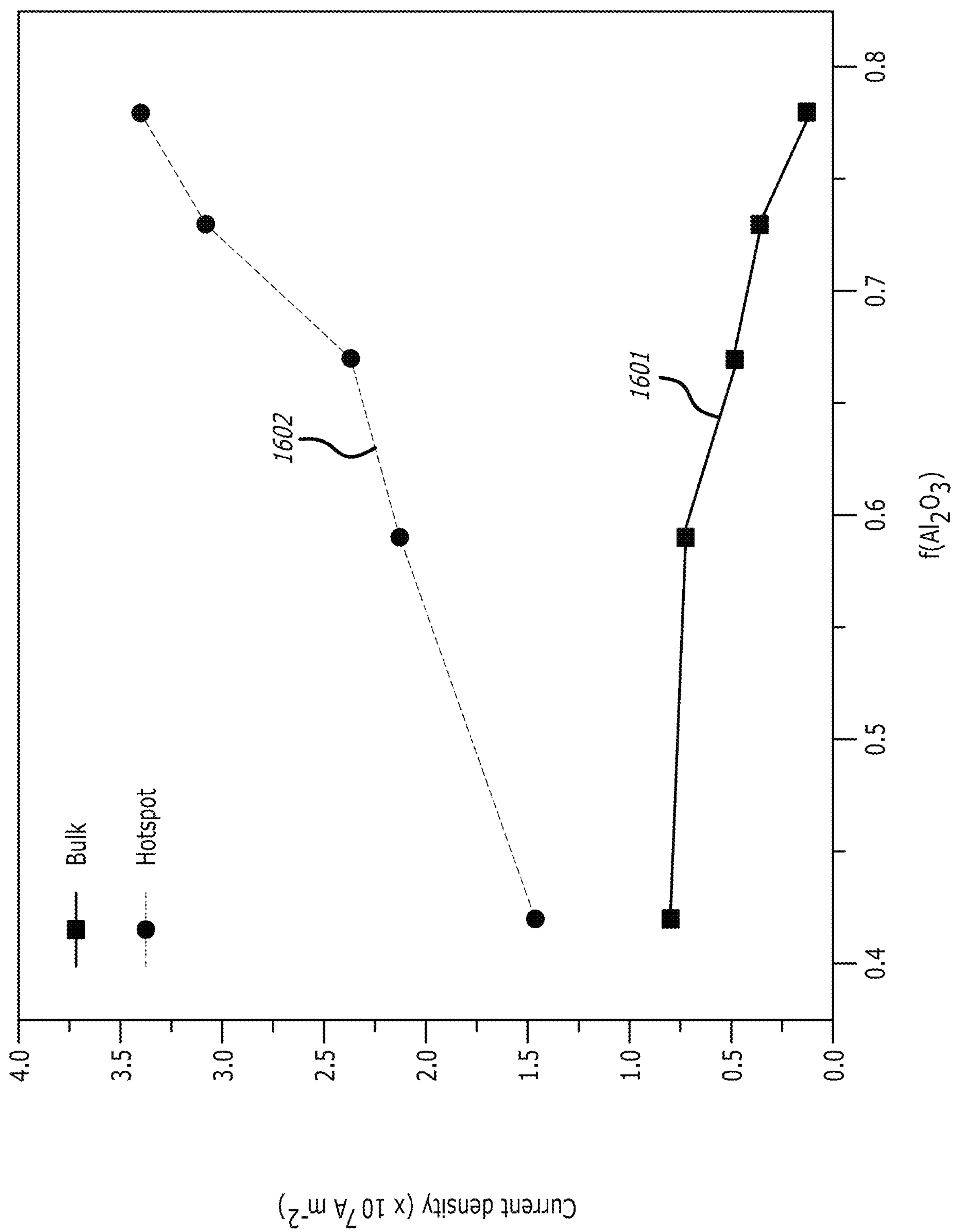
FIG. 16 shows current density at the bulk regions and the hotspot regions.

The large thermal dissipation in the regions with high current densities leads to the hotspots near $\gamma$-$Al_2O_3$NPs with much higher temperature than the bulk regions, which triggers the phase transformation. A shown in FIG. 16, the quantitative analysis of the current densities revealed a decreased bulk temperature (curve 1601) but an increased hotspot temperature (curve 1602) as the f($\gamma$-$Al_2O_3$) increased, which agreed well with the temperature measurement shown in FIG. 15C.

Topotactic Transition Pathway

Figure 17A:
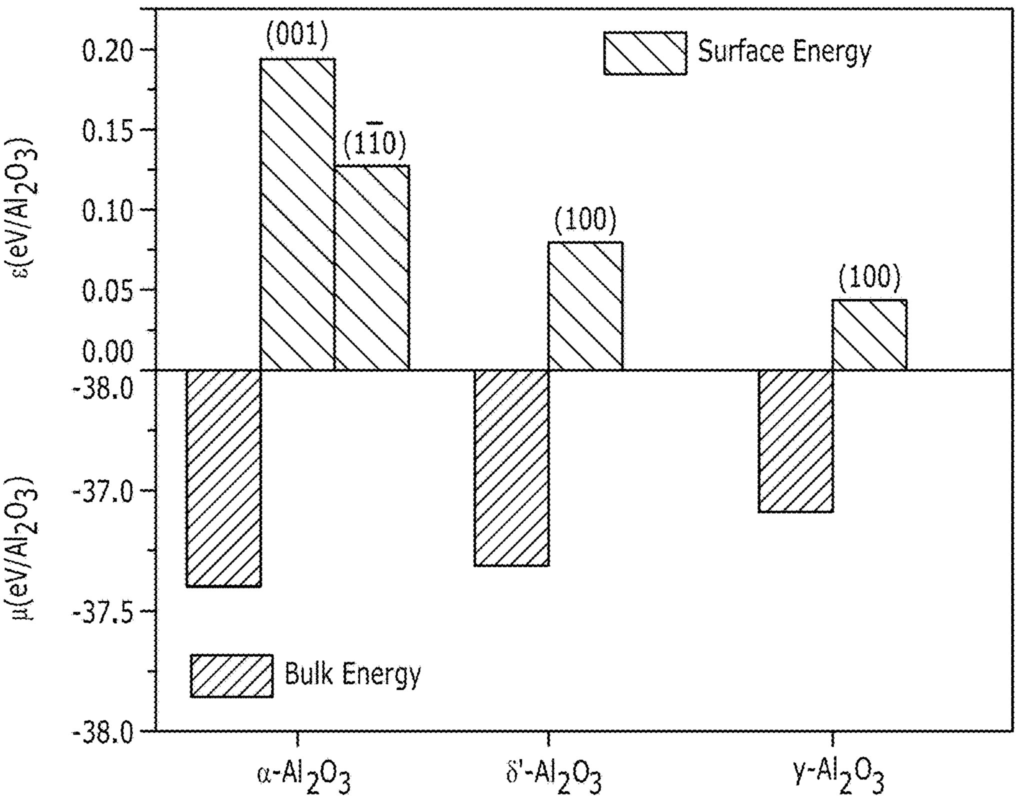
FIGS. 17A-17D show topotactic phase transformation process revealed by DFT calculations.
Figure 17B:
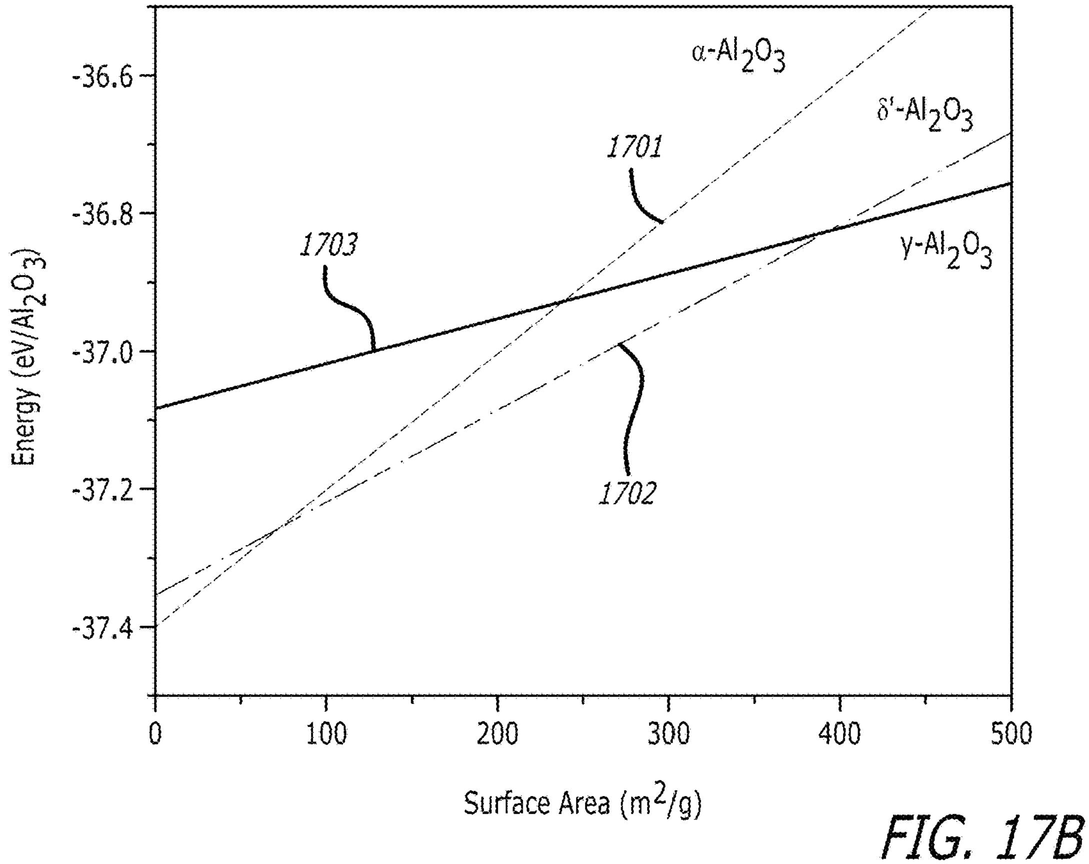

To provide deeper insight into the topotactic transition pathway, thermodynamic analysis of the three $Al_2O_3$ phases were conducted based on DFT. The bulk energy and surface energy of the three $Al_2O_3$ phases were calculated. FIG. 17A. The bulk energy of $\alpha$-$Al_2O_3$ is the lowest, followed by that of $\delta'$-$Al_2O_3$, and then $\gamma$-$Al_2O_3$, indicating that the $\alpha$-$Al_2O_3$ is the most stable phase as a dense bulk crystal. In contrast, the surface energy is opposite: $\gamma$-$Al_2O_3$(100) has the lowest surface energy, followed by $\delta'$-$Al_2O_3$(100), $\alpha$-$Al_2O_3$(110) and (001). The surface energy difference determines the thermodynamic stability of the three $Al_2O_3$ phases as the surface area increases. FIG. 17B, with curves 1701-1703 for $\alpha$-$Al_2O_3$, $\delta'$-$Al_2O_3$, and $\gamma$-$Al_2O_3$, respectively. When smaller than a surface area of ~79 $m^2/g$, or larger than a particle size of ~21 nm, the $\alpha$-$Al_2O_3$ phase becomes more stable than the $\delta'$-phase. Hence, the particle size of ~21 nm is suggested as the thermodynamic limit for the synthesis of dehydrated $\alpha$-$Al_2O_3$ by a thermal process that involves an intermediate $\delta'$-phase. The particle size of $\alpha$-$Al_2O_3$ (~23 nm) synthesized by PDC approaches the thermodynamically limited value, and smaller than that obtained by most other thermal processes (TABLE IV).

TABLE IV

Synthesis of $\alpha$-$Al_2O_3$ by Thermal Process

| Method | Particle size (nm) | Surface area ($m^2/g$) | Temperature (K) | Reference |
|---|---|---|---|---|
| Flame spray pyrolysis | 29-88 | 40-60 | 1873 | Laine 2006 |
| Furnace calcination | ~30 | ~50 | 1473 | Johnston 1992 |
| Precipitation/calcination | 100 | — | 1173 | Li 2000 |
| Furnace calcination | 150 | — | 1273 | Zhang 2008 |
| Furnace calcination | 35 | — | 1473 | Yoo 2009 |
| Hotspot Joule heating | ~23 | ~65 | 573 | Herein |

The ultrafast, pulsed, and low-temperature PDC process to a large extent avoids mass transfer and grain coarsening during the phase transformation process.

Figure 17C:
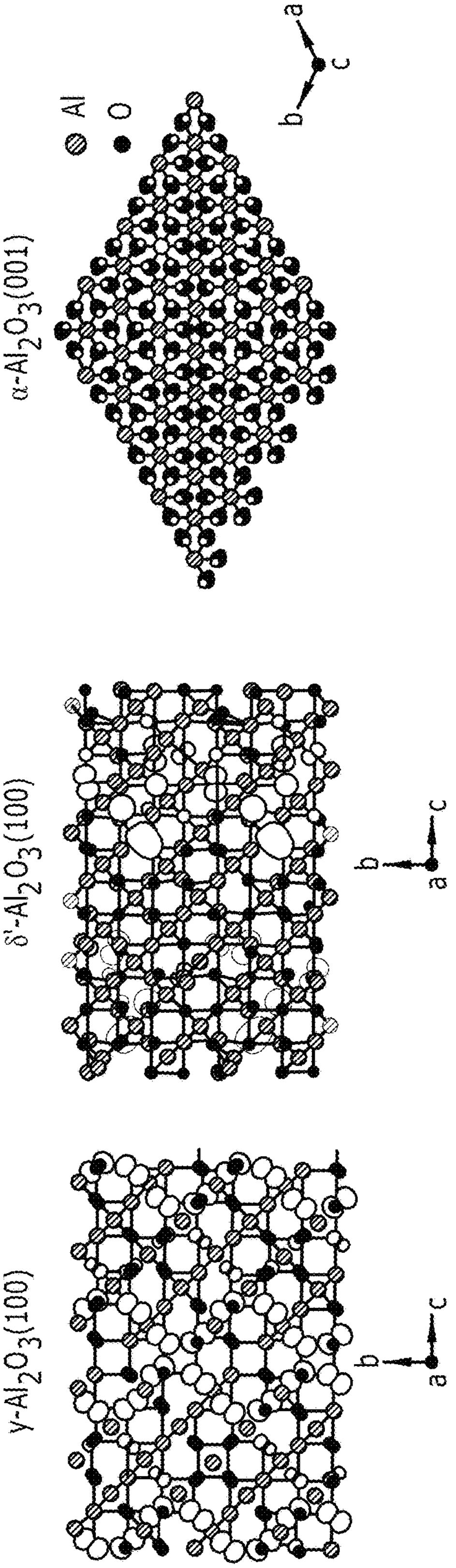
Figure 17D:
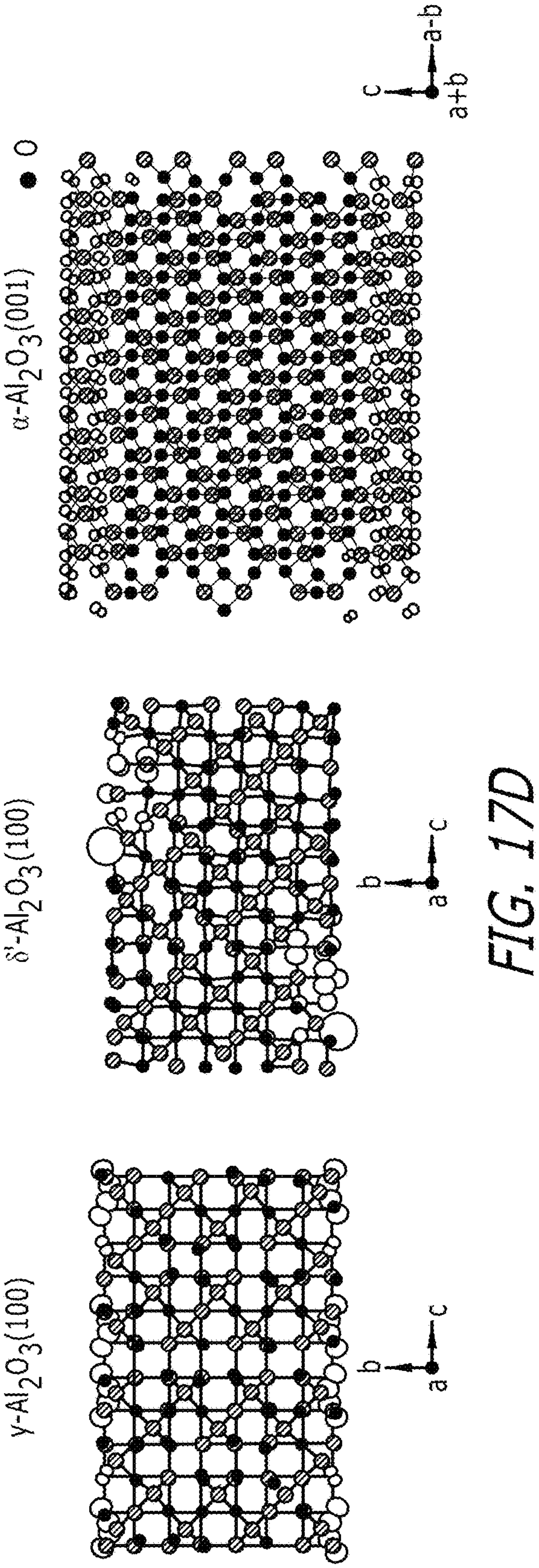

To gain insight into the structural origin of the phase-dependent bulk and surface energy, the partial charge density contour at the highest bands (0.3 eV below the Fermi levels) of the surface states of the three $Al_2O_3$ phases were plotted. FIGS. 17C-17D. All of the surface atoms on $\alpha$-$Al_2O_3$(001) are active, while the sites with missing Al atoms on the $\delta'$-$Al_2O_3$(100) and $\gamma$-$Al_2O_3$(100) surfaces are relatively active (FIG. 17C). Closer analysis indicated that the active states go deep into the bulk for the $\delta'$-$Al_2O_3$(100) and $\gamma$-$Al_2O_3$(100) but not for $\alpha$-$Al_2O_3$(001) (FIG. 17D). This explains the bulk as well as surface energy sequences of the three $Al_2O_3$ phases, and identifies the Al vacancies in $\gamma$- and $\delta'$-phases as the structural origin of their thermodynamic stability/instability vs the $\alpha$-phase.

Applications

Accordingly, for the synthesis of corundum nanoparticles, the present invention provides, among other things, an ultrafast synthesis, which is within 1 second, and is much faster than any reported methods, which requires at least several hours. The corundum ($\alpha$-$Al_2O_3$) nanoparticles resulting from the present invention have small particles size and high-surface area, which can utilized in a number of applications, such as for stable catalysis support and in ceramics with high fracture strength and toughness.

For instance, one prominent application of $\alpha$-$Al_2O_3$NPs is as a precursor for sintering nanometer-grained alumina ceramics (i.e., ultrafast ACS for nano-grained alumina ceramics). The typical alumina ceramics sintering processes occur under high-pressure and high-temperature conditions (HP-HT), such as hot isostatic pressing, [Mizuta 1992], spark plasma sintering [Balima 2019], and pulse electric current sintering [Zhou 2004]. The high pressure, usually several GPa, retains the grain growth and advances densification [Wang 2013], which can be a main factor for dense ceramic sintering using coarse grained precursors. However, the HPHT process is not suitable for complex structures. The nanocrystalline precursors could undergo the pressureless sintering yet it would suffer from an elevated sintering temperature and prolonged time (>10 h). [Guo 2016; Cao 2017; Li 2006]. Very recently, an ultrafast high-temperature sinter method [Wang 2020] based on direct current heating was reported for the rapid screening of ceramics.

Figure 18A:
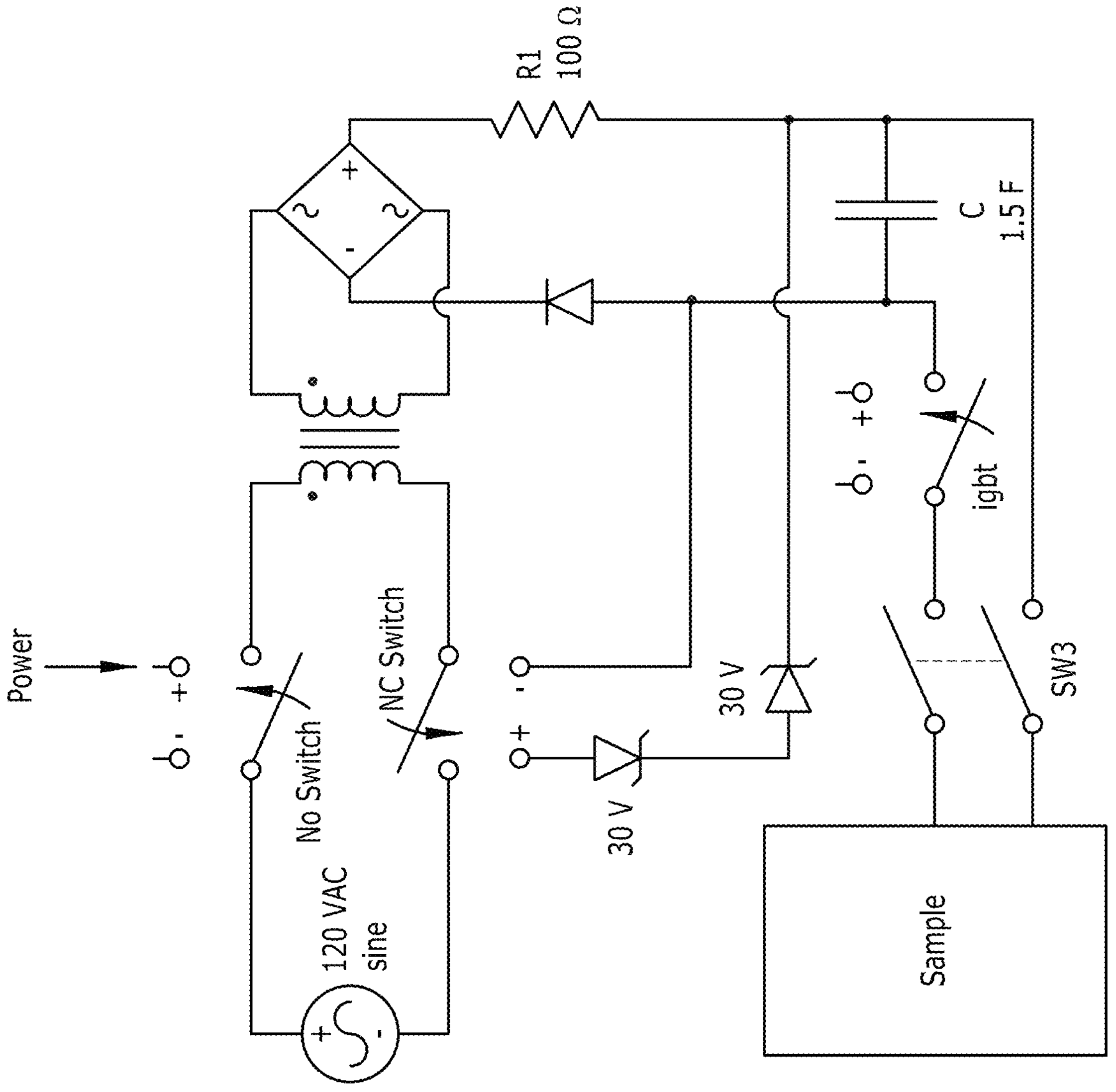
FIGS. 18A-18C shows an ultrafast alternating current sintering (ACS) system and sample holder.

Here, based on the Joule heating technique, an alternative current sintering (ACS) process has been created for ultrafast sintering of the alumina ceramics. The ACS system is capable of providing stable and high energy output with voltages up to 63 V and currents up to 100 A (FIG. 18A), making it suitable for the sintering of structural ceramics. For the ACS system, the total capacitance was 1.5 F and the largest available voltage was 63 V. The capacitor was simultaneous charged by the AC supply and provided energy output to the samples by discharging. The energy output was continuous and enabled an extended sinter of seconds with high energy output.

Figure 18B:
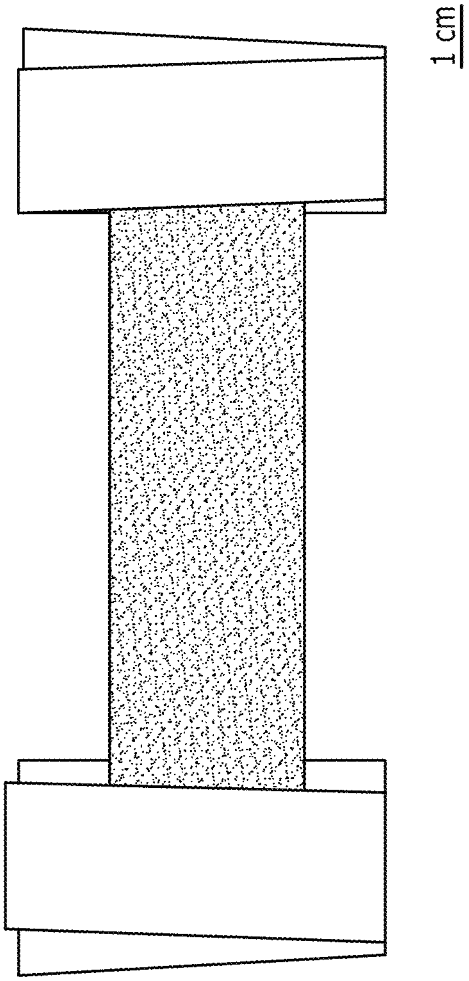
Figure 18C:
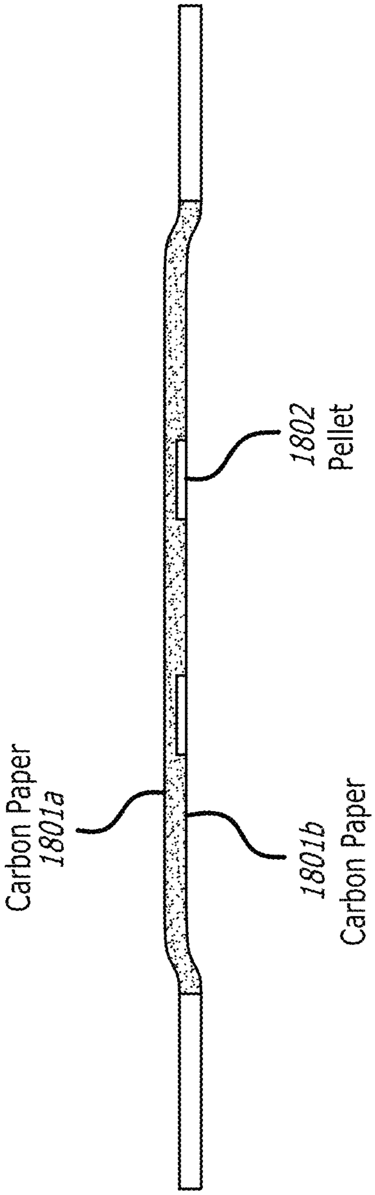

Two separated, highly graphitized carbon papers 1801*a*-1801*b* in FIG. 18C connected to electrodes were used as the heating elements. See FIG. 18B (in which carbon papers 1801*a*-1801*b* were attached to a glass slide and adhered by copper tabs). The $\alpha$-$Al_2O_3$NPs, mixed with polyethylene glycol (PEG) binder [Taktak 2011], were pressed at 500 MPa into pellets 1802. Commercial $\alpha$-$Al_2O_3$ nanopowder (~300 nm) was used as a control. After removal of the binder (5° C. $min^{-1}$ to 500° C. for 2 h hold; in air), the pellets 1802 were put between the carbon papers and under the ACS at ~15 V.

Figure 19A:
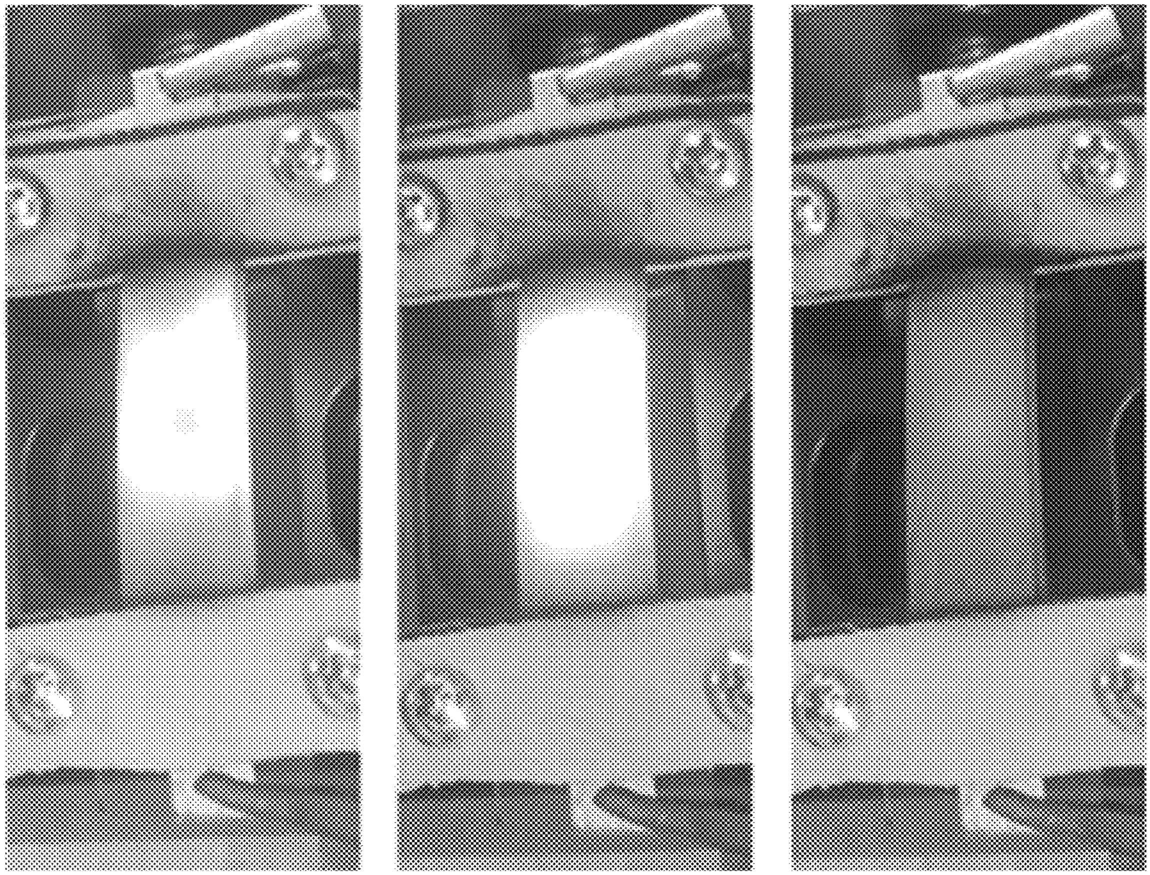
FIGS. 19A-19H show ultrafast ACS of the alumina ceramics.
Figure 19B:
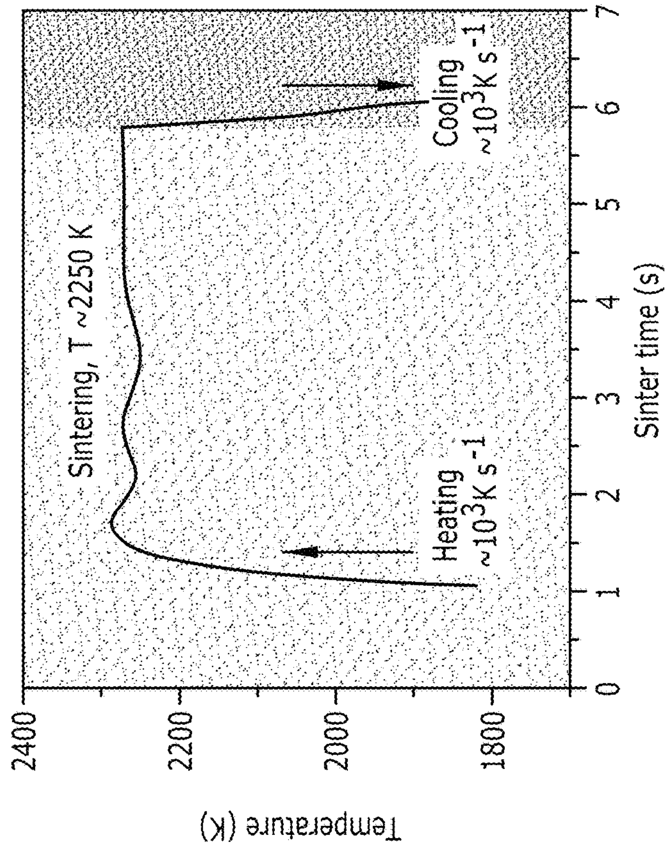
Figure 19C:
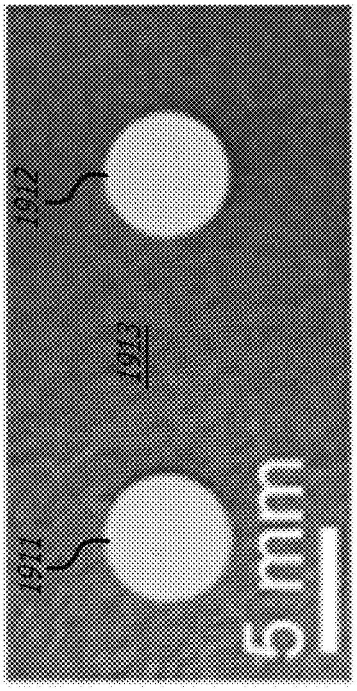

FIG. 19A shows the rapid heating 1901, stable sintering 1902, and rapid cooling 1903. The temperature was recorded by fitting the blackbody radiation. The temperature rapidly ramped up to ~2250 K with a heating rate of ~$10^3$ K $s^{-1}$. After stable sintering for 5 s, the sample cooled also with a rapid cooling rate of ~$10^3$ K $s^{-1}$. See FIG. 19B. FIG. 19C shows sintered ceramic pellets 1911-1912 supported on carbon papers 1913.

Figure 19D:
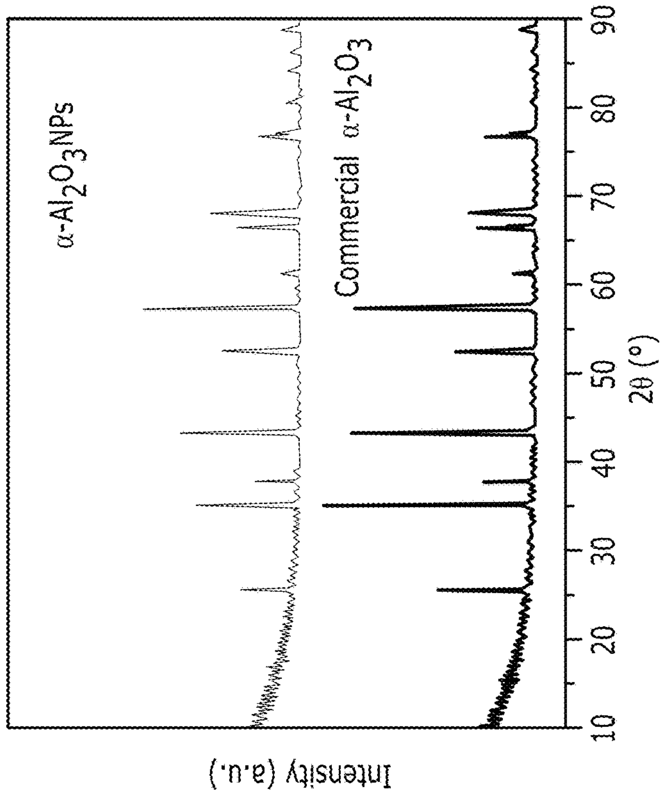
Figure 19E:
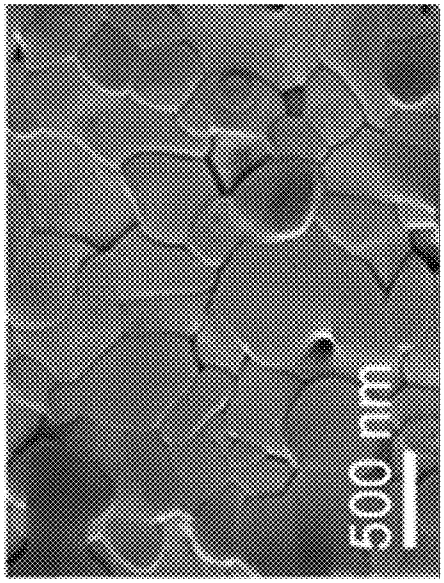
Figure 19F:
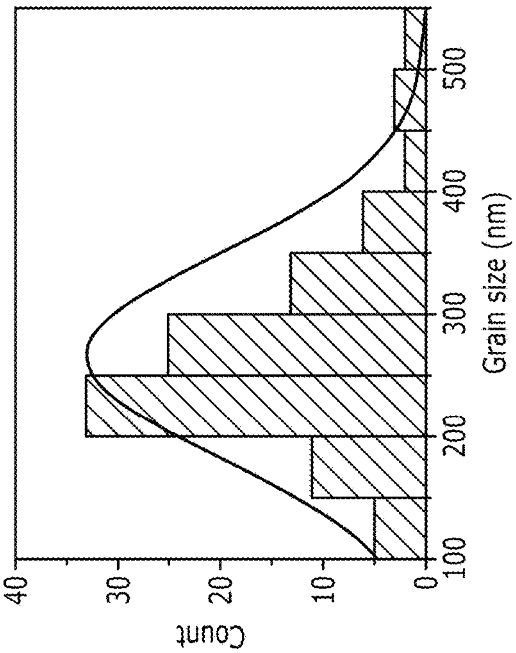
Figure 19G:
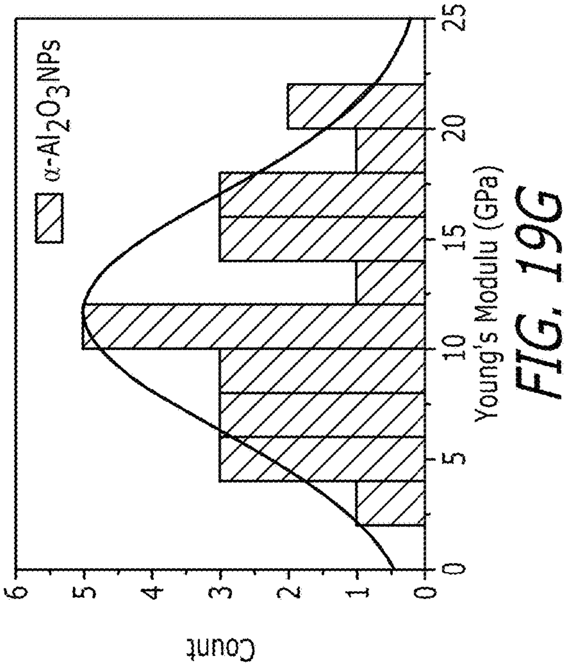
Figure 19H:
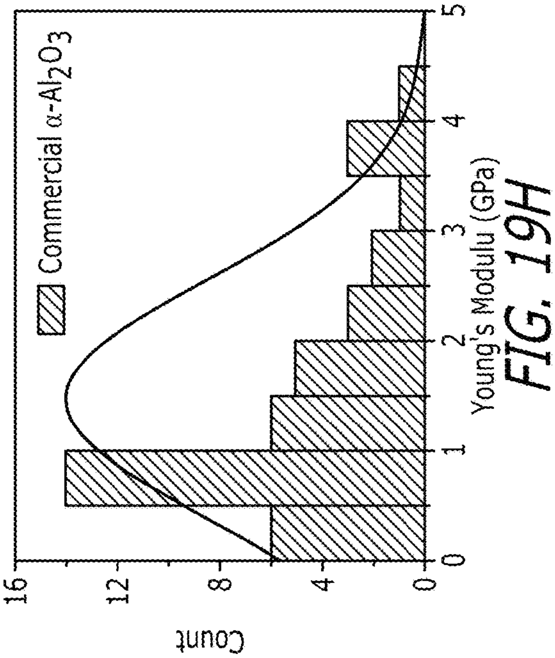

The XRD patterns confirm the pure $\alpha$-phase of the alumina ceramics. FIG. 19D. The microstructure by scanning electron microscopy (SEM) showed the equal-sized grains and tightly bonded grain boundaries with a polyhedral morphology (FIG. 19E), demonstrating the well-developed sintering. The average grain size of the alumina ceramics was ~270 nm (FIG. 19F). In comparison, the alumina ceramics sintered from the commercial $\alpha$-$Al_2O_3$ powders exhibited high residual porosity with grain size of 1200 nm, demonstrating that the sinter was in its initial stage. This result shows that the fine grain size of the $\alpha$-$Al_2O_3$NPs helps the ultrafast sintering, presumably assisted by the grain growth at high temperature. [Guo 2016]. The mechanical properties of the ceramics were measured. See FIGS. 19G-19H. The ceramics sintered by $\alpha$-$Al_2O_3$NPs precursors demonstrated a Young's modulus of ~11.7 GPa, significantly higher than that from the commercial $\alpha$-$Al_2O_3$ powders (~1.5 GPa). By using a traditional high pressure based sintering process [Mizuta 1992; Balima 2019; Zhou 2004] or elongating the sintering time, [Guo 2016; Laine 2006], the mechanical properties of the alumina ceramics derived from the $\alpha$-$Al_2O_3$NPs would likely improve.

Accordingly, the ACS process can be utilized in the sintering of functional ceramics, porous ceramics, or for materials screening. [Wang 2020].

Effectiveness and Scalability

Figure 20A:
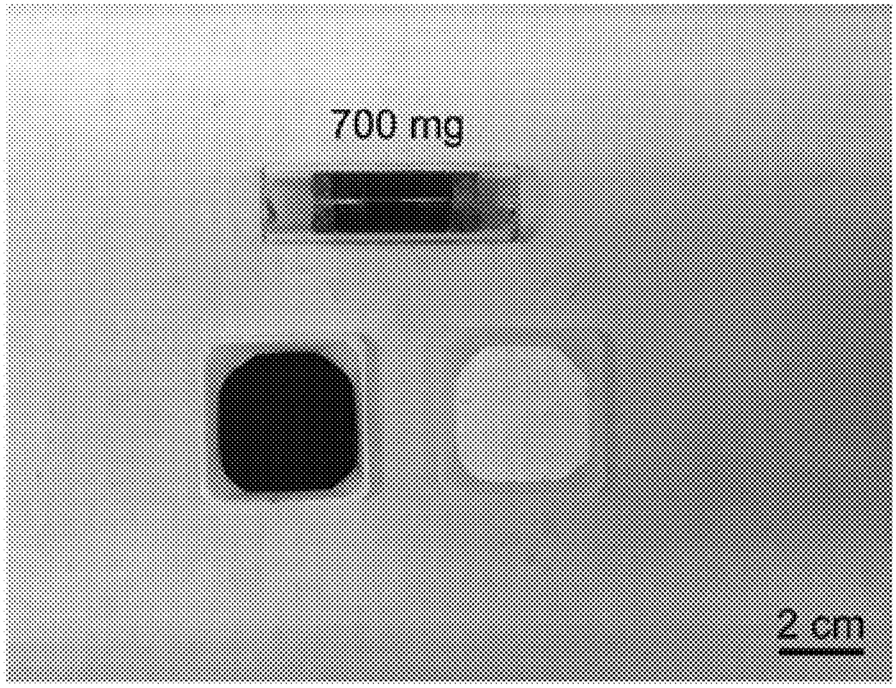
FIGS. 20A-20B and FIGS. 21A-21B show scalability of the PDC process.
Figure 20B:
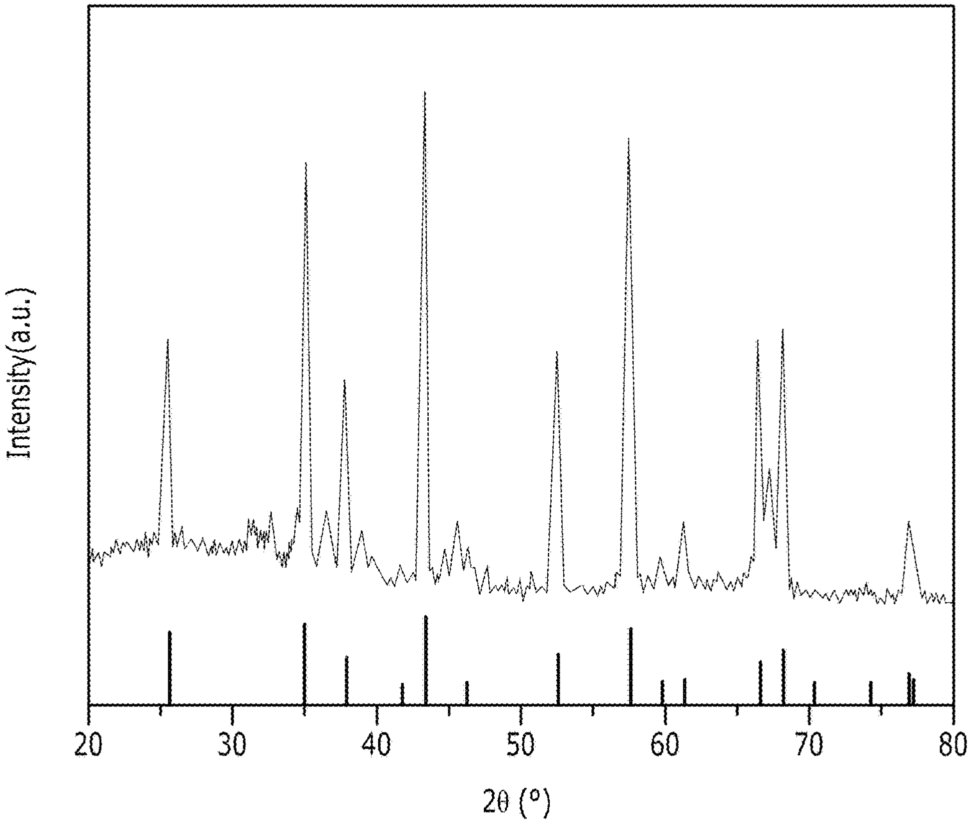
Figure 21A:
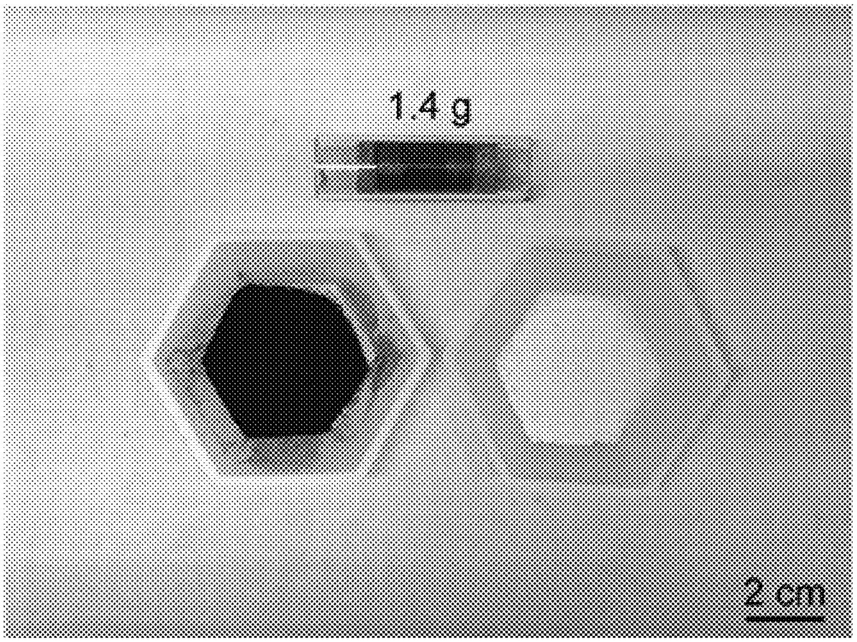
Figure 21B:
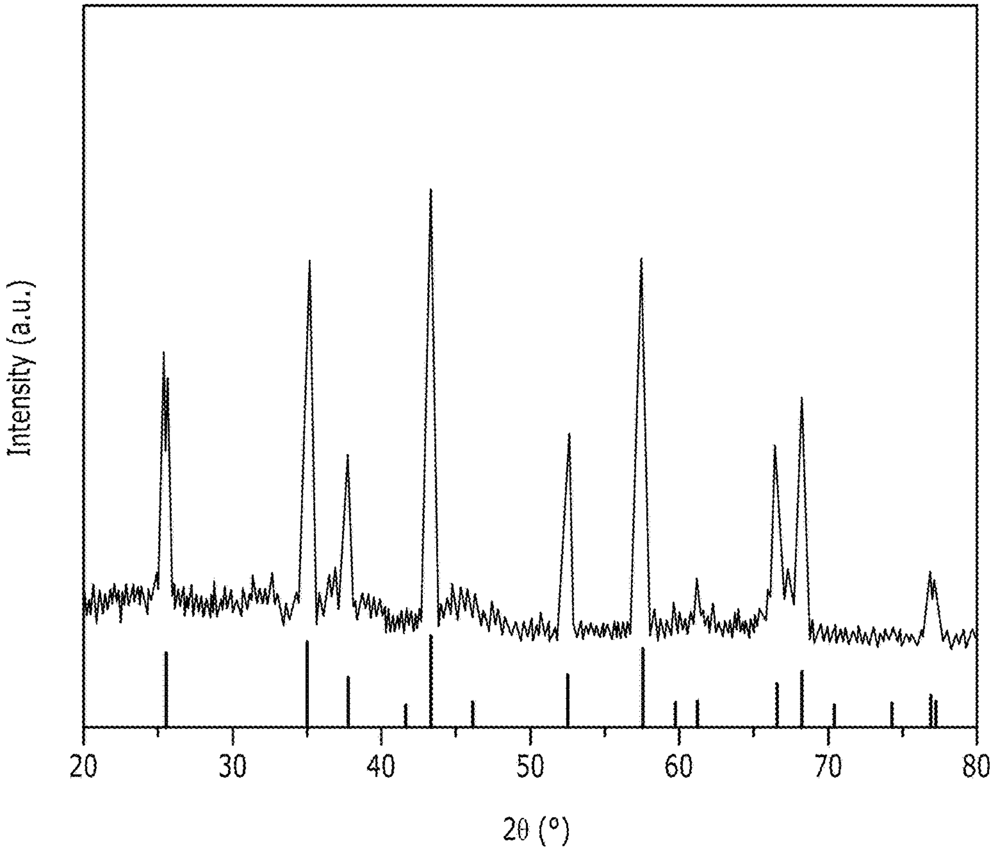

Being a highly efficient energy supplies technology, Joule heating has a coefficient of performance of 1.0. The localized heating by resistive hotspots in PDC makes the process more effective because most of the electrothermal energy was directly targeted to the phase transformation, making the synthesis possible with a low energy input of ~4.77 kJ $g^{-1}$ or 0.027 $ $kg^{-1}$ in electrical energy cost. Moreover, the PDC process can be scaled by adjusting sample cross-sectional area and the PDC voltage. A synthesis of $\alpha$-$Al_2O_3$NPs up to 1.4 g-scale has been performed. See FIGS. 20A-20B and 21A-21B (in FIGS. 20A and 21A, the black powders are as-synthesized mixture of CB and $\alpha$-$Al_2O_3$, and the white powders are $\alpha$-$Al_2O_3$ after calcination). The PDC process combined with the resistive hotspot effect greatly reduces the required temperature for reactions that should be originally triggered at a high energy input, serving as an alternative technique for cost-efficient synthesis.

Recovery of Metal From E-Waste

The present invention includes flashing Joule heating [see Luong 2020; Stanford 2020; Tour PCT '000 Application] for ultrafast processes to recover metals (precious metals) from waste (such as e-waste). Waste can be mixed with carbon black, then subjected to ultrafast Joule heating flashing. According to the Ellingham diagram, multiple precious metals are reduced to elemental metal by the carbothermic reaction. The recycling process is ultrafast, within seconds. Of import, the process is a totally dry process without any solvents, and hence is extremely environmentally friendly.

Synthesis Processes

Methods for ultrafast synthesis to recover metal from waste can include the following.

The method can include preparation of the electronic wastes for flashing. For instance, a printed circuit board (PCB) from a used electronic printer was used as the starting materials. The PCB board was first cut into pieces and then crushed into small particles. Ball milling was used to grind it to a microscale fine powder, which was then available for flash Joule heating by adding carbon black (or other carbon materials as discussed above) and treated as described below in a flash Joule heating apparatus.

Evaporative Separation

It has been discovered that the different vapor pressure of metals—compared to that of substrate materials (carbon, ceramics, and glass)—enables the separation of metals from e-waste. This is termed "evaporative separation." The high vapor pressure of precious metals is obtained by an ultrafast flash Joule heating (FJH) process under vacuum. A subsecond current pulse is passed through the precursors, which brings the sample to an ultrahigh temperature of ~3400 K, enabling the evaporative separation of precious metals. Halide additives are used to improve the recovery yield greater than 80% for Rh, Pd, and Ag, and greater than 60% for Au that are abundant in the tested e-waste. Alternatively, compared with directly leaching e-waste raw materials, by leaching the residual solids after FJH, the recovery yield is significantly improved with tens of times increase for Ag and few times increase for Rh, Pd and Au. The toxic heavy metals, including Cd, Hg, As, Pd, and Cr, could also be removed and collected, minimizing the health risks and environmental impact of the recycling process.

Figure 22:
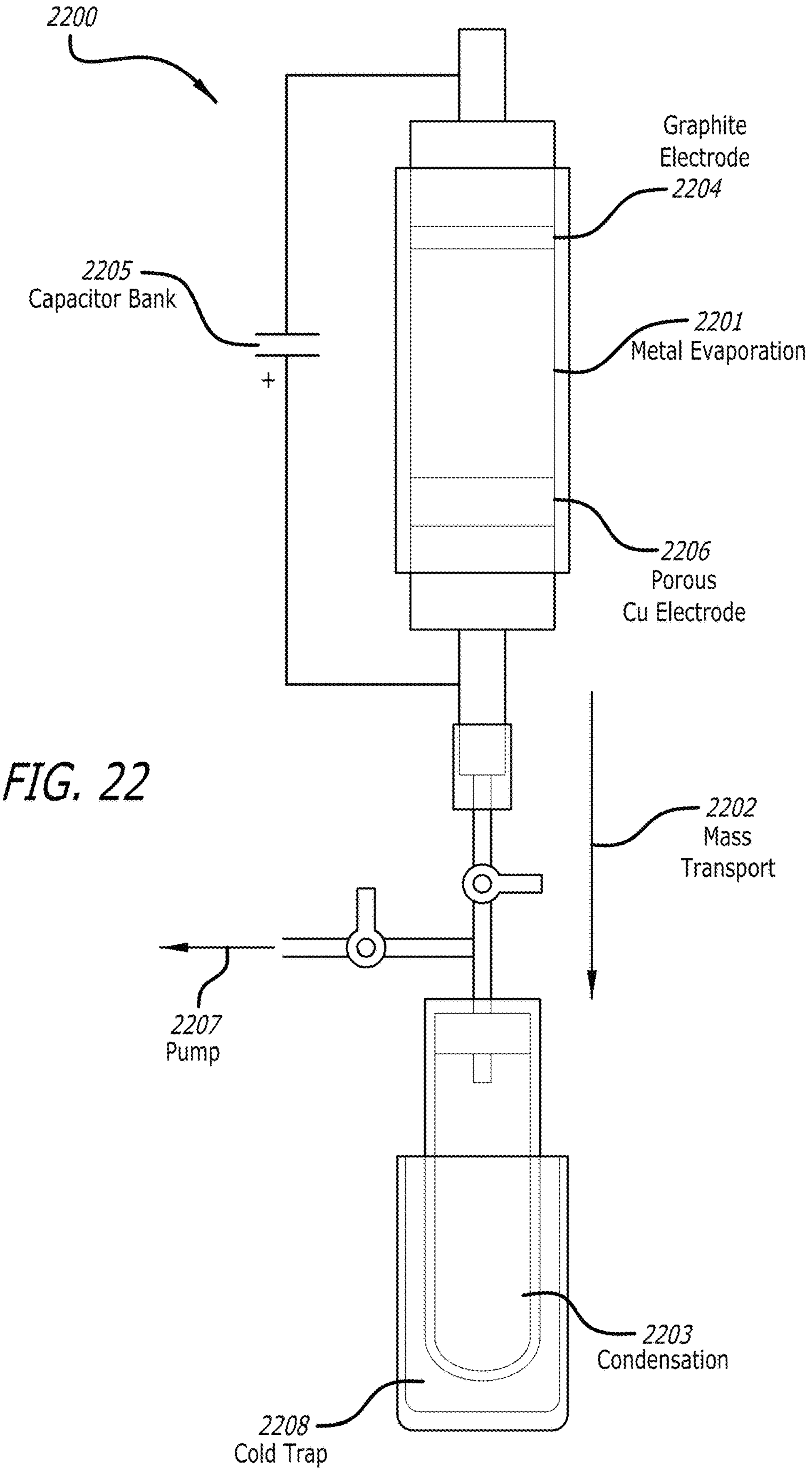
FIGS. 22-28 show the recovery of precious metals by flash Joule heating (FJH).
Figure 23:
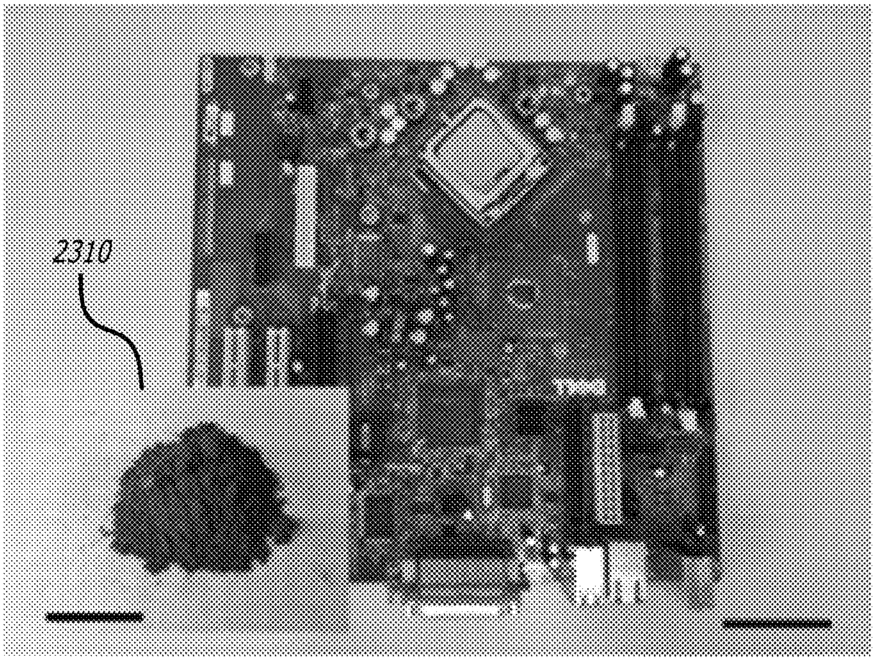

The FJH process to recover precious metals from e-waste involves three stages. See FIG. 22 showing a schematic of the system 2200. In the metal evaporation stage 2201 (which included FJH apparatus having capacitor bank 2205 and porous Cu electrode 2206), the metals in e-waste were heated and evaporated by ultrahigh-temperature FJH. Then, in mass transport stage 2202, the metal vapors were transported under vacuum (using vacuum system having pump 2207), and, in condensation stage 2203, were collected by condensation (using cold trap 2208). A printed circuit board (PCB) from a discarded computer, a representative e-waste, was used as the starting material. See FIG. 23. The PCB was ground to small powder and mixed with carbon black (CB), which served as the conductive additive. Inset 2310 of FIG. 23.

Figure 24:
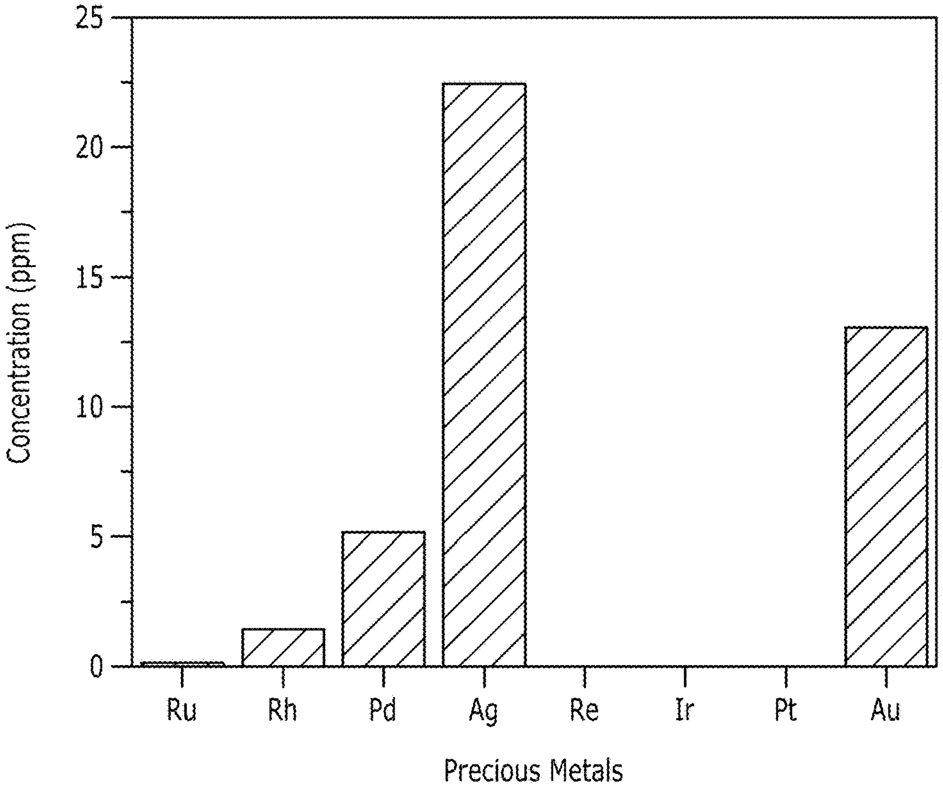

To establish baseline concentrations, the PCB was digested using dilute aqua regia [Hong 2020], and the concentration of precious metals was determined by inductively coupled plasma mass spectrometry (ICP-MS). Among the precious metals, Rh, Pd, Ag, and Au are abundant with concentration of several to tens of parts per million (ppm), as shown in FIG. 24.

Figure 29A:
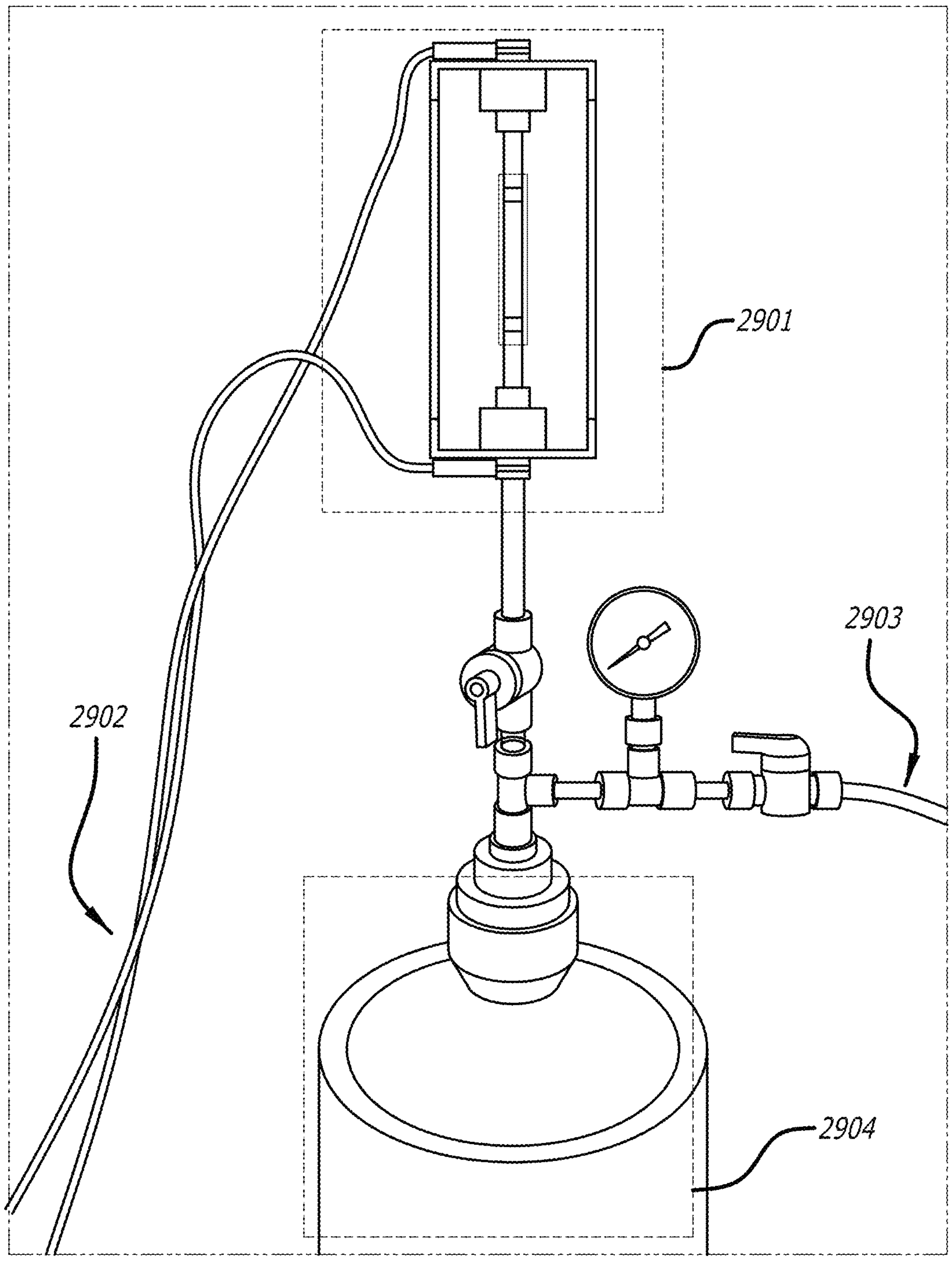
FIGS. 29A-29E are photographs of a system to collect evaporated metal vapor.
Figure 29B:
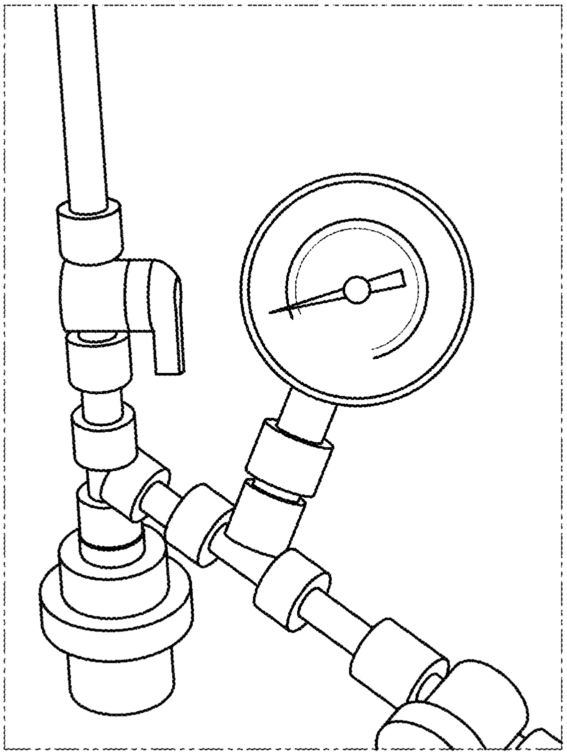
Figure 29C:
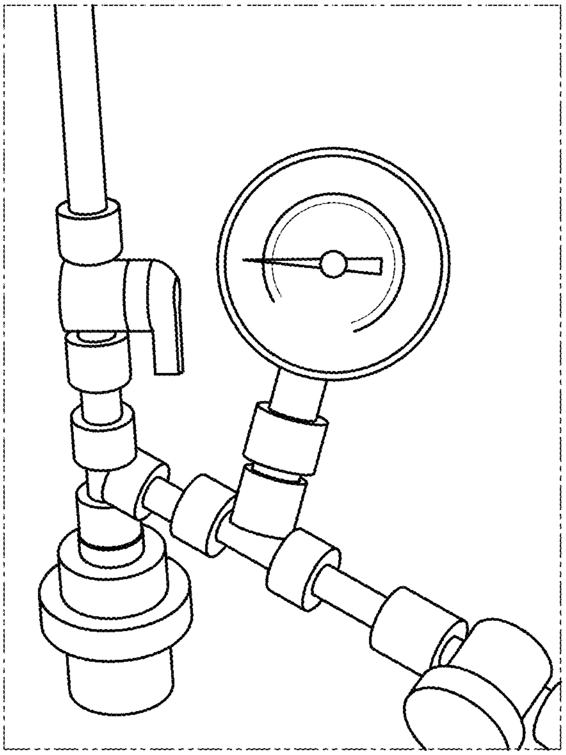
Figure 29D:
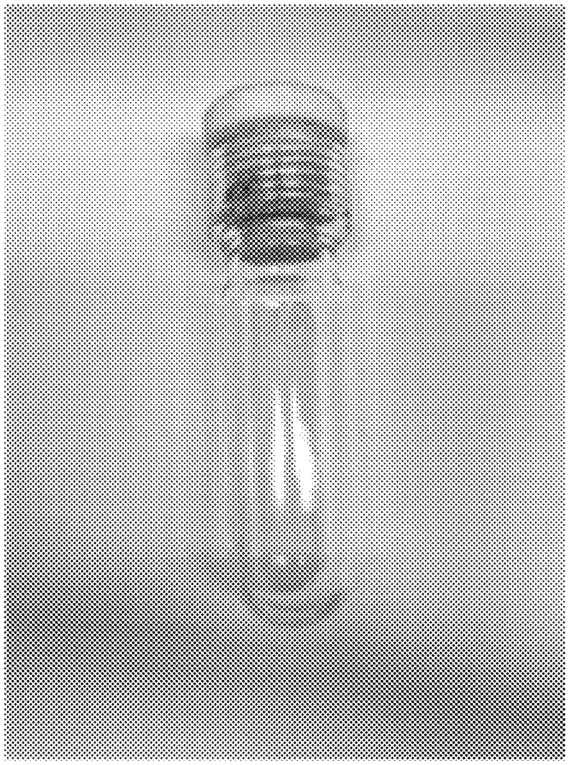
Figure 29E:
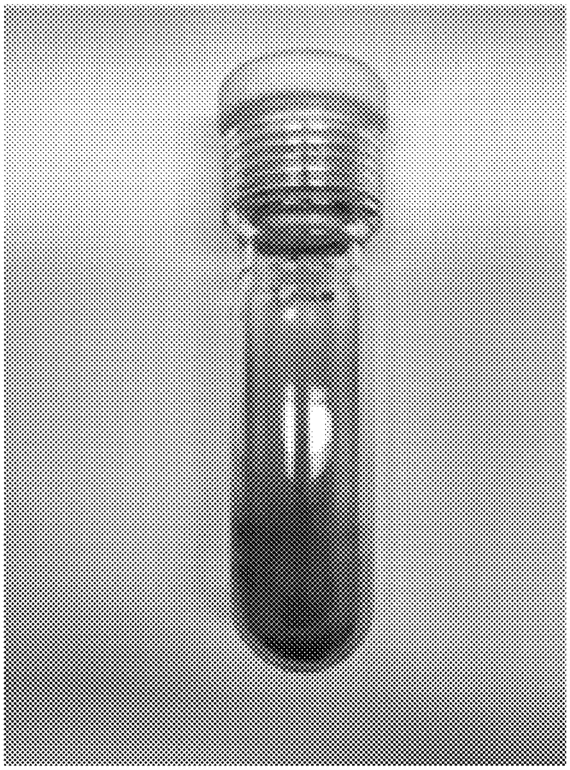
Figure 30:
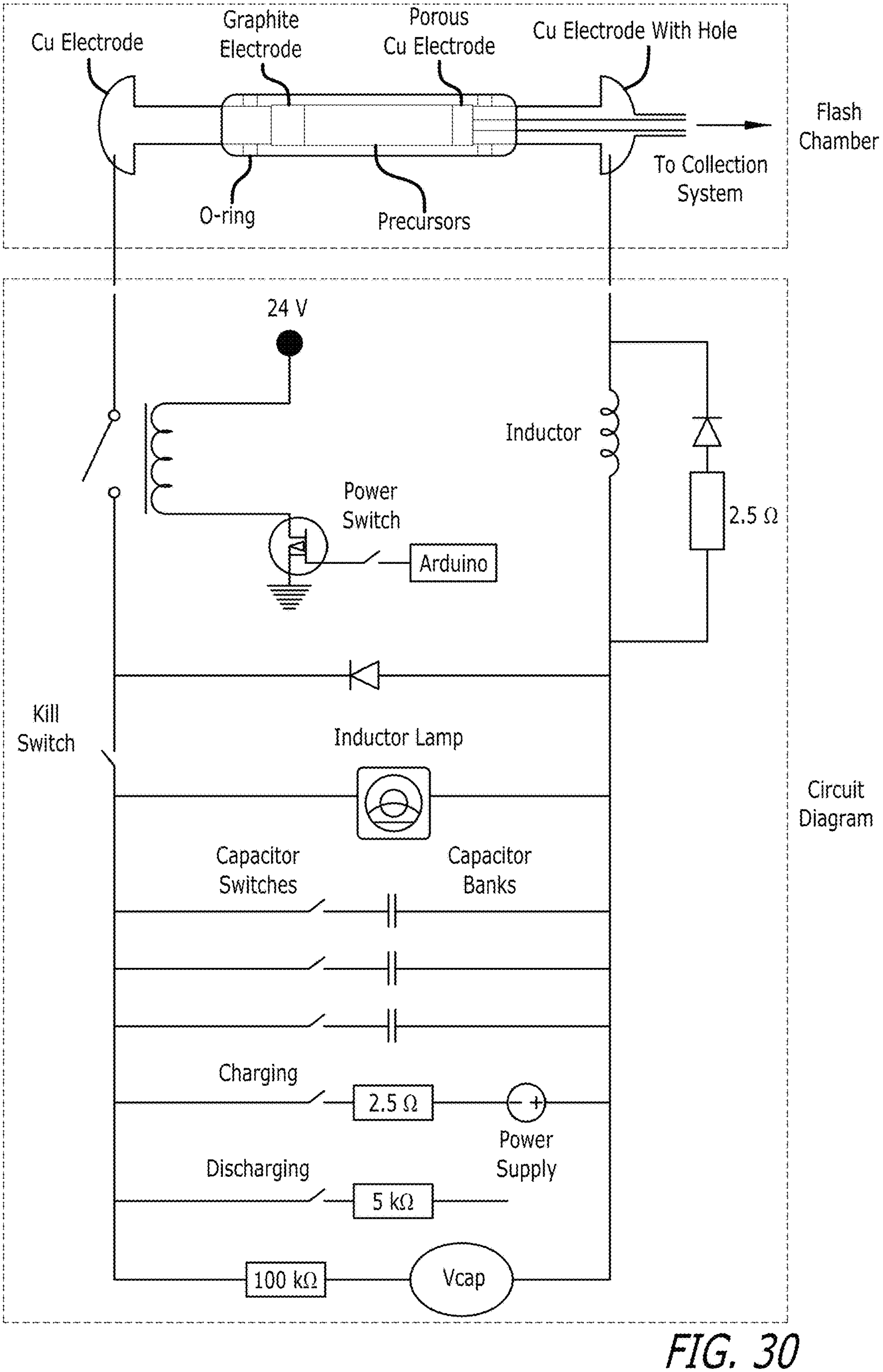
FIG. 30 is an electrical circuit diagram of the flash Joule heating (FJH) system utilized in the system shown in FIG. 29.

In a FRI process, the mixture of PCB powder and ~30 wt % CB was slightly compressed inside a quartz tube between two sealed electrodes. FIG. 22. FIG. 29A shows a photograph of the system, which included the flash stage 2901, the power source 2902, the pump 2903, and the cold trap 2904 (liquid nitrogen, Dewar). One electrode was a porous Cu electrode to facilitate gas diffusion, and the other was a graphite rod. FIG. 30. The resistance of the sample was tunable by adjusting the compressive force on the two electrodes. The two electrodes were connected to a capacitor bank with total capacitance of 60 mF. The detailed separation conditions are shown in TABLE V.

TABLE V

Parameters For FJH Under Vacuum

| Precursors | Mass Ratio | Mass (mg) | Resistance (Ω) | Voltage (V) | Time (s) |
|---|---|---|---|---|---|
| PCB:CB, 1# | 2:1 | 300 | 1.8 | 150 | 1 |
| PCB:CB, 2# | 2:1 | 300 | 2.0 | 150 | 1 |
| PCB:CB, 3# | 2:1 | 300 | 2.5 | 150 | 1 |
| PCB:CB:NaCl, 1# | 1:2:3 | 300 | 2.3 | 150 | 1 |
| PCB:CB:NaCl, 2# | 1:2:3 | 300 | 1.9 | 150 | 1 |
| PCB:CB:NaCl, 3# | 1:2:3 | 300 | 1.8 | 150 | 1 |
| PCB:CB:KCl, 1# | 1:2:3 | 300 | 22 | 150 | 1 |
| PCB:CB:KCl, 2# | 1:2:3 | 300 | 18 | 150 | 1 |
| PCB:CB:KCl, 3# | 1:2:3 | 300 | 14 | 150 | 1 |
| PCB:CB:PVC, 1# | 1:2:3 | 300 | 2.0 | 150 | 1 |
| PCB:CB:PVC, 2# | 1:2:3 | 300 | 2.5 | 150 | 1 |
| PCB:CB:PVC, 3# | 1:2:3 | 300 | 2.5 | 150 | 1 |
| PCB:CB:CPVC, 1# | 1:2:3 | 200 | 3.0 | 150 | 1 |
| PCB:CB:CPVC, 2# | 1:2:3 | 200 | 3.0 | 150 | 1 |
| PCB:CB:CPVC, 3# | 1:2:3 | 200 | 3.2 | 150 | 1 |
| PCB:CB:NaF, 1# | 1:2:3 | 200 | 1.5 | 150 | 1 |
| PCB:CB:NaF, 2# | 1:2:3 | 200 | 1.0 | 150 | 1 |
| PCB:CB:NaF, 3# | 1:2:3 | 200 | 1.0 | 150 | 1 |
| PCB:CB:PTFE, 1# | 1:2:3 | 200 | 2.0 | 150 | 1 |
| PCB:CB:PTFE, 2# | 1:2:3 | 200 | 2.2 | 150 | 1 |
| PCB:CB:PTFE, 3# | 1:2:3 | 200 | 2.2 | 150 | 1 |
| PCB:CB:NaI, 1# | 1:2:3 | 200 | 0.6 | 150 | 1 |
| PCB:CB:NaI, 2# | 1:2:3 | 200 | 0.6 | 150 | 1 |
| PCB:CB:NaI, 3# | 1:2:3 | 200 | 0.5 | 150 | 1 |
| PCB:CB:NaF:NaCl:NaI, 1# | 1:2:1:1:1 | 200 | 0.2 | 150 | 1 |
| PCB:CB:NaF:NaCl:NaI, 2# | 1:2:1:1:1 | 200 | 1 | 150 | 1 |
| PCB:CB:NaF:NaCl:NaI, 3# | 1:2:1:1:1 | 200 | 0.5 | 150 | 1 |

Figure 25:
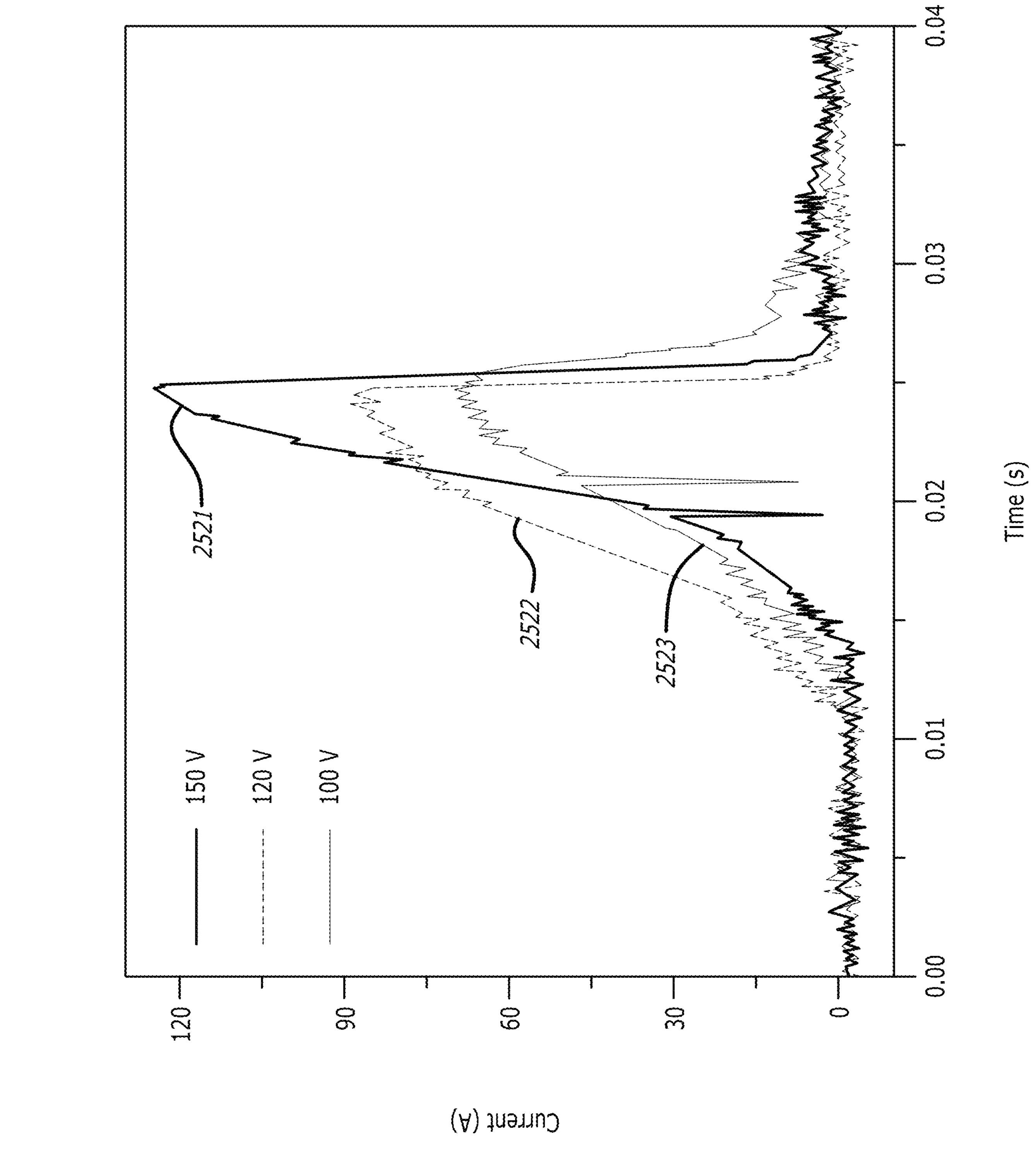
Figure 26:
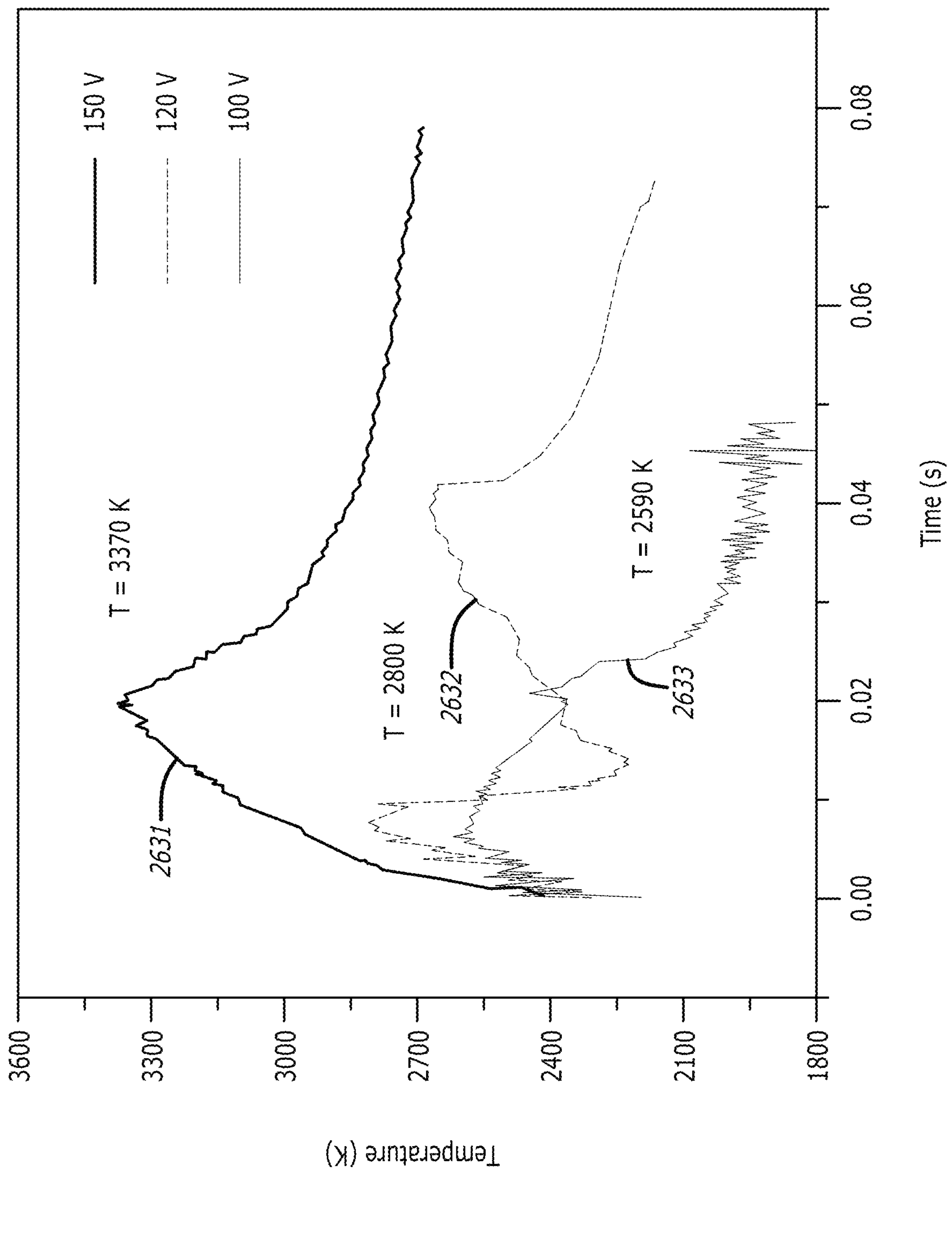

The high-voltage discharge of the capacitor bank brings the reactant to a high temperature. With the fixed sample resistance of ~1Ω, the current passing through the sample was measured under different FJH voltages. See FIG. 25, showing curves 2521-2523 for 150 V, 120 V, and 100 V, respectively. The real-time temperature of the sample was estimated by fitting the blackbody radiation in the 600-1100 nm emission. The temperature varied according to the FJH voltage, reaching ~3400 K at 150 V in <50 ms. See FIG. 26, showing curves 2631-2633 for 150 V, 120 V, and 100 V, respectively.

Figure 27:
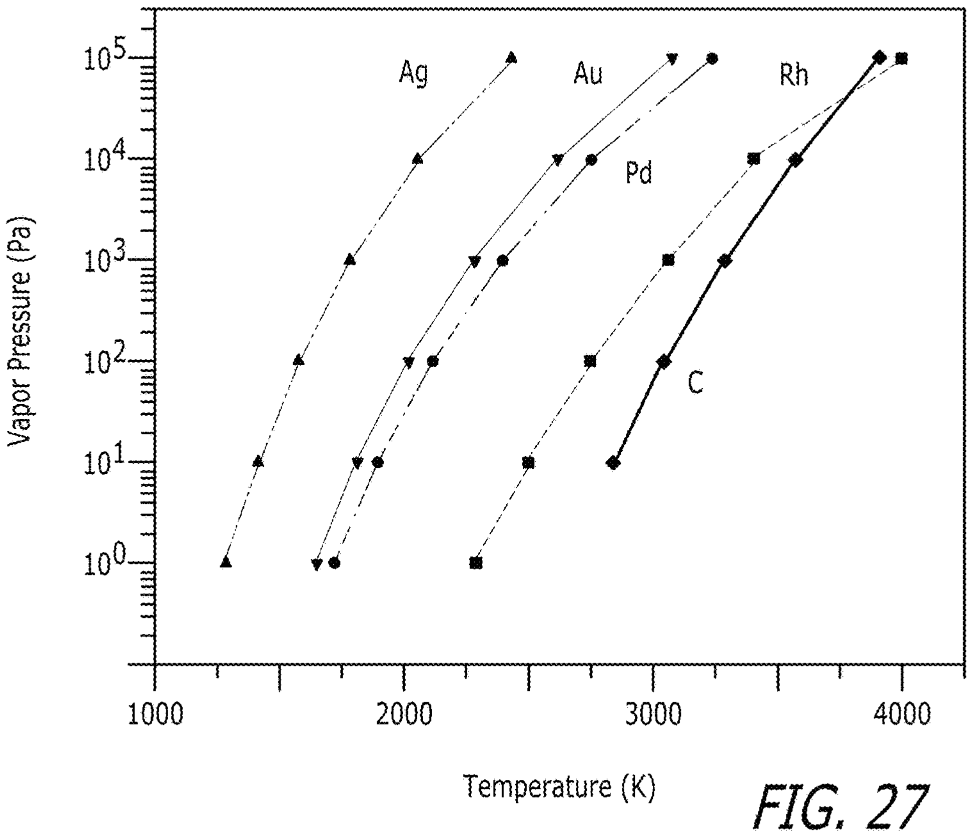

Since the resistance of the sample is much larger than that of the graphite and porous Cu electrode, the voltage drop was mainly imposed on the sample. Hence, the high-temperature region was limited to the sample and the FJH setup has good durability even though it can achieve a high temperature of >3000 K. Such a high temperature (>3000 K) volatilizes most of the non-carbon components. According to the calculated vapor pressure-temperature relationships (FIG. 27), the precious metals have a higher vapor pressure than carbon, the latter not subliming until 3900 K. [Abrahamson 1974].

As a result, the metals are evaporated, and the major carbon-containing components such as plastics were carbonized. [Luong 2020; Algozeeb 2020] The evaporated metal vapors were captured by condensation in a cold trap (FIGS. 22 and 29A). Some of the vapor remained gaseous even at the liquid $N_2$ temperature (77 K); these gases were presumed to be $H_2$ and CO. [Algozeeb 2020].

Figure 28:
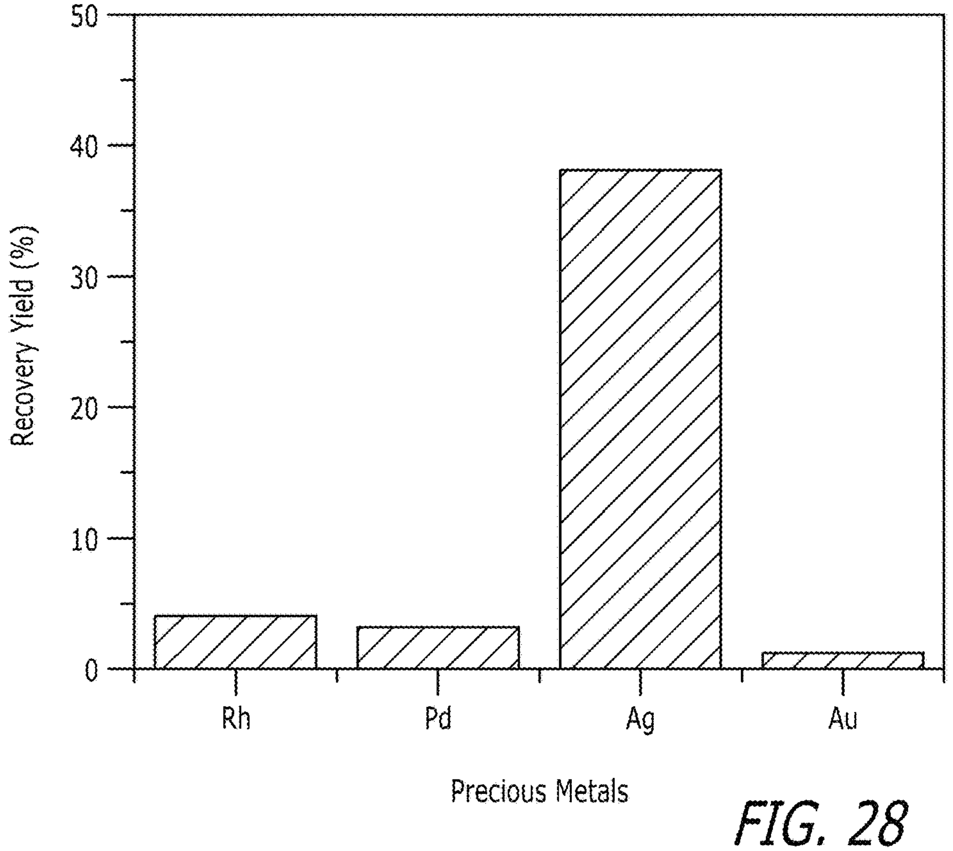

The content of the precious metals in the condensed solid was measured and the recovery yield was calculated. FIG. 28. The recovery yield of Ag was ~40%, while Rh, Pd, and Au had a relatively low recovery yield of ~3%. This is because Ag has a high vapor pressure and relatively low boiling point. The concentration of precious metals in the starting commercial CB is 1-2% of the concentration in PCB, hence their presence in CB will not introduce significant errors. Moreover, the precious metals tend to not form stable carbide phases even at high temperature due to their extremely low C solubility. [Okamoto 2016]. Hence, the use of CB as conductive additive will not affect the evaporative behavior of precious metals.

Halide Assisted Improvement of Recovery Yield

Figure 31A:
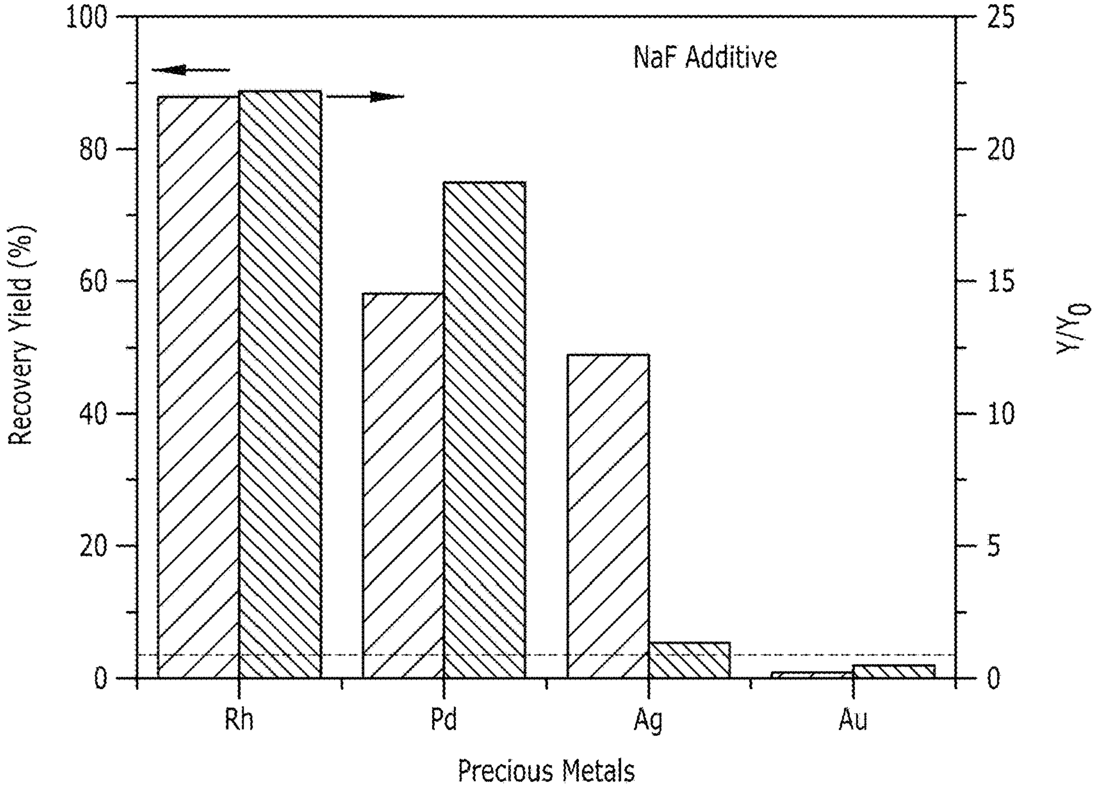
FIGS. 31A-31G show halide assisted improvement of recovery yield.
Figure 31B:
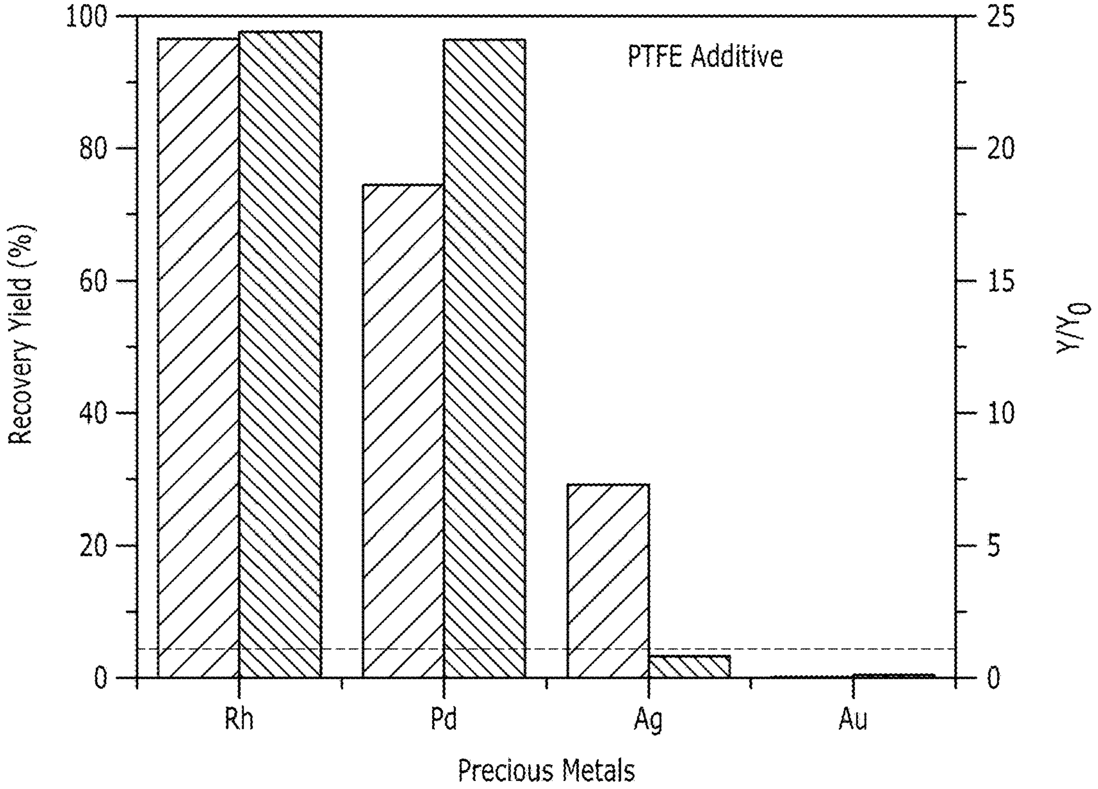

The high recovery yield of the evaporative separation relies on the generation of more volatile components. To improve the recovery, halides were used as additives because of the much higher vapor pressure of metal halides compared with the elemental metals. [Lide 2005]. Fluorine-containing components were first used as the additive, including the sodium fluoride (NaF) and polytetrafluoroethylene (PTFE, Teflon). With the additives, the recovery yields of Rh and Pd were improved to >80% and 70%, respectively. See FIGS. 31A-31B, demonstrating ~20 times improvement compared to the experiments without additives. The concentration of precious metals in the additives were <2% of those in PCB, hence this exclude the additives from introducing significant error in the recovery of precious metals.

Figure 31C:
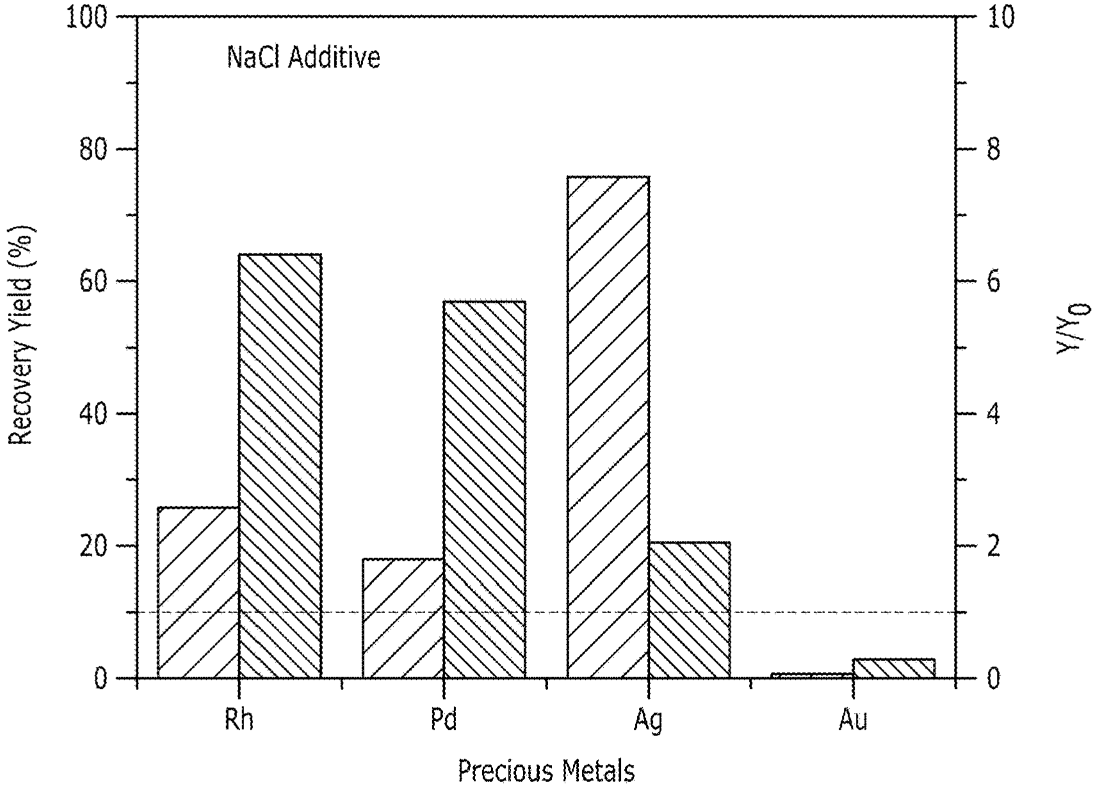
Figure 31D:
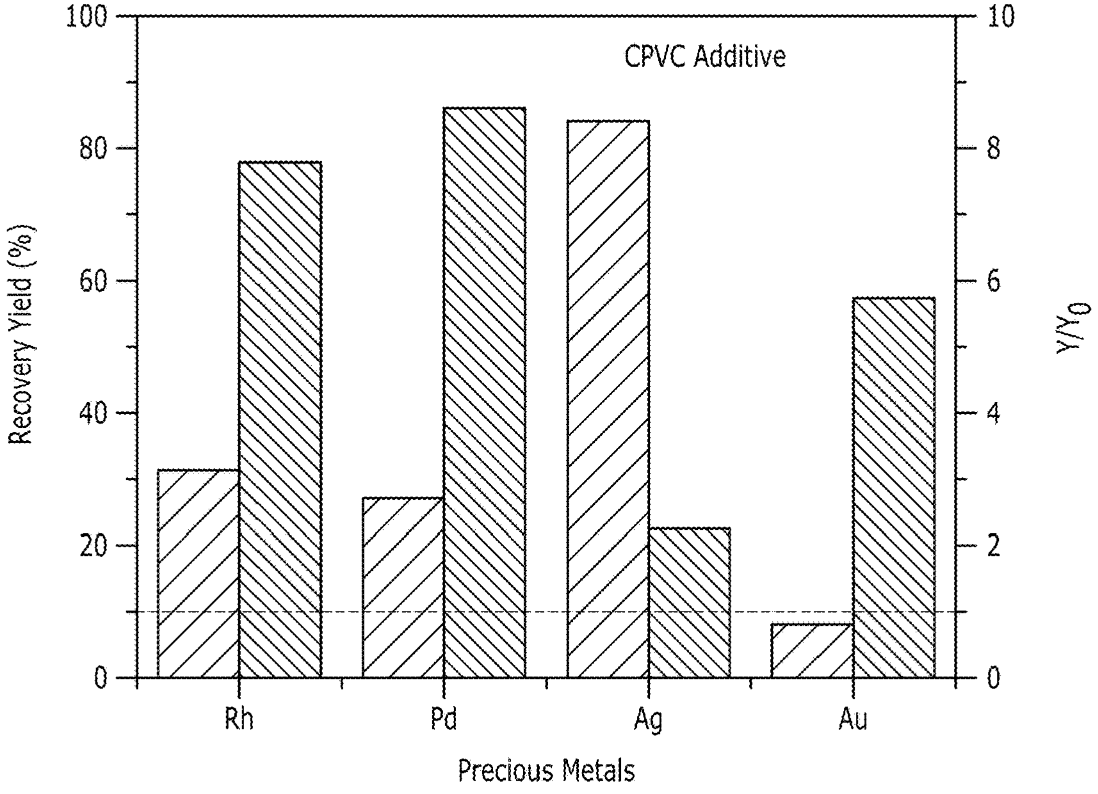

Chlorine-containing compounds were tried because of their abundance and low cost. Both sodium chloride (NaCl) and potassium chloride (KCl) were used (FIG. 31C). The recovery yields of Rh, Pd, and Ag increased for both NaCl and KCl additives. In addition, both polyvinyl chloride (PVC) and chlorinated polyvinyl chloride (CPVC) plastics were used (FIG. 31D). The recovery yield of all four precious metals were increased, especially for Ag, with the recovery yield improving to >80%. The plastic additives were ground post-consumer samples with very low or negative values, so they will not introduce significant materials cost during the e-waste recycling process.

Figure 31E:
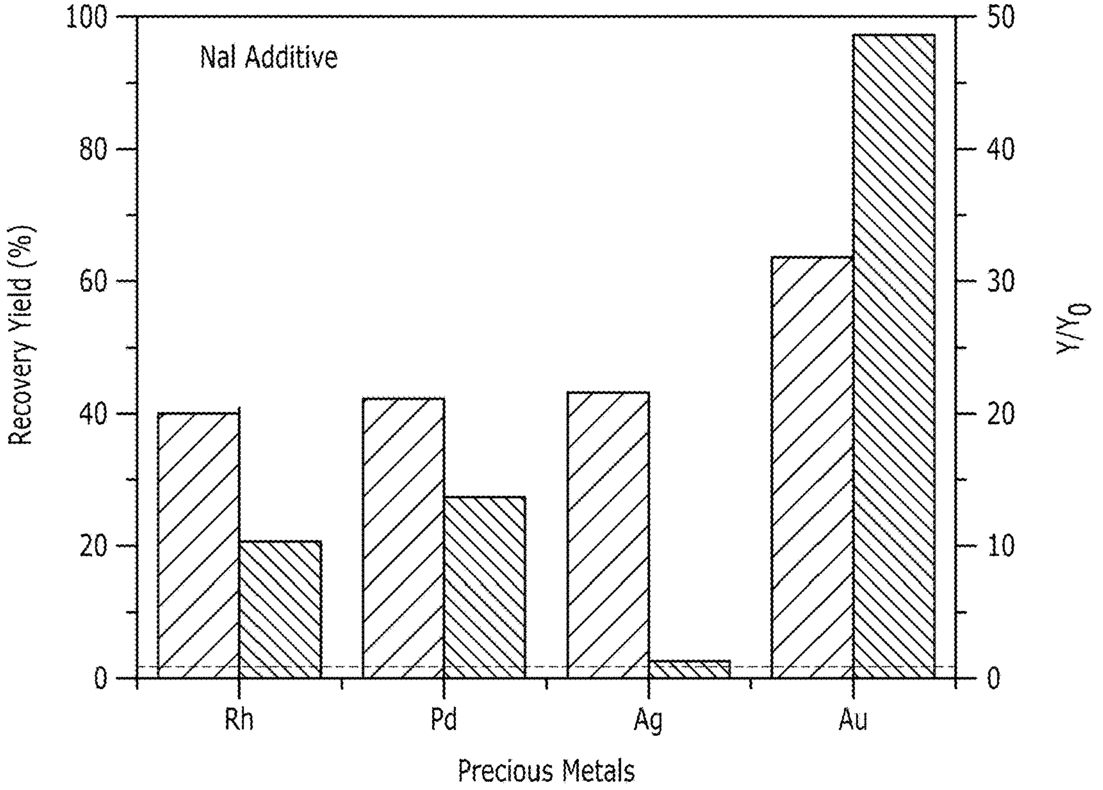
Figure 31F:
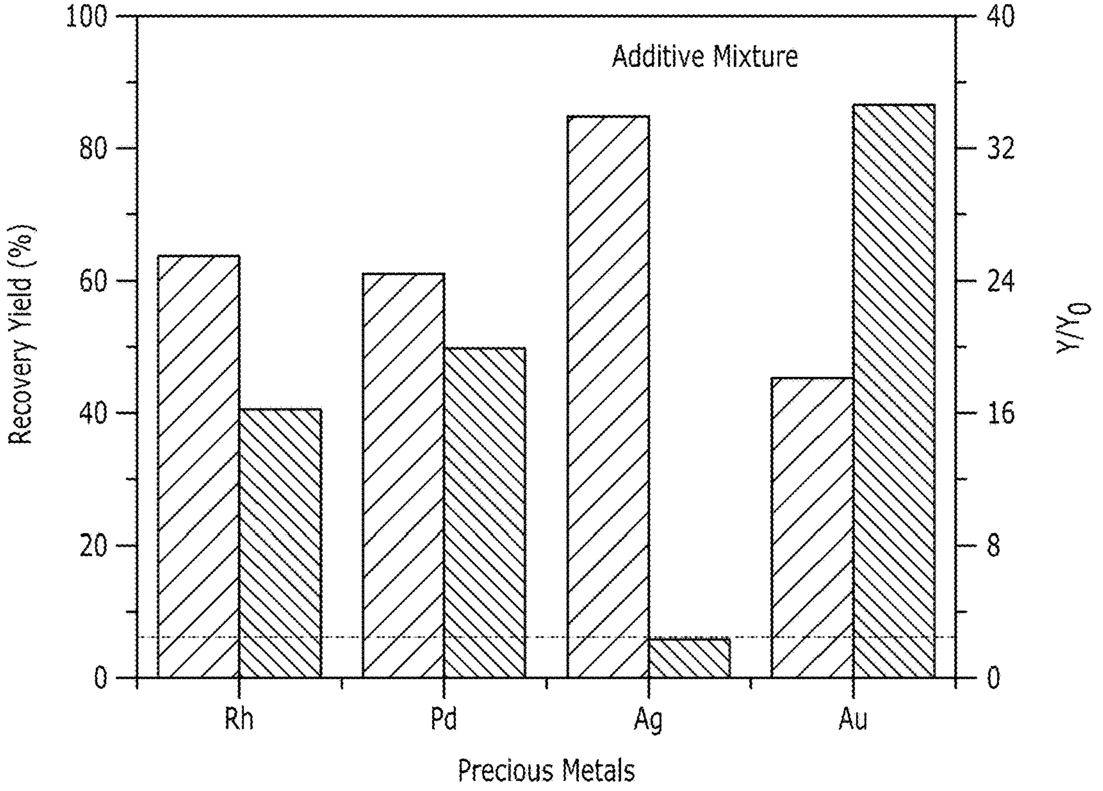

Even with the F and Cl additives, the recovery yield of Au is <10%. Interestingly, the recovery yields of all four precious metals were improved when sodium iodine (NaI) was used as the additive; the recovery yield of Au was improved to >60% (FIG. 31E). The I additive has the best performance among halides for Au recovery. According to the hard and soft acids and bases (HSAB) theory, $Au^+$ is a soft Lewis acid, and $I^-$ is a soft Lewis base while $F^-$ and $Cl^-$ are harder than $I^-$ [Pearson 1963], favoring AuI. By using an additive mixture of NaF, NaCl and NaI, the precious metals all had a good recovery yield, >60% for Rh, >60% for Pd, >80% for Ag, and >40% for Au (FIG. 31F). The composition analysis of the raw materials and the remaining solid after FJH by X-ray photoemission spectroscopy (XPS) showed that 10-40% of the halide additives were evaporated during the FJH process, which could be recovered and reused by a water washing and precipitation process.

A total composition analysis of the collected metals in the cold trap was conducted. In both cases with or without the chemical additives, in additions to the precious metals, the most abundant metals were Cu with mass ratio >60 wt %, followed by other prominent metals in e-waste including Al, Sn, Fe, and Zn. Further purification and refining could be done by selective precipitation, solvent extraction, and solid-phase extraction, which are commercially well-established practices and are known in the art. [Ueda 2016].

Figure 31G:
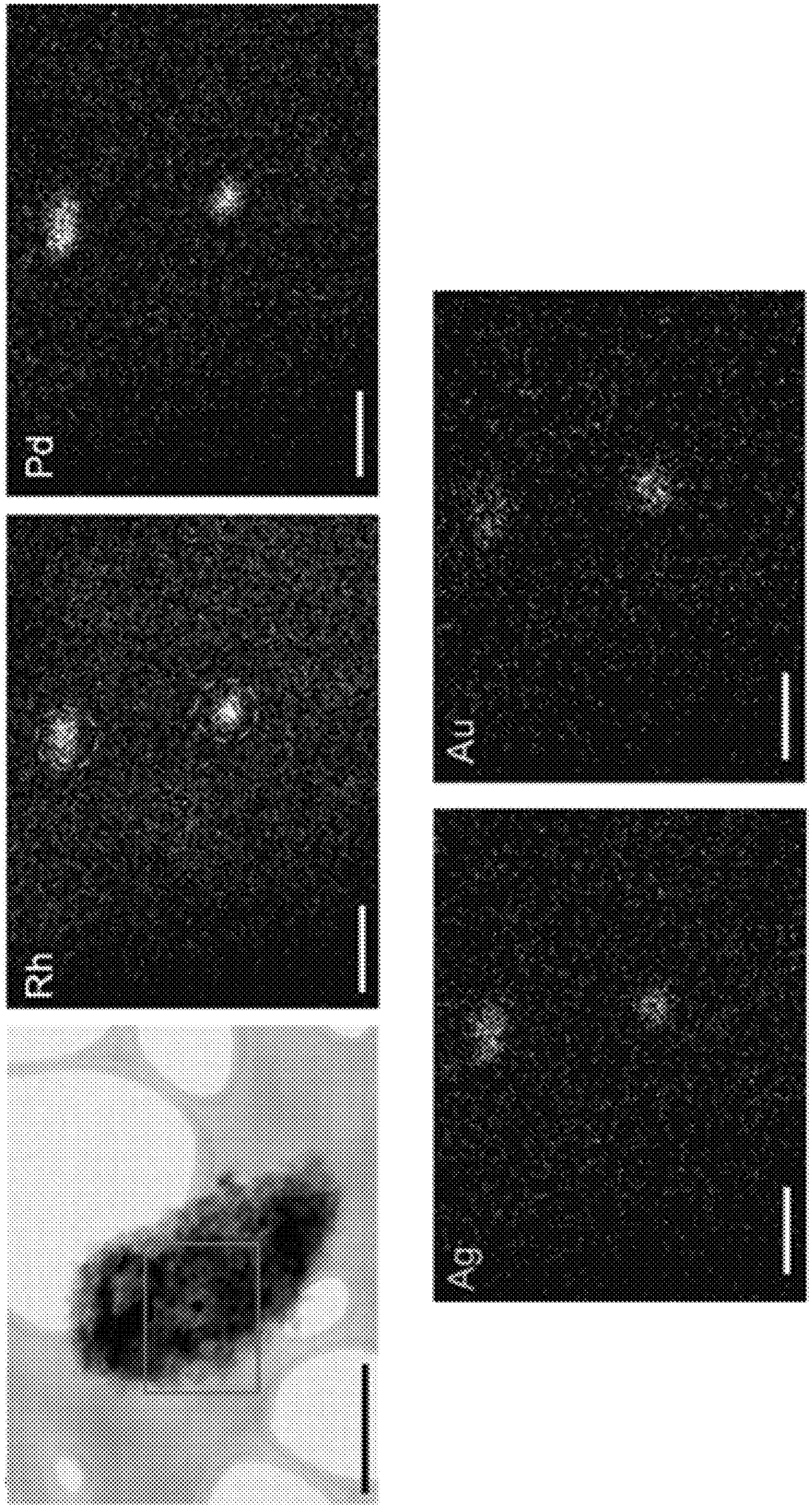

The morphology and chemical composition of the condensed solids were characterized using scanning transmission electron microscopy (STEM) and energy dispersion spectroscopy (EDS). The elemental maps showed the clustered alloy particles of Rh, Pd, Ag, and Au (FIG. 31G), which were formed by the ultrafast heating and rapid cooling of the FJH process. This is similar to the case of the carbothermic shock synthesis of high-entropy alloy nanoparticles, which could be potentially used in catalysts. [Yao 2018]. In other regions, the precious metals spreading over the entire product was also observed. Moreover, the XPS analysis of the collected volatiles showed that Ag and Au were mainly in the elemental state, while elemental state and higher oxidation state coexisted for Rh and Pd, presumably due to their different chemical reactivity.

Improved Leaching Efficiency of Precious Metals

Figure 32A:
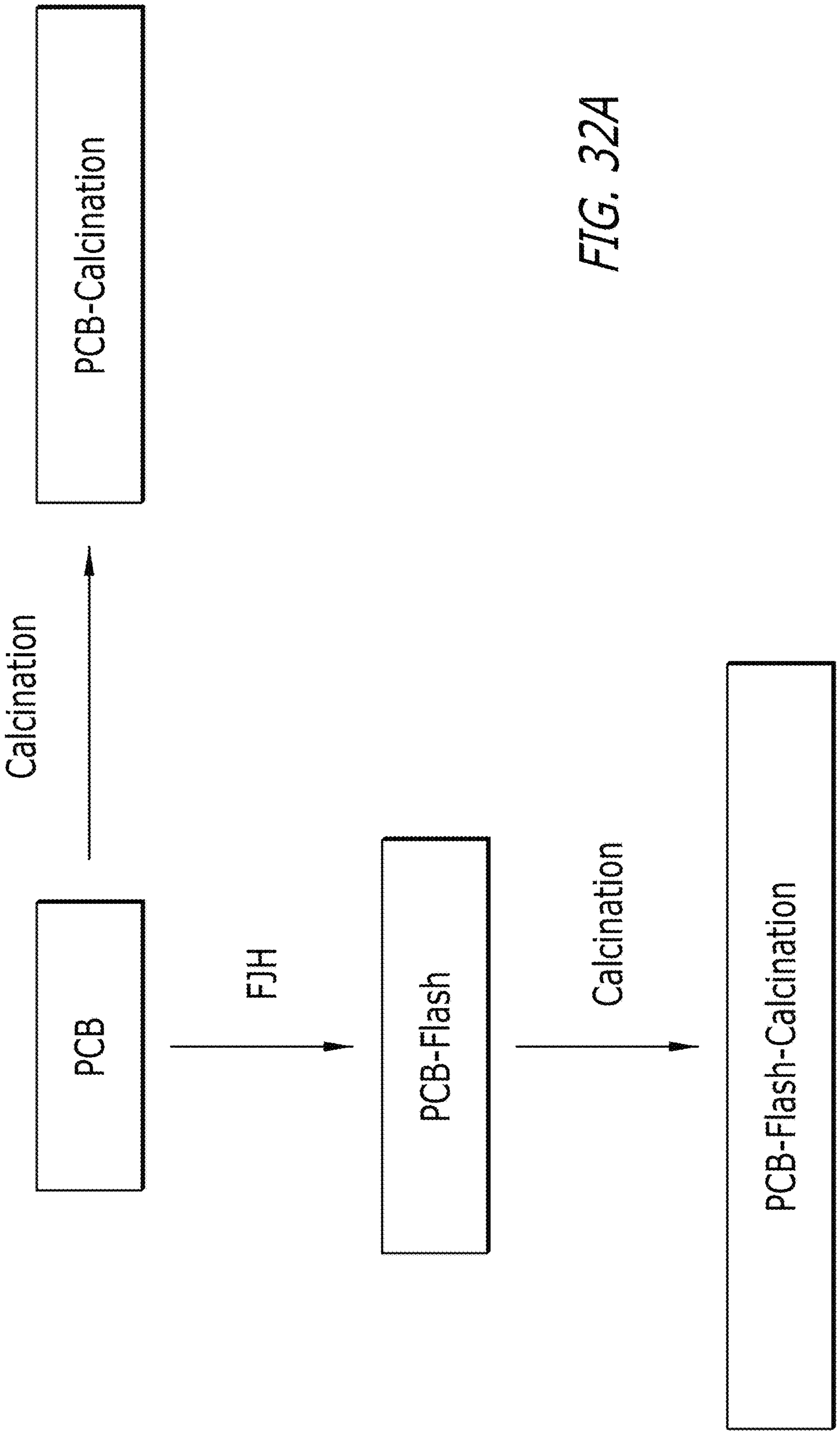
FIGS. 32A-32F shows recovery of precious metal by flash Joule heating (FJH) and calcination.
Figure 33A:
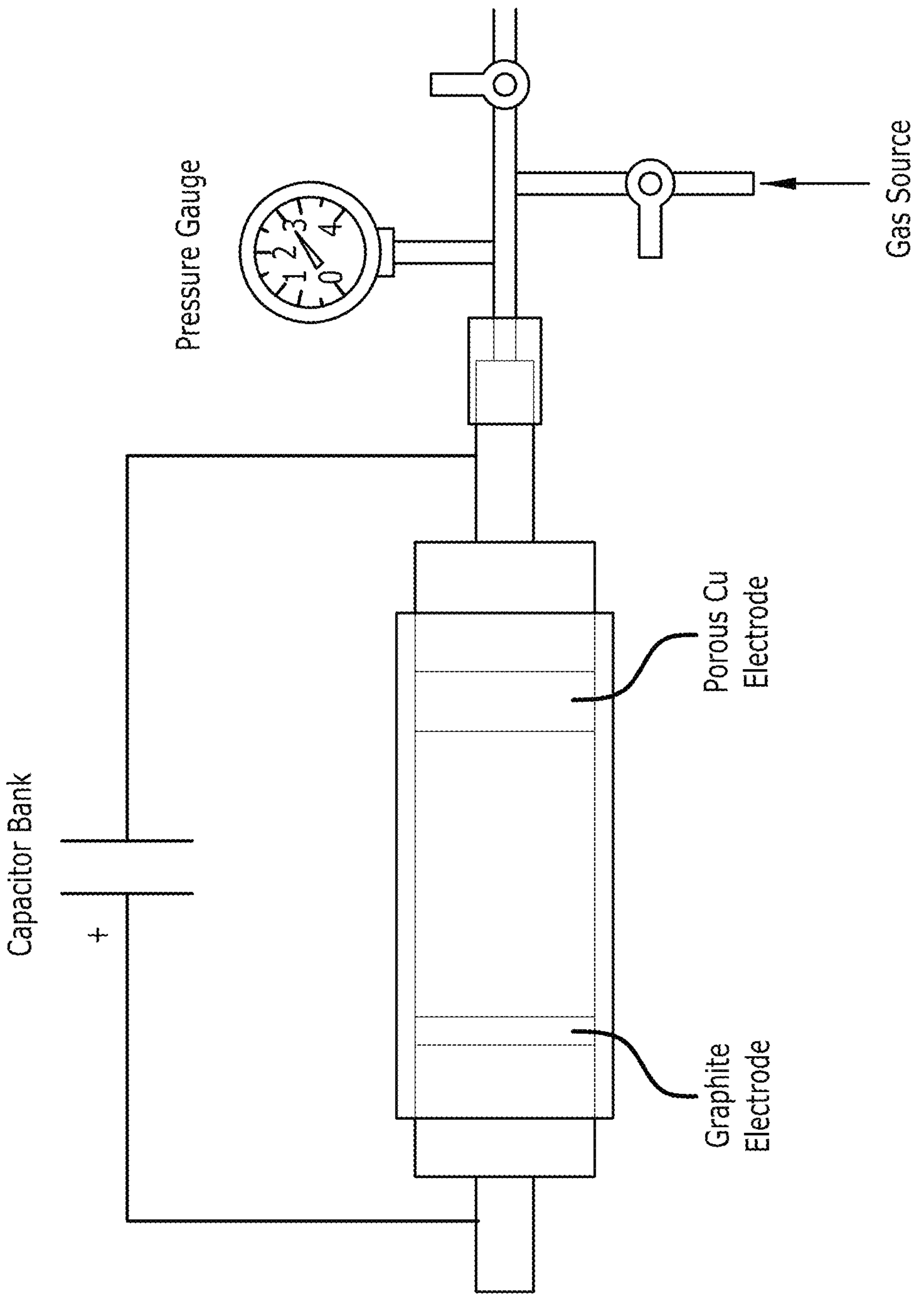
FIGS. 33A-33F shows leaching efficiency improvement of precious metals by the flash Joule heating (FJH) process.

Apart from the condensation of the volatile composition, the other pathway to recover the precious metals was by leaching the residual solids obtained by FJH. See FIG. 32A. Different from the use of a vacuum to facilitate the metal volatilization in the evaporative separation scheme (FIG. 22), a pressurized setup was built to trap the metals in the reactor (FIG. 33A). An inert gas ($N_2$) cylinder was connected to the FJH reactor, where the pressure was monitored by a pressure gauge. The inner pressure ($P_0$) during FJH was estimated to be ~5 atm according to the amount of collected gas.

Figure 33B:
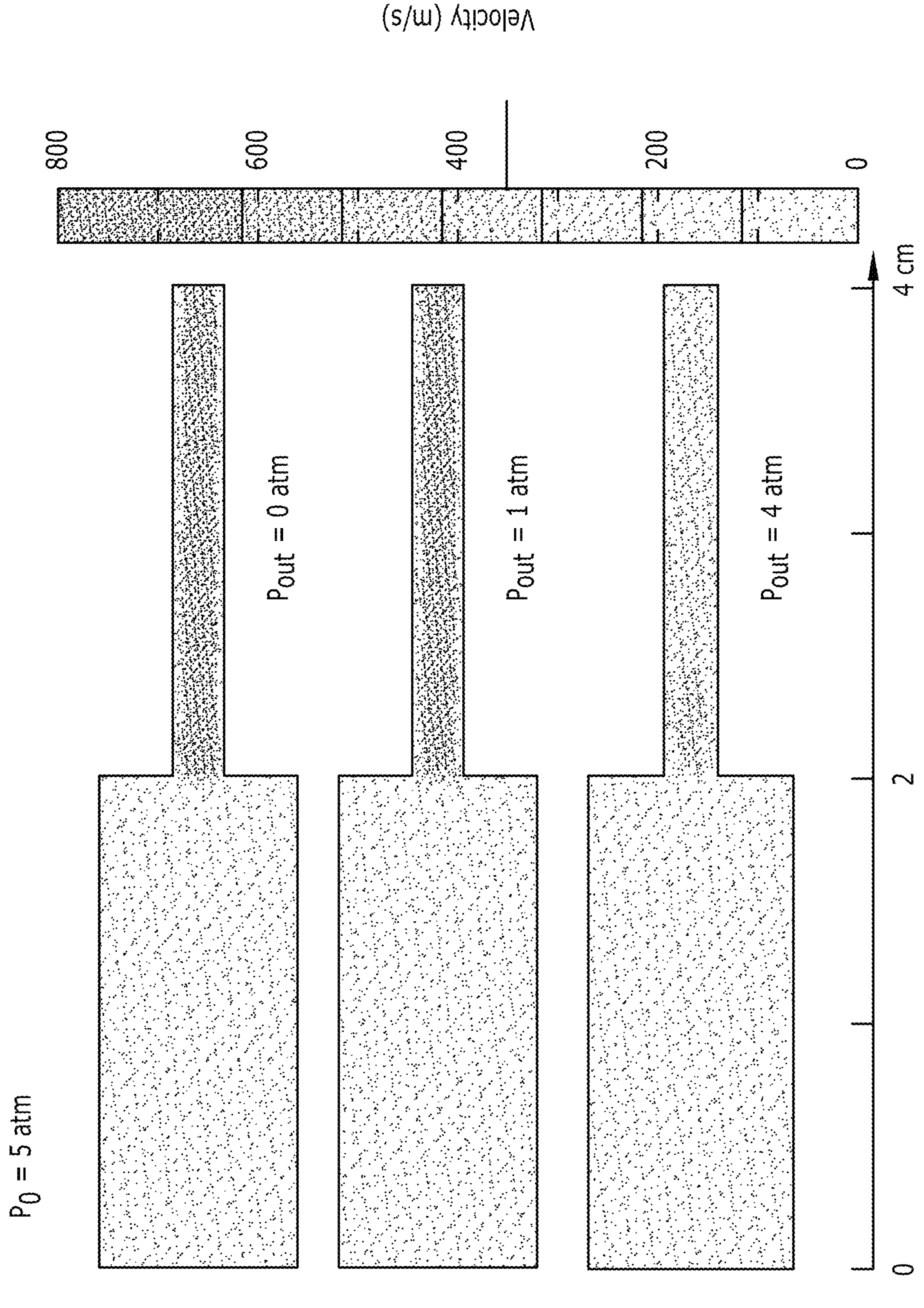

Based on the pressure drop and the size of the FJH chamber, the gas diffusion was simulated under different pressures ($P_{out}$) (FIG. 33B). When vacuum was used ($P_{out}$=0 atm), as it is in the evaporative separation (FIG. 22), the gas velocity was up to 800 m $s^{-1}$. Such a high gas velocity aided the volatile components to quickly diffuse to the cold trap and prevent the condensation loss at the tube sidewalls. In contrast, the gas velocity was greatly reduced with the increase in pressure (FIG. 33B). As a result, more of the originally volatile components were trapped within the residual solids in the reactor. The detailed reaction conditions for the pressurized FJH are shown in TABLE VI.

TABLE VI

Parameters For FJH Under Pressure

| Precursors | Mass Ratio | Mass (mg) | Resistance (Ω) | Pressure | Voltage (V) | Time (s) | Mass after FJH (mg) |
|---|---|---|---|---|---|---|---|
| PCB:CB | 2:1 | 200 | 1.0 | 1 bar | 10 | 1 | 196 |
| PCB:CB | 2:1 | 200 | 1.3 | 1 bar | 30 | 1 | 196 |
| PCB:CB | 2:1 | 200 | 1.0 | 1 bar | 50 | 1 | 180 |
| PCB:CB | 2:1 | 200 | 1.0 | 1 bar | 100 | 1 | 158 |
| PCB:CB | 2:1 | 200 | 1.0 | 1 bar | 120 | 1 | 115 |
| PCB:CB | 2:1 | 200 | 1.0 | vacuum | 120 | 1 | 65 |

TABLE VI-continued

Parameters For FJH Under Pressure

| Precursors | Mass Ratio | Mass (mg) | Resistance (Ω) | Pressure | Voltage (V) | Time (s) | Mass after FJH (mg) |
|---|---|---|---|---|---|---|---|
| PCB:CB | 2:1 | 200 | 1.0 | 1 bar | 120 | 1 | 115 |
| PCB:CB | 2:1 | 200 | 1.0 | 2 bar | 120 | 1 | 142 |
| PCB:CB | 2:1 | 200 | 1.0 | 3 bar | 120 | 1 | 155 |
| PCB:CB | 2:1 | 200 | 1.0 | 4 bar | 120 | 1 | 165 |

Figure 33C:
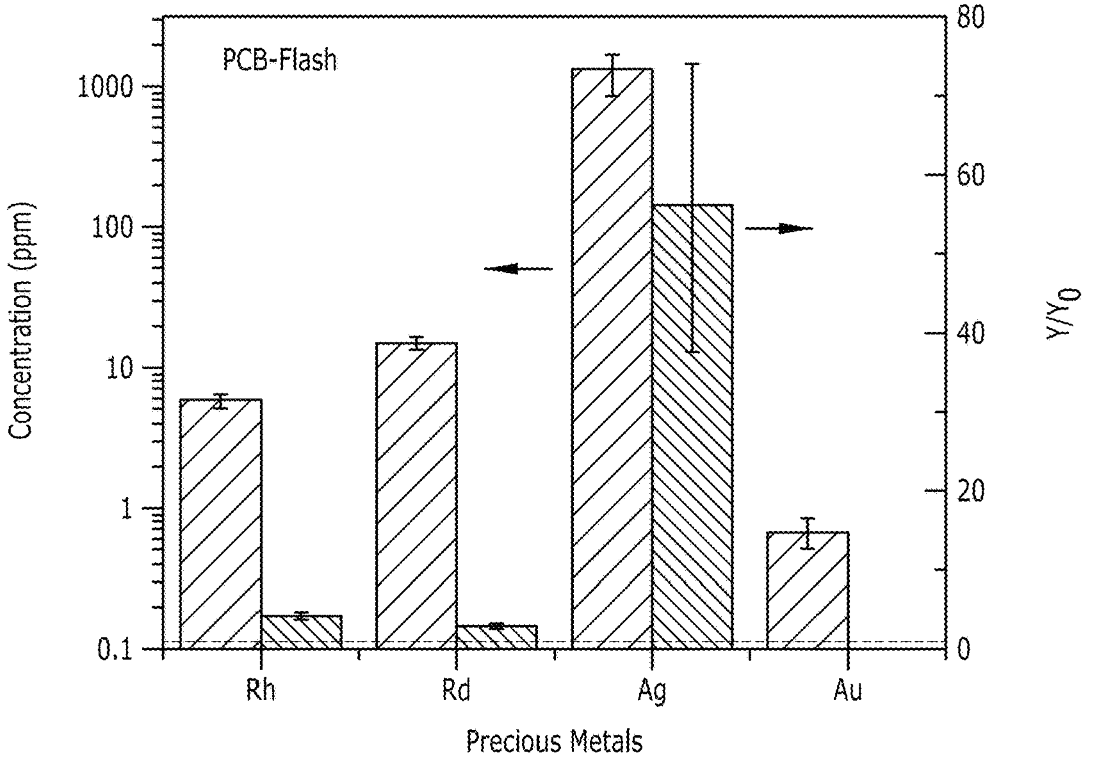

The leaching of the residual solids after FJH (denoted as PCB-Flash) was started at 120 V and atmospheric pressure using dilute acids (1 M HCl, 1 M $HNO_3$). The leachable content of Rh, Pd, and Ag in PCB-Flash was substantially higher than that in the PCB raw materials (FIG. 33C). The ratio of the recovery yield by leaching the PCB-Flash (Y) and leaching the PCB raw materials ($Y_0$) was calculated. FJH with leaching was far more effective than leaching alone. The recovery yield of Rh, Pd, and Ag was increased by 4.17±0.48, 2.90±0.31, 56.0±18.1 times, respectively (FIG. 33C). (In FIG. 33C, $Y_0$ and Y mean the recovery yield by leaching printed circuit board (PCB) and PCB-Flash, respectively. The dashed line denotes $Y/Y_0=1$. The error bars denote the standard deviation where n=3). The deviations could be from the inhomogeneous distribution of precious metals in e-waste. Interestingly, the Au recovery yield was reduced after the FJH process. The reason was presumably the formation of covalent bonds between Au and carbon [Olavarria-Contreras 2016], which could significantly increase the difficulty of acid leaching.

Figure 32B:
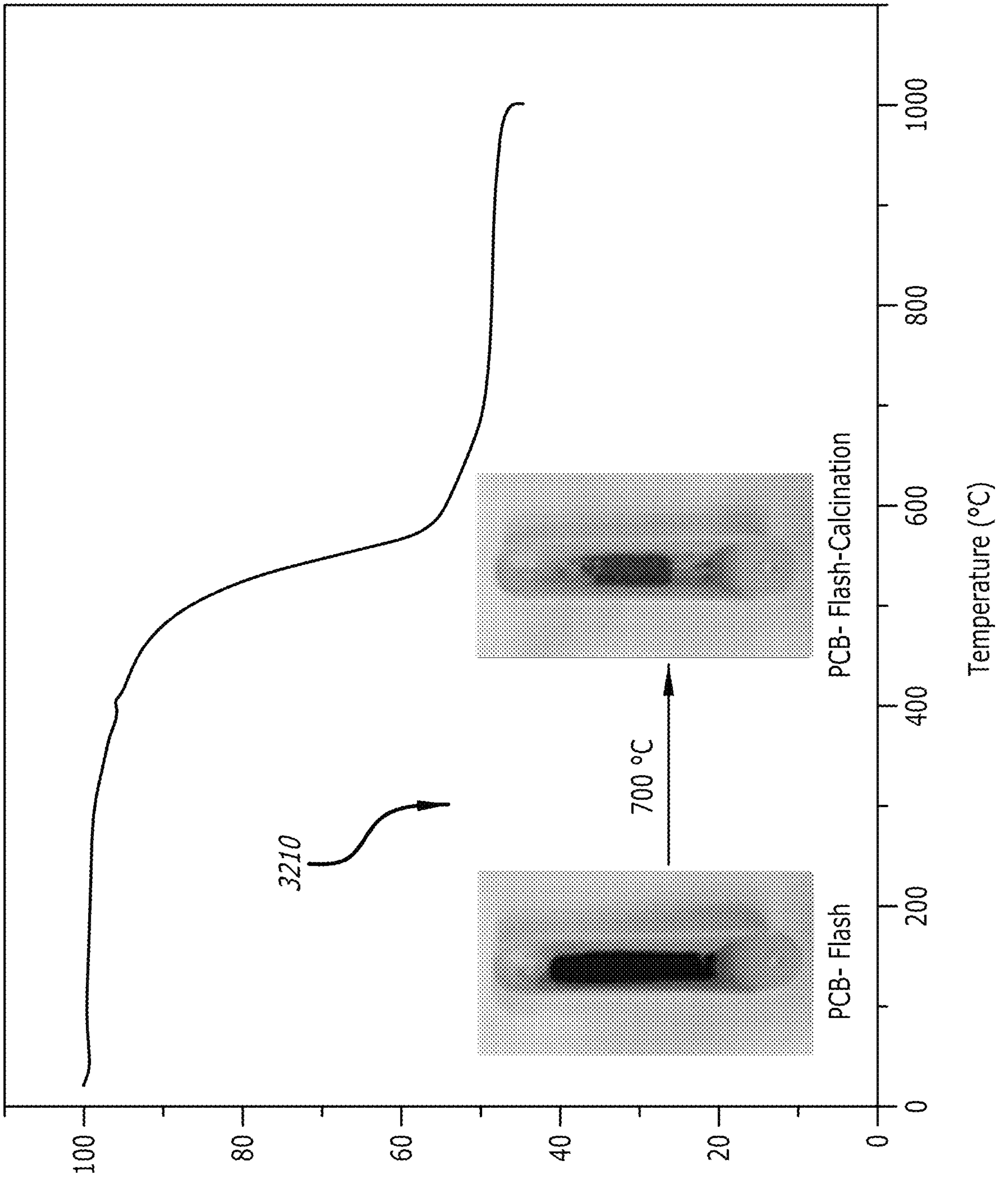
Figure 32C:
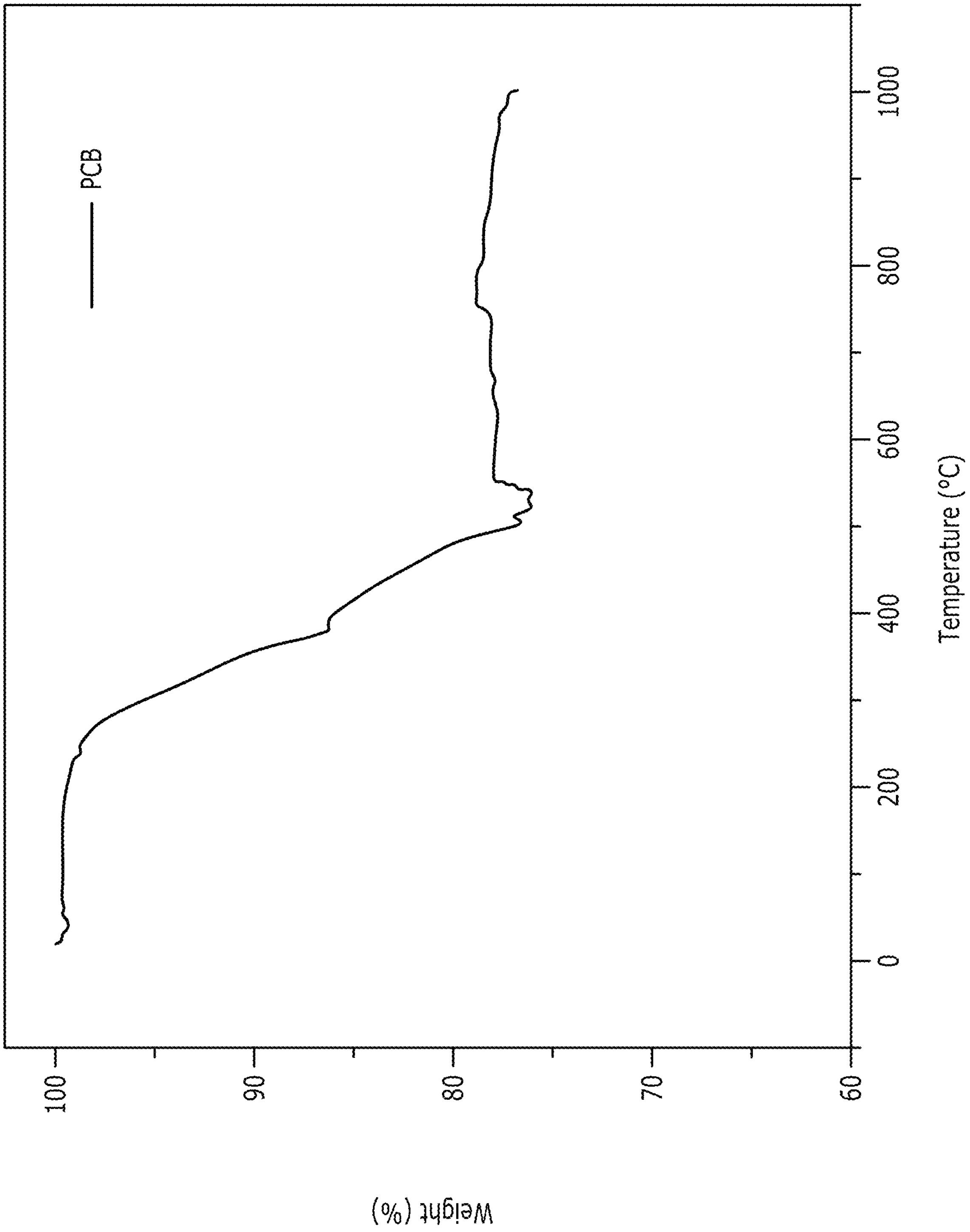

The thermogravimetric analysis (TGA) of the PCB-Flash showed that the carbon could be removed in air at ~700° C. (FIG. 32B). (The TGA curve in FIG. 32B shows that the PCB-Flash started to lose weight at ~400° C. and remains stable at ~800° C.). Hence, the PCB-Flash solid was calcined at 700° C. for 1 h (denoted as PCB-Flash-Calcination). Inset 3201 shows photographs of PCB-Flash and PCB-Flash-Calcination The PCB raw materials were also calcined as a control (denoted as PCB-Calcination, FIG. 32C).

Figure 32D:
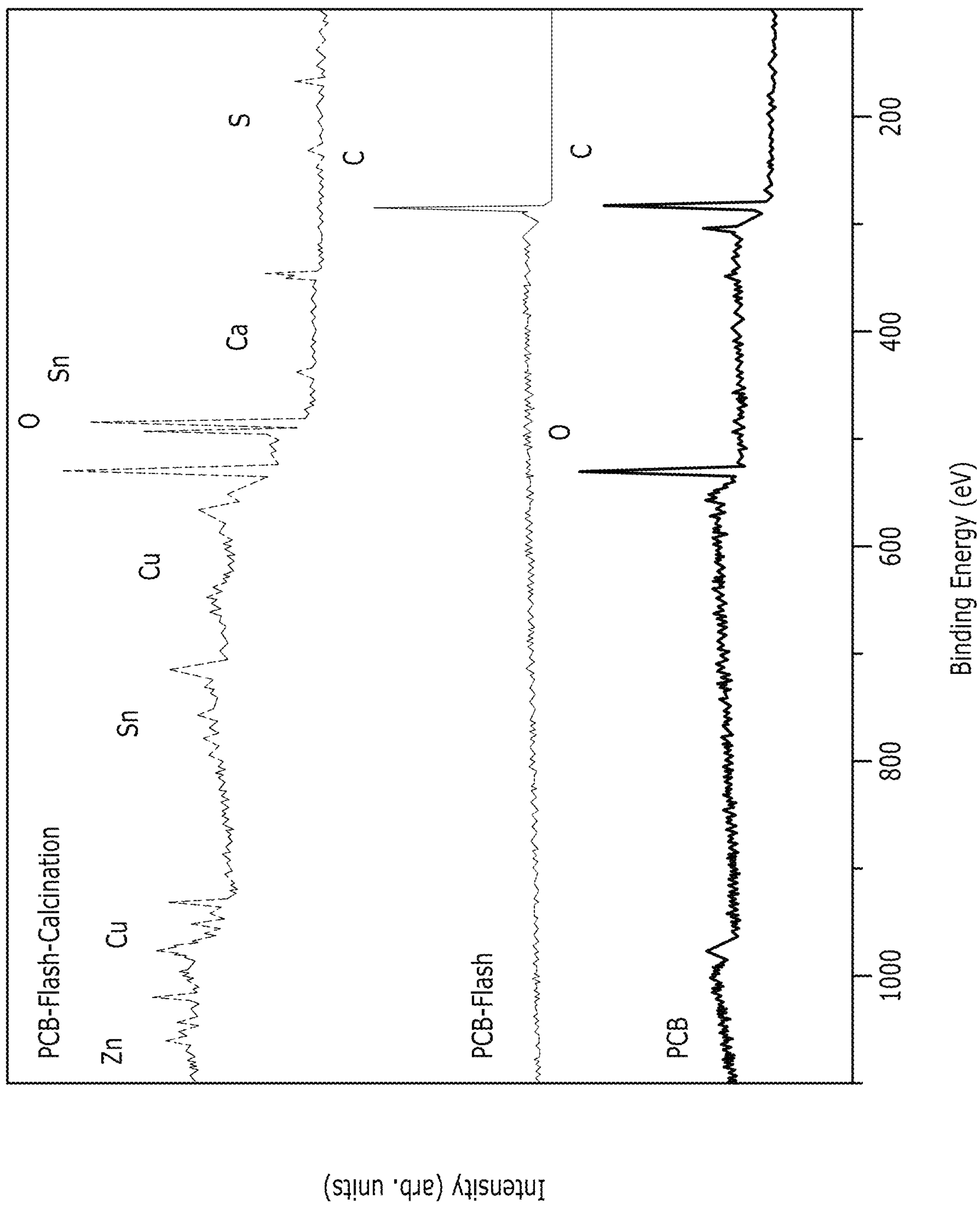
Figure 32E:
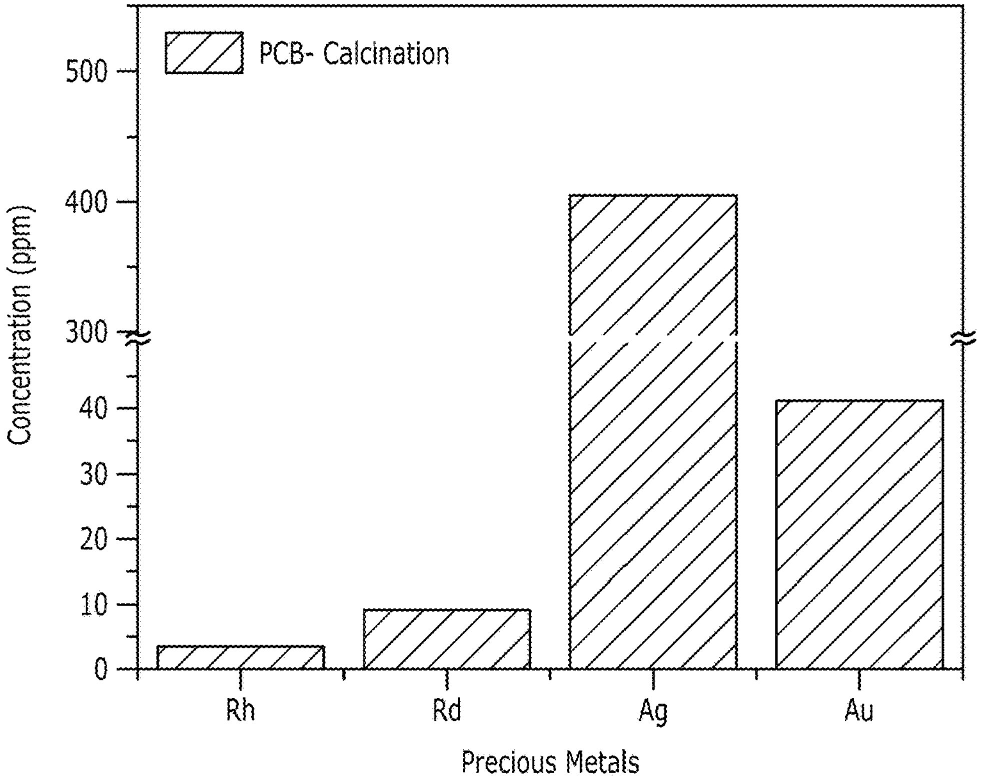
Figure 32F:
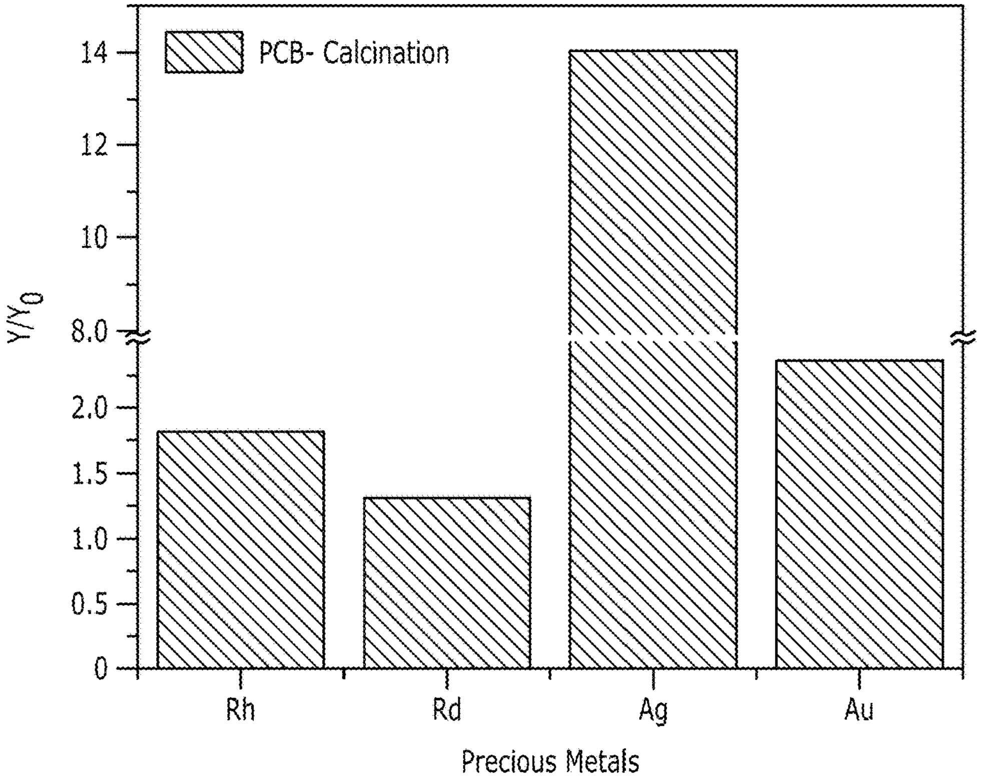
Figure 33D:
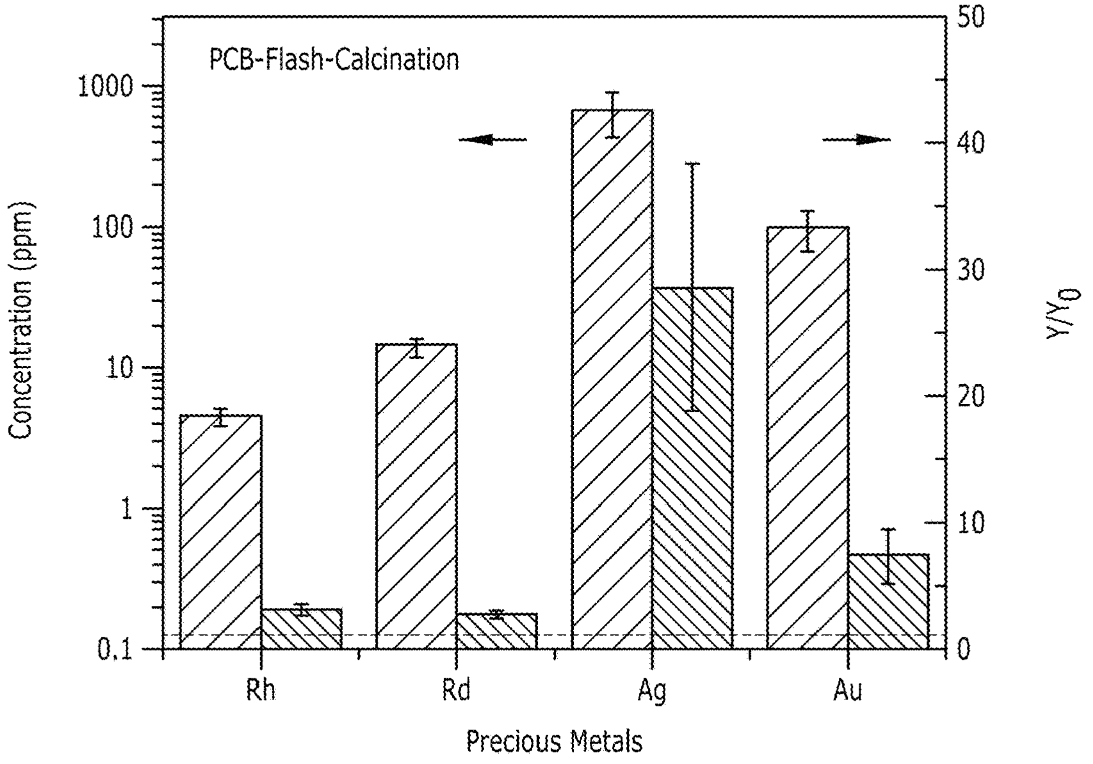

The XPS analysis showed the efficient removal of carbon by calcination (FIG. 32D). (In FIG. 32D, the XPS of PCB shows mostly C and some inorganic signals. The XPS of PCB-Flash shows mostly C signals, indicating that 0 was removed by the FJH process, and the inorganic element peaks are not detected, presumably because the inorganics were covered by carbon during the FJH process. The XPS of PCB-Flash-Calcination show abundant elemental signals, demonstrating the removal and exposure of inorganic materials). With the FJH and calcination process, the recovery yields of Rh, Pd, Ag, and Au were increased by 3.11±0.37, 2.64±0.39, 28.5±9.8, 7.24±2.22 times, respectively (FIG. 33D). (In FIG. 33D, $Y_0$ and Y mean the recovery yield by leaching PCB and PCB-Flash-Calcination, respectively. The dashed line denotes $Y/Y_0=1$. The error bars denote the standard deviation where n=3). The values are larger than those achieved with the calcination-only process (FIGS. 32E-32F).

Figure 34A:
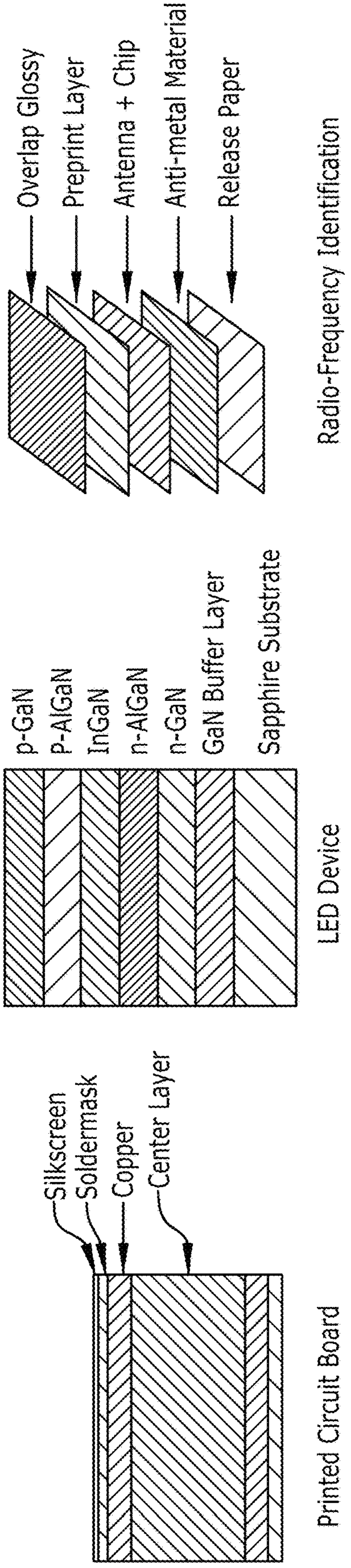
FIGS. 34A-34E shows mechanism of the improvement of leaching efficiency by flash Joule heating (FJH).
Figure 34B:
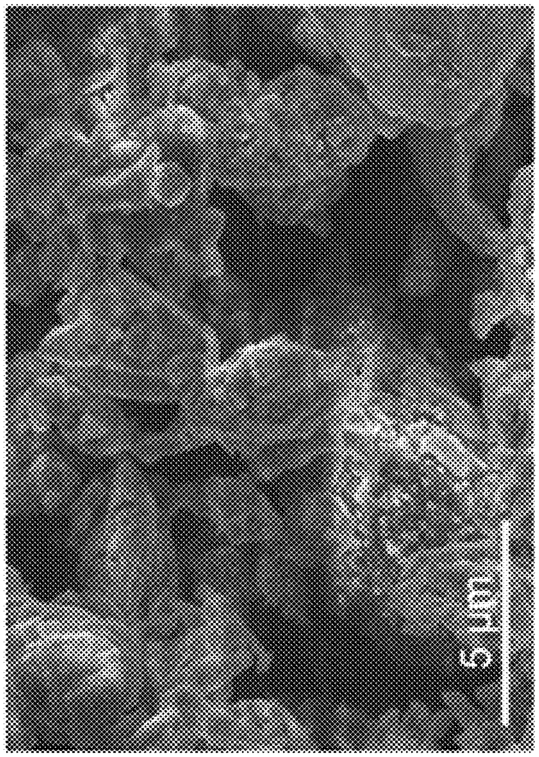
Figure 34C:
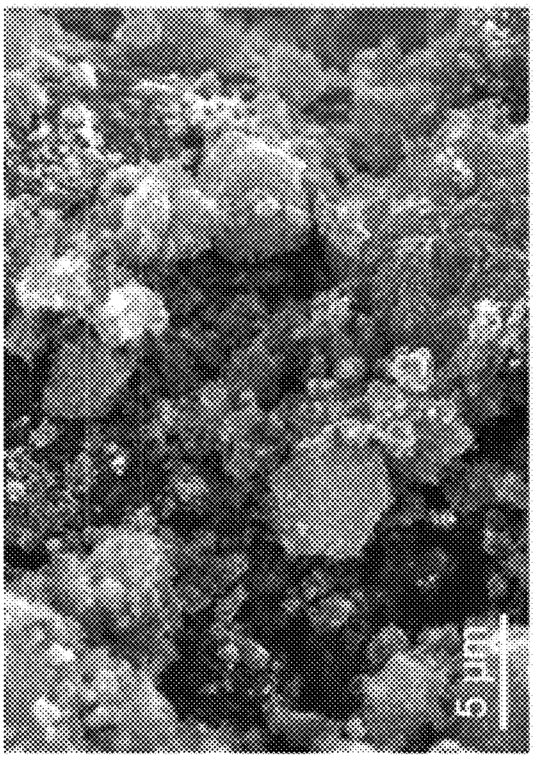
Figure 34D:
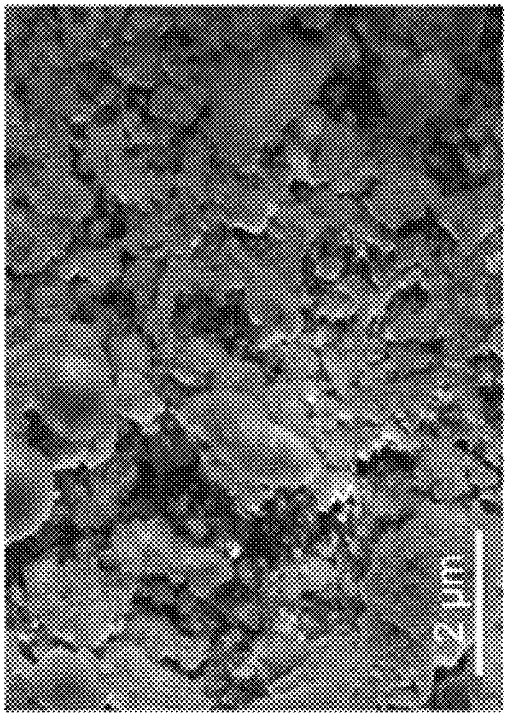
Figure 34E:
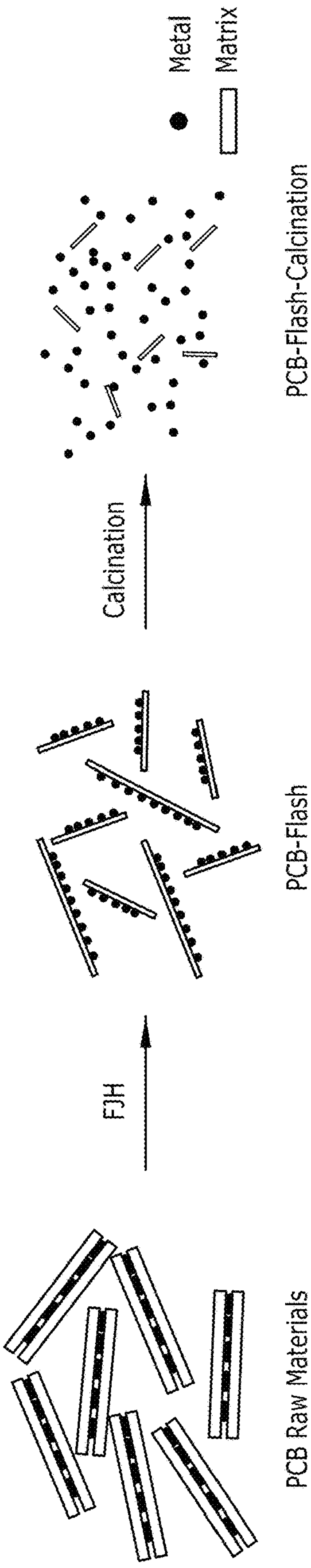

The mechanism of the improved leaching efficiency by FJH is shown in FIGS. 34A-34E. Modern electronics are fabricated and packaged by a planar process and have a laminated configuration, where the useful metals are embedded into polymer or ceramic matrices (FIG. 34A). [Sun Z 2017]. Even after the pulverization, the particle size was large ~5 μm (FIG. 34B). The laminated structure hinders the extraction of metals in a typical hydrochemistry process, resulting in elongated leaching times and low leaching efficiencies. [Sun Z 2017]. During the FJH process, the matrix was rendered as an ultrafine powder at the ultrahigh temperature (FIGS. 34C-34D), and the metals were exposed (FIG. 34E), which greatly accelerated the leaching rate and extent of metal extraction.

Figure 33E:
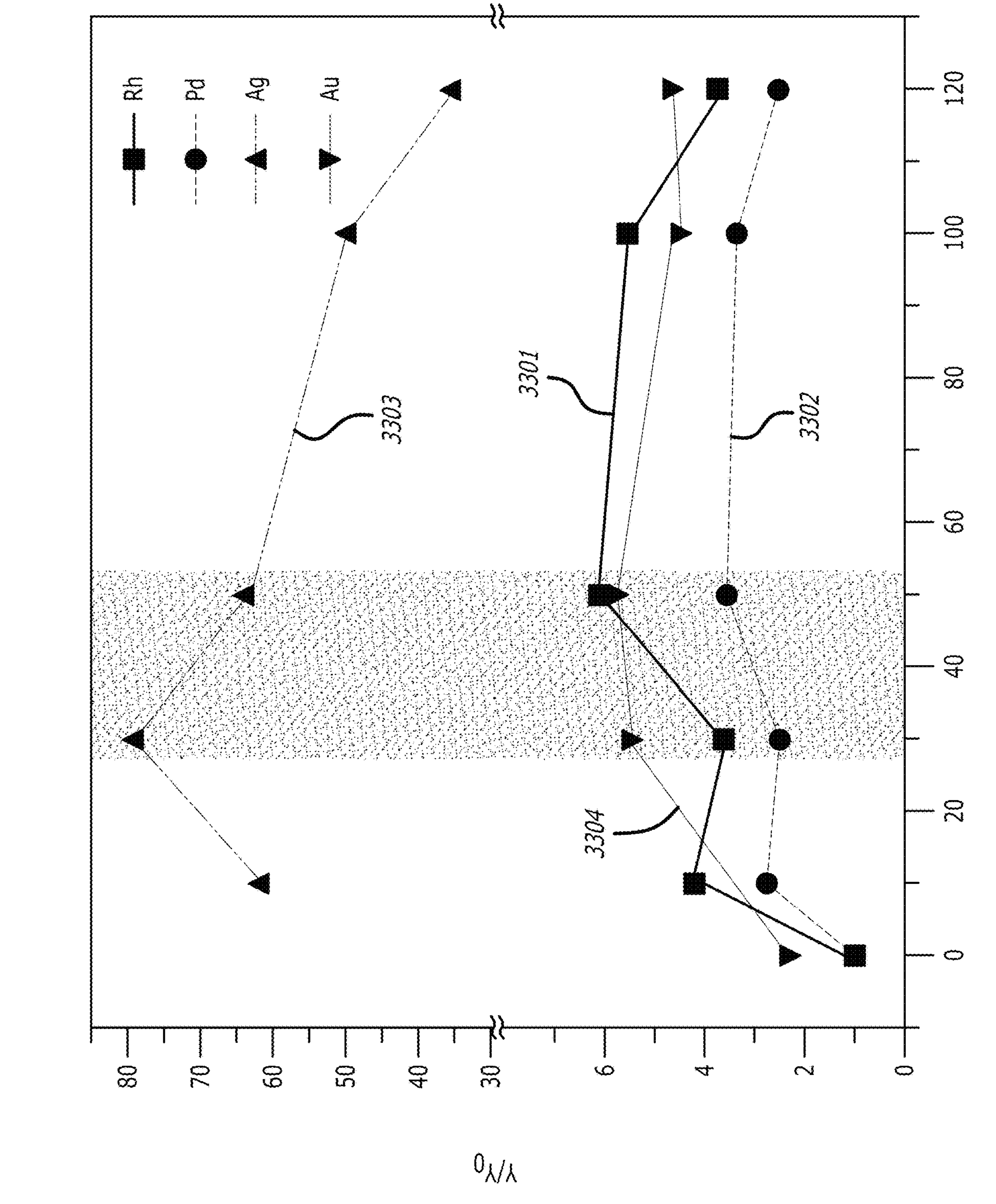
Figure 33F:
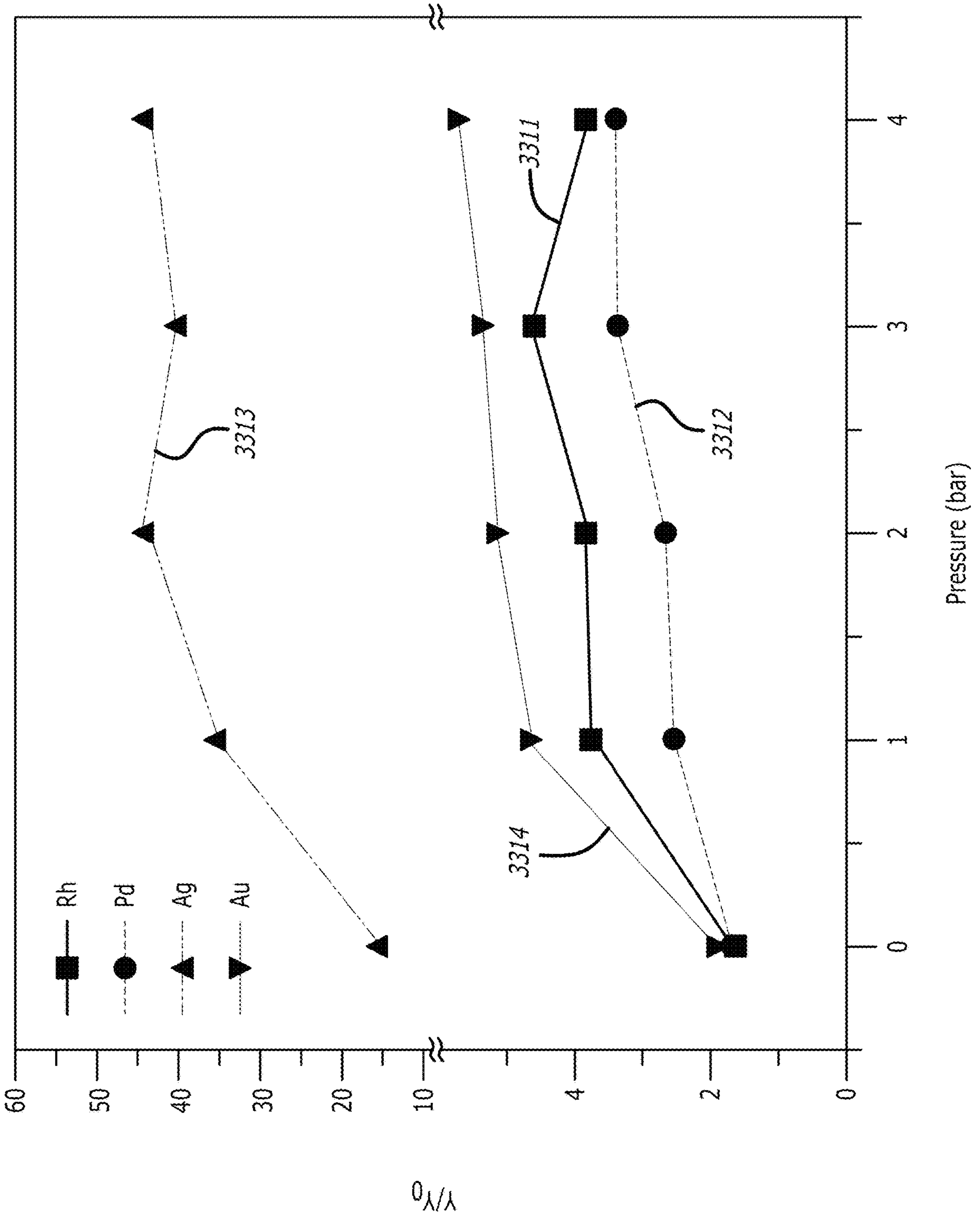

The effect of the FJH voltage and pressure on the recovery yield were evaluated. It was found that the modest FJH voltages between 30 to 50 V led to the best recovery yield (FIG. 33E, showing curves 3301-3304 for Rh, Pd, Ag, and Au, respectively, with the shaded region of FIG. 33E is the approximate optimal voltage for all metal recovery). Too low voltage did not provide enough energy to thermally decompose the matrix, while too high voltage presumably resulted in evaporative loss. It was found that a higher surrounding pressure was beneficial (FIG. 33F, showing curves 3311-3314 for Rh, Pd, Ag, and Au, respectively). This is because the volatile components were trapped in the residual solid, as projected by the gas flow simulations (FIG. 33B). The mild acid leaching condition (1 M HCl, 1 M $HNO_3$) used in the processes of the present invention are more cost-effective and environmentally friendly compared to other hydrometallurgical processes, which use the highly concentrated mineral acids such as aqua regia [Sun Z 2017; Park 2009], or toxic cyanides [Sethurajan 2019; Quinet 2005] as extractants for achieving a high recovery yield.

Removal and Collection of Toxic Heavy Metals

Figure 35A:
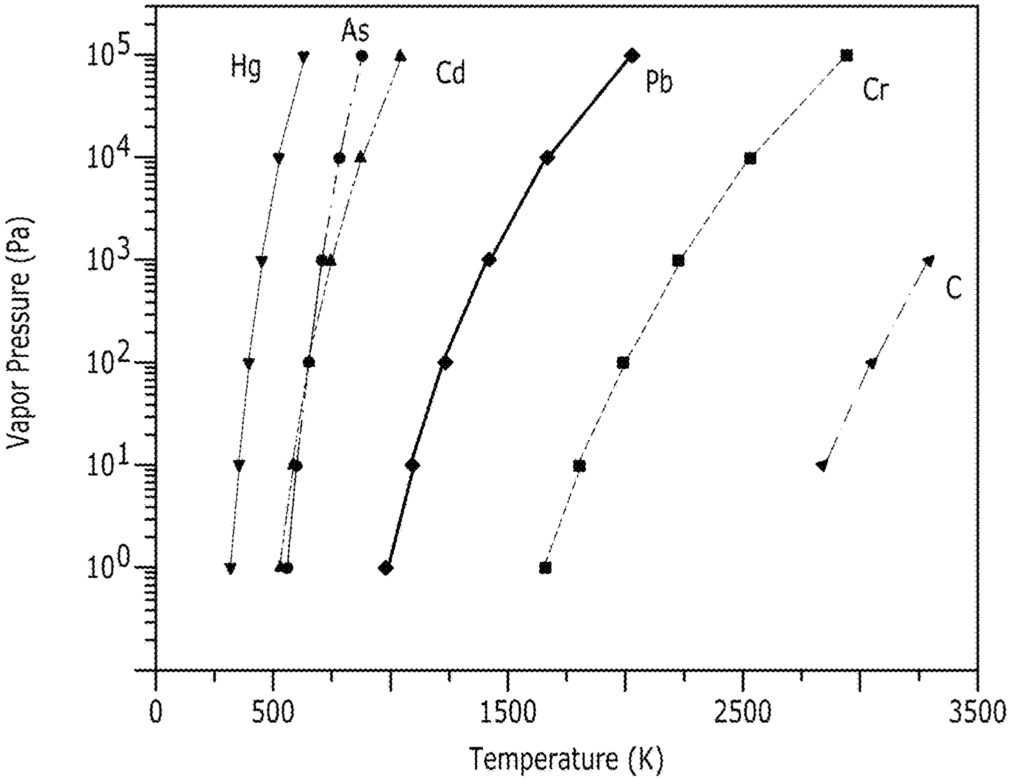
FIGS. 35A-35F shows removal of heavy metals in e-waste by flash Joule heating (FJH) process.
Figure 35B:
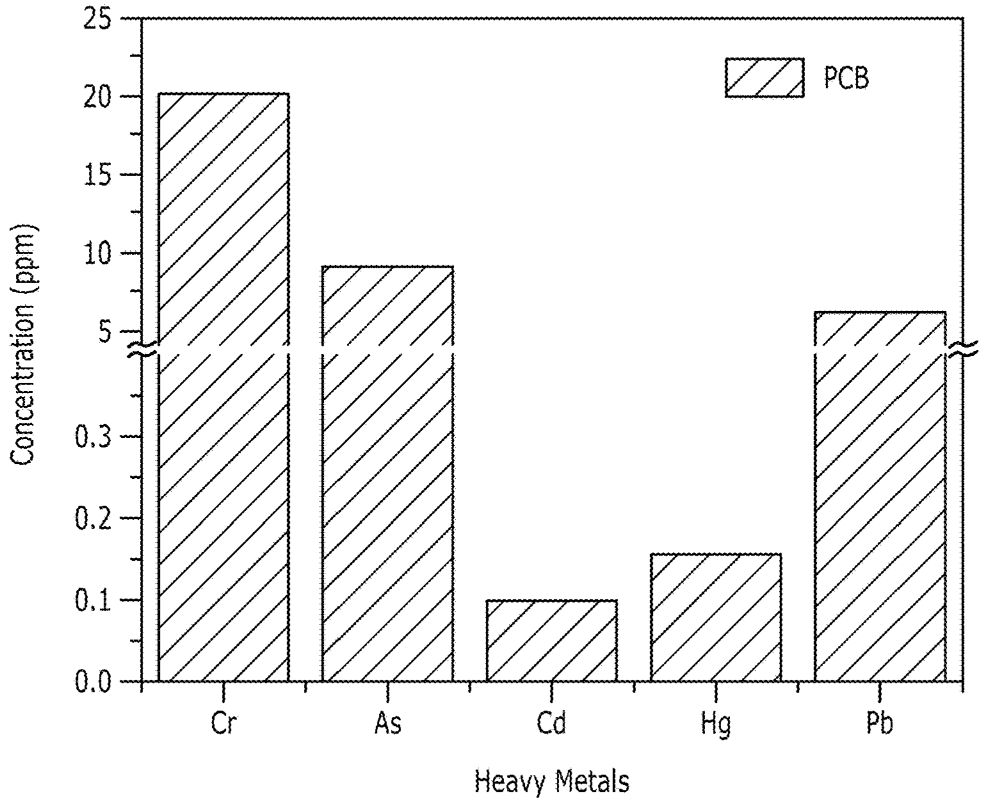

Removal of toxic components is another major concern for e-waste processing. [Ogunseitan 2009; Leung 2008; Julander 2014; Sun 2020]. The heavy metal removal capability of the FJH process was evaluated. Compared to precious metals, the heavy metals, including Cr, Pb, Cd, As, and Hg, have much higher vapor pressures and lower boiling points (FIG. 35A). Especially for the most toxic Cd, As, and Hg, the separation factors between them and precious metals could achieve ~$10^5$ based on the theoretical analysis. The levels of heavy metals in PCB waste are in the range of 0.1-20 ppm (FIG. 35B). These values are above the safe limits of heavy metals in soils for agriculture as recommended by the world health organization (WHO). [Kinuthia 2020].

Figure 35C:
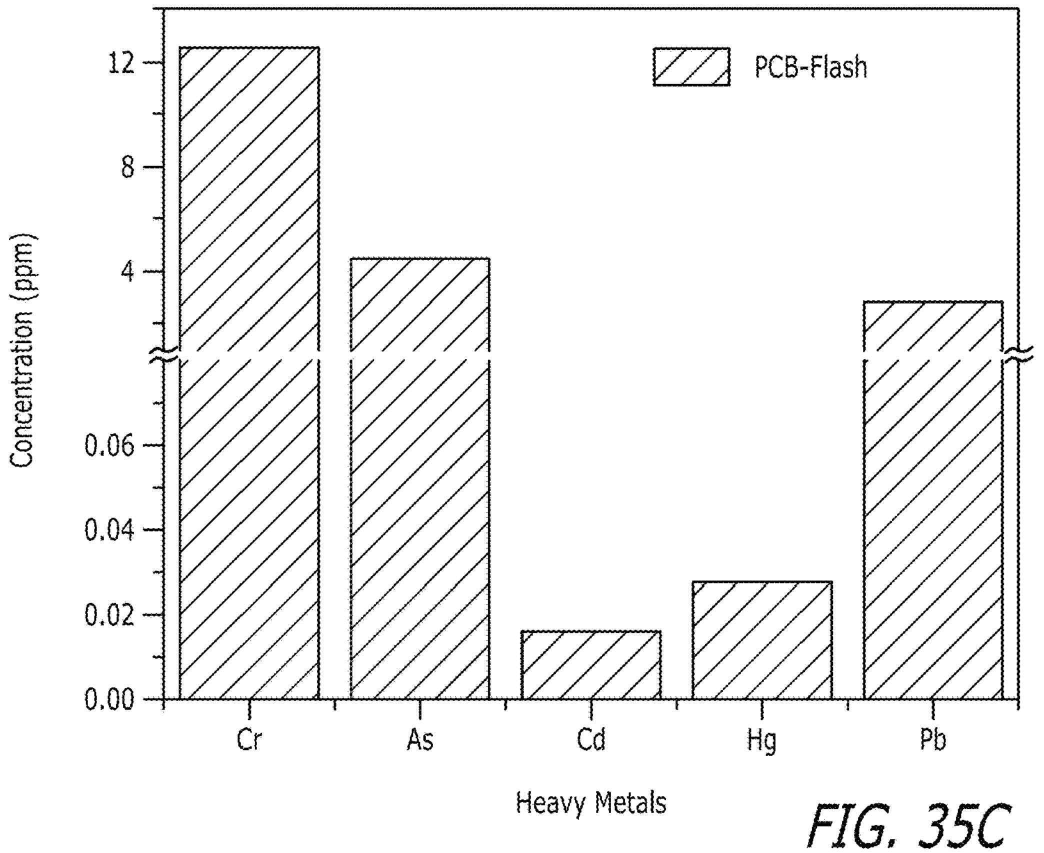
Figure 35D:
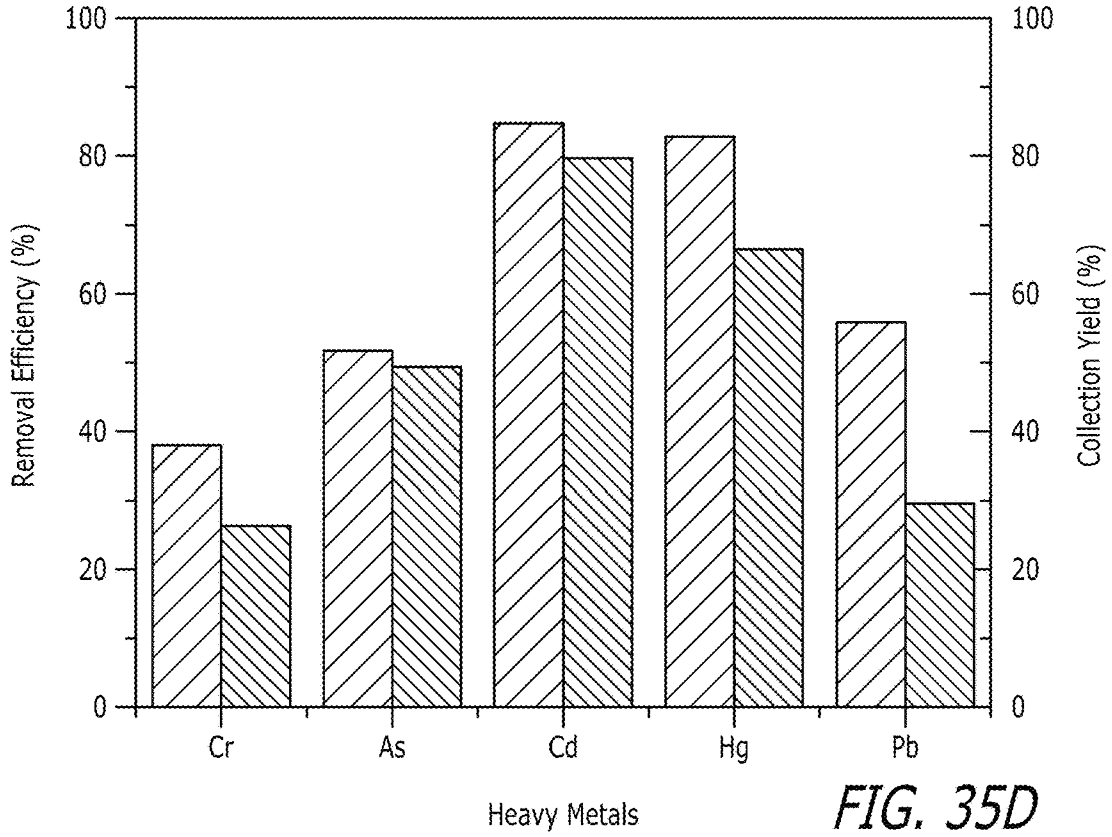

After one FJH, the heavy metal contents in the remaining solid (PCB-Flash) were greatly reduced (FIG. 35C). The removal efficiencies of Hg and Cd were calculated to be >80%, followed by Pb and As (>50%), and Cr (>35%) (FIG. 35D). These efficiencies were consistent with their vapor pressure values (FIG. 35A). The heavy metals were collected by condensation in the cold trap, as was done for the evaporative separation, and the collection yields were calculated (FIG. 35D). The collection yield matched well with the removal efficiency, demonstrating that most of the evaporated heavy metal was trapped by the cold trap, minimizing the leakage of heavy metals into the environment during the recycling process.

Figure 35E:
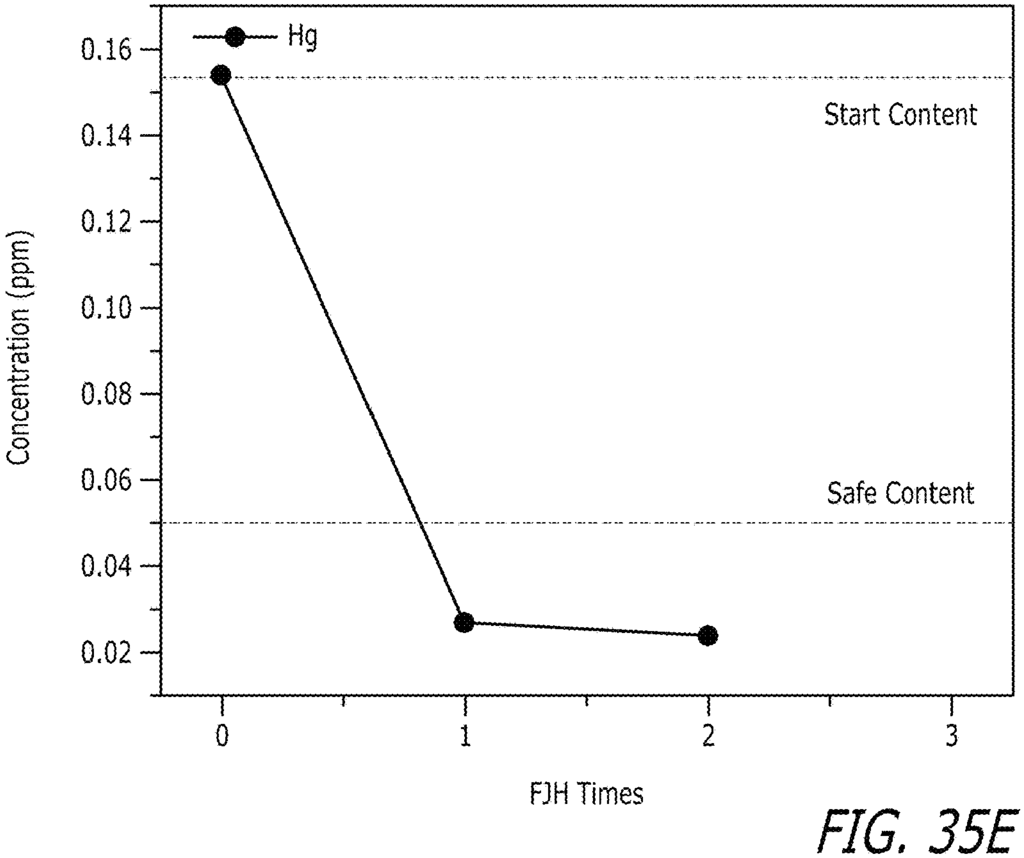
Figure 35F:
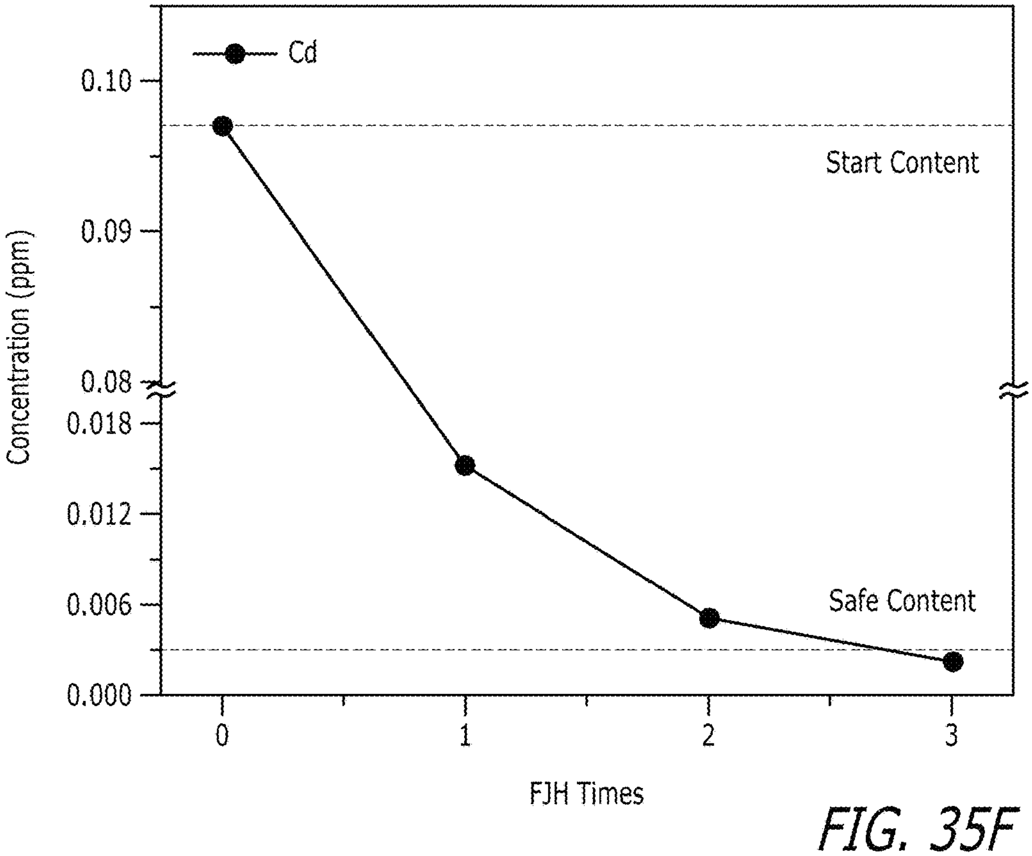
Figure 37A:
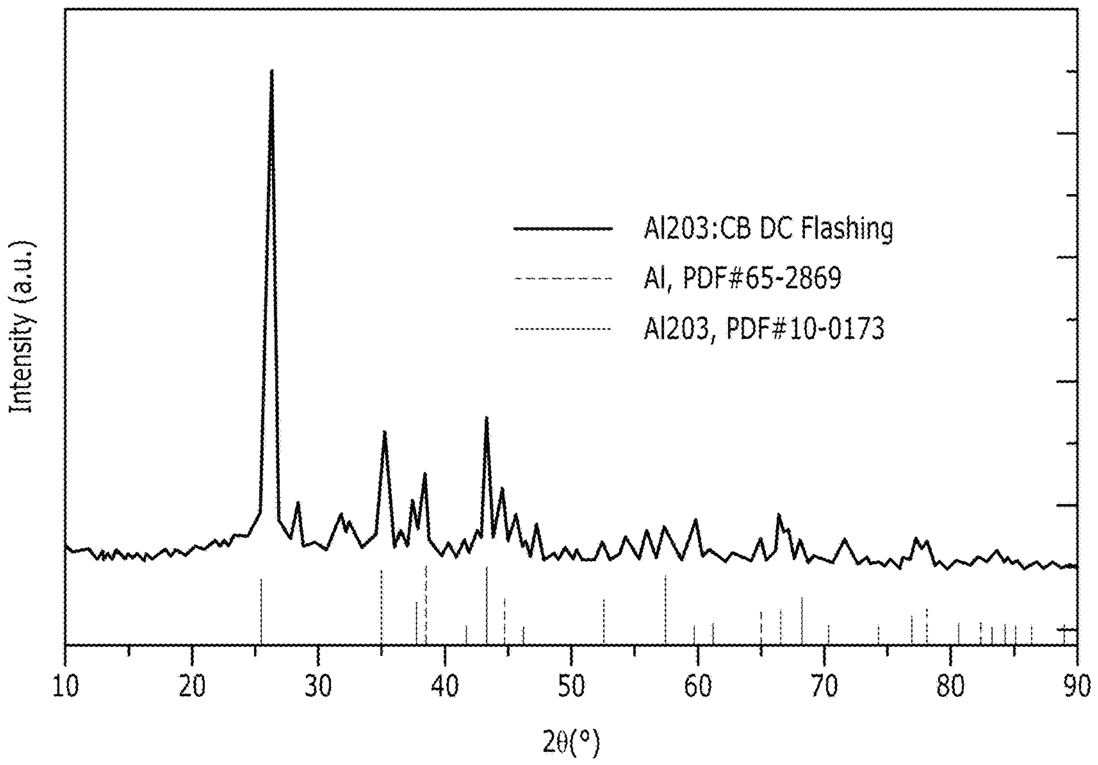
FIGS. 37A-37F show carbothermic reaction to recovery metal from metal oxide.
Figure 37B:
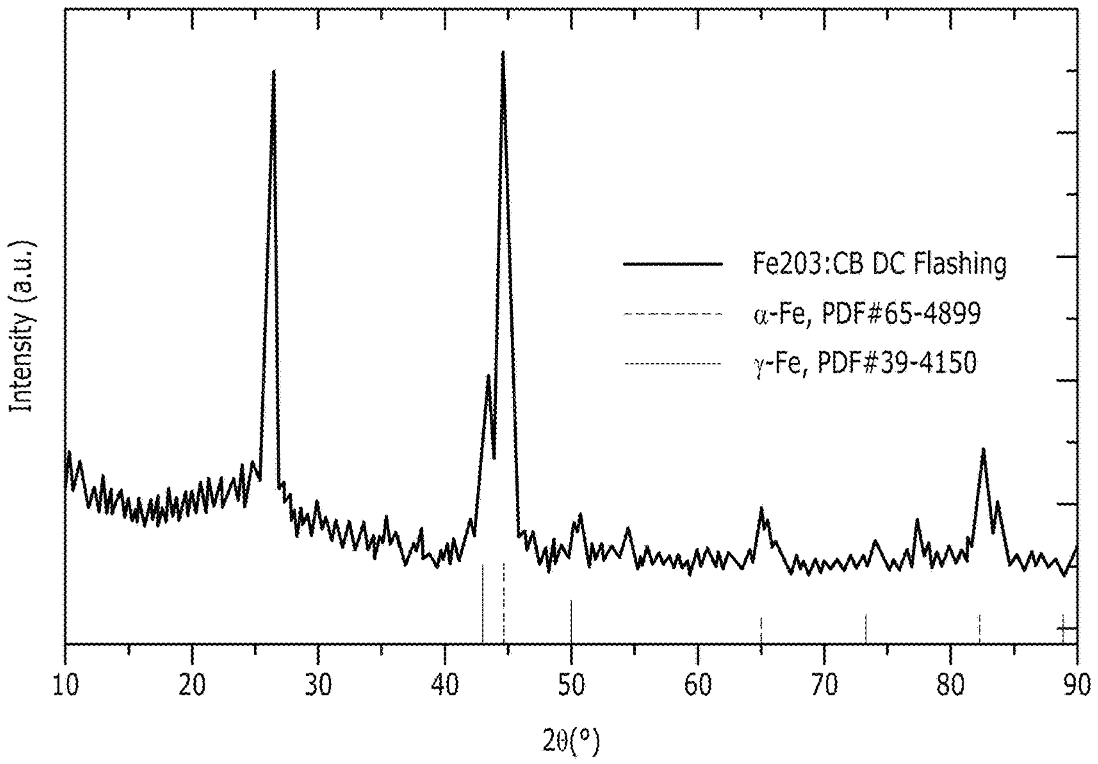
Figure 37C:
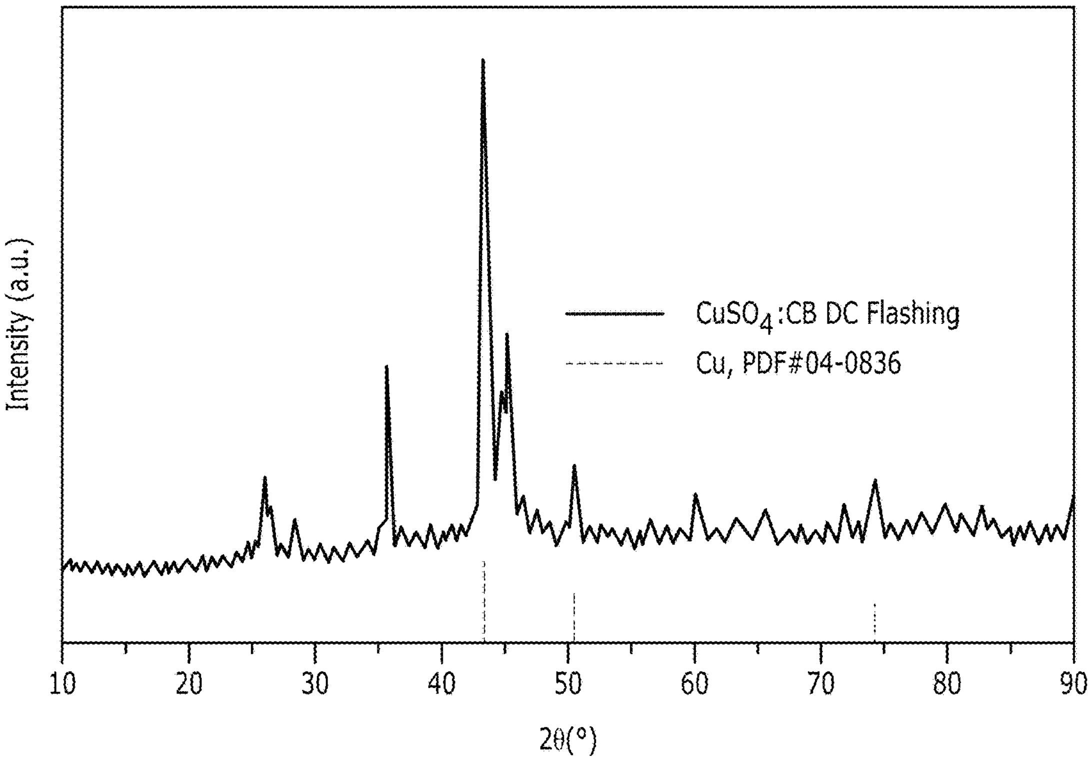
Figure 37D:
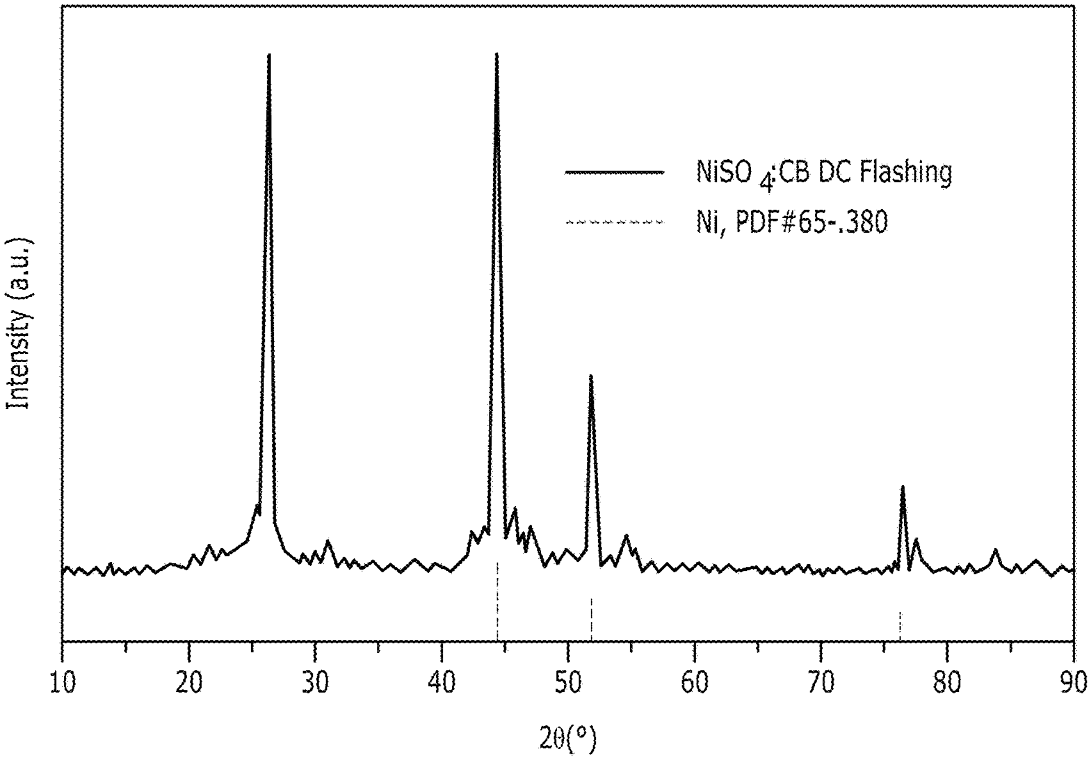
Figure 37E:
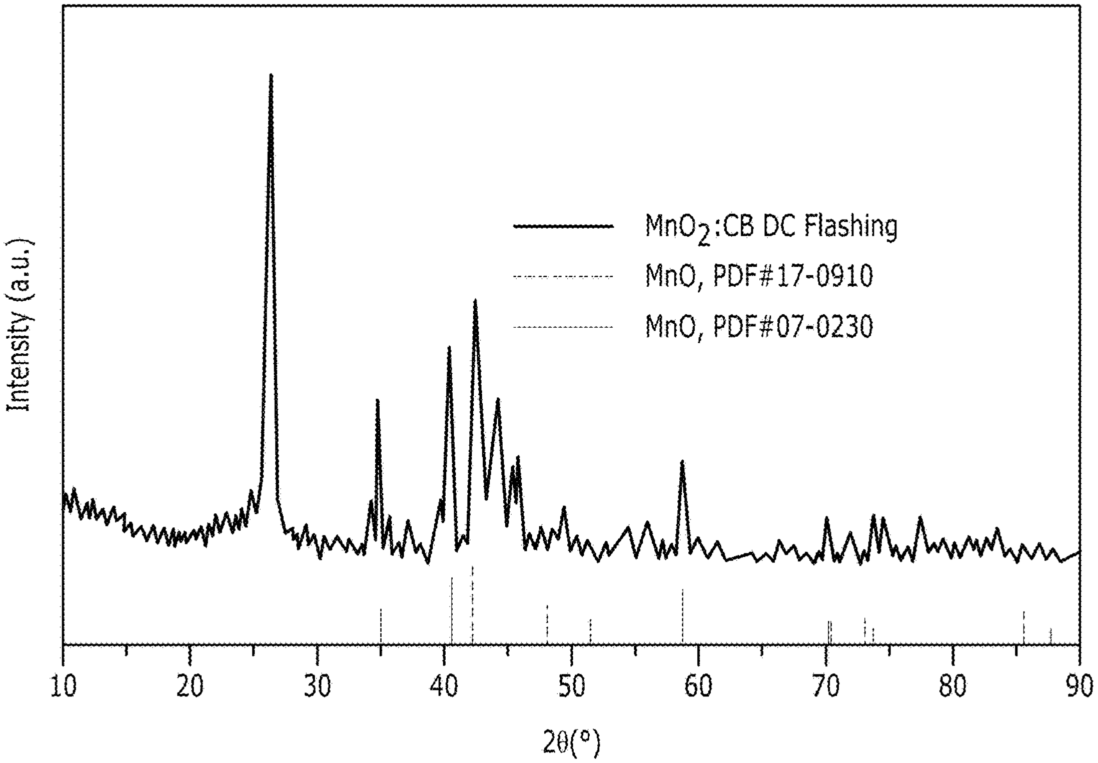
Figure 37F:
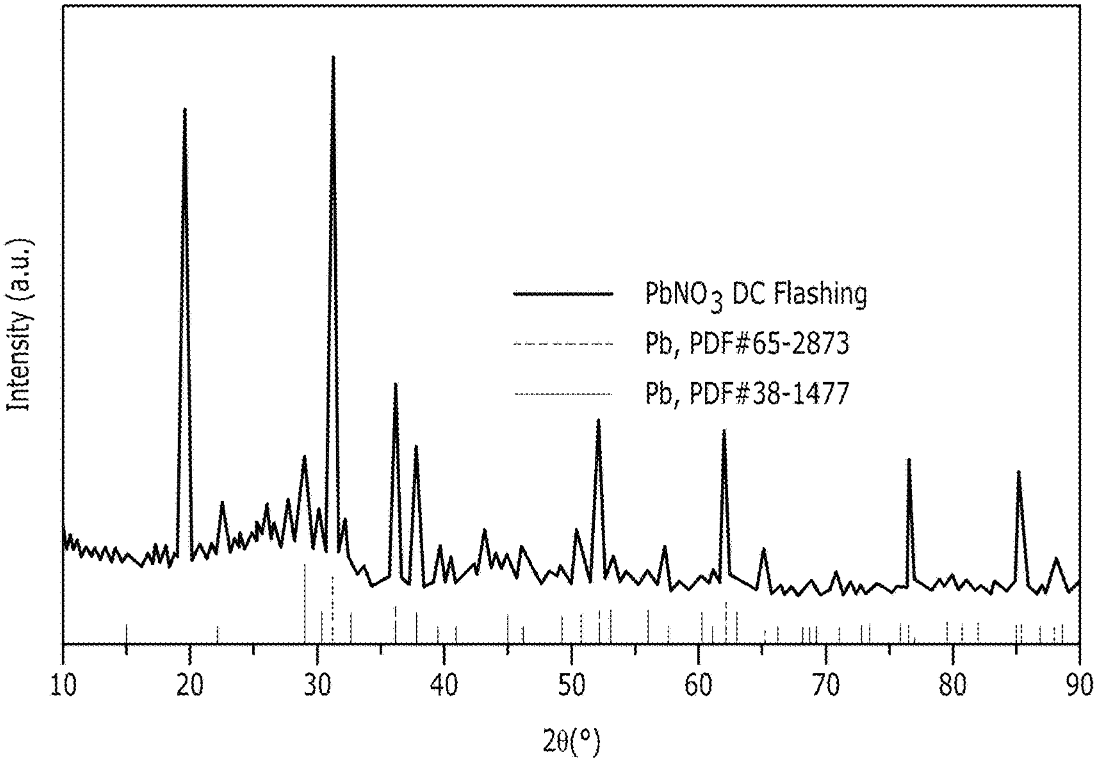

The concentration of heavy metals in the residue solids could be further reduced by multiple FJH reactions. After one FJH reaction, the concentration of Hg was reduced to below the safe limit of Hg in soils for agriculture (0.05 ppm) (FIG. 35E) [Kimuthia 2020], the highest standard for waste disposal. As for Cd, three consecutive FJH cycles reduced the concentration to below the safe limit (0.003 ppm) (FIG. 35F). [Kimuthia 2020]. The concentration of As, Pb, and Cr were all reduced with an increase in the number of FJH reactions. Since each FJH only takes 1 s, multiple flashes are easily accomplished.

Metal Separation

The above-described processes utilizing the evaporative separation scheme is discussed directed to the recovery of metals from e-waste. Nevertheless, such processes could exhibit the capability for the separation of metals. Calculation shows that large separation factors up to ~$10^5$ could be realized for most metals with large vapor pressure differences. The chart of FIG. 36 provides the theoretical separation factors of the evaporative separation process based on the vapor pressure difference. The factors represent practical values for trace metals separation from abundant metals. For the separation of abundant metals, the values should be corrected according to their activity in the alloy melt.

The different recovery yields of precious metals (FIG. 28) has been shown by the separation of the FJH process based on the vapor pressure difference. As shown in FIG. 28, without chemical additives, the recovery yields for the precious metals were Y(Rh)=4.0%, Y(Pd)=3.1%, Y(Ag)=38.0%, and Y(Au)=1.3%. These different recovery yield values demonstrate the separation ability of the FJH process. See TABLE VII below.

TABLE VII

Separation Factors Of Precious Metals

| | Rh | Pd | Ag | Au |
|---|---|---|---|---|
| Rh | 1 | 1.29 | 9.5 | 3.1 |
| Pd | 1.29 | 1 | 12.3 | 2.4 |
| Ag | 9.5 | 12.3 | 1 | 29.2 |
| Au | 3.1 | 2.4 | 29.2 | 1 |

The chemical additives (FIGS. 31A-31F) also regulated the precious metals separation presumably due to their different chemical reactivity. See TABLES VIII-X, below.

TABLE VIII

Separation Factors Of Precious Metals By Using NaCl Additives

| | Rh | Pd | Ag | Au |
|---|---|---|---|---|
| Rh | 1 | 1.44 | 3.0 | 840 |
| Pd | 1.44 | 1 | 4.33 | 58.3 |
| Ag | 3.0 | 4.33 | 1 | 253 |
| Au | 840 | 58.3 | 253 | 1 |

TABLE IX

Separation Factors Of Precious Metals By Using NaF Additives

| | Rh | Pd | Ag | Au |
|---|---|---|---|---|
| Rh | 1 | 1.52 | 1.8 | 146 |
| Pd | 1.52 | 1 | 1.19 | 96 |
| Ag | 1.8 | 1.19 | 1 | 81 |
| Au | 146 | 96 | 81 | 1 |

TABLE X

Separation Factors Of Precious Metals By Using NaI Additives

| | Rh | Pd | Ag | Au |
|---|---|---|---|---|
| Rh | 1 | 1.05 | 1.08 | 1.59 |
| Pd | 1.05 | 1 | 1.03 | 1.51 |
| Ag | 1.08 | 1.03 | 1 | 1.48 |
| Au | 1.59 | 1.51 | 1.48 | 1 |

The separation ability of the evaporative separation scheme could be further improved by progressively increasing the FRI temperature.

Carbothermic Reduction

The flash Joule heating process can also be used for carbothermic reduction of metal from oxide. Before recovery, various metal oxides were used that showed the availability to recovery metal by the flash Joule heating method. As shown in FIGS. 37A-37F, it was found that Al can be recovered from $Al_2O_3$, Fe can be recovered from $Fe_2O_3$, Cu can be recovered from $CuSO_4$, Ni can be recovered from $NiSO_4$, Mn can be recovered from $MnO_2$, Pb can be recovered from $PbNO_3$. During the flash Joule heating process, carbon from carbon black reduces the metal oxides and metal salts to the metal while oxidizing the carbon presumably to carbon dioxide and carbon monoxide.

In certain embodiment of the present invention, the process can include a mechanism used to trap the metals in waste. For example, the mechanism can use reduced pressure and have the volatilized metals, metal carbides, metal oxides, or other metal complexes volatilize out of the reaction chamber enter a cold trap upon flash Joule heating of the source. The cold trap can be, but need not be, liquid $N_2$. Even at room temperature, these can be collected in the trap.

Figure 38:
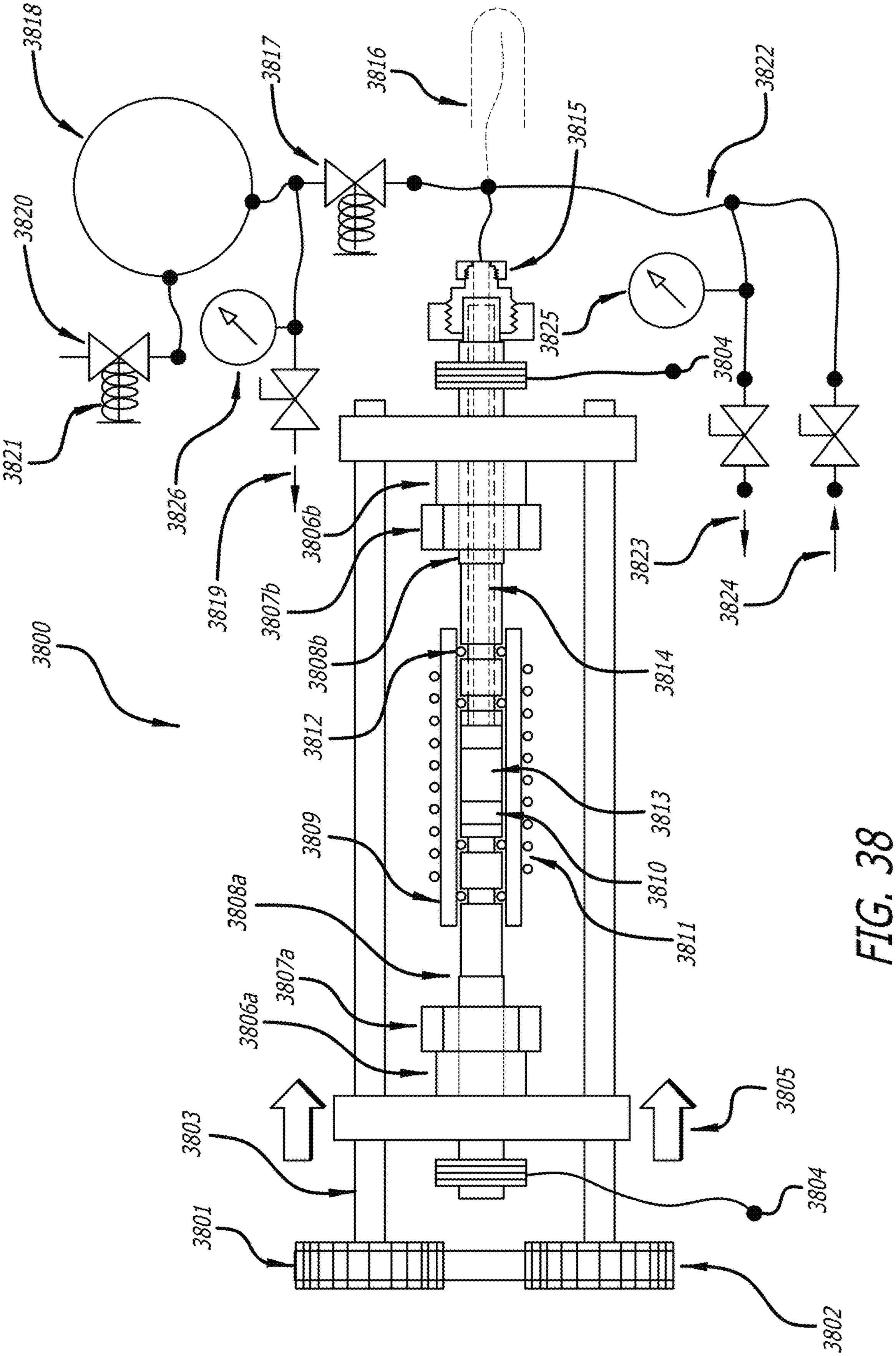
FIG. 38 is a schematic of a flash Joule heating pressure and gas collection system that can be used for embodiments of the present invention.

Further, for example, the mechanism can use atmospheric or higher pressure (such, as, for instance, 10 atmospheres or 20 atmospheres), and have the metals remain in with the newly formed graphene. The graphene can be calcined away (such as, for instance, at 700-800° C. in air), leaving the metals (or metal oxides, etc.) isolated. Or the graphene can be oxidized away chemically, like with $HNO_3$. For this latter mechanism, a pressure release valve can be used at the end of the electrode-hole assembly for the flash Joule heating process. Some of the metals being recovered have very high boiling points and they will stay with the carbon, especially at the higher pressures utilized Designs and Scalability FIG. 38 shows a flash joule heating pressure and gas collection system 3800 that can be used for embodiments of the present invention. System 3800 includes the following:

(a) Timing sprockets and belt 3801;
(b) Manual or motor drive 3802;
(c) Driver 3803 (such as twin screw drive);
(d) Power supply 3804 (such as AC or DC from flash power supply);
(e) Sample compression 3805;
(f) Nuts 3807*a*-3807*b* and soft spacers 3806*a*-3806*b;*
(g) Electrode 3808*a* (such as a solid brass electrode with thread) and electrode 3808*b* (such as a brass electrode with a thread and with a hole drilled);
(h) Tube 3809 (such as quartz tube);
(i) Cooper wool 3810;
Torsional spring compression 3811;
(k) Electrode 3812 (such as brass electrode with O-rings seals and axial bore);
(l) Sample 3813;
(m) Conduit 3814 (such as PTFE tube) inside electrode 3812;
(n) Pressure seal 3815 (such as with Swagelok reducing union);
(o) Particle collector 3816;
(p) Adjustable pressure relief value 3817;
(q) Gas collector 3818;
(r) Flow to vacuum or gas analysis 3819;
(s) Vent 3820;
(t) Safety relief valve 3821;

(u) Conduit 3822 (such as PFE tubing);

(v) Flow to vacuum 3823;

(w) Pressurized input from gas supply 3824; and (x) Pressure gauges 3825-3826.

System 3800 is a pressurizable flash Joule heating cell that has a gas collector 3818 should gas overpressure ensue. In some embodiments, system 3800 utilizes electrodes having 5⁄16 inches or 8 mm diameter. Conduits can have 1⁄8 inch outer diameter.

In system 3800, the two brass electrodes with O-ring grooves are inserted into the quartz tube that is tightly wrapped with a compression spring to put the quartz under compression and resist the outward force of the pressure. One electrode is hollow, with a PTFE tube inserted to provide a smooth and continuous exit path. A reducing Swagelok fitting provides a pressure and vacuum tight seal to the PTFE tube, which exits the electrode without a joint. System 3800 is capable of withstanding tens of atmospheres of pressure. Generally, with respect to pressure, the limiting factor is the quartz tube, and how well a strong spring can prevent breakage. The twin-screw supporting frame also should be sufficiently robust to resist the thrust when the sample is pressurized or when pressure is created by the flash. The quartz tube can be replaced by any non-conductive tube, and crosslinked polyethylene has also been used since the temperature reach on the tube is generally below 250° C. and generally for less than 1 second. While not shown in FIG. 38, a motor drive can be added and utilized. Furthermore, because the system is fully sealed, there is no need for an external vacuum chamber surrounding the flash assembly.

Rubber bushings between the nut and the support frame can be useful in absorbing the shock when short-duration flashes are used.

System 3800 can be sealed with O-rings. Silicon O-rings are heat resistant and even with overheating, do not melt but tend to harden, and should maintain a seal. Because no hot gases can typically flow past the O-rings, they do not overheat. While discoloration of the first O-ring has been observed, the double O-ring remained sealed.

System 3800 can be fully evacuated and would hold pressure following the flashing of the sample 3813 as the gases exited into a heavy wall glass pressure tube. In some embodiments, a right angle joint can be used so that the gas exhaust would not interfere with the end connections of the electrodes. However, if particulates or nanoparticles are ejected, a straight exit tube is generally preferred. System 3800 shows a straight and continuous conduit 3814 (PTFE exit tube), and the wires are connected with rings on threaded brass electrodes 3808*a*-3808*b*.

System 3800 uses of the twin-screw translation, which provides consistent alignment of the electrodes. It was found that for single-screw translators, when pressure or force is applied, the electrodes angle upward, which in turn had put strain on quartz tube 3809. The twin screws are connected by timing sprockets and a belt 3801 for simultaneous thrust, and can be driven either manually or with a stepper motor.

As for the vacuum and gas supply, the tubing that exits the end of the hollow electrode can be connected through valves to vacuum 3823, a gas supply 3824, and a pressure gauge 2925. The gas supply can be inert, or be used to infuse reagents into the sample like hydrogen, methane, or other reactive species like halocarbons, ammonia, boron compounds, etc. These can be added to the porous carbon/graphene in a subsequent flash.

The pressure relief can be preset for system 3800. Adjustable pressure relief valve 3817 determines the ultimate pressure on the sample 3813. The cell can be fully pressurized before the flash, or allow the flash to generate high pressure. The opening pressure is set by a spring and threaded cap on the valve, and when the pressure exceeds the set force of the spring, the valve opens and the gases enter the gas collector, which was evacuated previously. Subsequently, the gases can be analyzed, or just pumped away. Pressure gauge 3826 and the volume of gas collector 3818 provide information on the total yield of gases. Gas collector 3818 also has a pressure relief valve 3821 connected to a vent 3820 in case of excessive gas production.

As for the effect of wide range of pressures that can utilized by system 3800, with the sealed flash chamber and adjustable relief valve, the effect of a wide range of pressures on the yield of the flash has been evaluated. Because of the pressure, volatile additives can be incorporated in the sample and will not depart until the relief valve opens.

System 3800 can be utilized for a variety of particle/metal collection methods. For instance, when it is desirable to collect particulates, the PTFE tube can go straight (without bends) into particle collector 3816 (i.e., a test-tube impactor). This would be inside a larger evacuated vessel (not shown), and the momentum of the particles can cause them to stick to tube while the non-condensable gases can be pumped away. This can be used to collect volatile metals and metal compounds, which will aggregate as they cool and form nanoparticles that will adhere to particle collector 3816.

This design can be varied and modified as needed with materials changes and design changes depending upon the intended use.

The cost and benefit of the FJH processing were evaluated since economic incentives are the main driver for waste recycling. [Awasthi 2019]. FJH is a highly efficient heating process due to the ultrafast heating/cooling rate, the direct sample heating feature, and the short reaction duration, compared to traditional smelting furnaces where large amounts of energy are used to maintain the temperature of the whole chamber. [Khaliq 2014]. The FJH method has an energy consumption of ~939 kWh $ton^{-1}$, which is ~$\frac{1}{500}^{th}$ of that for a lab-scale tubular furnace, [Balaji 2020], and ~$\frac{1}{80}^{th}$ of that for a commercially used Kaldo furnace in industrial scale [Theo 1998]. Hence, the FJH process for e-waste processing have advantages over traditional pyrometallurgical processes.

Figure 39A:
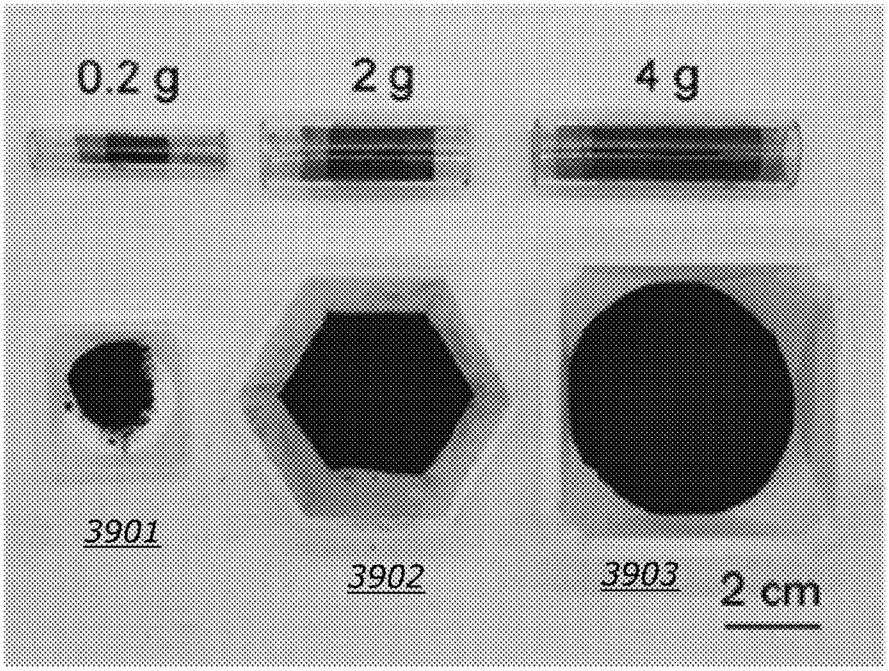
FIGS. 39A-39D show scaling up of the flash Joule heating (FJH) process.
Figure 39B:
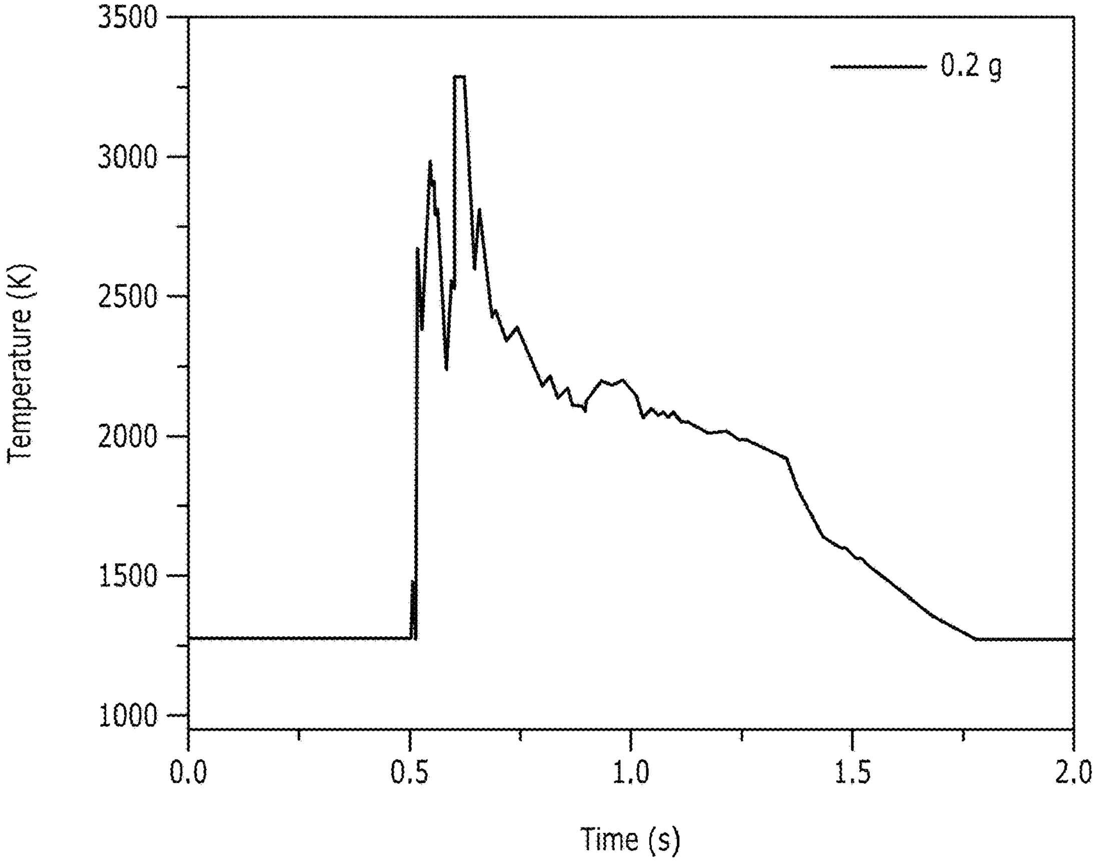
Figure 39C:
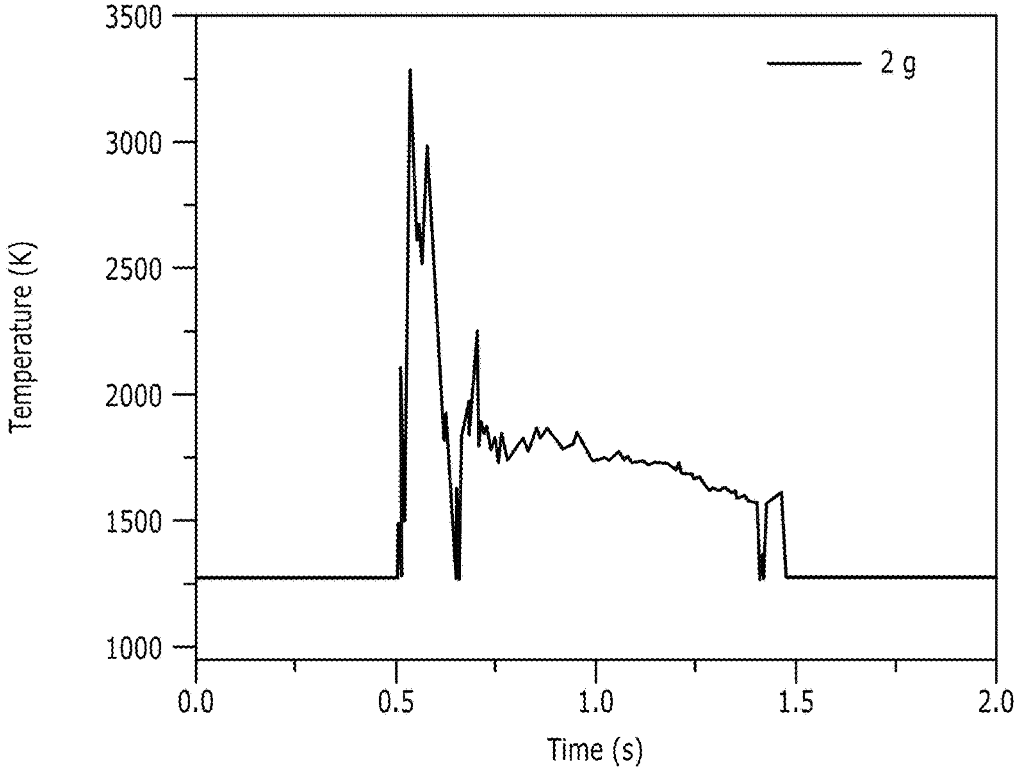
Figure 39D:
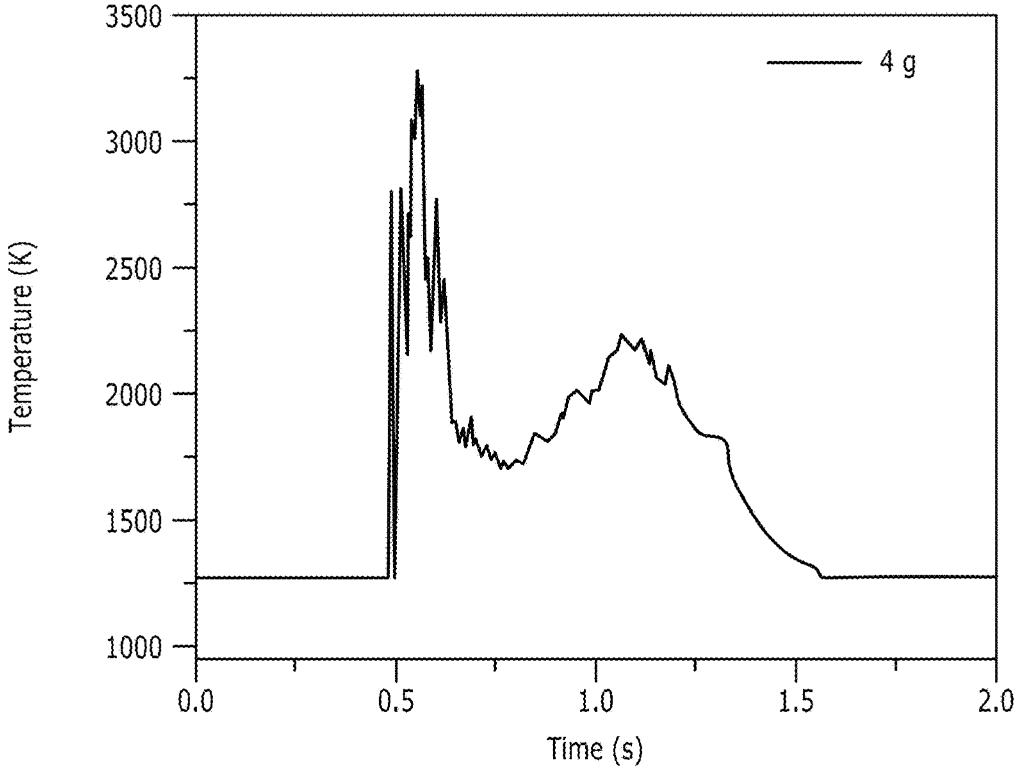

The FJH process is scalable. According to the analysis performed, the FJH voltage and/or the capacitance of the capacitor bank can be increased when scaling up the sample mass. FIGS. 39A-39D show scaling up of the flash Joule heating (FJH) process. FIG. 39A is a photograph of samples treated with the condition of $m_0$=0.2 g, $V_0$=150 V, and $C_0$=0.06 F (sample 3901), $m_1$=2 g, $V_1$=150 V, and $C_1$=0.6 F (sample 3902), $m_2$=4 g, $V_2$=300 V, and $C_2$=0.6 F (sample 3903). FIGS. 39B-30D are realtime temperature curves for samples 3901-3903, respectively.

Figure 40A:
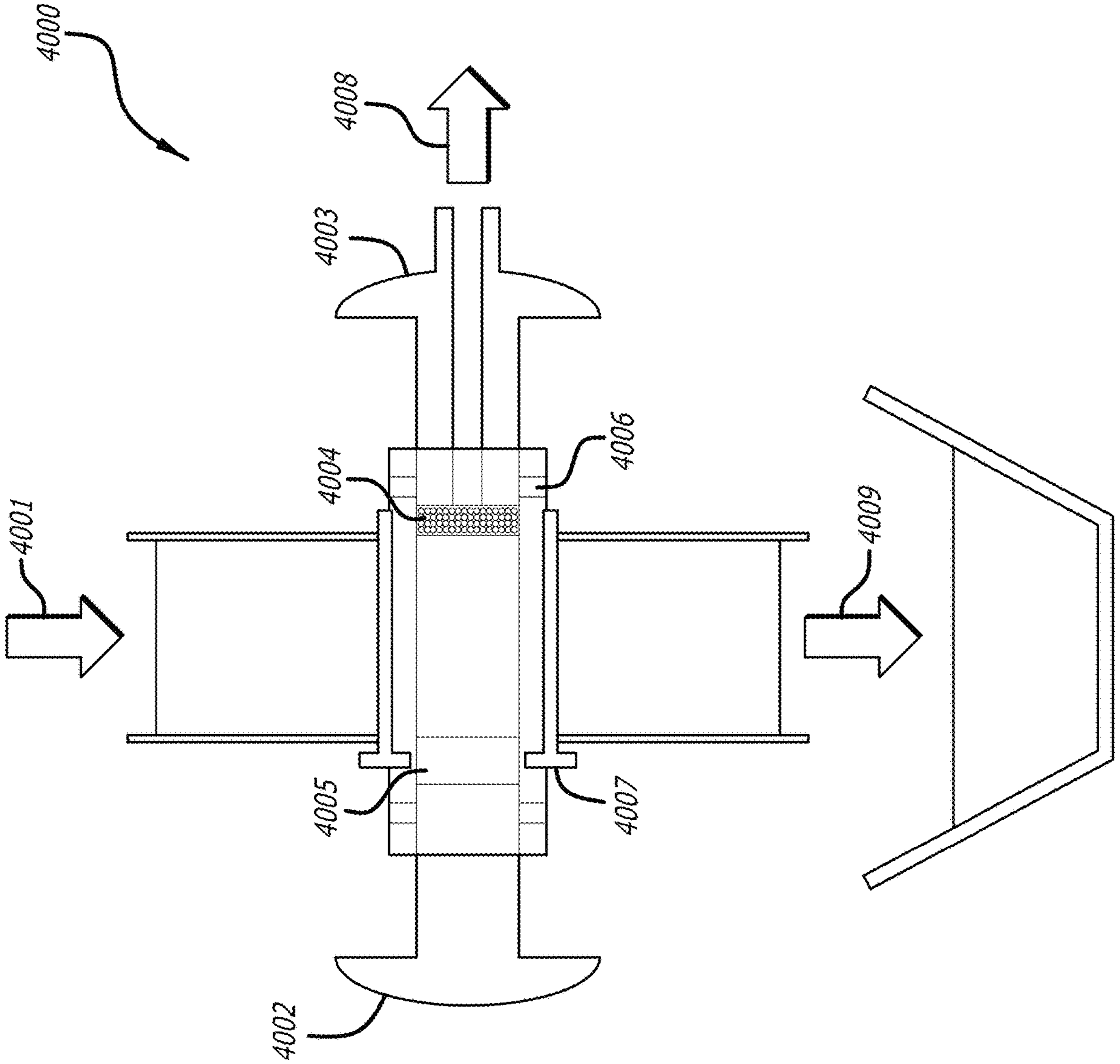
FIGS. 40A-40B are schemes of continuous flash Joule heating (FJH) reactors.

FIG. 40A is a scheme of a continuous flash Joule heating (FJH) reactor 4000 having a continuous feed 4001 (such a e-waste and carbon black), Cu electrodes 4002-4003 (with Cu electrode having a hole), porous electrode 4004, graphite electrode 4005, O-ring 4006, and baffle 4007. The volatile components can go to collection system 3108 for collection using a cooling trap, and the non-volatile components can be collected in collector 4009.

Figure 40B:
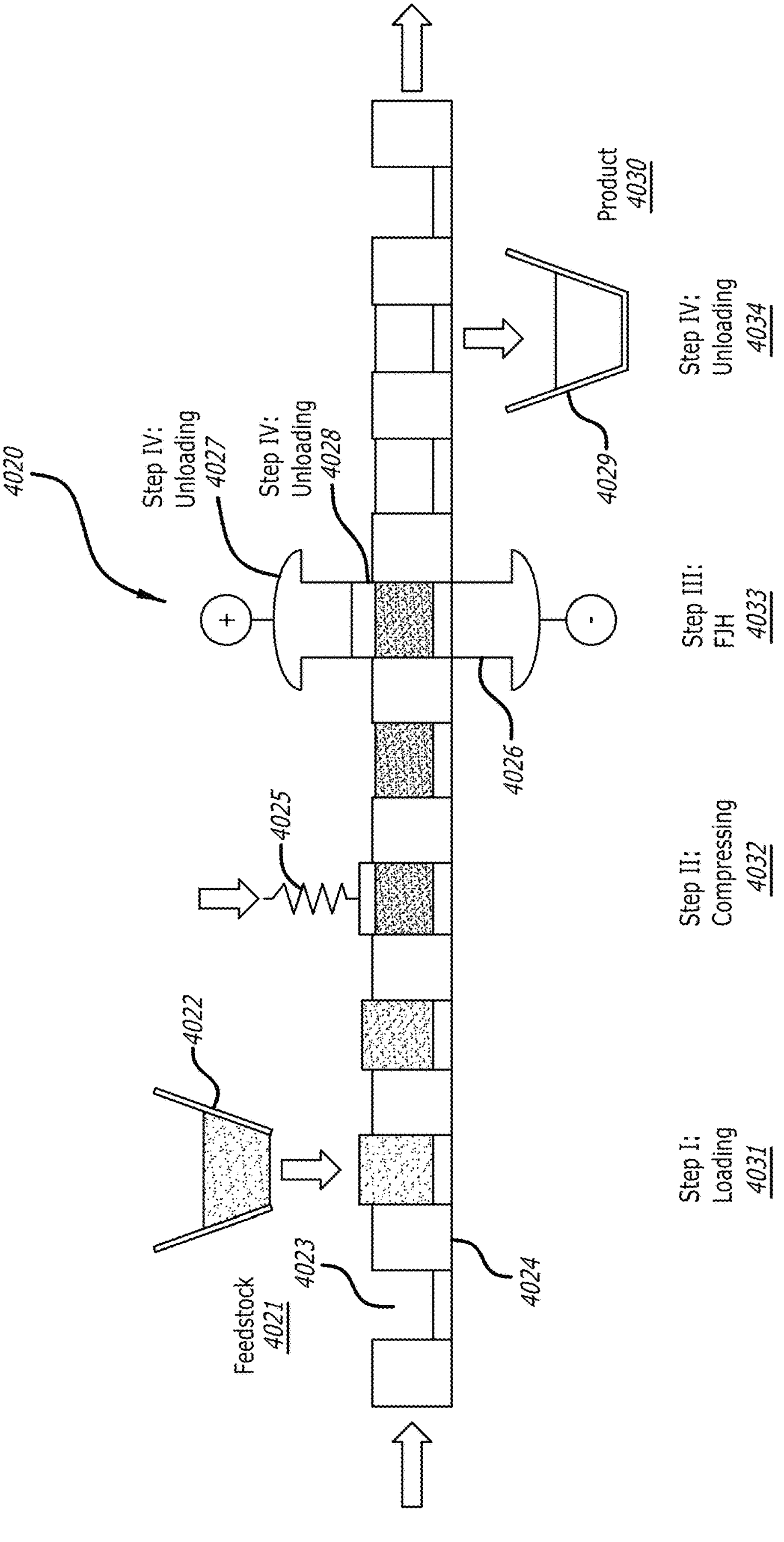

FIG. 40B is is a scheme of a continuous flash Joule heating (FJH) reactor 4020 having continuous feed of feedstock 4021 (such as e-waste and carbon black) that flows from bin 4022. In step 4031, feedstock 4021 is loaded onto the chamber 4023 of conveyor belt 4024. In step 4032, feedstock 4021 in chamber 4023 is compressed (using compressor 4025) to a predetermined resistance. In step 4033, the feedstock 4021 then undergoes the FJH reaction using the FJH system 4026 having Cu electrode 4027 and graphite electrodes 4028. In step 4034, the product 4034 is then unloaded in collector 4029.

While the schemes of FIGS. 40A-40B are described with relation to feedstock of e-waste and carbon block, these can be utilized for other materials utilized in FJH reaction.

Through the use of an automation system integrated with a FJH setup, a production rate of >10 kg $day^{-1}$ has already been realized.

Accordingly, for the metal recovery from e-waste, the present invention provides, among other things, (i) the flash Joule heating is a dry process without usage of any solvent, which endows it as environmentally friendly; (ii) the flash Joule heating can recover most of metal elements in waste in one step, which is hard to realize by other methods; (iii) the flash Joule heating process also removes nearly all the harmful materials in waste, so it will not result in secondary pollution; and (iv) the flash Joule heating process uses far less electrical energy than a furnace since the heating durations are short and the is little energy that escapes the sample being flash Joule heated.

The precious metals recovered from e-waste, are very important raw materials for various industry. Indeed, mixtures of metals like this are quite valuable since many mining companies already implement automated systems that do the base metal separations.

Moreover, the recovery process removes the harmful materials such as heavy metal within the waste, which has import for solving the environmental issues raised by those waste.

Ores, Fly Ash, and Bauxite Residue (Red Mud)

Similar situations to e-waste likewise pertains to ores, fly ash, and red mud (red mud is more recently referred to as bauxite residue), again because rare earth elements (REE) are strategic resources in modern electronics, clean energy, and automotive industries. Thus, the above-described methods and systems can likewise be implemented for the recovery of metals from ores, fly ash, and bauxite residue (red mud).

Embodiments of the present invention include the ultrafast electrothermal process based on flash Joule heating (FJH) to activate the ores, fly ash, and red mud to improve the acid extractability of REE simply using a mild acid such as 0.1 M HCl. A pulsed voltage in seconds brings the raw materials to a temperature of 3000° C., leading to the thermal decomposition of the hard-to-dissolve REE phosphates in CFA into highly soluble REE oxides, and the carbothermic reduction of REE components to highly reactive REE metals. The activation process can enable the increase of REE recovery yields to ~206% for class F-type CFA (CFA-F) and ~187% for class C-type CFA (CFA-C) compared to directly leaching the raw materials with more concentrated acids. The activation strategy is feasible for various secondary wastes, as demonstrated by coal fly ash (CFA) and red mud (bauxite residue (BR)). The rapid FJH process is scalable and highly energy-efficient with a low electrical energy consumption of (such as 600 kWh $ton^{-1}$ or \$12 $ton^{-1}$) enabling a profit percentage of greater than 10 times.

FJH System and Process

Figure 41A:
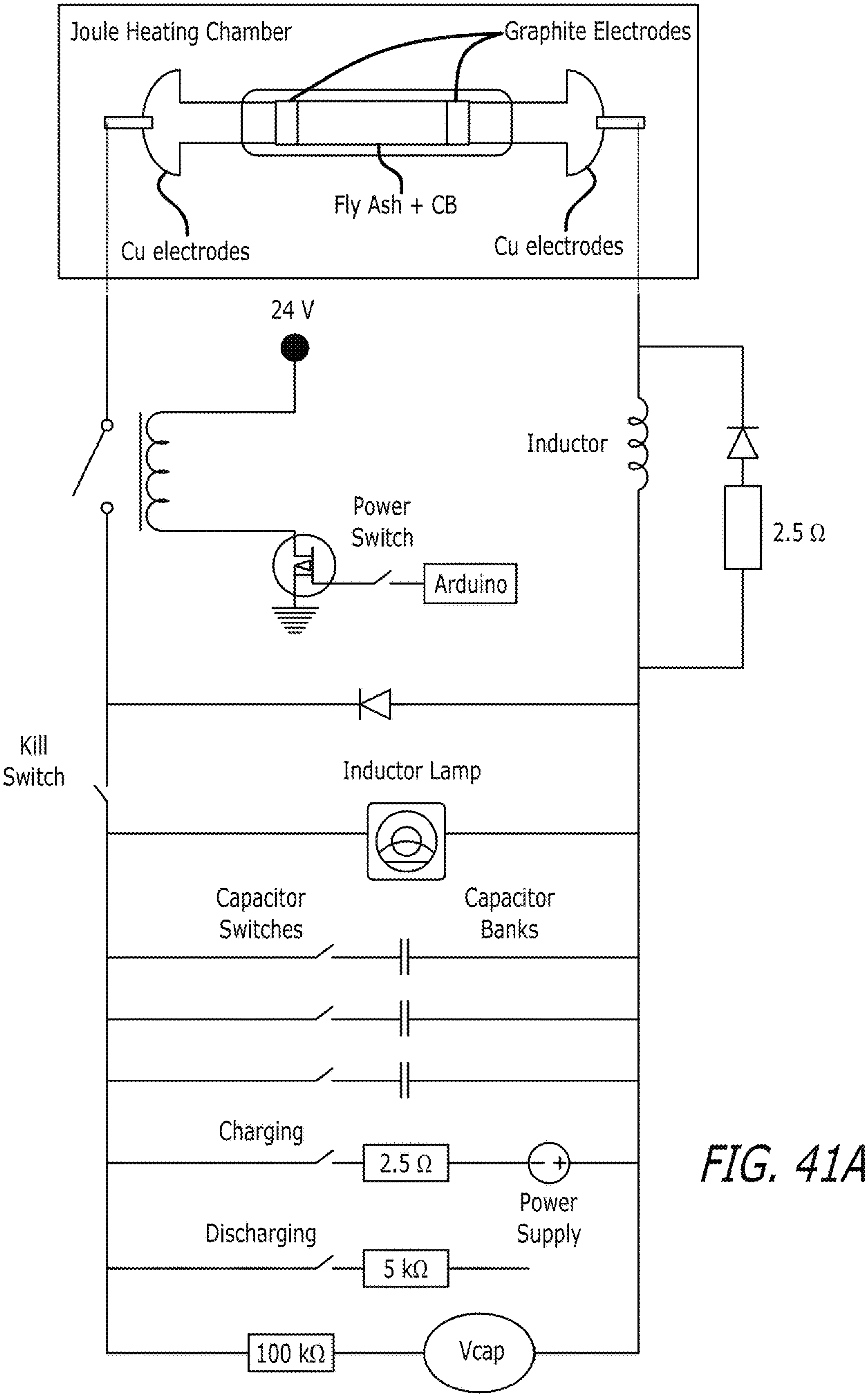
FIGS. 41A-41C shows a FJH system used for fly ash.

The FJH system that can be utilized is similar to those described and discussed above. For instance, an electrical diagram of the FJH system that can be utilized for fly ash is shown in FIG. 41A (which is similar to previously described FJH systems, such as shown in FIGS. 6A, 13A, and 30 above).

Figure 41B:
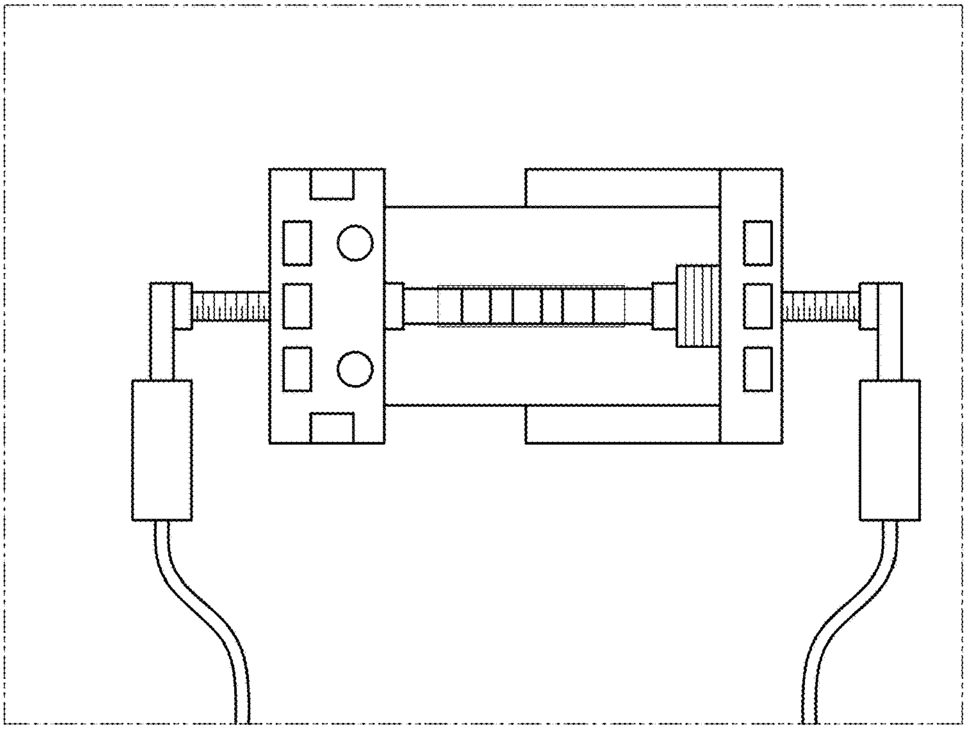
Figure 41C:
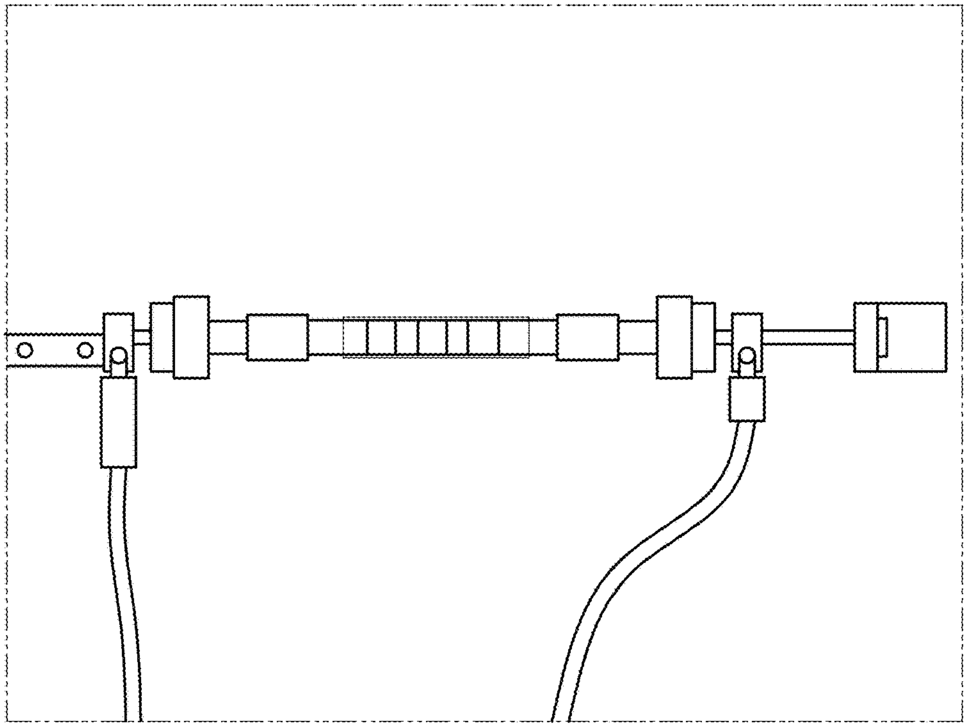

In a typical experiment, the secondary wastes (CFA, BR) were mixed with carbon black with the mass ratio (such as 2:1) by using the ball miller (MSEsupplies, PWV1-0.4L). The carbon black served as the conductive additive. 200-mg mixture (133 mg waste and 67 mg CB) was added into a quartz tube (inner diameter of 8 mm and outer diameter of 12 mm). The resistance was controlled by compressing the two electrodes. The samples were loaded into a jig (FIGS. 41B-41C), and the electrodes were connected to the capacitor bank. In such embodiments, 10 aluminum electrolytic capacitors (450 V, 6 mF, Mouser #80-80-PEH200YX460BQU2) were used for charging, and the capacitor bank with a total capacitance of 60 mF was charged by a direct current (DC) supply. A relay with programmable ms-level relay was used to control the discharging time. TABLE XI reflects from detailed parameters of some secondary wastes that were utilized. After the FJH, the samples were rapidly cooled to room temperature.

TABLE XI

FJH Parameters For Activation of Secondary Wastes

| Precursors | Mass Ratio | Mass (mg) | Resistance (Ω) | Voltage (V) | Time (s) | Mass after FJH (mg) |
|---|---|---|---|---|---|---|
| CFA-F:CB | 2:1 | 200 | 1.0 | 50 | 1 | 190 |
| CFA-F:CB | 2:1 | 200 | 1.0 | 80 | 1 | 138 |
| CFA-F:CB | 2:1 | 200 | 1.0 | 100 | 1 | 115 |
| CFA-F: CB | 2:1 | 200 | 1.0 | 120 | 1 | 157 |
| CFA-F:CB | 2:1 | 200 | 1.0 | 150 | 1 | 88 |
| CFA-C:CB | 2:1 | 200 | 1.0 | 120 | 1 | 182 |
| BR:CB | 2:1 | 200 | 1.2 | 50 | 1 | 190 |
| BR:CB | 2:1 | 200 | 1.2 | 80 | 1 | 174 |
| BR:CB | 2:1 | 200 | 1.2 | 100 | 1 | 162 |
| BR:CB | 2:1 | 200 | 1.2 | 120 | 1 | 159 |
| BR:CB | 2:1 | 200 | 1.2 | 150 | 1 | 152 |
| *PCB:CB | 2:1 | 200 | 1.0 | 50 | 1 | 162 |
| *PCB:CB | 2:1 | 200 | 2.0 | 100 | 1 | 185 |
| *PCB:CB | 2:1 | 200 | 2.0 | 120 | 1 | 98 |

*The results on the printed circuit boards are shown as a comparison of this method being used on e-waste.

Acid-Extractable REE Content In CFA

Figure 42:
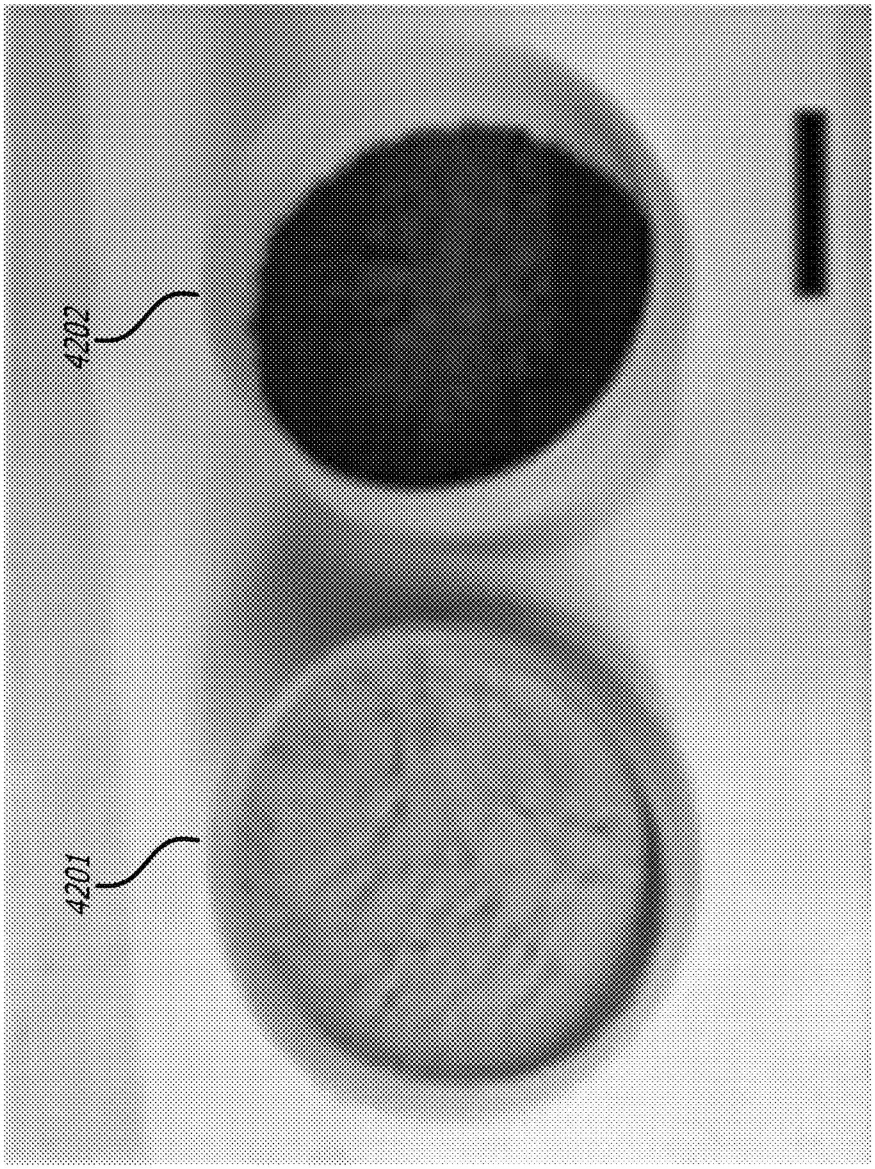
FIG. 42 is a photograph of CFA-C and CFA-F. The scale bar is 4 cm.

There are two types of CFA categorized by the chemical composition, CFA-F, with the total content of $SiO_2$, $Al_2O_3$, and $Fe_2O_3$>70 wt %, and CFA-C, with a higher abundance of CaO. [Liu 2019]. In examples evaluated herein, CFA-F was collected from the Appalachian Basin (App), and CFA-C from the Powder River Basin (PRB) [Taggart 2016], both in the US. FIG. 42 is a photograph of CFA-C 4201 and CFA-F 4202 (scale bar, 4 cm).

Figure 43A:
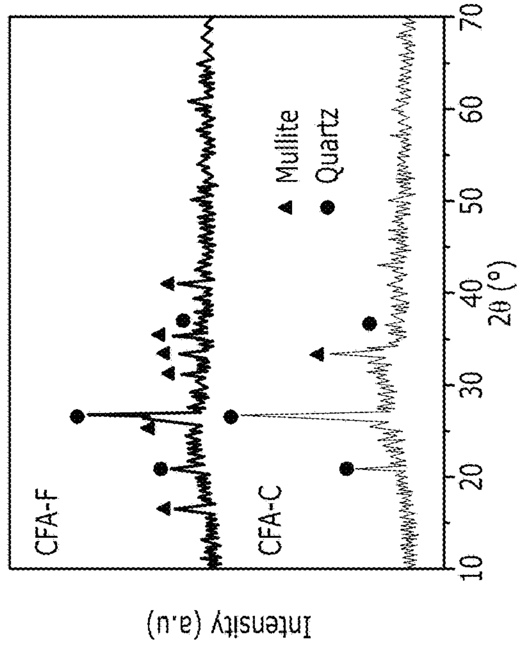
FIGS. 43A-43G show acid-extractable REE content in CFA.
Figure 43B:
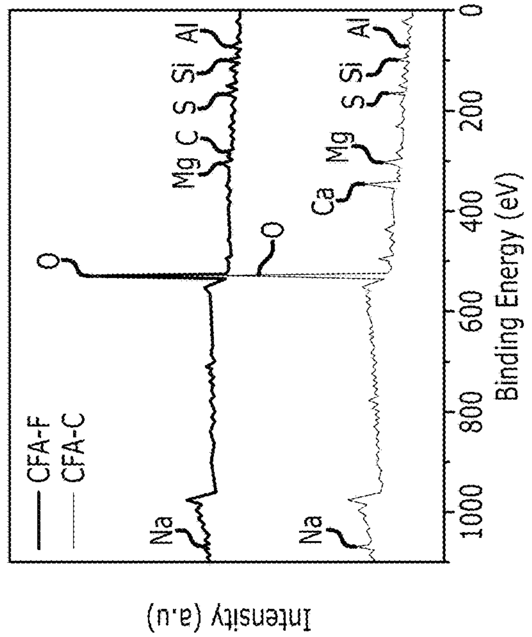

CFA is composed of primary amorphous phases (60-90%) [Zhang 2020], and the remaining crystalline materials include mainly quartz and mullite, as shown by the X-ray diffraction patterns (XRD). FIG. 43A. In addition to the enrichment of Ca in CFA-C, the elemental analysis by X-ray photoelectron spectroscopy (XPS) (FIG. 43B) and energy-dispersive X-ray spectroscopy (EDS) show a high C content in CFA-F, which was may have been caused by the incomplete combustion of coal feeds. The high C content in CFA-F was also evident by the large weight loss at ~700° C. by thermal gravimetric analysis (TGA).

Figure 43C:
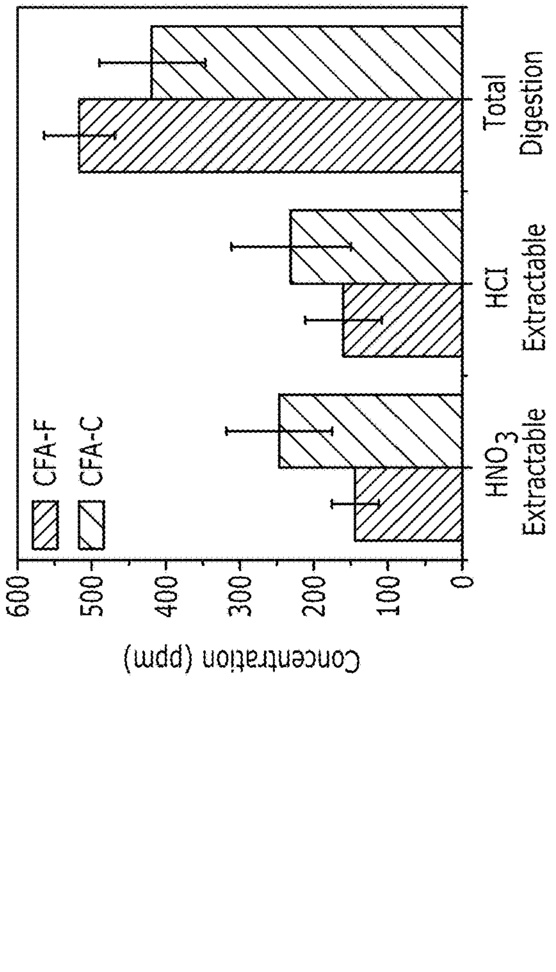

The total quantification of REEs in CFA was done by the HF:$HNO_3$ digestion method. [Taggart 2016]. The total REE content, $C_{total}$(CFA Raw), was 516±48 mg $kg^{-1}$ for CFA-F, and 418±71 mg $kg^{-1}$ for CFA-C. FIG. 43C. The CFA from App has a higher REE content than that from PRB, consistent with Taggart 2016. Acid-leachable REE contents from CFA raw materials, $c_0$(CFA Raw), were measured by using a 1 M HCl or 15 M $HNO_3$ [Taggart 2016; Middleton 2020]. For CFA-F, the $HNO_3$- and HCl-extractable REE contents were 144±32 mg $kg^{-1}$ and 160±50 mg $kg^{-1}$ (FIG. 43C), respectively, corresponding to the REE extractability ($Y_0$) of ~28% and ~31%, respectively. For CFA-C, the $HNO_3$- and HCl-extractable REE contents were 246±71 mg $kg^{-1}$ and 231±81 mg $kg^{-1}$ (FIG. 43C), respectively, corresponding to the REE extractability of ~59% and ~55%, respectively. It is concluded that the acid concentration has limited effect on the REE leachability once it is greater 1 M. Hence, 1 M HCl leaching was utilized in the standard protocol for subsequent evaluations.

Figure 43D:
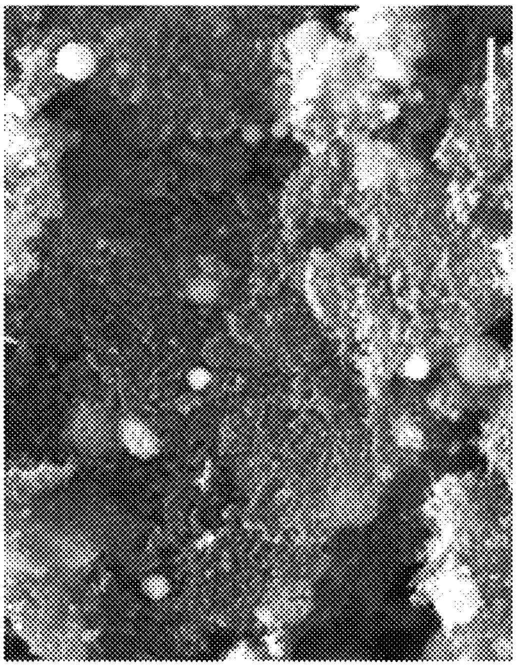
Figure 43E:
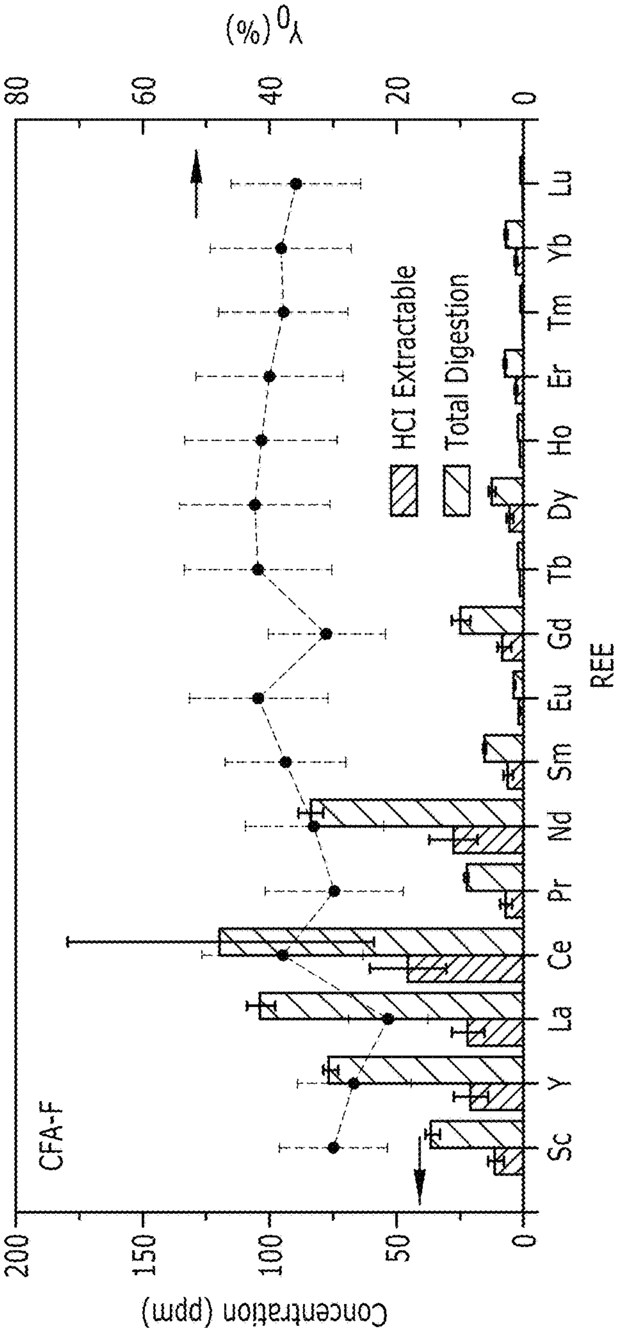
Figure 43F:
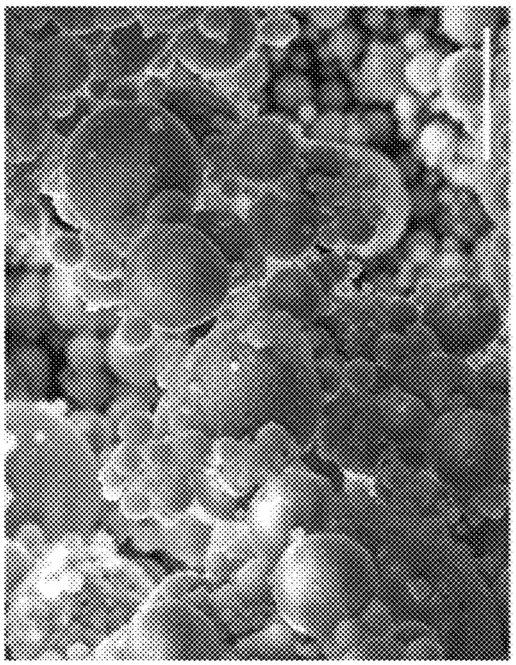
Figure 43G:
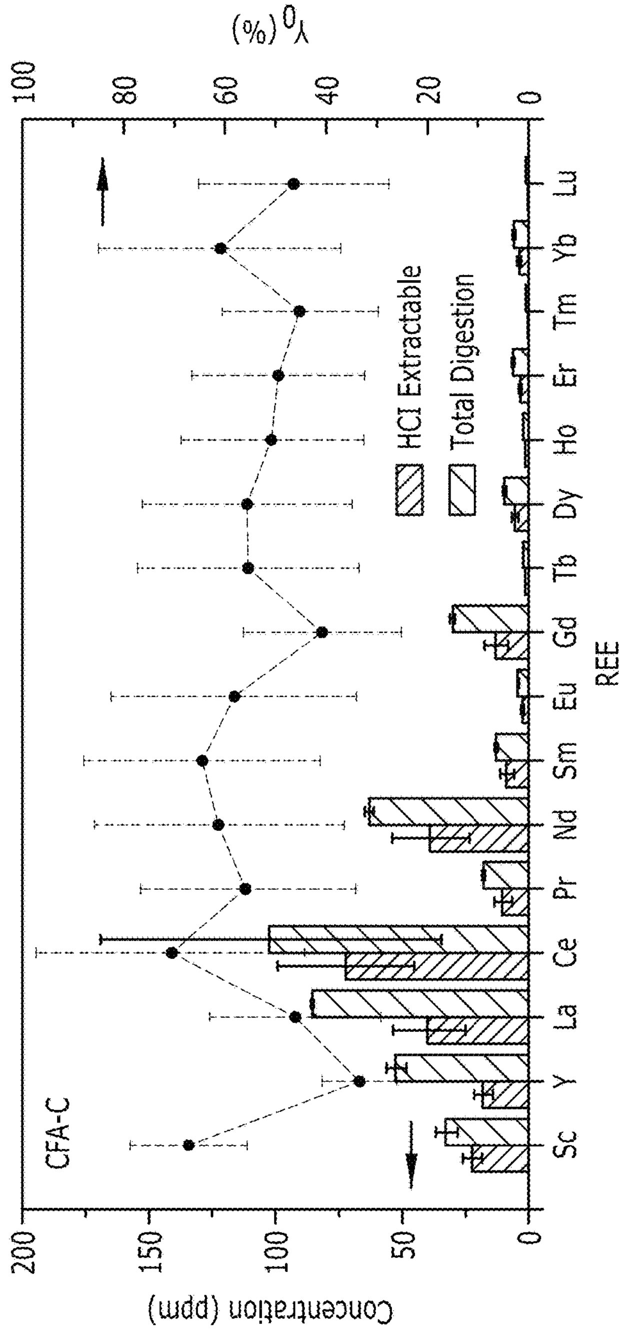

The acid extractability of REE from CFA-C was higher than that from CFA-F. This is consistent with [Liu 2019], which attributes the higher extractability to the higher content of easy-to-dissolve REE species like REE oxides in CFA-C. The morphology image by scanning electron microscopy (SEM) of CFA-F is shown in FIG. 43D, and the high carbon content could retard the accessibility of aqueous acids to REE-bearing species, leading to the low extractability ranging from 21% to 42% for individual REE. FIG. 43E. In contrast, CFA-C is composed of fine, uncovered spheric particles (FIG. 43F), which benefits the acid leaching process, leading to a relatively higher extractability ranging from 33% to 67% for individual REE (FIG. 43G).

Improved Recovery Yield of REE From CFA By Electrothermal Activation

Figure 44A:
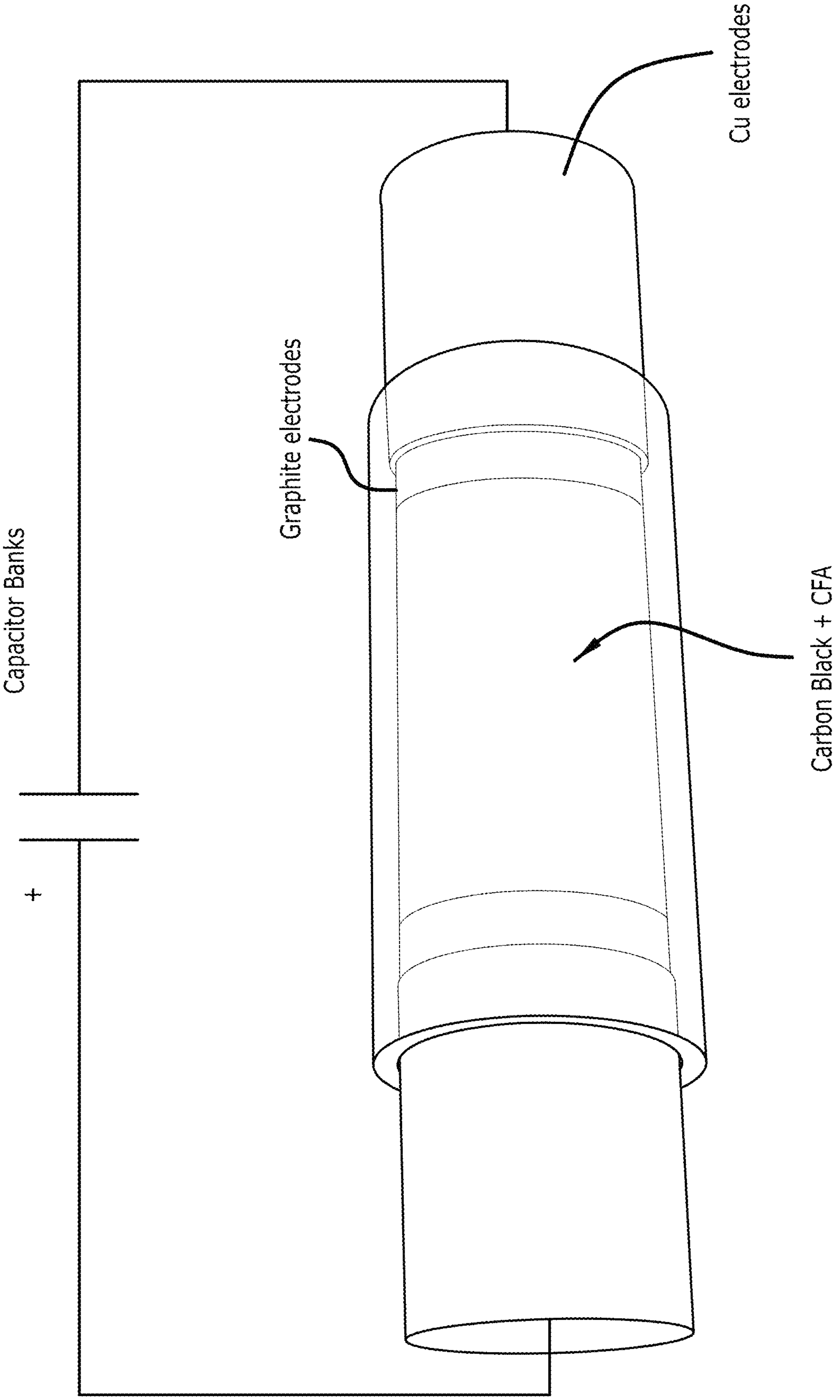
FIGS. 44A-44H show the improved recovery yield of REE from CFA by electrothermal activation.

In the electrothermal activation process by FRI, CFA raw materials were first mixed with carbon black (CB), which serves as the conductive additive. The mixture of CFA and CB (~30% CB) was loaded inside a quartz tube between two graphite electrodes. FIGS. 41A and 44A. The resistance (R) of the sample was tunable by adjusting the compressive force between the two electrodes, that were connected to a capacitance bank of 60 mF. The sample was brought to a high temperature by high voltage discharging of the capacitors. The detailed experimental parameters are shown in TABLE XI.

Figure 44B:
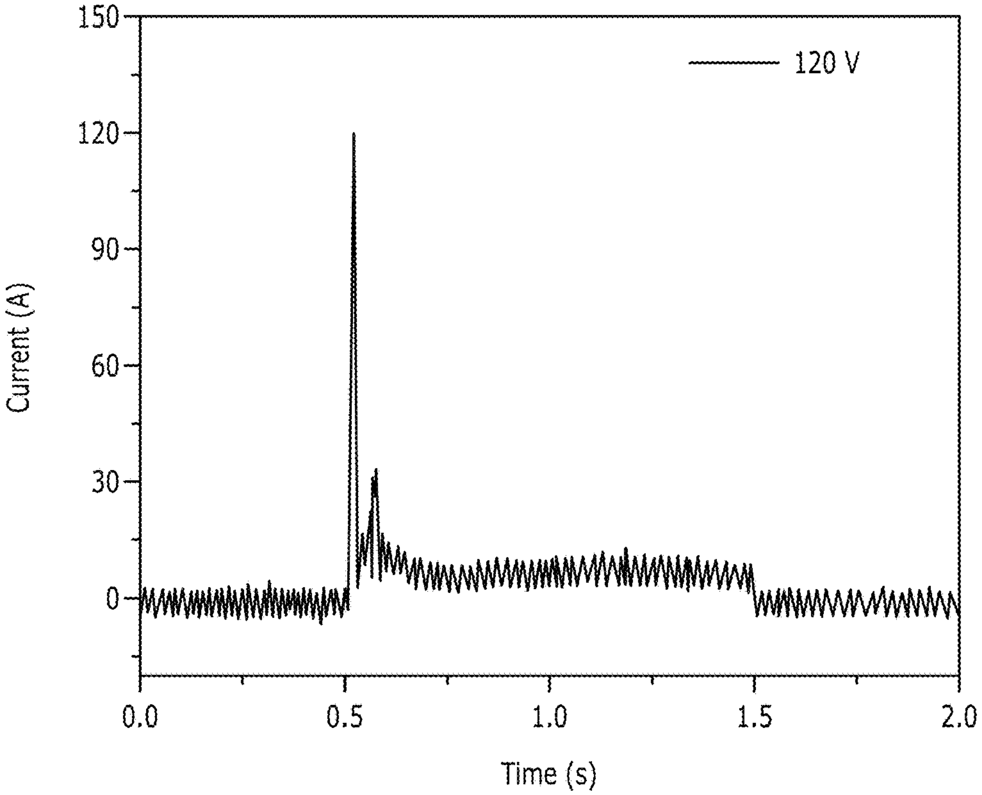
Figure 44C:
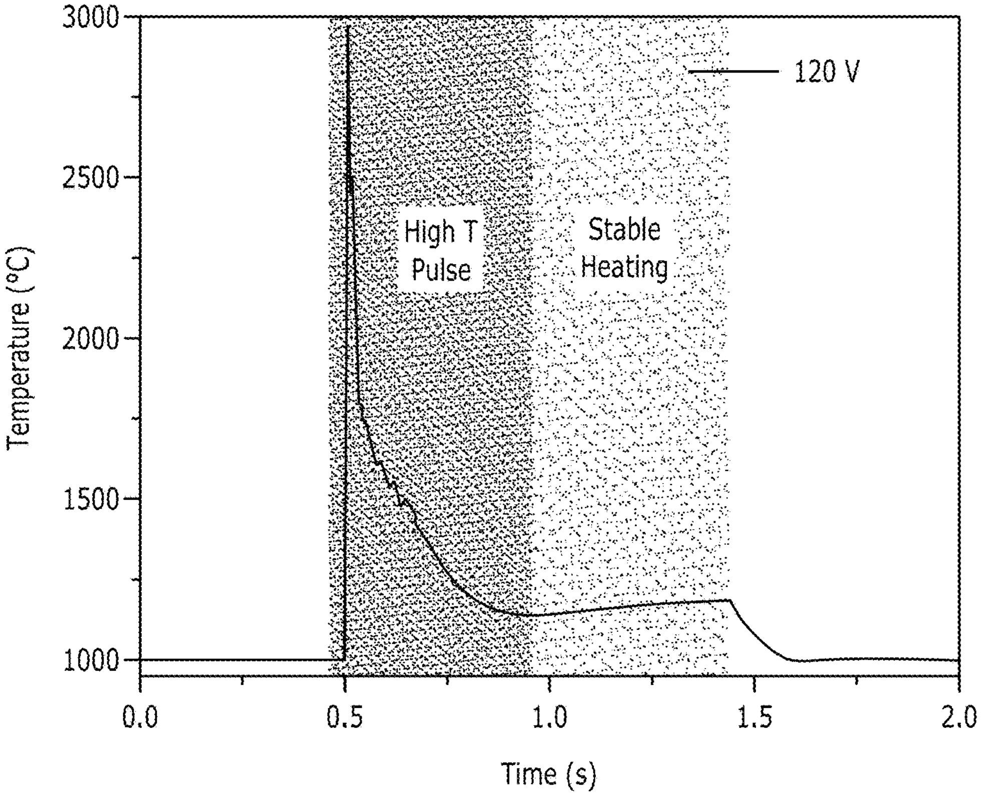
Figure 45:
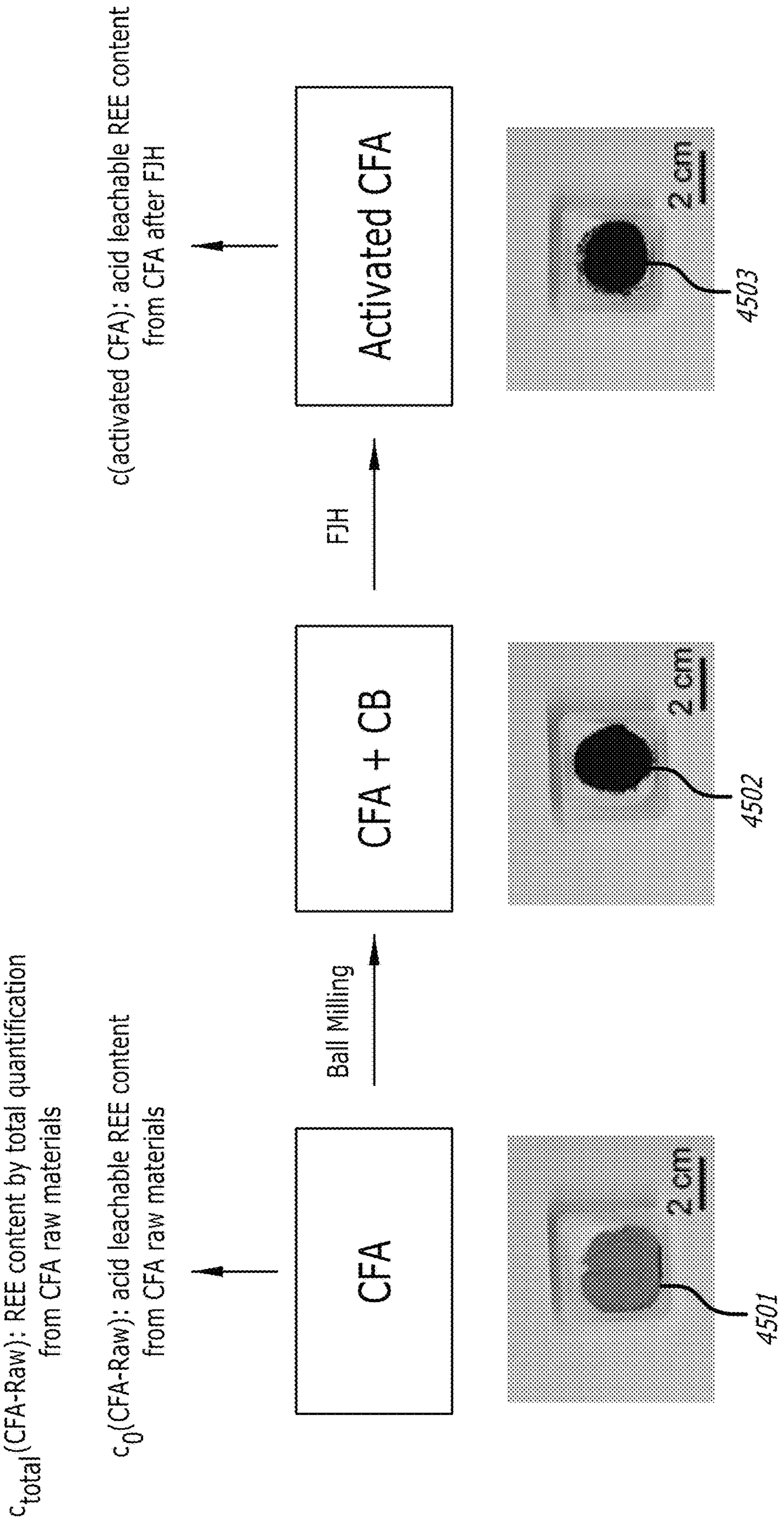
FIG. 45 is a flow chart of REE recovery from secondary wastes by electrothermal activation.

In a typical discharging process with FJH voltage of 120 V, R of 1Ω, and discharging time (t) of 1 s, the current curve passing through the sample was recorded with the peak current at ~120 A followed by a current plateau at ~7 A. FIG. 44B. The corresponding real-time temperature curve exhibits a peak temperature up to 3000° C. followed by the stable heating at 1150° C. FIG. 44C. The obtained solid after the FJH is termed as activated CFA. FIG. 45 (showing a flow chart of REE recovery from CFA 4501 to CFA+CB 4502 synthesized (via FJH) to activated CFA 4503). The acid leachable REE content from the activated CFA, c(activated CFA), was measured by a 1 M HCl leaching procedure. The recovery yield of REE from the activated CFA (Y) was calculated and compared with that of the CFA raw materials ($Y_0$).

Figure 44D:
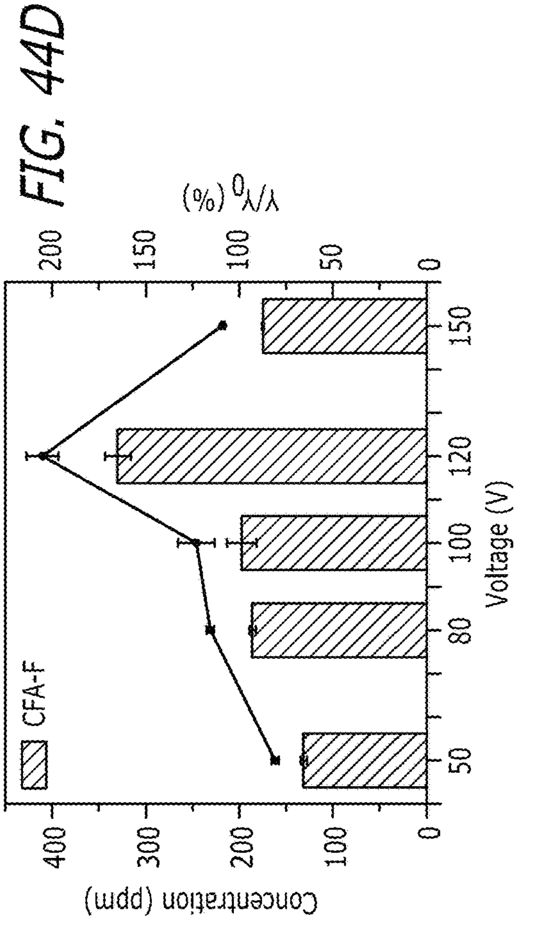
Figure 44E:
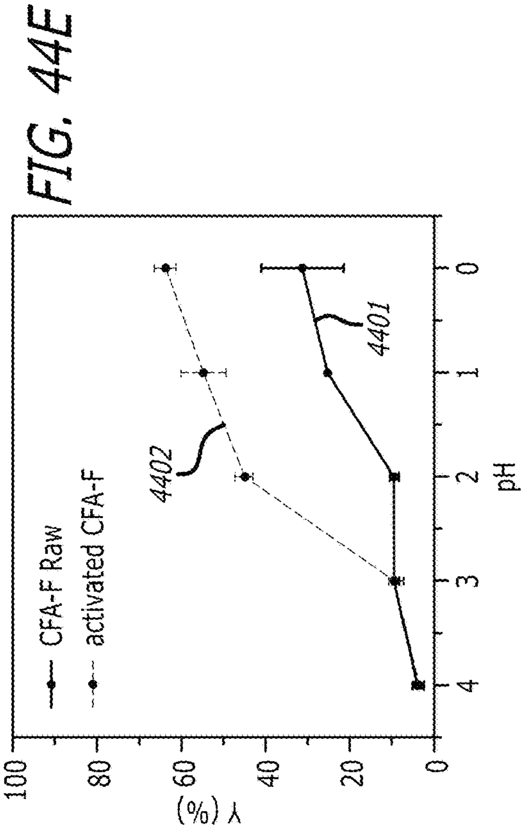

A series of FJH voltage ranging from 50 V to 150 V were applied. FIG. 44D. At the ~120 V, the HCl-leachable content of total REE (1 M HCl, 85° C.) from the activated CFA-F was improved to 329±14 mg $kg^{-1}$. FIG. 44D. This corresponds to the recovery yield of Y ~64%, representing an increase to ~206% over that of the CFA-F raw materials ($Y_0$~31%). The pH-dependent leaching dynamics of REE from CFA-F raw materials and activated CFA-F were investigated. FIG. 44E (with curves 4401-4402 for CFA-F raw materials and activated CFA-F, respectively). Generally, the yield was reduced as the acid pH increased. Remarkably, the recovery yield of REE from the activated CFA-F remained Y ~45% at pH 2 (or 0.01 M HCl), significantly higher than that of the CFA raw materials at the same leaching condition ($Y_0$~9% at pH 2), and even under a much higher acid concentration ($Y_0$~31% at pH 0).

Figure 44F:
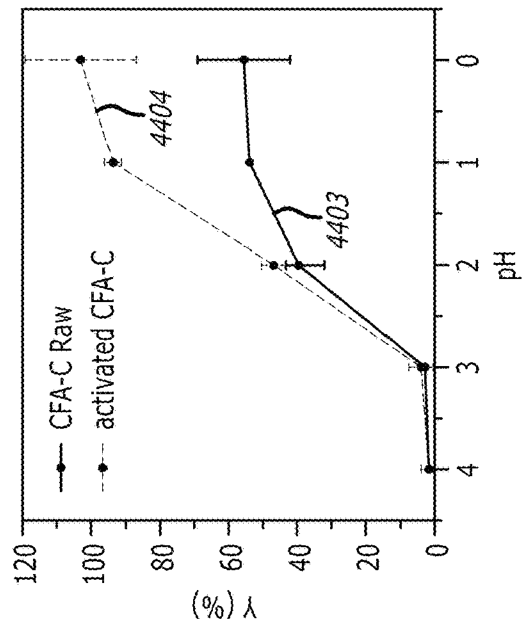

For CFA-C, under the optimized FJH condition, the acid leachability of REE from the activated CFA-C was measured to be Y ~103% using the HCl leaching procedure (1 M HCl, 85° C.) (FIG. 44F, with curves 4403-4404 for CFA-F raw materials and activated CFA-F, respectively), corresponding to the ratio of ~187% of that from the CFA-C raw materials ($Y_0$~55%).

Even using a dilute acid (pH 1, 0.1 M HCl), the recovery yield of REE from the activated CFA-C remains Y ~94%, significantly higher than that of the CFA-C raw materials ($Y_0$~54%). This would render far more manageable wastewater streams.

Figure 44G:
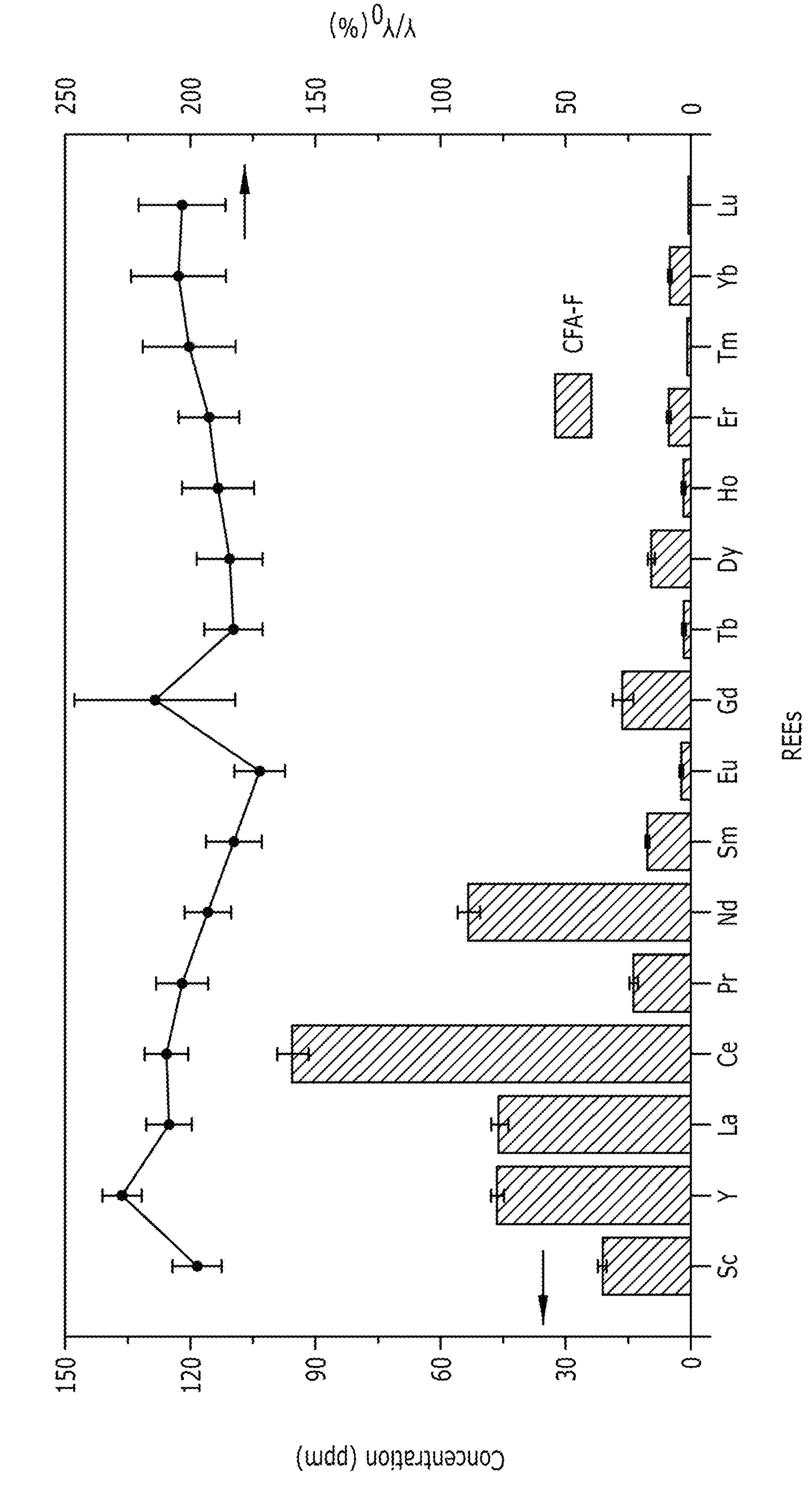
Figure 44H:
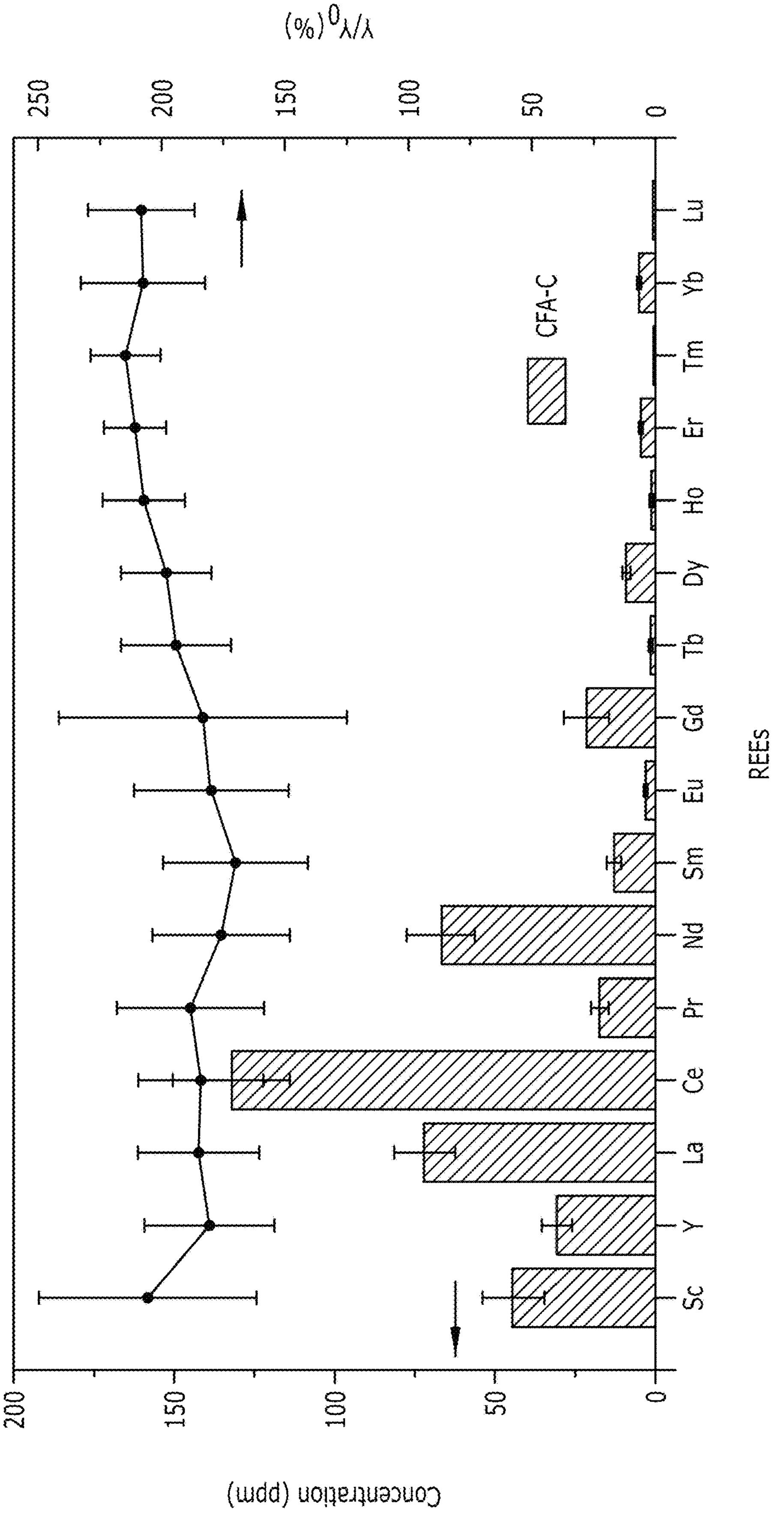

For individual REE, with the FJH activation process, the acid leachability was improved ranging from 170% to 230% for CFA-F (FIG. 44G), and from 170% to 210% for CFA-C(FIG. 44H) using the same leaching procedure (1 M HCl, 85° C.). Similar improvements were realized using a dilute acid leaching (0.1 M HCl, 85° C.). No significant deviation among the REE was observed, demonstrating that the FJH activation process works indiscriminately for all REE.

As control, the REE content in carbon black was measured using the same digestion method. The total REE content in carbon black was ~5 mg $kg^{-1}$, corresponding to ~1% of the REE content in CFA. Hence, the use of carbon black does not induce significant error into these measurements. In practical applications, the carbon black could be substituted with anthracite coal or any other inexpensive sources of mildly conductive carbon, but the REE content in that source should be considered in yield calculations.

The Mechanism of the Improved REE Extractability

The mechanism of the improved REE leachability by the electrothermal activation process was investigated. The REE speciation and distribution in CFA determine the REE extractability. REE phosphate, including monazite and xenotime, is one of the primary counterions of REE in coal. [Liu 2019; Stuckman 2018]. REE phosphates are rather stable components, and no melting or thermal dissociation occur up to 2000° C. in air. [Ushakov 2001; Hikichi 1987]. The coal-fire combustion temperature typically ranges from 1300° C. to 1700° C. [Stuckman 2018]. As a result, the REE-bearing trace phases, including monazite and xenotime, persist in CFA. [Kolker 2017; Smolka-Danielowska 2010]. The REE could also be partitioned and encapsulated into the glass fraction of CFA by diffusion into the melt (e.g., aluminosilicates) formed at the coal boiler temperature. [Dai 2014]. Those hard-to-dissolve REE phosphates and glass phases are detrimental for REE extraction [Liu 2019], while REE oxides and carbonates in CFA are relatively easier to extract by acid leaching.

Figure 46A:
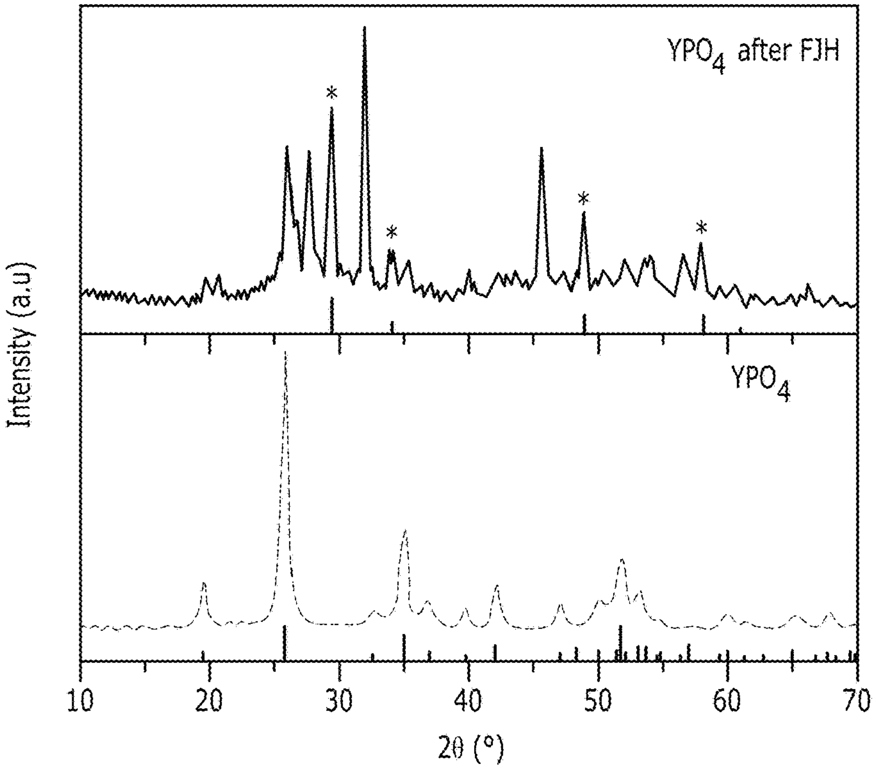
FIGS. 46A-46G show the mechanism of the improved REE extractability by the electrothermal activation.
Figure 46B:
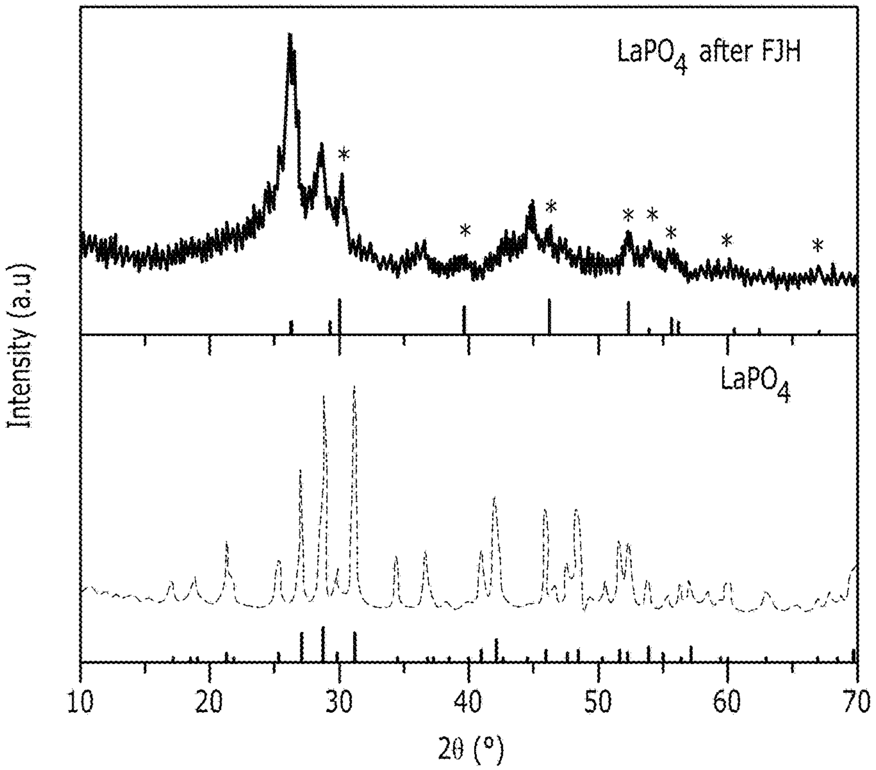

The high temperature of ~3000° C. generated by the FJH process, which is significantly higher than the coal boiler temperature, could thermally degrade the REE species. Lanthanum phosphate ($LaPO_4$) and yttrium phosphate ($YPO_4$) were used as representatives for REE phosphates. As shown in FIG. 46A, after FJH of the $LaPO_4$ precursor, the $La_2O_3$ phase was identified. Similarly, $YPO_4$ was thermally decomposed to $Y_2O_3$ after the FJH process. FIG. 46B. The REE oxides have much higher solubility ($\log_{10}K_{sp}$ of 5 to 33) than REE phosphates ($\log_{10}K_{sp}$ of −27 to −24). See TABLE XII.

TABLE XII

Gibbs Free Energy Change And Solubility Product Constants Of REE Metals, Oxides, And Phosphates Dissolution Reactions At 25° C.

| Materials | Reaction | ΔG | $\log K_{sp}$ |
|---|---|---|---|
| Sc | $Sc + 3H^+ = Sc^{3+} + \frac{3}{2}H_2$ | −614.2 kJ $mol^{-1}$ | 107.61 |
| $Sc_2O_3$ | $\frac{1}{2}Sc_2O_3 + 3H^+ = Sc^{3+} + \frac{3}{2}H_2O$ | −32.61 kJ $mol^{-1}$ | 5.71 |
| $ScPO_4$ | $ScPO_4 = Sc^{3+} + PO_4^{3-}$ | — | −26.96 |
| Y | $Y + 3H^+ = Y^{3+} + \frac{3}{2}H_2$ | −693.8 kJ $mol^{-1}$ | 121.56 |
| $Y_2O_3$ | $\frac{1}{2}Y_2O_3 + 3H^+ = Y^{3+} + \frac{3}{2}H_2O$ | −141.19 kJ $mol^{-1}$ | 24.74 |
| $YPO_4$ | $YPO_4 = Y^{3+} + PO_4^{3-}$ | — | −25.02 |
| La | $La + 3H^+ = La^{3+} + \frac{3}{2}H_2$ | −683.7 kJ $mol^{-1}$ | 119.79 |
| $La_2O_3$ | $\frac{1}{2}La_2O_3 + 3H^+ = La^{3+} + \frac{3}{2}H_2O$ | −186.49 kJ $mol^{-1}$ | 32.67 |
| $LaPO_4$ | $LaPO_4 = La^{3+} + PO_4^{3-}$ | — | −25.7 |
| Ce | $Ce + 3H^+ = Ce^{3+} + \frac{3}{2}H_2$ | −672 kJ $mol^{-1}$ | 117.74 |
| $Ce_2O_3$ | $\frac{1}{2}Ce_2O_3 + 3H^+ = Ce^{3+} + \frac{3}{2}H_2O$ | −174.59 kJ $mol^{-1}$ | 30.59 |
| $CePO_4$ | $CePO_4 = Ce^{3+} + PO_4^{3-}$ | — | −26.2 |
| Pr | $Pr + 3H^+ = Pr^{3+} + \frac{3}{2}H_2$ | −679.1 kJ $mol^{-1}$ | 118.98 |
| $Pr_2O_3$ | $\frac{1}{2}Pr_2O_3 + 3H^+ = Pr^{3+} + \frac{3}{2}H_2O$ | −174.89 kJ $mol^{-1}$ | 30.64 |
| $PrPO_4$ | $PrPO_4 = Pr^{3+} + PO_4^{3-}$ | — | −26.4 |
| Nd | $Nd + 3H^+ = Nd^{3+} + \frac{3}{2}H_2$ | −671.6 kJ $mol^{-1}$ | 117.67 |
| $Nd_2O_3$ | $\frac{1}{2}Nd_2O_3 + 3H^+ = Nd^{3+} + \frac{3}{2}H_2O$ | −166.89 kJ $mol^{-1}$ | 29.24 |
| $NdPO_4$ | $NdPO_4 = Nd^{3+} + PO_4^{3-}$ | — | −26.2 |
| Sm | $Sm + 3H^+ = Sm^{3+} + \frac{3}{2}H_2$ | −666.6 kJ $mol^{-1}$ | 116.79 |
| $Sm_2O_3$ | $\frac{1}{2}Sm_2O_3 + 3H^+ = Sm^{3+} + \frac{3}{2}H_2O$ | −154.99 kJ $mol^{-1}$ | 27.16 |
| $SmPO_4$ | $SmPO_4 = Sm^{3+} + PO_4^{3-}$ | — | −26.1 |
| Eu | $Eu + 3H^+ = Eu^{3+} + \frac{3}{2}H_2$ | −574.1 kJ $mol^{-1}$ | 100.58 |
| $Eu_2O_3$ | $\frac{1}{2}Eu_2O_3 + 3H^+ = Eu^{3+} + \frac{3}{2}H_2O$ | −151.39 kJ $mol^{-1}$ | 26.52 |
| $EuPO_4$ | $EuPO_4 = Eu^{3+} + PO_4^{3-}$ | — | −25.9 |
| Gd | $Gd + 3H^+ = Gd^{3+} + \frac{3}{2}H_2$ | −661 kJ $mol^{-1}$ | 115.81 |
| $Gd_2O_3$ | $\frac{1}{2}Gd_2O_3 + 3H^+ = Gd^{3+} + \frac{3}{2}H_2O$ | −134.79 kJ $mol^{-1}$ | 23.62 |
| $GdPO_4$ | $GdPO_4 = Gd^{3+} + PO_4^{3-}$ | — | −25.6 |
| Tb | $Tb + 3H^+ = Tb^{3+} + \frac{3}{2}H_2$ | −651.9 kJ $mol^{-1}$ | 114.21 |
| $Tb_2O_3$ | $\frac{1}{2}Tb_2O_3 + 3H^+ = Tb^{3+} + \frac{3}{2}H_2O$ | −119.19 kJ $mol^{-1}$ | 20.88 |
| $TbPO_4$ | $TbPO_4 = Tb^{3+} + PO_4^{3-}$ | — | −25.3 |
| Dy | $Dy + 3H^+ = Dy^{3+} + \frac{3}{2}H_2$ | −665 kJ $mol^{-1}$ | 116.51 |
| $Dy_2O_3$ | $\frac{1}{2}Dy_2O_3 + 3H^+ = Dy^{3+} + \frac{3}{2}H_2O$ | −134.94 kJ $mol^{-1}$ | 23.64 |
| $DyPO_4$ | $DyPO_4 = Dy^{3+} + PO_4^{3-}$ | — | −25.1 |
| Ho | $Ho + 3H^+ = Ho^{3+} + \frac{3}{2}H_2$ | −673.7 kJ $mol^{-1}$ | 118.03 |
| $Ho_2O_3$ | $\frac{1}{2}Ho_2O_3 + 3H^+ = Ho^{3+} + \frac{3}{2}H_2O$ | −133.84 kJ $mol^{-1}$ | 23.45 |
| $HoPO_4$ | $HoPO_4 = Ho^{3+} + PO_4^{3-}$ | — | −25.0 |
| Er | $Er + 3H^+ = Er^{3+} + \frac{3}{2}H_2$ | −669.1 kJ $mol^{-1}$ | 117.23 |
| $Er_2O_3$ | $\frac{1}{2}Er_2O_3 + 3H^+ = Er^{3+} + \frac{3}{2}H_2O$ | −120.44 kJ $mol^{-1}$ | 21.10 |
| $ErPO_4$ | $ErPO_4 = Er^{3+} + PO_4^{3-}$ | — | −25.1 |
| Tm | $Tm + 3H^+ = Tm^{3+} + \frac{3}{2}H_2$ | −662 kJ $mol^{-1}$ | 115.98 |
| $Tm_2O_3$ | $\frac{1}{2}Tm_2O_3 + 3H^+ = Tm^{3+} + \frac{3}{2}H_2O$ | −120.44 kJ $mol^{-1}$ | 21.10 |
| $TmPO_4$ | $TmPO_4 = Tm^{3+} + PO_4^{3-}$ | — | −25.0 |
| Yb | $Yb + 3H^+ = Yb^{3+} + \frac{3}{2}H_2$ | −644 kJ $mol^{-1}$ | 112.83 |
| $Yb_2O_3$ | $\frac{1}{2}Yb_2O_3 + 3H^+ = Yb^{3+} + \frac{3}{2}H_2O$ | −136.34 kJ $mol^{-1}$ | 23.89 |
| $YbPO_4$ | $YbPO_4 = Yb^{3+} + PO_4^{3-}$ | — | −24.8 |
| Lu | $Lu + 3H^+ = Lu^{3+} + \frac{3}{2}H_2$ | −628 kJ $mol^{-1}$ | 110.03 |
| $Lu_2O_3$ | $\frac{1}{2}Lu_2O_3 + 3H^+ = Lu^{3+} + \frac{3}{2}H_2O$ | −89.19 kJ $mol^{-1}$ | 15.63 |
| $LuPO_4$ | $LuPO_4 = Lu^{3+} + PO_4^{3-}$ | — | −24.7 |

Figure 46C:
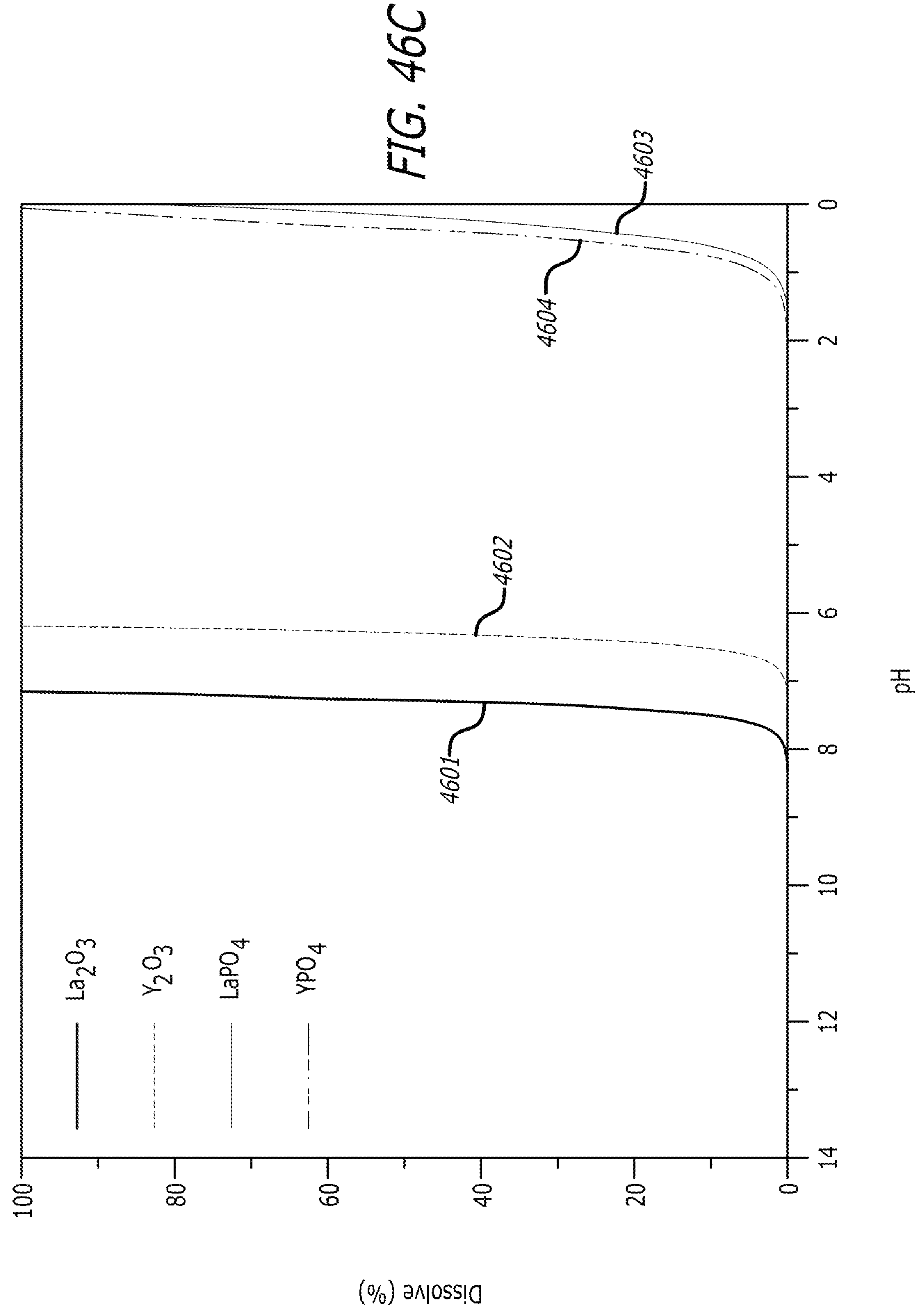
Figure 46D:
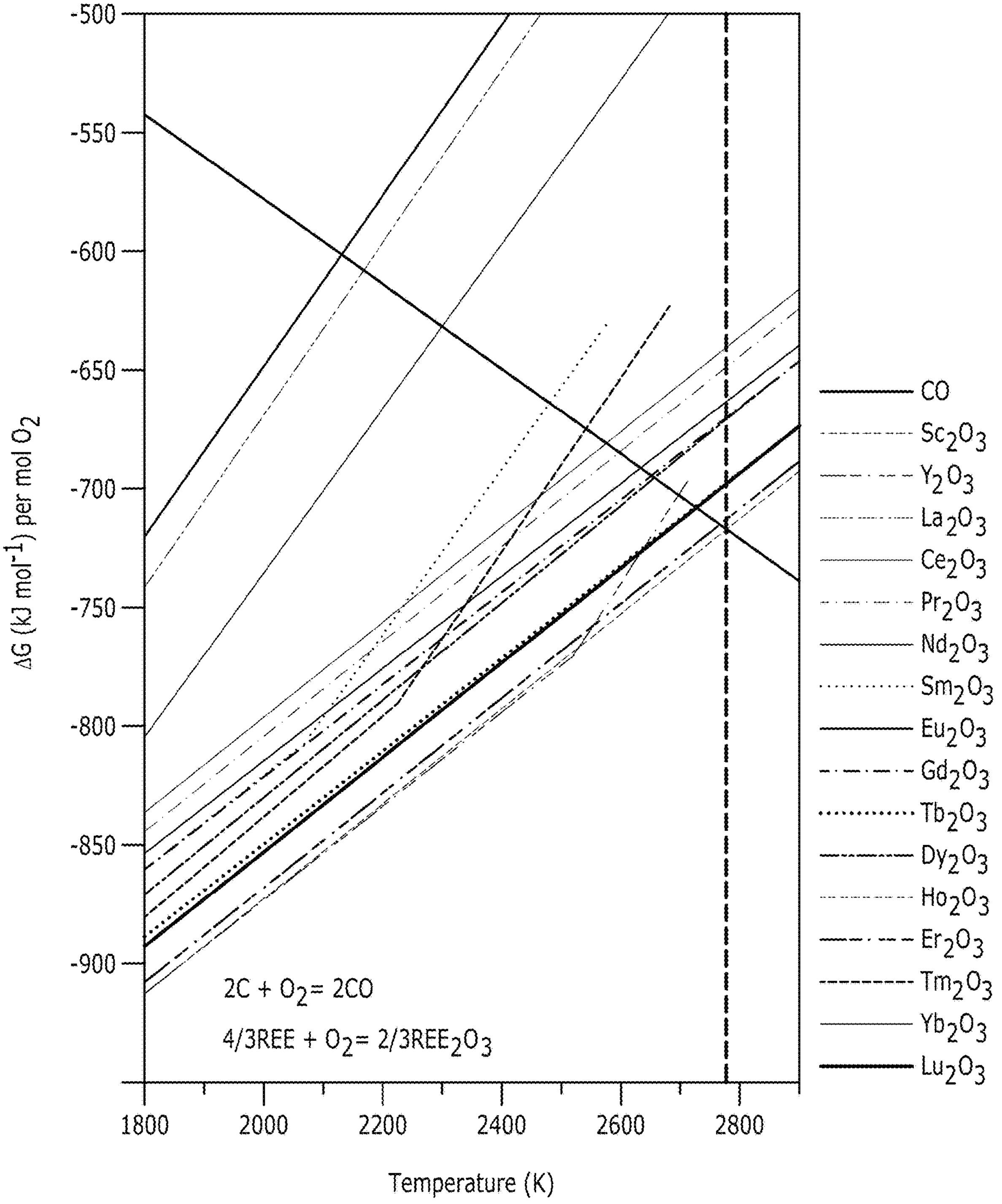
Figure 46E:
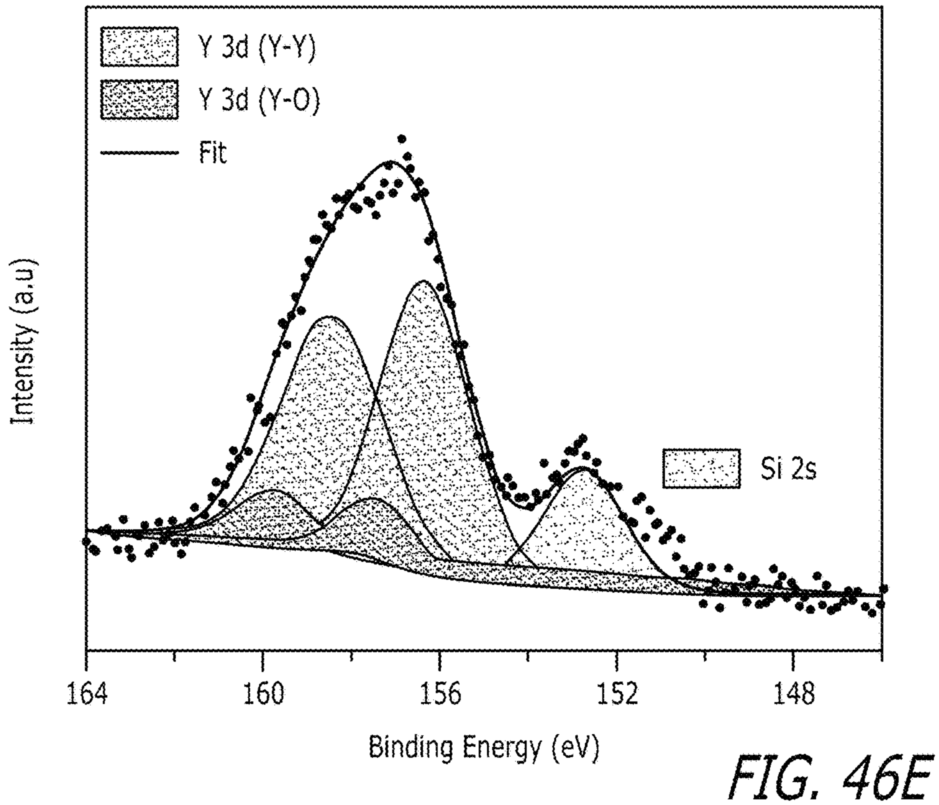
Figure 46F:
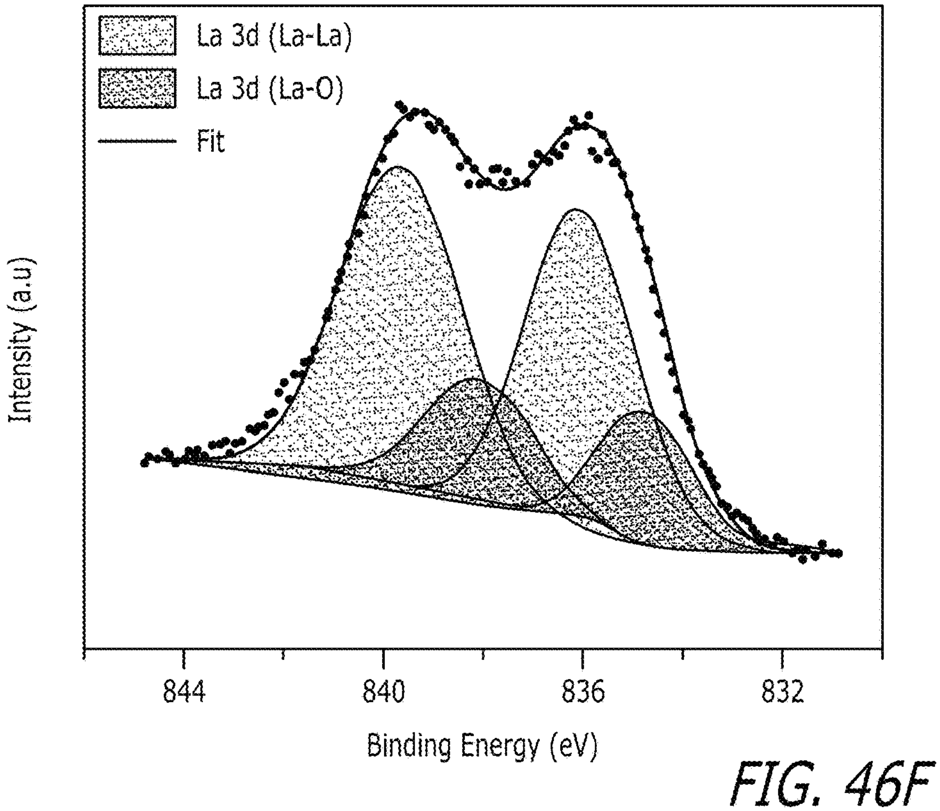

To further provide insight on the solubility of REE phosphates and oxides, the dissolution curves as a function of pH were calculated. FIG. 46C (with curves 4601-4604 for $La_2O_3$, $Y_2O_3$, $LaPO_4$, and $YPO_4$, respectively). It was found that $LaPO_4$ and $YPO_4$ showed significant solubility only when pH approaches 0, while the oxide counterparts readily dissolve at a low acidity with pH ~6. This partially explains the pH-dependent REE leaching dynamics, that higher REE leachabilities were achieved for the activated CFA than the raw materials using dilute acid. FIG. 46E-46F. (For FIG. 46E, the Si signal might be from the quartz tube during FJH).

In addition to the thermal decomposition of REE phosphates, the ultrahigh temperature could also trigger the thermal reduction of REE compounds. According to the Ellingham diagram (FIG. 46D), the carbothermic reduction temperatures of REE oxides are estimated to be between ~1900° C. (for $Eu_2O_3$) and ~2500° C. (for $Dy_2O_3$). The FJH at ~120 V generates a temperature up to ~3000° C. (FIG. 44C), which permits the reduction of REE oxides.

$Y_2O_3$ and $La_2O_3$ were used as representatives to verify the carbothermic reduction of REE oxides by the FJH process. The fitting of the XPS fine spectrum of $Y_2O_3$ after FJH shows four peaks. FIG. 46E and TABLE XIII. The peaks at 157.5 and 159.6 eV are assigned to $3d_{5/2}$ and $3d_{3/2}$ of Y in $Y_2O_3$ [Barreca 2001], and the peaks at 156.4 and 158.5 eV are assigned to $3d_{5/2}$ and $3d_{3/2}$ of Y in Y(0) [Cole 2020].

TABLE XIII

The XPS Peak Fitting Of La And Y

| Samples | Element | Position (eV), peak | Chemical state, Chemical bond |
|---|---|---|---|
| $La_2O_3$ | La | 834.8, $La3d_{5/2}$ | +3, La—O |
| | | 838.2, satellite | +3, La—O |
| $La_2O_3$ after FJH | La | 834.8, $La3d_{5/2}$ | +3, La—O |
| | | 836.0, $La3d_{5/2}$ | 0, La—La |
| | | 838.1, satellite | +3, La—O |
| | | 839.6, satellite | 0, La—La |
| $Y_2O_3$ | Y | 157.4, $Y3d_{5/2}$ | +3, Y—O |
| | | 159.4, $Y3d3_{/2}$ | +3, Y—O |
| $Y_2O_3$ after FJH | Y | 156.4, $Y3d_{5/2}$ | 0, Y—Y |
| | | 157.5, $Y3d_{5/2}$ | +3, Y—O |
| | | 158.5, $Y3d3_{/2}$ | 0, Y—Y |
| | | 159.6, $Y3d3_{/2}$ | +3, Y—O |

Figure 46G:
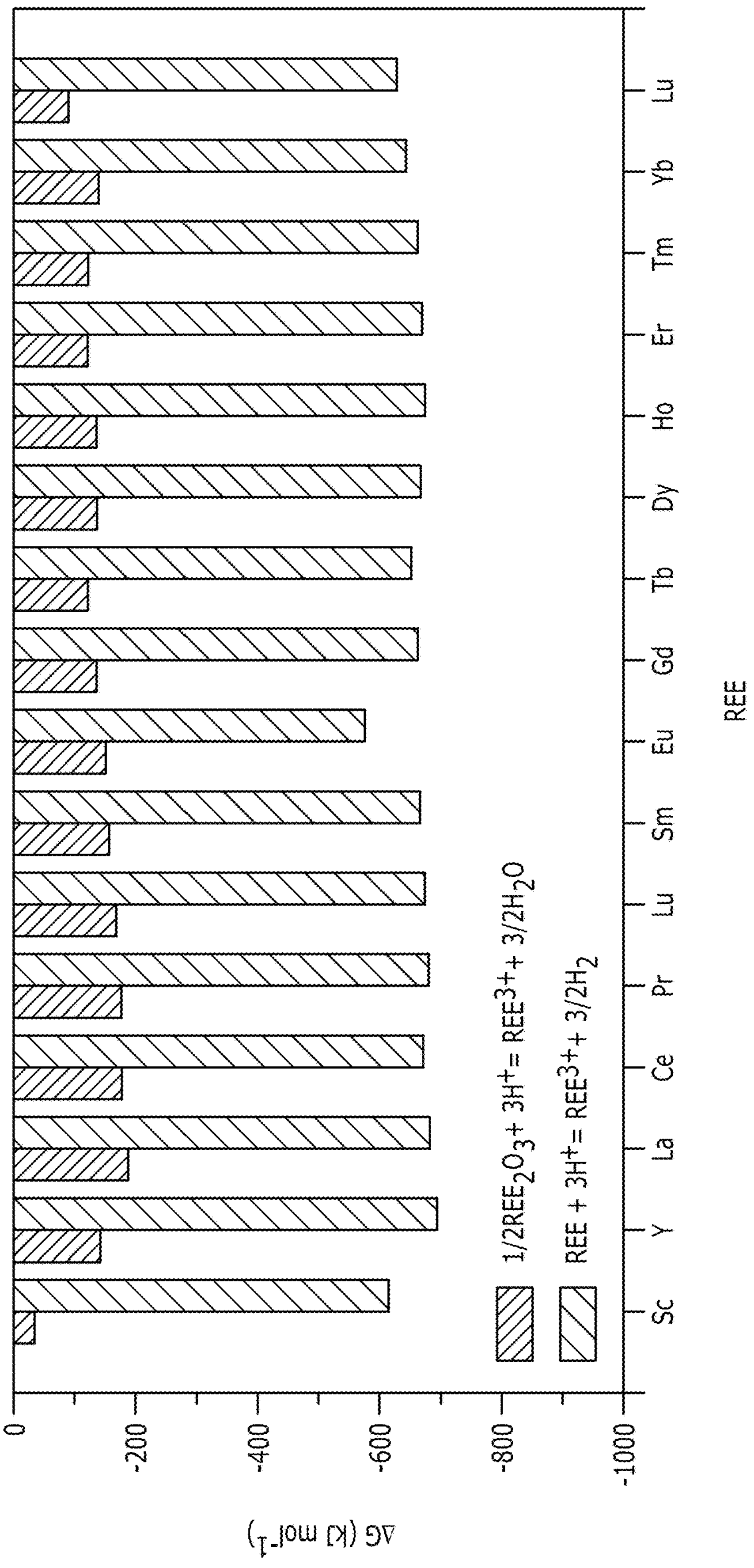

The XPS analysis proved the reduction of $Y_2O_3$ to Y metal by the FJH process, while the small ratio of $Y_2O_3$ might be from the surface oxidation. Similarly, the fitting of XPS fine spectra of $La_2O_3$ precursor and $La_2O_3$ after FJH (FIG. 46F, TABLE XIII) verifies the reduction of $La_2O_3$ to La metal. [Deasha 1995; Li 2019]. The reduced REE species with low oxidation state are highly active materials that readily react with even pure water. [Greenwood 1997]. The calculated Gibbs free energy change (AG) values for the REE metals dissolution reaction are much more negative than those of REE oxides (FIG. 46G, TABLE XII), demonstrating a much larger thermodynamic solubility of REE metals than for their oxide counterparts.

This suggests that the required temperature for the thermal activation is >2000° C. for thermal decomposition of REE phosphates, and >2500° C. for carbothermic reduction of REE oxides, which also provides insight on the voltage dependent REE leachability. FIG. 44D. A FJH voltage of ≥120 V can be needed for achieving a temperature >2000° C., while a voltage of <100 V can have limited effect on the REE leachability. Nevertheless, too high of a FJH voltage, ≥150 V, can lead to a prolonged high temperature of >3000° C., which could in turn result in the evaporative loss of the REE during the FJH process.

In addition to speciation, the REE distribution also affects the extractability, where the REE encapsulated in or distributed throughout the glass phases are hard to dissolve. [Liu 2019]. The FJH permits an ultrafast heating and rapid cooling (>$10^4$ K $s^{-1}$, FIG. 44C), which would induce thermal stress and cracking of the glass phases in CFA, contributing to the improved leachability.

Generality of the Electrothermal Activation Process

The electrothermal activation process is applicable to other waste products for REE recovery, including BR [Deady 2016; Rivera 2018; Reid 2017] and e-waste (including as discussed above) [Maroufi 2018; Deshmane 2020; Peelman 2018].

Figure 47A:
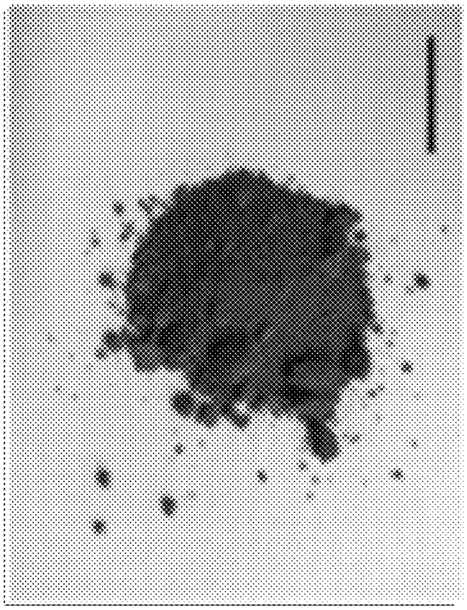
FIGS. 47A-47C shows recovery of REE from BR.
Figure 47B:
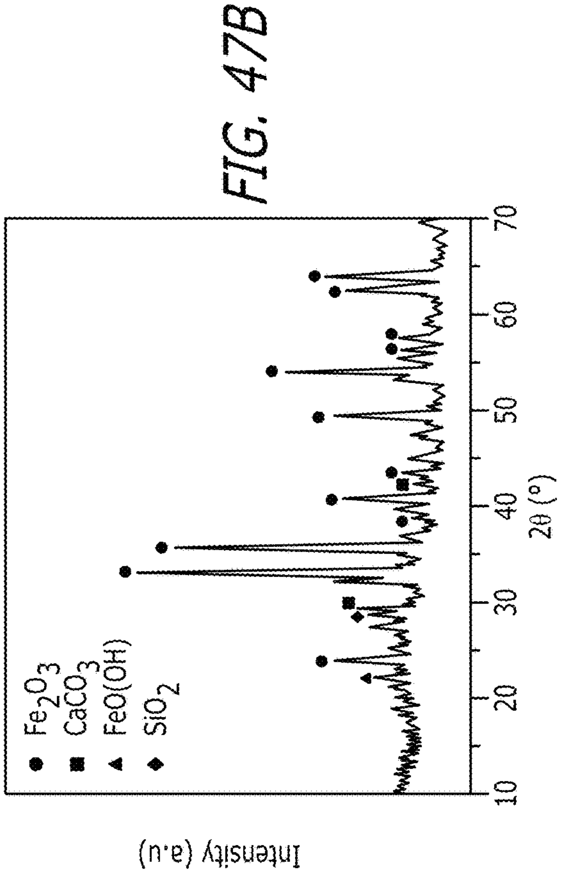
Figure 47C:
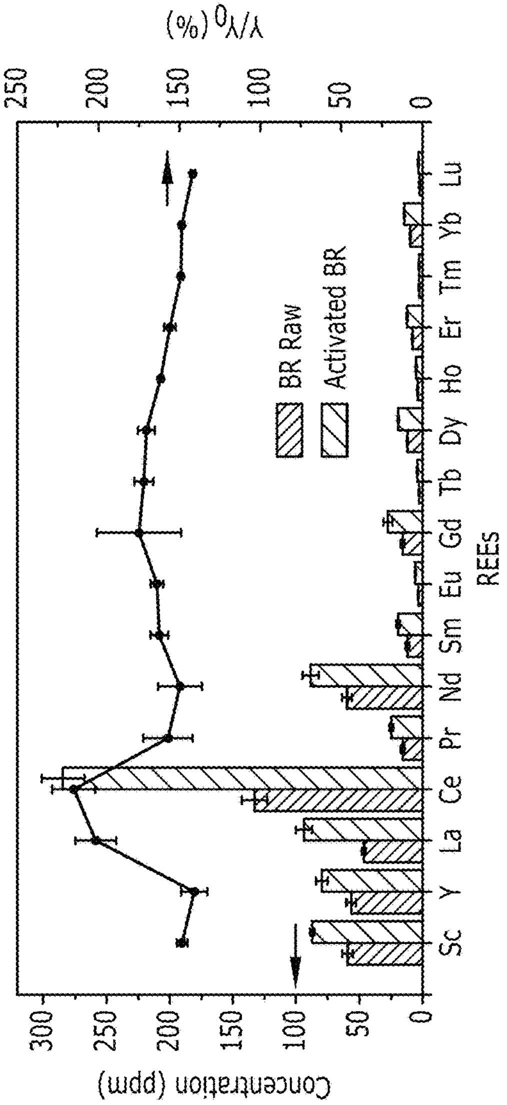
Figure 48A:
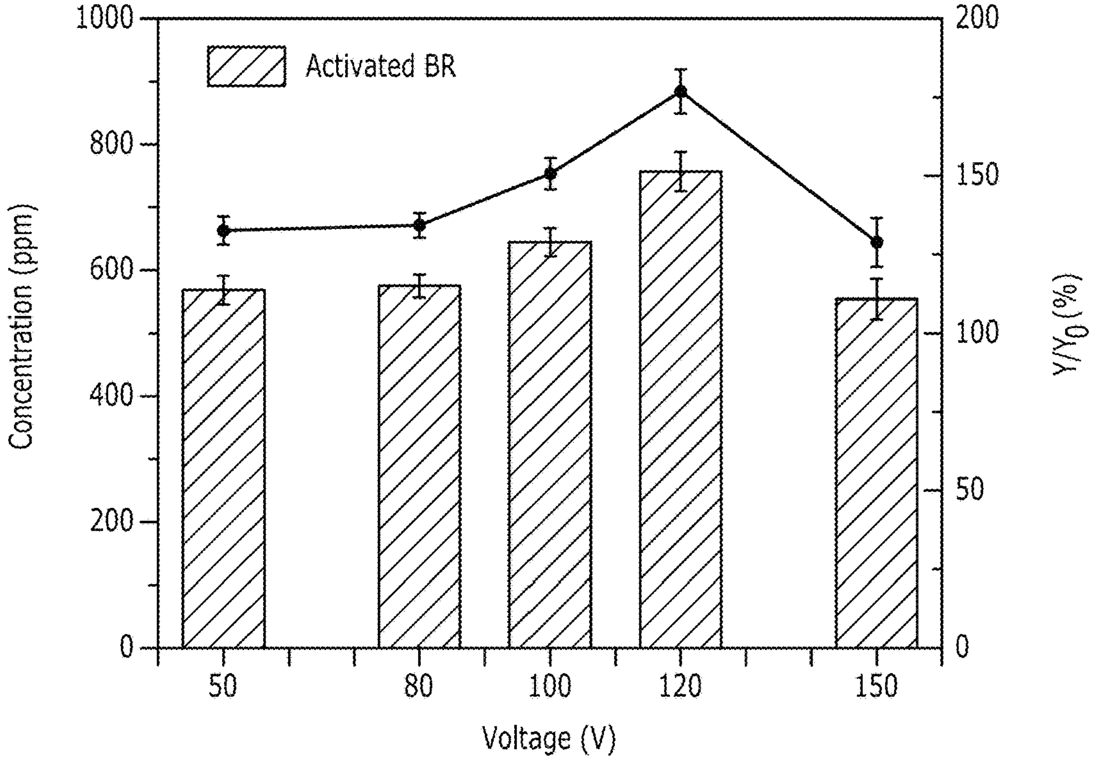
FIGS. 48A-48B show FJH voltage dependent REE recovery yield from BR.
Figure 48B:
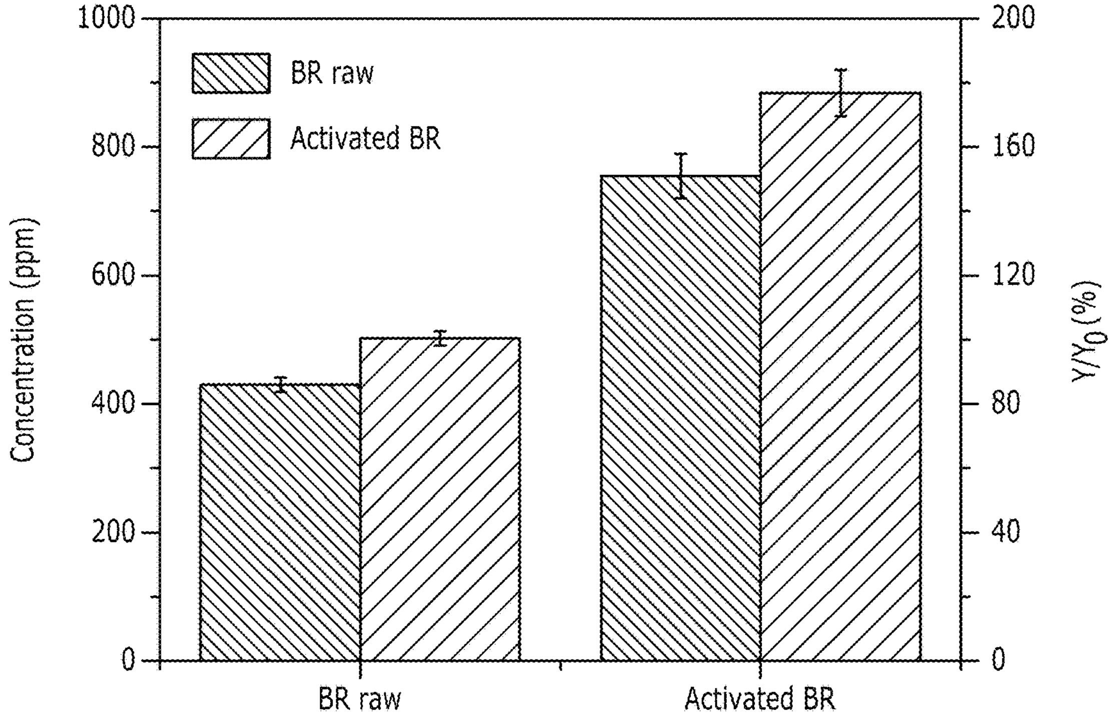

BR (red mud) is the waste product of the Bayer process for alumina production. BR is one of the most abundant industrial wastes with 3 billion tons already stored in waste ponds and an additional 150 million tons produced each year, yet just 3% is currently recycled [Service 2020]. BR contains a significant amount of REE, for example, a total REE content of ~1000 ppm is found in BR from MYTILI- NEOS "Aluminum of Greece." [Deady 2016]. The BR is a dried powder with fine particle size, and has major components including $Fe_2O_3$, $CaCO_3$, FeO(OH), and $SiO_2$. FIGS. 47A-47B. The REE in BR was extracted by a direct leaching process using 0.5 M $HNO_3$. [Ochsenkuhn-Petropulu 1996]. The acid extractable REE content from BR raw materials is 428±9 mg $kg^{-1}$. FIGS. 47C and 48A-48B.

Similar to CFA, the REE extractability of the BR after the electrothermal activation process is also dependent on the FJH voltage. FIG. 48A. At the optimized FJH voltage of 120 V, the extractable REE content increased to 757±30 mg $kg^{-1}$ (FIG. 48B), corresponding to $Y/Y_0$~177% of that from the BR raw materials (FIG. 47C). The mechanism of the improvement of REE extractability from BR by the FJH process is presumed to be similar to that of CFA (FIGS. 46A-46G), since the phosphate is one of the dominant counterions for BR. [Boni 2013].

This FJH strategy was also applied for for activating e-waste and it is shown here as a complement to the methods described that used no mild acid leaching. More than 40 million tons of e-waste are produced globally each year due to the rapid upgrade of personal electronics, with <20% being recycled. [Zeng 2018]. REE are widely used in electronics in permanent magnets [Deshmane], and capacitors [Alam 2012]. In turn, the recovery of REEs from high-grade e-waste has its economic feasibility compared to REE mining from ores.

Figure 49B:
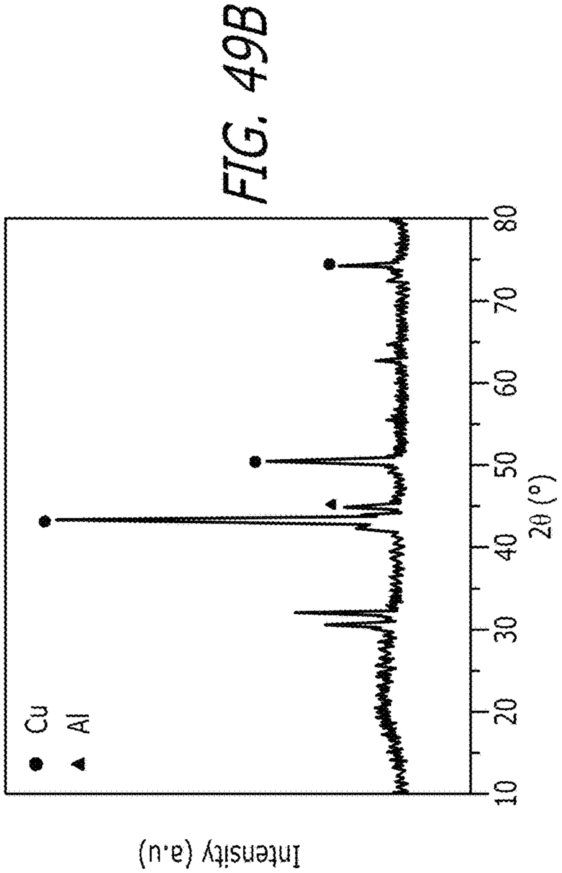
FIGS. 49A-49C shows recovery of REE from e-waste.
Figure 49A:
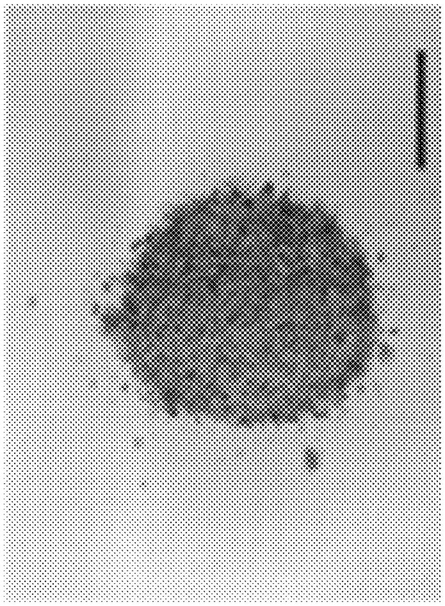
Figure 49C:
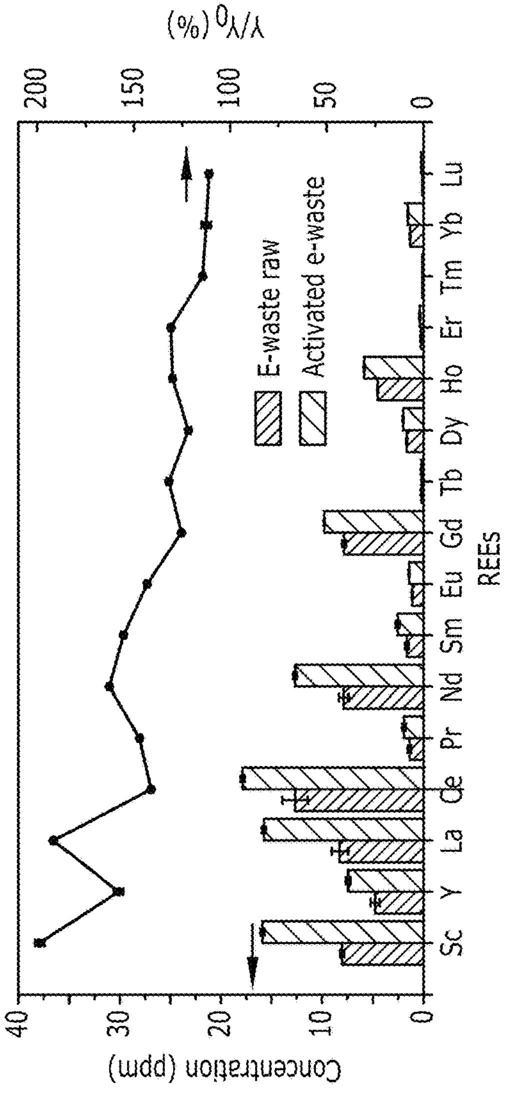
Figure 50A:
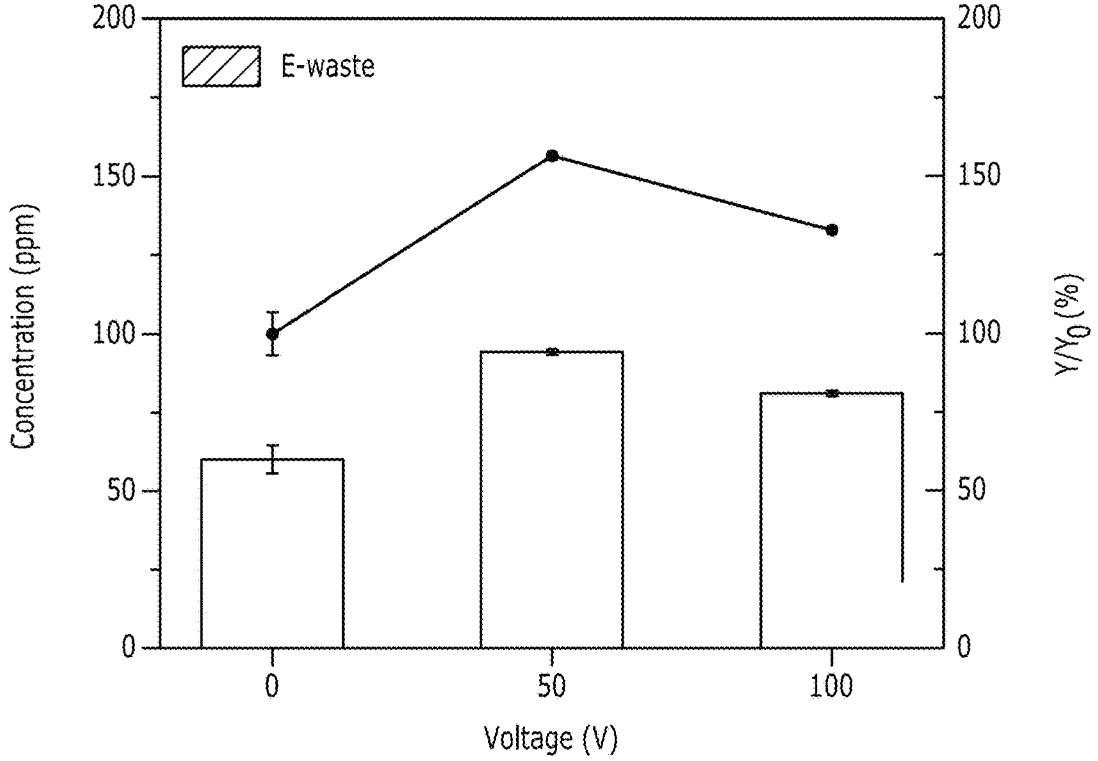
FIGS. 50A-50B show improving the REEs recovery yield from e-waste by FJH activation.
Figure 50B:
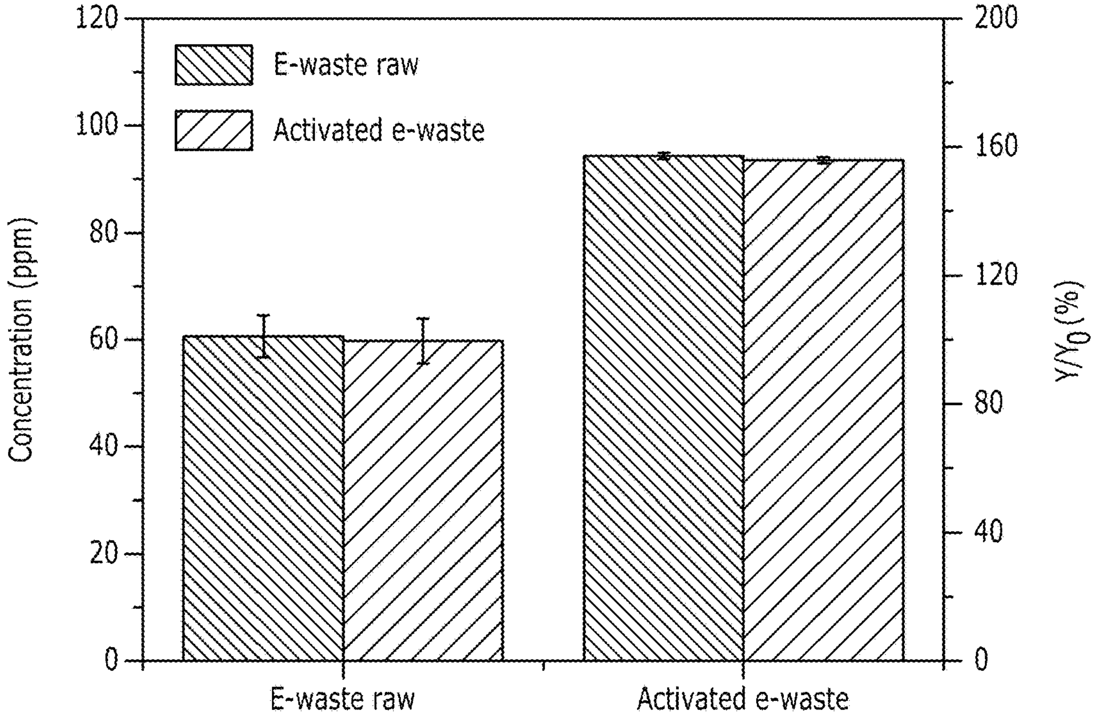

The e-waste used in this FJH process was a printed circuit board (PCB) from a discarded computer. FIG. 49A (showing e-waste ground to powder). As shown in the FIG. 49B, the abundant metals in e-waste include Cu and Al, which are mainly used as the interconnects. The REEs in the PCB waste was extracted by 1 M HCl leaching process at 85° C. The acid leachable REE content is 61±4 mg $kg^{-1}$ from the e-waste raw materials. FIGS. 50A-50B. After the activation process at an optimized voltage (FIGS. 50A-50B), the extractable REE content was increased to 94.6±0.2 mg $kg^{-1}$, corresponding to $Y/Y_0$~156% of that from the e-waste raw materials. FIGS. 49C and 50A-50B.

Different from CFA or BR, the REE species in e-waste are usually in the form of easy-to-dissolve REE metals or oxides. [Alam 2012]. However, the REEs are usually embedded into the matrix materials due to the laminated configuration of the electronics, which could hinder the REE extraction by the hydrometallurgical process. The FJH process could expose the metals by cracking the matrices, accelerating the leaching rate and extent of metal extraction.

Scalability and Utility

The FJH process for REE recovery is scalable. To maintain a constant temperature when scaling up the sample mass per batch, the FJH voltage or the total capacitance of the capacitor bank can be increased. A production rate of >10 kg $day^{-1}$ by the batch-by-batch process has already been realized. The FJH process can be integrated into the continuous production manner for further automation, such as by using the schemes shown in FIGS. 40A-40B. The ongoing commercial scaling of the FJH process to tons per day paves the way for future REE recovery from large-scale waste products.

The economics since the profit margin is often the sustainer of recycling. Due to the direct sample heating feature, short duration, and rapid heating/cooling rate, embodiments of the FJH process are highly energy-efficient with a low electrical energy consumption of 600 kWh $ton^{-1}$ or $12 $ton^{-1}$, enabling a profit percentage of >10× compared to directly leaching the raw materials.

For further refining, the removal of dissolved impurities, including mainly Al, Si, Fe, Ca, and Mg, in the REE-containing leachate and subsequent separation are needed. It was observed that the content ratio of REE and impurity (c(REE)/c(Impurity)) in the leachate was improved with the FJH process in most cases, indicating that the FJH process would also be beneficial for the subsequent REE separation.

Ores

Since monazite, (Ce, La, Y, Th)$PO_4$, and xenotime, $YPO_4$, are the main commercial sources for REE production [Chelsson 2019], embodiments can also be used for REE mining to improve the leachability from REE ores. Commercially, alkaline digestion (70% NaOH, 140-150° C.) is the main leaching technology for monazite [Peelman 2016], or acid baking (concentrated $H_2SO_4$, 200° C.) for monazite and xenotime [Kim 2016]. This FJH process could be faster and less dependent on the use of concentrated bases and acids. Existing individual elemental separation technologies, such as solvent extraction and ion exchange [Xie 2014] can utilized to work with the REE mixtures obtained by FJH since these are often less contaminated than those generated through traditional mining methods.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. The scope of protection is not limited by the description set out above, but is only limited by the claims which follow, that scope including all equivalents of the subject matter of the claims.

The disclosures of all patents, patent applications, and publications cited herein are hereby incorporated herein by reference in their entirety, to the extent that they provide exemplary, procedural, or other details supplementary to those set forth herein.

Amounts and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of approximately 1 to approximately 4.5 should be interpreted to include not only the explicitly recited limits of 1 to approximately 4.5, but also to include individual numerals such as 2, 3, 4, and sub-ranges such as 1 to 3, 2 to 4, etc. The same principle applies to ranges reciting only one numerical value, such as "less than approximately 4.5," which should be interpreted to include all of the above-recited values and ranges. Further, such an interpretation should apply regardless of the breadth of the range or the characteristic being described.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a" and "an" mean "one or more" when used in this application, including the claims.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter.

As used herein, the term "about" and "substantially" when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, the term "substantially perpendicular" and "substantially parallel" is meant to encompass variations of in some embodiments within ±10° of the perpendicular and parallel directions, respectively, in some embodiments within ±5° of the perpendicular and parallel directions, respectively, in some embodiments within ±1° of the perpendicular and parallel directions, respectively, and in some embodiments within ±0.5° of the perpendicular and parallel directions, respectively.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

REFERENCES

PCT International Patent Appl. Publ. No. WO/2020/051000, entitled "Flash Joule Heating Synthesis Method And Compositions Thereof," filed Aug. 23, 2019 and published Mar. 12, 2020, to James M. Tour et al. ("the Tour PCT '000 Application").

Abrahamson, J., "Graphite sublimation temperatures, carbon arcs and crystalline erosion," *Carbon,* 1974, 12, 111-141 ("Abrahamson 1974").

Alam, M. A., et al., "Economics of rare earth elements in ceramic capacitors," *Ceram. Int.,* 2012, 38, 6091-6098 ("Alam 2012").

Algozeeb, W. A., et al., "Flash graphene from plastic waste," *ACS Nano,* 2020, 14, 15595-15604 ("Algozeeb 2020").

Amrute, A. P., et al., "High-surface-area corundum by mechanochemically induced phase transformation of boehmite," *Science,* 2019, 366, 485-489 ("Amrute 2019").

Awasthi, A. K., et al., "Circular economy and electronic waste," *Nat. Electron.,* 2019, 2, 86-89 ("Awasthi 2019").

Baek, D., et al., "Ordered mesoporous metastable alpha-$MoC_{1-x}$ with enhanced water dissociation capability for boosting alkaline hydrogen evolution activity," *Adv. Funct. Mater.,* 2019, 29, 1901217-1901225 ("Back 2019").

Balaji, R., et al., *Urban Mining and Sustainable Waste Management* Ch. 7 (Springer, Singapore), 2020 ("Balaji 2020").

Balima, F., et al., Phase transformation of alumina induced by high pressure spark plasma sintering (HP-SPS)," *Scripta Mater,* 2019, 158, 20-23 ("Balima 2019").

Barreca, D., et al., $Y_2O_3$ thin films characterized by XPS, *Surf. Scid Spectra,* 2001, 8, 234-239 ("Barreca 2001").

Bianchini, M., et al., "The interplay between thermodynamics and kinetics in the solid-state synthesis of layered oxides," *Nat. Mater.,* 2020, 19, 1088-1095 ("Bianchini 2020").

Blochl, P. E., "Projector Augmented-wave method," *Phys. Rev. B,* 1994, 50, 17953-17979 ("Blochl 1994").

Boni, M., et al., "Quantitative mineralogical characterization of karst bauxite deposits in the southern Apennines, Italy," *Econ. Geol.,* 2013, 108, 813-833 ("Boni 2013").

Cao, W. B., et al., "Sintering of alpha-$Al_2O_3$ nanocrystalline ceramic from large alpha-$Al_2O_3$ polycrystalline nanoparticles," *Ceram Int,* 2017, 43, 1378-1382 ("Cao 2017").

Chang, P. L., et al., "Examinations on the critical and primary crystallite sizes during theta- to alpha-phase transformation of ultrafine alumina powders," *Nano Lett,* 2001, 1, 253-261 ("Chang 2001").

Chauruka, S. R., et al., "Effect of mill type on the size reduction and phase transformation of gamma alumina," *Chem Eng Sci,* 2015, 134, 774-783 ("Chauruka 2015").

Cheisson, T, et al., "Rare earth elements: Mendeleev's bane, modern marvels, *Science,* 2019, 363, 489-493 ("Cheisson 2019").

Chen, W. F., et al., "Recent developments in transition metal carbides and nitrides as hydrogen evolution electrocatalysts," *Chem. Commun.,* 2013, 49, 8896-8909 ("Chen 2013").

Chen, Y., et al., "Phase engineering of nanomaterials," *Nat. Rev. Chem.,* 2020, 4, 243-256 ("Chen 2020").

Claridge, J. B., et al., "Study of the temperature-programmed reaction synthesis of early transition metal carbide and nitride catalyst materials from oxide precursors," *Chem. Mater.,* 2000, 12, 132-142 ("Claridge 2000").

Cole, K. M., et al., "Surface $Y_2O_3$ layer formed on air exposed Y powder characterized by XPS," *Surf. Sci. Spectra,* 2020, 27, 024010-024021 ("Cole 2020").

Cui, J. R., et al., Metallurgical recovery of metals from electronic waste: A review," *J. Hazard. Mater.,* 2008, 158, 228-256 ("Cui 2008").

Dai, S. F., et al., "Petrology, mineralogy, and chemistry of size-fractioned fly ash from the Jungar Power Plant, Inner Mongolia, China, with emphasis on the distribution of rare earth elements," *Energy Fuels,* 2014, 28, 1502-1514 ("Dai 2014").

De Aza, A. H., et al., "Crack growth resistance of alumina, zirconia and zirconia toughened alumina ceramics for joint prostheses," *Biomaterials,* 2002, 23, 937-945 ("De Aza 2002").

Deady, E. A., et al., "A review of the potential for rare-earth element resources from European red muds: examples from Seydisehir, Turkey and Parnassus-Giona, Greece," *Mineral Mag,* 2016, 80(1), 43-61 ("Deady 2016").

Deasha, A. M., et al., "Oxidation of lanthanum overlayers on Cu(111)," *Surf. Sci.,* 1995, 322, 41-50 ("Deasha 1995").

Demetriou, M. D., et al., "Computation of metastable phases in tungsten-carbon system," *J. Phase Equilib.,* 2002, 23, 305-309 ("Demetriou 2002").

Deshmane, V. G., et al., "Selective recovery of rare earth elements from a wide range of e-waste and process scalability of membrane solvent extraction," *Environ. Sci. Technol.,* 2020, 54, 550-558 ("Deshmane 2020").

Dudarev, S. L., et al., "Electron-energy-loss spectra and the structural stability of nickel oxide: An LSDA+U study," *Phys. Rev. B,* 1998, 57, 1505-1509 ("Dudarev 1998").

Dyjak, S., et al., "A simple method of synthesis and surface purification of titanium carbide powder," *Int. J. Refract. Met. H,* 2013, 38, 87-91 ("Dyjak 2013").

Fan, X. J., et al., "Atomic H-induced $Mo_2C$ hybrid as an active and stable bifunctional electrocatalyst,"*ACS Nano,* 2017, 11, 384-394 ("Fan 2017").

Frank, B., et al., "Kinetics and mechanism of the reduction of nitric oxides by H-2 under lean-burn conditions on a Pt—Mo—Co/alpha-$Al_2O_3$ catalyst," *Appl Catal B-Environ,* 1998, 19, 45-57 ("Frank 1998").

Gao, Q. S., et al., "Structural Design and Electronic Modulation of Transition-Metal-Carbide Electrocatalysts toward Efficient Hydrogen Evolution," *Adv Mater,* 2019, 31(2) ("Gao 2019").

Ghosh, B., et al., "Waste Printed Circuit Boards recycling: an extensive assessment of current status," *J. Clean. Prod.,* 2015, 94, 5-19 ("Ghosh 2015").

Giorgi, E., et al., "Reactive carbothermal reduction of ZrC and ZrOC using Spark Plasma Sintering," *Adv. Appl. Ceram.,* 2018, 117, S34-S47 ("Giorgi 2018").

Greeley, J., Jaramillo, et al., "Computational high-throughput screening of electrocatalytic materials for hydrogen evolution," *Nat. Mater.,* 2006, 5, 909-913 ("Greeley 2006").

Greenwood, N. N., et al., *Chemistry of the Elements* (2nd ed., Butterworth-Heinemann), 1997, 299. ("Greenwood 1997").

Gong, Q. F., et al., "Ultrasmall and phase-pure $W_2C$ nanoparticles for efficient electrocatalytic and photoelectrochemical hydrogen evolution," *Nat Commun,* 2016, 7 ("Gong 2016").

Guo, R. Y, et al., "Selective Corrosion Preparation and Sintering of Disperse—$Al_2O_3$Nanoparticles,"*J Am Ceram Soc,* 2016, 99, 3556-3560 ("Guo 2016").

Hall, W. J., et al., "Separation and recovery of materials from scrap printed circuit boards," *Resour. Conserv. Recy.,* 2007, 51, 691-709 ("Hall 2007").

Han, N. N., et al., "Nitrogen-doped tungsten carbide nanoarray as an efficient bifunctional electrocatalyst for water splitting in acid," *Nat. Commun.,* 2018, 9, 924 ("Han 2018").

Hikichi, Y, et al., "Melting temperatures of monazite and xenotime," *J. Am. Ceram. Soc.,* 1987, 70, 252-253 ("Hikichi 1987").

Hong, Y, et al., "Precious metal recovery from electronic waste by a porous porphyrin polymer," *P Natl. Acad. Sci. USA,* 2010, 117, 16174-16180 ("Hong 2020").

Hugosson, H. W., et al., "Phase stability diagrams of transition metal carbides, a theoretical study," *Chem. Phys. Lett.,* 2001, 333, 444-450 ("Hugosson 2001").

Hugosson, H. W., et al., "Theory of phase stabilities and bonding mechanisms in stoichiometric and substoichiometric molybdenum carbide," *J. Appl. Phys.,* 1999, 86, 3758-3767 ("Hugosson 1999").

Ighodaro, O. L., et al., "Fracture toughness enhancement for alumina systems: A review," *Int J Appl Ceram Tec,* 2008, 5(3), 313-323 ("Ighodaro 2008").

Jadhav, U., et al. "Hydrometallurgical recovery of metals from large printed circuit board pieces," *Sci. Rep.-UK,* 2015, 5, 14574 ("Jadhav 2015").

Jang, H. D., et al., "The effects of temperature on particle-size in the gas-phase production of $TiO_2$," *Aerosol. Sci. Tech.,* 1995, 23, 553-560 ("Jang 1995").

Johnson, W. L., et al., "Beating Crystallization in Glass-forming metals by millisecond heating and processing," *Science,* 2011, 332, 828-833 ("Johnson 2011").

Johnston, G. P., et al., "Reactive Laser Ablation Synthesis of Nanosize Alumina Powder," *J Am Ceram Soc,* 1992, 75, 3293-3298 ("Johnston 1992").

Julander, A., et al. "Formal recycling of e-waste leads to increased exposure to toxic metals: An occupational exposure study from Sweden," *Environ. Int,* 2014, 73, 243-251 ("Julander 2014").

Jyothi, R. K., et al., "Review of rare earth elements recovery from secondary resources for clean energy technologies: Grand opportunities to create wealth from waste," *J. Clean. Prod.,* 2020, 267, 122048-122073 ("Jyothi 2020").

Karagedov, G. R., et al., "Preparation and sintering of nanosized alpha-$Al_2O_3$ powder," *Nanostruct Mater,* 1998, 11, 559-572 ("Karagedov 1999").

Kaya, M., "Recovery of metals and nonmetals from electronic waste by physical and chemical recycling processes," Waste Manage., 2016, 57, 64-90 ("Kaya 2016").

Khaliq, A., et al., "Metal extraction processes for electronic waste and existing industrial routes: a review and australian perspective," *Resources,* 2014, 3, 152-179 ("Khaliq 2014").

Kim, R., et al., "Optimization of acid leaching of rare-earth elements from Mongolian apatite-based Ore," *Minerals,* 2016, 6, 63 ("Kim 2016").

King, J. F., et al., "Aqueous acid and alkaline extraction of rare earth elements from coal combustion ash," *Int. J. Coal Geol.,* 2018, 195, 75-83 ("King 2018").

Kinuthia, G. K., et al., "Levels of heavy metals in wastewater and soil samples from open drainage channels in Nairobi, Kenya: community health implication," *Sci. Rep.-UK,* 2020, 10, 8434 ("Kinuthia 2020").

Kolel-Veetil, M. K., et al., "Formation of a superconducting mixture of beta-$Mo_2C$ nanoparticles and carbon nanotubes in an amorphous matrix of molybdenum compounds by the pyrolysis of a molybdenum derivative of a carboranylenesiloxane," *Chem. Mater.,* 2005, 17, 6101-6107 ("Kolel-Veetil 2005").

Kolker, A., et al., "Distribution of rare earth elements in coal combustion fly ash, determined by SHRIMP-RG ion microprobe," *Int. J Coal. Geol.,* 2017, 184, 1-10 ("Kolker 2017").

Krell, A., et al., "Effects of grain size and humidity on fretting wear in fine-grained alumina, $Al_2O_3$/TiC, and zirconia," *J Am Ceram Soc,* 1996, 79, 1139-1146 ("Krell 1996").

Kresse, G. et al., "Efficient iterative schemes for ab initio total-energy calculations using a plane-wave basis set," *Phys. Rev. B,* 1996, 54, 11169-11186 ("Kresse 1996").

Kumar, A. S., et al., "Machinability of hardened steel using alumina based ceramic cutting tools," *Int J Refract Met H,* 2003, 21, 109-117 ("Kumar 2003").

Kurlov, A. S., et al., "Tungsten carbides and W—C phase diagram," *Inorg. Mater.,* 2006, 42, 121-127 ("Kurlov 2006").

Lathe, R. M., et al., "Nano-alpha-$Al_2O_3$ by liquid-feed flame spray pyrolysis," *Nat Mater,* 2006, 5, 710-712 ("Laine 2006").

Lamouri, S., et al., "Control of the gamma-alumina to alpha-alumina phase transformation for an optimized alumina densification," *Bol Soc Esp Ceram V,* 2017, 56, 47-54 ("Lamouri 2017").

Lee, J. C. K., et al., "Pathways for greening the supply of rare earth elements in China," *Nat. Sustain.,* 2018, 1, 598-605 ("Lee 2018").

Leung, A. O. W., et al., "Heavy metals concentrations of surface dust from e-waste recycling and its human health implications in southeast China," *Environ. Sci. Technol.,* 2008, 42, 2674-2680 ("Leung 2008").
Levin, I., et al., "Metastable alumina polymorphs: Crystal structures and transition sequences," *J Am Ceram Soc,* 1998, 81, 1995-2012 ("Levin 1998").
Li, J. G., et al., "Densification and grain growth of $Al_2O_3$ nanoceramics during pressureless sintering," *J Am Ceram Soc,* 2006, 89, 139-143 ("Li 2006").
Li, J. G., et al., "Synthesis and sintering behavior of a nanocrystalline alpha-alumina powder," *Acta Mater,* 2000, 48, 3103-3112 ("Li 2000").
Li, J. P. H., et al., "Understanding of binding energy calibration in XPS of lanthanum oxide by in situ treatment," *Phys. Chem. Chem. Phys.,* 2019, 21, 22351-22358 ("Li 2019").
Li, J. S., et al., "Coupled molybdenum carbide and reduced graphene oxide electrocatalysts for efficient hydrogen evolution," *Nat. Commun.,* 2016, 7, 11204 ("Li 2016").
Li, Z., et al., "Two-dimensional transition metal carbides as supports for tuning the chemistry of catalytic nanoparticles," *Nat. Commun.,* 2018, 9, 5258 ("Li 2018").
Lide, D. R., *CRC Handbook of Chemistry and Physics* Ch. 4 (CRC Press, Internet Version), 2005 ("Lide 2005").
Lin, B. Y., et al., "Ammonia Synthesis Activity of Alumina-Supported Ruthenium Catalyst Enhanced by Alumina Phase Transformation," *Acs Catal,* 2019, 9(3), 1635-1644 ("Lin 2019").
Lin, L. L., et al., "Low-temperature hydrogen production from water and methanol using Pt/alpha-MoC catalysts," *Nature,* 2017, 544, 80-83 ("Lin 2017").
Liu, P., et al., "Comprehensive understandings of rare earth element (REE) speciation in coal fly ashes and implication for REE extractability," *Environ. Sci. Technol.,* 2019, 53, 5369-5377 ("Liu 2019").
Lodziana, Z., et al., "A negative surface energy for alumina," *Nat Mater,* 2004, 3(5), 289-293 ("Lodziana 2004").
Loffler, L., et al., "Transformation mechanism of the dehydration of diaspore," *J Am Ceram Soc,* 2003, 86(4), 534-540 ("Loffler 2003").
Luong, D. X., et al., "Gram-scale bottom-up flash graphene synthesis," *Nature,* 2020, 577(7792), 647-651 ("Luong 2020").
Ma, R. G., et al., "Ultrafine Molybdenum Carbide Nanoparticles Composited with Carbon as a Highly Active Hydrogen-Evolution Electrocatalyst," *Angew Chem Int Edit,* 2015, 54(49), 14723-14727 ("Ma 2015").
Maroufi, S., et al., "Recovery of rare earth (i.e., La, Ce, Nd, and Pr) oxides from end-of-life Ni-MH battery via thermal isolation," *ACS Sustain. Chem. Eng.,* 2018, 6, 11811-11818 ("Maroufi 2018").
Matanovic, I., et al., "Nitrogen electroreduction and hydrogen evolution on cubic molybdenum carbide: a density functional study," *Phys. Chem. Chem. Phys.,* 2018, 20, 14679- 14687 ("Matanovic 2018").
Mavrikakis, M., "Computational methods: A search engine for catalysts," *Nat. Mater.,* 2006, 5, 847-848 ("Mavrikakis 2006").
McHale, J. M., et al., "Surface energies and thermodynamic phase stability in nanocrystalline aluminas," *Science,* 1997, 277(5327), 788-791 ("McHale 1997").
Middleton, A., et al., "Major element composition controls rare earth element solubility during leaching of coal fly ash and coal by-products," *Int. J. Coal. Geol.,* 2020, 227, 103532-103539 ("Middleton 2020").
Mizuta, H., et al., "Preparation of High-Strength and Translucent Alumina by Hot Isostatic Pressing," *J Am Ceram Soc,* 1992, 75, 469-473 ("Mizuta 1992").
Monkhorst, H. J., et al., "Special points for brillouin-zone integrations," *Phys. Rev. B,* 1976, 13, 5188-5192 ("Monkhorst 1976").
Ochsenkuhn-Petropulu, M., et al., "Recovery of lanthanides and yttrium from red mud by selective leaching," *Anal. Chim. Acta.,* 1996, 319, 249-254 ("Ochsenkuhn-Petropulu 1996").
Ochsenkuhn-Petropulu, M., et al., "Selective Separation and Determination of Scandium from Yttrium and Lanthanides in Red Mud by a Combined Ion Exchange/Solvent Extraction Method," *Anal Chim Acta,* 1995, 315(1-2), 231-237 ("Ochsenkuhn-Petropulu 1995").
Ogunseitan, O. A., et al., "The electronics revolution: From e-wonderland to e-wasteland," *Science,* 2009, 326, 670-671 ("Ogunseitan 2009").
Okamoto, H., et al., *ASM Handbook Volume* 3*: Alloy Phase Diagrams* (ASM International, Ohio), 2016 ("Okamoto 2016").
Olavarria-Contreras, I. J., et al., "C—Au covalently bonded molecular junctions using nonprotected alkynyl anchoring groups," *J. Am. Chem. Soc.,* 2016, 138, 8465-8469 ("Olavarria-Contreras 2016").
Oyama, S. T., "Preparation and catalytic properties of transition-metal carbides and nitrides," *Catal. Today,* 1992, 15, 179-200 ("Oyama 1992").
Park, Y. J., et al., "Recovery of high purity precious metals from printed circuit boards," *J. Hazard. Mater.,* 2009, 164, 1152-1158 ("Park 2009").
Pearson, R. G., "Hard and soft acids and bases," *J. Am. Chem. Soc.,* 1963, 85, 3533-3539 ("Pearson 1963").
Peelman, S., et al., "Hydrometallurgical recovery of rare earth elements from mine tailings and WEEE," *J. Sustain. Metall.,* 2018, 4, 367-377 ("Peelman 2018").
Peelman, S. et al., in *Rare Earths Industry* (Borges, I., et al., Eds., Elsevier, Boston), 2016, 319-334 ("Peelman 2016").
Perdew, J. P., et al., "Generalized gradient approximation made simple," *Phys. Rev. Lett.,* 1996, 77, 3865-3868 ("Perdew 1996").
Peterson, E. J., et al., "Low-temperature carbon monoxide oxidation catalysed by regenerable atomically dispersed palladium on alumina," *Nat Commun,* 2014, 5, 4885 ("Peterson 2014").
Pinto, H. P., et al., "Ab initio study of gamma-$Al_2O_3$ surfaces," *Phys Rev B,* 2004, 70, 125402-125412 ("Pinto 2004").
Pol, V. G., et al., "One-step synthesis and characterization of SiC, $Mo_2C$, and WC nanostructures," *Eur. J. Inorg. Chem.,* 2009, 6, 709-715 ("Pol 2009").
Politi, J. R. D., et al., "Atomic and electronic structure of molybdenum carbide phases: bulk and low Miller-index surfaces," *Phys. Chem. Chem. Phys.,* 2013, 15, 12617-12625 ("Politi 2013").
Popoola, O. E., et al., "Levels of awareness and concentrations of heavy metals in the blood of electronic waste scavengers in Nigeria," *J. Health Pollut.,* 2019, 9, 190311 ("Popoola 2019").
Quinet, P., et al., "Recovery of precious metals from electronic scrap by hydrometallurgical processing routes," *Miner. Metall. Proc.,* 2005, 22, 17-22 ("Quinet 2005").
Reddy, K. M., et al., "Enhanced mechanical properties of nanocrystalline boron carbide by nanoporosity and interface phases," *Nat. Commun.,* 2012, 3, 1052 ("Reddy 2012").
Reid, S., et al., "Technospheric mining of rare earth elements from bauxite residue (red mud): process optimization, kinetic investigation, and microwave pretreatment," *Sci. Rep.,* 2017, 7, 15252 ("Reid 2017").

Rivera, R. M., et al., "Extraction of rare earths from bauxite residue (red mud) by dry digestion followed by water leaching," *Miner. Eng.*, 2018, 119, 82-92 ("Rivera 2018").

Rosa, C. J., "Carbon diffusion in $Mo_2C$ as determined from carburization of Mo," *Metall. Trans. A*, 1983, 14, 199-202 ("Rosa 1983").

Sahoo, P. K., et al., "Recovery of metals and other beneficial products from coal fly ash: a sustainable approach for fly ash management," *Int. J. Coal Sci. Technol.*, 2016, 3, 267-283 ("Sahoo 2016").

Sarker, P., et al., "High-entropy high-hardness metal carbides discovered by entropy descriptors," *Nat. Commun.*, 2018, 9, 4980 ("Sarker 2018").

Sarvar, M., et al., "Characterization and mechanical separation of metals from computer Printed Circuit Boards (PCBs) based on mineral processing methods," *Waste Manage.*, 2015, 45, 246-257 ("Sarvar 2015").

Schatzmann, M. T., et al., "Synthesis of monoclinic monazite, $LaPO_4$, by direct precipitation," *J. Mater. Chem.*, 2009, 19, 5720-5722 ("Schatzmann 2009").

Sethurajan, M., et al., "Recent advances on hydrometallurgical recovery of critical and precious elements from end of life electronic wastes—a review," *Crit. Rev. Env. Sci. Tec.*, 2019, 49, 212-275 ("Sethurajan 2019").

Service, R. F., "Red alert," *Science*, 2020, 369, 910-911 ("Service 2020").

Smith, R. C., et al., "Selective recovery of rare earth elements from coal fly ash leachates using liquid membrane processes," *Environ. Sci. Technol.*, 2019, 53, 4490-4499 ("Smith 2019").

Smolka-Danielowska, D., "Rare earth elements in fly ashes created during the coal burning process in certain coal-fired power plants operating in Poland—Upper Silesian Industrial Region," *J Environ. Radioactiv.*, 2010, 101, 965-968 ("Smolka-Danielowska 2010").

Soderberg, M., "Resistive breakdown of inhomogeneous-media," *Phys Rev B*, 1987, 35, 352-357 ("Soderberg 1987").

Song, H. J., et al., "Ultrafine alpha-phase molybdenum carbide decorated with platinum nanoparticles for efficient hydrogen production in acidic and alkaline media," *Adv. Sci.*, 2019, 6, 1802135-1802142 ("Song 2019").

Stanford, M. G., et al., "Flash Graphene Morphologies," *ANS Nano*, 2020, https://doi.org/10.1021/acsnano.0c05900 ("Stanford 2020").

Steiner, C. J.-P., et al., "Kinetics of the gamma-to-alpha alumina phase transformation," *J Am Ceram Soc*, 1971, 54, 412-413 ("Steiner 1971").

Sthiannopkao, S., et al., "Handling e-waste in developed and developing countries: Initiatives, practices, and consequences," *Sci Total Environ*, 2013, 463, 1147-1153 ("Sthiannopkao 2013").

Stuckman, M. Y, et al., "Distribution and speciation of rare earth elements in coal combustion by-products via synchrotron microscopy and spectroscopy," *Int. J. Coal Geol.*, 2018, 195, 125-138 ("Stuckman 2018").

Sun, G. L., et al., "Using yeast to sustainably remediate and extract heavy metals from waste waters," *Nat. Sustain.*, 2020, 3, 303-311 ("Sun 2020").

Sun, W. H., et al., "Thermodynamic routes to novel metastable nitrogen-rich nitrides," *Chem. Mater.*, 2017, 29, 6936-6946 ("Sun W 2017").

Sun, Z. et al., "Toward sustainability for recovery of critical metals from electronic waste: The hydrochemistry processes," *ACS Sustain. Chem. Eng.*, 2017, 5, 21-40 ("Sun Z 2017").

Taggart, R. K., et al., "Effects of roasting additives and leaching parameters on the extraction of rare earth elements from coal fly ash," *Int. J. Coal Geol.*, 2018, 196, 106-114 ("Taggart 2018").

Taggart, R. K., et al., "Trends in the rare earth element content of US-based coal combustion fly ashes," *Environ. Sci. Technol.*, 2016, 50, 5919-5926 ("Taggart 2016").

Taktak, R., et al., "Effect of binders on microstructural and mechanical properties of sintered alumina," *Mater Charact*, 2011, 62, 912-916 ("Taktak 2011").

Teng, X. Y., et al., "Effect of $Al_2O_3$ particle size on the mechanical properties of alumina-based ceramics," *Mat Sci Eng a-Struct*, 2007, 452, 545-551 ("Teng 2007").

Theo, L., *Proceedings of the* 1998 *IEEE International Symposium on Electronics and the Environment. ISEE*—1998 (*Cat. No.* 98*CH*36145), 1998, 42-47 ("Theo 1998").

Ueda, T., Ichiishi, et al., *Metal Sustainability: Global Challenges, Consequences, and Prospects*, Ch. 15, (John Wiley & Sons Press, West Sussex), 2016 ("Ueda 2016").

Ushakov, S. V., et al., "Thermochemistry of rare-earth orthophosphates," *J. Mater. Res.*, 2001, 16, 2623-2633 ("Ushakov 2001").

Xie, F., et al., "A critical review on solvent extraction of rare earths from aqueous solutions," *Miner. Eng.*, 2014, 56, 10-28 ("Xie 2014").

Wan, C., et al., "Multiple Phases of Molybdenum Carbide as Electrocatalysts for the Hydrogen Evolution Reaction," *Angew Chem Int Edit*, 2014, 53(25), 6407-6410 ("Wan 2014").

Wan, J., et al., "Rapid synthesis of size-tunable transition metal carbide nanodots under ambient conditions," *J. Mater. Chem. A*, 2019, 7, 14489-14495 ("Wan 2019").

Wang, C. W., et al., "A general method to synthesize and sinter bulk ceramics in seconds," *Science*, 2020, 368, 521-526 ("Wang 2020").

Wang, K. F., et al., "Fabrication of ultrafine and high-purity tungsten carbide powders via a carbothermic reduction-carburization process," *J. Alloy Compd.*, 2019, 784, 362-369 ("Wang K 2019").

Wang, S. F., et al., "Transparent ceramics: Processing, materials and applications," *Prog Solid State Ch*, 2013, 41, 20-54 ("Wang 2013").

Wang, Y. Y., et al., "Raman studies of monolayer graphene: The substrate effect," *J Phys Chem C*, 2008, 112, 10637-10640 ("Wang 2008").

Wang, Z., et al., "Rare earth elements and yttrium in coal ash from the Luzhou power plant in Sichuan, Southwest China: Concentration, characterization and optimized extraction," *Int. J Coal Geol.*, 2019, 203, 1-14 ("Wang Z 2019").

Wang, Z. H., et al., "Take responsibility for electronic-waste disposal," *Nature*, 2016, 536, 23-25 ("Wang 2016").

Wolden, C. A., et al., "Synthesis of beta-$Mo_2C$ Thin Films," *ACS Appl. Mater. Inter.*, 2011, 3, 517-521 ("Wolden 2011").

Wu, K. H., et al., "Synthesis of high purity nano-sized transition-metal carbides," *J. Mater. Res. Technol.*, 2020, 9, 11778-11790 ("Wu 2020").

Yamane, L. H., et al., "Recycling of WEEE: Characterization of spent printed circuit boards from mobile phones and computers," *Waste Manage.*, 2011, 31, 2553-2558 ("Yamane 2011").

Yao, S. Y., et al., "Atomic-layered Au clusters on alpha-MoC as catalysts for the low-temperature water-gas shift reaction," *Science*, 2017, 357, 389-393 ("Yao 2017").

Yao, Y. G., et al., "Carbothermal shock synthesis of high-entropy-alloy nanoparticles," *Science,* 2018, 359, 1489-1494 ("Yao 2018").

Yoo, Y. S., et al., "Preparation of alpha-alumina nanoparticles via vapor-phase hydrolysis of $AlCl_3$," *Mater Lett,* 2009, 63, 1844-1846 ("Yoo 2009").

Zeng, M., et al., "Recent advances in heterogeneous electrocatalysts for the hydrogen evolution reaction," *J. Mater. Chem. A,* 2015, 3, 14942-14962 ("Zeng 2015").

Zeng, X. L., et al., "Urban mining of e-waste is becoming more cost-effective than virgin mining," *Environ. Sci. Technol.,* 2018, 52, 4835-4841 ("Zeng 2018").

Zhang, J. F., et al., "Biomorphic cellular silicon carbide nanocrystal-based ceramics derived from wood for use as thermally stable and lightweight structural materials, *ACS Appl. Nano Mater.,* 2019, 2, 7051-7060 ("Zhang 2019").

Zhang, K., et al., "E-waste recycling: where does it go from here?" *Environ. Sci. Technol.,* 2012, 46, 10861-10867 ("Zhang 2012").

Zhang, W. C., et al., "A comprehensive review of rare earth elements recovery from coal-related materials," *Minerals,* 2020, 10, 451-478 ("Zhang 2020").

Zhang, X. X., at al., "Nanocrystalline alpha-alumina with novel morphology at 1000 degrees C.,"*J Mater Chem,* 2008, 18, 2423-2425 ("Zhang 2008").

Zhao, Y. F., et al., "First-principles prediction of icosahedral quantum dots for tetravalent semiconductors," *Phys Rev Lett,* 2004, 93, 015502 ("Zhao 2004").

Zhao, Y. F., et al., "What is the ground-state structure of the thinnest Si nanowires?" *Phys Rev Lett,* 2003, 91(3), 035501 ("Zhao 2003").

Zhong, L. S., et al., "Cobalt carbide nanoprisms for direct production of lower olefins from syngas," *Nature,* 2016, 538, 84-87 ("Zhong 2016").

Zhou, Y, et al., "Densification and grain growth in pulse electric current sintering of alumina," *J Eur Ceram Soc,* 2004, 24, 3465-3470 ("Zhou 2004").

Zhuang, W. Q., et al., "Recovery of critical metals using biometallurgy," *Curr. Opin. Biotech.,* 2015, 33, 327-335 ("Zhuang 2015").

Zielinski, P. A., et al., "Structural transformations of alumina by high-energy ball-milling," *J Mater Res,* 1993, 8, 2985-2992 ("Zielinski 1993").

Zou, J., et al., "Spark Plasma Sintering of Superhard $B_4CZrB_2$ Ceramics by Carbide Boronizing," *J Am Ceram Soc,* 2013, 96(4), 1055-1059 ("Zou 2013").

What is claimed is:

1. A method of recovering metal, wherein the method comprises:

(a) mixing a material with a conductive additive to form a mixture, wherein the material is prepared from ores, fly ash, and/or bauxite residue;

(b) applying a voltage across the mixture to recover metal from the material, wherein (i) the voltage is applied in one or more voltage pulses, and (ii) duration of each of the one or more voltage pulses is for a duration period; and (c) collecting the recovered metal, wherein the recovering and collecting of the metal comprises performing a leaching process after applying the voltage across the mixture.

2. The method of claim 1, wherein the material is prepared from ore.

3. The method of claim 1, wherein the material is prepared from fly ash.

4. The method of claim 1, wherein the material is prepared from bauxite residue.

5. The method of claim 1, wherein the material is prepared by performing a mechanical process to transform the material into a fine powder.

6. The method of claim 1, wherein the material and the conductive additive are mixed at a weight ratio in a range of 1:2 and 25:1.

7. The method of claim 1, wherein the voltage applied is in a range of 15 V and 300 V.

8. The method of claim 1, wherein (a) mass of the mixture to which the voltage is applied is more than 1 kg; and (b) the voltage applied is between 100 V and 100,000 V.

9. The method of claim 1, wherein (a) mass of the mixture to which the voltage is applied is more than 1 kg; and (b) the voltage is applied to produce a current between 1,000 amps and 30,000 amps.

10. The method of claim 1, wherein the mixture has a resistance in the range of 0.1 ohms and 25 ohms when the voltage is applied.

11. The method of claim 1, wherein the voltage pulse is performed using direct current (DC).

12. The method of claim 1, wherein the method is performed utilizing a pulsed direct current (PDC) Joule heating process.

13. The method of claim 1, wherein the voltage pulse is performed using alternating current (AC).

14. The method of claim 1, wherein the voltage pulse is performed by using both direct current (DC) and alternating current.

15. The method of claim 14, wherein the method switches back and forth between the use of direct current (DC) and alternating current (AC).

16. The method of claim 1, wherein the metal comprises a rare earth element.

17. The method of claim 1, wherein the metal comprises precious metal.

18. The method of claim 1, wherein (a) the materials comprises a metal oxide; and (b) the step of applying a voltage across the mixture results in a carbothermic reaction of the metal oxide to recover the metal.

19. The method of claim 1, wherein the applying of the voltage across the mixture to recover the metal from the material is performed at a pressure between 0.001 and 25 atmospheres.

20. The method of claim 19, wherein the method is performed using a pressurized cell.

21. The method of claim 20, wherein (a) the applying of the voltage across the mixture to recover the metal from the material creates graphene from the mixture; and (b) the applying of the voltage across the mixture to recover the metal from the material results in a majority of the metal remaining with the graphene created.

22. The method of claim 21, wherein the collecting of the recovered metal comprises separating the metal from the graphene.

23. The method of claim 1, wherein the step of collecting comprises collecting a gas stream comprising volatized products produced by the application of the voltage across the mixture.

24. The method of claim 1, wherein the leachability of metals in the mixture after applying a voltage across the mixture is more than two times the leachability content of the metals in the mixture before applying the voltage across the mixture, when conducted using the same pH and same volume of aqueous treatment.

* * * * *